(12) United States Patent
Lindmeier et al.

(10) Patent No.: US 12,307,580 B2
(45) Date of Patent: May 20, 2025

(54) METHODS FOR MANIPULATING OBJECTS IN AN ENVIRONMENT

(71) Applicant: Apple Inc., Cupertino, CA (US)

(72) Inventors: William D. Lindmeier, San Francisco, CA (US); Matan Stauber, San Francisco, CA (US); Stephen O. Lemay, Palo Alto, CA (US); Matthew J. Sundstrom, Campbell, CA (US); Madeleine Cordier, San Francisco, CA (US); Kristi E. Bauerly, Los Altos, CA (US); Peter D. Anton, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/469,788

(22) Filed: Sep. 8, 2021

(65) Prior Publication Data

US 2022/0084279 A1    Mar. 17, 2022

Related U.S. Application Data

(60) Provisional application No. 63/077,521, filed on Sep. 11, 2020.

(51) Int. Cl.
*G06T 15/20* (2011.01)
*G06F 3/01* (2006.01)

(52) U.S. Cl.
CPC .............. *G06T 15/20* (2013.01); *G06F 3/013* (2013.01); *G06F 3/017* (2013.01)

(58) Field of Classification Search
None
See application file for complete search history.

(56) References Cited

U.S. PATENT DOCUMENTS

| 5,015,188 | A |   | 5/1991  | Pellosie et al. |
| 5,809,267 | A | * | 9/1998  | Moran ............... G06V 30/36 715/863 |
| 6,167,433 | A |   | 12/2000 | Maples et al. |

(Continued)

FOREIGN PATENT DOCUMENTS

| CN | 102298493 A | 12/2011 |
| EP | 2393056 A1  | 12/2011 |

(Continued)

OTHER PUBLICATIONS

International Search Report received for PCT Patent Application No. PCT/US2021/049520, mailed on Apr. 8, 2022, 8 pages.

(Continued)

*Primary Examiner* — Frank S Chen
(74) *Attorney, Agent, or Firm* — Kubota & Basol LLP

(57) ABSTRACT

In some embodiments, an electronic device enhances a two-dimensional drawing. In some embodiments, an electronic device manipulates an object in a three-dimensional environment. In some embodiments, an electronic device displays a contextual menu or moving an object in a three-dimensional environment. In some embodiments, an electronic device moves an object in a three-dimensional environment by an amount based on the distance of the object from the user. In some embodiments, an electronic device scans a real world object. In some embodiments, an electronic device manipulates a distant object.

57 Claims, 87 Drawing Sheets

(56) References Cited

U.S. PATENT DOCUMENTS

| | | |
|---|---|---|
| 6,295,069 B1 | 9/2001 | Shirur |
| 6,323,846 B1 | 11/2001 | Westerman et al. |
| 6,426,745 B1 | 7/2002 | Isaacs et al. |
| 6,570,557 B1 | 5/2003 | Westerman et al. |
| 6,677,932 B1 | 1/2004 | Westerman |
| 6,750,873 B1 | 6/2004 | Bernardini et al. |
| 7,298,370 B1 | 11/2007 | Middler et al. |
| 7,580,576 B2 | 8/2009 | Wang et al. |
| 7,614,008 B2 | 11/2009 | Ording |
| 7,633,076 B2 | 12/2009 | Huppi et al. |
| 7,634,718 B2 | 12/2009 | Nakajima |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,721,226 B2 | 5/2010 | Barabe et al. |
| 7,844,914 B2 | 11/2010 | Andre et al. |
| 7,957,762 B2 | 6/2011 | Herz et al. |
| 8,006,002 B2 | 8/2011 | Kalayjian et al. |
| 8,239,784 B2 | 8/2012 | Hotelling et al. |
| 8,279,180 B2 | 10/2012 | Hotelling et al. |
| 8,381,135 B2 | 2/2013 | Hotelling et al. |
| 8,479,122 B2 | 7/2013 | Hotelling et al. |
| 9,183,672 B1 | 11/2015 | Hickman et al. |
| 9,214,137 B2 | 12/2015 | Bala et al. |
| 9,245,388 B2 | 1/2016 | Poulos et al. |
| 9,294,757 B1 | 3/2016 | Lewis et al. |
| 9,298,334 B1 | 3/2016 | Zimmerman et al. |
| 9,348,458 B2 | 5/2016 | Hotelling et al. |
| 9,383,189 B2 | 7/2016 | Bridges et al. |
| 9,396,580 B1 | 7/2016 | Nowrouzezahrai et al. |
| 9,519,371 B2 | 12/2016 | Nishida |
| 9,704,230 B2 | 7/2017 | Hofmann et al. |
| 9,779,512 B2 | 10/2017 | Tomlin et al. |
| 9,911,232 B2 | 3/2018 | Shapira et al. |
| 9,933,937 B2 | 4/2018 | Lemay et al. |
| 10,026,209 B1 | 7/2018 | Dagley et al. |
| 10,339,721 B1 | 7/2019 | Dascola et al. |
| 10,373,381 B2 | 8/2019 | Nuernberger et al. |
| 10,488,941 B2 | 11/2019 | Lam et al. |
| 10,642,368 B2 | 5/2020 | Chen |
| 10,664,043 B2 | 5/2020 | Ikuta et al. |
| 10,671,241 B1 | 6/2020 | Jia et al. |
| 10,691,216 B2 | 6/2020 | Geisner et al. |
| 10,762,716 B1 | 9/2020 | Paul et al. |
| 10,776,933 B2 | 9/2020 | Faulkner |
| 10,846,864 B2 | 11/2020 | Kim et al. |
| 11,138,798 B2 | 10/2021 | Paul et al. |
| 11,204,678 B1 | 12/2021 | Baker et al. |
| 11,249,556 B1 | 2/2022 | Schwarz et al. |
| 11,262,885 B1 | 3/2022 | Burckel |
| 11,340,756 B2 | 5/2022 | Faulkner et al. |
| 11,347,319 B2 | 5/2022 | Goel et al. |
| 11,380,323 B2 | 7/2022 | Shin et al. |
| 11,409,363 B2 | 8/2022 | Chen et al. |
| 11,416,080 B2 | 8/2022 | Heo et al. |
| 11,531,402 B1 | 12/2022 | Stolzenberg |
| 11,531,459 B2 | 12/2022 | Poupyrev et al. |
| 11,557,102 B2 | 1/2023 | Palangie et al. |
| 11,615,596 B2 | 3/2023 | Faulkner et al. |
| 11,641,460 B1 | 5/2023 | Geusz et al. |
| 11,669,155 B2 | 6/2023 | Bowman et al. |
| 11,762,473 B2 | 9/2023 | Cipoletta et al. |
| 11,768,544 B2 | 9/2023 | Schwarz et al. |
| 11,847,748 B2 | 12/2023 | Liu et al. |
| 11,886,643 B2 | 1/2024 | Irie et al. |
| 11,899,845 B2 | 2/2024 | Chung et al. |
| 11,909,453 B2 | 2/2024 | Javaudin et al. |
| 11,914,759 B2 | 2/2024 | Klein et al. |
| 11,928,263 B2 | 3/2024 | Jung et al. |
| 11,983,326 B2 | 5/2024 | Lacey |
| 11,989,965 B2 | 5/2024 | Tarighat Mehrabani |
| 12,032,803 B2 | 7/2024 | Pastrana Vicente et al. |
| 12,154,236 B1 | 11/2024 | Herman et al. |
| 2002/0015024 A1 | 2/2002 | Westerman et al. |
| 2002/0030692 A1* | 3/2002 | Griesert ............... G06T 15/20 348/E5.022 |
| 2005/0062738 A1 | 3/2005 | Handley et al. |
| 2005/0190059 A1 | 9/2005 | Wehrenberg |
| 2005/0248299 A1 | 11/2005 | Chemel et al. |
| 2006/0017692 A1 | 1/2006 | Wehrenberg et al. |
| 2006/0033724 A1 | 2/2006 | Chaudhri et al. |
| 2006/0197753 A1 | 9/2006 | Hotelling |
| 2008/0310707 A1 | 12/2008 | Kansal et al. |
| 2010/0185949 A1 | 7/2010 | Jaeger |
| 2010/0302245 A1 | 12/2010 | Best |
| 2010/0332196 A1 | 12/2010 | Fisker et al. |
| 2011/0142321 A1 | 6/2011 | Huffman |
| 2011/0243448 A1 | 10/2011 | Kawabuchi et al. |
| 2011/0320969 A1 | 12/2011 | Hwang et al. |
| 2012/0113223 A1 | 5/2012 | Hilliges et al. |
| 2012/0170089 A1 | 7/2012 | Kim et al. |
| 2012/0249741 A1 | 10/2012 | Maciocci et al. |
| 2013/0222227 A1 | 8/2013 | Johansson et al. |
| 2013/0321462 A1 | 12/2013 | Salter et al. |
| 2013/0332890 A1 | 12/2013 | Ramic et al. |
| 2014/0040832 A1 | 2/2014 | Regelous |
| 2014/0071241 A1 | 3/2014 | Yang et al. |
| 2014/0078176 A1 | 3/2014 | Kim et al. |
| 2014/0104206 A1 | 4/2014 | Anderson |
| 2014/0129990 A1 | 5/2014 | Xin et al. |
| 2014/0237366 A1 | 8/2014 | Poulos et al. |
| 2014/0333666 A1* | 11/2014 | Poulos .............. G06T 19/006 345/633 |
| 2014/0363074 A1 | 12/2014 | Dolfing et al. |
| 2014/0368620 A1 | 12/2014 | Li et al. |
| 2015/0067580 A1 | 3/2015 | Um et al. |
| 2015/0121466 A1 | 4/2015 | Brands et al. |
| 2015/0123901 A1 | 5/2015 | Schwesinger et al. |
| 2015/0153833 A1* | 6/2015 | Pinault ................ G06F 3/0304 345/156 |
| 2015/0317831 A1 | 11/2015 | Ebstyne et al. |
| 2015/0331576 A1 | 11/2015 | Piya et al. |
| 2016/0026242 A1 | 1/2016 | Burns et al. |
| 2016/0098093 A1 | 4/2016 | Cheon et al. |
| 2016/0189426 A1* | 6/2016 | Thomas ............... G06F 3/011 345/633 |
| 2016/0225164 A1 | 8/2016 | Tomlin et al. |
| 2016/0291922 A1 | 10/2016 | Montgomerie et al. |
| 2016/0373647 A1 | 12/2016 | García Morate et al. |
| 2017/0032568 A1 | 2/2017 | Gharpure et al. |
| 2017/0052595 A1 | 2/2017 | Poulos et al. |
| 2017/0053383 A1 | 2/2017 | Heo |
| 2017/0178392 A1 | 6/2017 | Zuccarino et al. |
| 2017/0213388 A1 | 7/2017 | Margolis et al. |
| 2017/0221264 A1 | 8/2017 | Perry |
| 2017/0243352 A1 | 8/2017 | Kutliroff et al. |
| 2017/0251143 A1 | 8/2017 | Peruch et al. |
| 2017/0270715 A1* | 9/2017 | Lindsay ................ G06T 7/60 |
| 2017/0287215 A1 | 10/2017 | Lalonde et al. |
| 2017/0287225 A1* | 10/2017 | Powderly ............ G06F 3/0346 |
| 2017/0351094 A1 | 12/2017 | Poulos et al. |
| 2018/0005433 A1 | 1/2018 | Kohler et al. |
| 2018/0045963 A1 | 2/2018 | Hoover et al. |
| 2018/0088787 A1 | 3/2018 | Bereza et al. |
| 2018/0103209 A1 | 4/2018 | Fischler et al. |
| 2018/0122138 A1 | 5/2018 | Piya et al. |
| 2018/0130255 A1 | 5/2018 | Hazeghi et al. |
| 2018/0143693 A1* | 5/2018 | Calabrese ............ G06V 40/193 |
| 2018/0173404 A1 | 6/2018 | Smith |
| 2018/0197341 A1 | 7/2018 | Loberg et al. |
| 2018/0300952 A1 | 10/2018 | Evans et al. |
| 2018/0330544 A1 | 11/2018 | Corso et al. |
| 2018/0348986 A1 | 12/2018 | Sawaki |
| 2019/0018479 A1 | 1/2019 | Minami |
| 2019/0018498 A1 | 1/2019 | West et al. |
| 2019/0050062 A1 | 2/2019 | Chen et al. |
| 2019/0096134 A1 | 3/2019 | Amacker et al. |
| 2019/0130622 A1 | 5/2019 | Hoover et al. |
| 2019/0155495 A1* | 5/2019 | Klein ................... G06F 9/451 |
| 2019/0164340 A1 | 5/2019 | Pejic et al. |
| 2019/0228589 A1 | 7/2019 | Dascola et al. |
| 2019/0340832 A1 | 11/2019 | Srinivasan et al. |
| 2019/0349575 A1* | 11/2019 | Knepper ............... G06F 3/013 |

(56) References Cited

U.S. PATENT DOCUMENTS

| | | |
|---|---|---|
| 2019/0362557 A1 | 11/2019 | Lacey et al. |
| 2020/0005539 A1 | 1/2020 | Hwang et al. |
| 2020/0045249 A1 | 2/2020 | Francois et al. |
| 2020/0048825 A1 | 2/2020 | Schultz et al. |
| 2020/0128227 A1 | 4/2020 | Chavez et al. |
| 2020/0135141 A1* | 4/2020 | Day ................. G09G 5/377 |
| 2020/0214682 A1 | 7/2020 | Zaslavsky et al. |
| 2020/0218074 A1 | 7/2020 | Hoover et al. |
| 2020/0226823 A1 | 7/2020 | Stachniak et al. |
| 2020/0286299 A1* | 9/2020 | Wang ................. G06F 3/04815 |
| 2020/0379626 A1 | 12/2020 | Guyomard et al. |
| 2021/0034163 A1 | 2/2021 | Goel et al. |
| 2021/0034319 A1 | 2/2021 | Wang et al. |
| 2021/0225043 A1 | 7/2021 | Tang et al. |
| 2021/0241483 A1 | 8/2021 | Dryer et al. |
| 2021/0279967 A1 | 9/2021 | Gernoth et al. |
| 2021/0295592 A1 | 9/2021 | Von Cramon |
| 2021/0295602 A1 | 9/2021 | Scapel et al. |
| 2021/0374221 A1 | 12/2021 | Markhasin et al. |
| 2021/0383097 A1 | 12/2021 | Guerard et al. |
| 2022/0083145 A1 | 3/2022 | Matsunaga et al. |
| 2022/0121344 A1 | 4/2022 | Pastrana Vicente et al. |
| 2022/0130126 A1 | 4/2022 | Delgado et al. |
| 2022/0148257 A1 | 5/2022 | Boubekeur et al. |
| 2022/0206298 A1 | 6/2022 | Goodman |
| 2022/0253136 A1 | 8/2022 | Holder et al. |
| 2022/0317776 A1 | 10/2022 | Sundstrom et al. |
| 2022/0326837 A1 | 10/2022 | Dessero et al. |
| 2022/0335697 A1 | 10/2022 | Harding et al. |
| 2022/0382385 A1 | 12/2022 | Chen et al. |
| 2022/0397962 A1 | 12/2022 | Goel et al. |
| 2022/0408164 A1 | 12/2022 | Lee et al. |
| 2022/0413691 A1 | 12/2022 | Becker et al. |
| 2022/0414975 A1 | 12/2022 | Becker et al. |
| 2022/0415094 A1 | 12/2022 | Kim et al. |
| 2023/0027040 A1 | 1/2023 | Wang et al. |
| 2023/0030699 A1 | 2/2023 | Zion et al. |
| 2023/0031832 A1 | 2/2023 | Lipton et al. |
| 2023/0032771 A1 | 2/2023 | Zion et al. |
| 2023/0076326 A1 | 3/2023 | Xu et al. |
| 2023/0103161 A1 | 3/2023 | Li et al. |
| 2023/0119162 A1 | 4/2023 | Lipton et al. |
| 2023/0152935 A1 | 5/2023 | Mckenzie et al. |
| 2023/0168745 A1 | 6/2023 | Yoda |
| 2023/0290042 A1 | 9/2023 | Casella et al. |
| 2023/0377259 A1 | 11/2023 | Becker et al. |
| 2023/0377299 A1 | 11/2023 | Becker et al. |
| 2023/0377300 A1 | 11/2023 | Becker et al. |
| 2024/0037886 A1 | 2/2024 | Chiu et al. |
| 2024/0103636 A1 | 3/2024 | Lindmeier et al. |
| 2024/0104875 A1 | 3/2024 | Couche et al. |
| 2024/0104876 A1 | 3/2024 | Couche et al. |
| 2024/0233097 A1 | 7/2024 | Ngo et al. |

FOREIGN PATENT DOCUMENTS

| | | |
|---|---|---|
| EP | 3118722 A1 | 1/2017 |
| EP | 3336805 A1 | 6/2018 |
| EP | 3506151 A1 | 7/2019 |
| GB | 2540791 A | 2/2017 |
| KR | 10-2014-0097654 A | 8/2014 |
| KR | 10-2017-0027240 A | 3/2017 |
| KR | 10-2018-0102171 A | 9/2018 |
| KR | 10-2020-0110788 A | 9/2020 |
| KR | 10-2020-0135496 A | 12/2020 |
| WO | 2013/169849 A2 | 11/2013 |
| WO | 2014/105276 A1 | 7/2014 |
| WO | 2016/118344 A1 | 7/2016 |
| WO | 2019/172678 A1 | 9/2019 |
| WO | 2019/213111 A1 | 11/2019 |
| WO | 2022/147146 A1 | 7/2022 |

OTHER PUBLICATIONS

Adding Environments, Available online at: < https://manual.keyshot.com/manual/environments/adding-environments/>, [retrieved on 2023-06-09], 2 pages.
Area Light, Available online at: <https://manual.keyshot.com/manual/materials/material-types/light-sources/area-light/>, [retrieved on Jun. 9, 2023], 24 pages.
Feature Highlights, Available online at: <https://manual.keyshot.com/manual/whats-new/feature-highlights/>, [retrieved on Jun. 9, 2023], 28 pages.
Light Manager, Available online at: <https://manual.keyshot.com/manual/lighting/lighting-manager/>, [retrieved on Jun. 9, 2023], 3 pages.
Non-Final Office Action received for U.S. Appl. No. 17/807,226, mailed on Jun. 26, 2023, 21 pages.
Artec Leo Full 3D Scanning Demo w/ Sample Data, Digitize Designs, LLC, Available online at: <https://www.youtube.com/watch?v=ecBKo_h3Pug>, [retrieved on Sep. 1, 2022], Feb. 22, 2019, 3 pages.
Final Office Action received for U.S. Appl. No. 17/807,226, mailed on Nov. 30, 2023, 23 pages.
Final Office Action received for U.S. Appl. No. 17/812,965, mailed on Jan. 31, 2024, 9 pages.
International Search Report received for PCT Patent Application No. PCT/US2021/020062, mailed on May 4, 2021, 4 pages.
International Search Report received for PCT Patent Application No. PCT/US2022/071208, mailed on Aug. 18, 2022, 9 pages.
Non Final Office Action received for U.S. Appl. No. 17/814,455, mailed on Feb. 16, 2024, 24 pages.
Non-Final Office Action received for U.S. Appl. No. 17/812,965, mailed on Jun. 8, 2023, 8 pages.
Non-Final Office Action received for U.S. Appl. No. 17/814,462, mailed on Feb. 1, 2024, 30 pages.
Notice of Allowance received for U.S. Appl. No. 17/807,236, mailed on Feb. 5, 2024, 13 pages.
Notice of Allowance received for U.S. Appl. No. 18/317,893, mailed on Nov. 22, 2023, 9 pages.
Restriction Requirement received for U.S. Appl. No. 17/905,483, mailed on Dec. 7, 2023, 7 pages.
Search Report received for United Kingdom Patent Application No. GB2210885.6, mailed on Jan. 27, 2023, 1 page.
Cas and Chary XR, "Oculus Go & Your Phone as 2nd Controller !!—An Inexpensive Way to Play PC VR Games", posted on Mar. 8, 2019, https://www.youtube.com/watch?v=i_iRVa0kemw, 2019, 4 pages.
Gamedbharat, "I Want to Rotate a Object on Double Tap, Can Any One Help Me With This?", posted on Jul. 26, 2017, https://discussions.unity.com/t/i-want-to-rotate-a-object-on-double-tap-can-any-one-help-me-with-this/192010, 2017, 3 pages.
Locher et al., "Mobile Phone and Cloud—a Dream Team for 3D Reconstruction", 2016 IEEE Winter Conference on Applications of Computer Vision (WACV), 2016, pp. 1-8.
Slambekova, Dana. "Gaze and Gesture Based Object Interaction in Virtual World", May 31, 2012, [retrieved on Dec. 17, 2015]. Retrieved from the Internet: <URL:https://www.cs.rit.edu/~dxs4659/Report.pdf>, 54 pages.
Ex Parte Quayle Action received for U.S. Appl. No. 17/655,347, mailed on Jul. 8, 2024, 6 pages.
International Search Report received for PCT Patent Application No. PCT/US2023/074955, mailed on Feb. 1, 2024, 6 pages.
Non-Final Office Action received for U.S. Appl. No. 17/905,483, mailed on Mar. 27, 2024, 16 pages.
Non-Final Office Action received for U.S. Appl. No. 18/317,893, mailed on Apr. 25, 2024, 18 pages.
Notice of Allowance received for U.S. Appl. No. 17/807,226, mailed on Jul. 3, 2024, 9 pages.
Notice of Allowance received for U.S. Appl. No. 17/807,236, mailed on Jul. 10, 2024, 9 pages.
Notice of Allowance received for U.S. Appl. No. 17/812,965, mailed on Jul. 26, 2024, 6 pages.
Notice of Allowance received for U.S. Appl. No. 18/317,893, mailed on Mar. 6, 2024, 8 pages.

(56) References Cited

OTHER PUBLICATIONS

Notice of Allowance received for U.S. Appl. No. 18/473,180, mailed on Aug. 22, 2024, 13 pages.
Jones et al., "The Future of Virtual Museums: On-Line, Immersive, 3D Environments", ProQuest (Technology Collection Database, Dissertations and Theses Database): Technical Literature Search, Jul. 26, 2002, 12 pages.
Ro et al., "AR Pointer: Advanced Ray-Casting Interface Using Laser Pointer Metaphor for Object Manipulation in 3D Augmented Reality Environment", Applied Sciences, vol. 9, No. 3078, [retrieved on Jul. 27, 2020], Jul. 30, 2019, 18 pages.
Artec Leo, Artec 3D [online], 2018 [retrieved on Apr. 25, 2024]. Retrieved from the Internet: <URL: https://artec3d.com/portable-3d-scanners/artec-leo>, 39 pages.
Corrected Notice of Allowance received for U.S. Appl. No. 18/119,219, mailed on Sep. 11, 2024, 2 pages.
Curious Blocks Alternatives 12, progsoft [online]. 2024 [retrieved on Apr. 25, 2024]. Retrieved from the Internet: <URL: https://progsoft.net/en/software/curious-blocks>, 7 pages.
Final Office Action received for U.S. Appl. No. 17/814,462, mailed on Nov. 1, 2024, 44 pages.
Final Office Action received for U.S. Appl. No. 17/905,483, mailed on Jan. 8, 2025, 19 pages.
Voxelization with ARKit4 and LiDAR, Kitasenju Design [online]. X, Jul. 13, 2020 [retrieved on Apr. 25, 2024]. Retrieved from the Internet: <URL: https://twitter.com/kitasenjudesign/status/1282665402812608513>, 1 page.
MagicaVoxel 0.99.5 Review, YouTube [online]. Jun. 6, 2020 [retrieved on Apr. 25, 2024]. Retrieved from the Internet: <URL: https://www.youtube.com/watch?v=WPPFnHQWwFk>, 2 pages.
Non-Final Office Action received for U.S. Appl. No. 18/119,219, mailed on Mar. 28, 2024, 15 pages.
Notice of Allowability received for U.S. Appl. No. 17/814,455, mailed on Jan. 13, 2025, 3 pages.
Notice of Allowance received for U.S. Appl. No. 17/655,347, mailed on Oct. 9, 2024, 7 pages.
Notice of Allowance received for U.S. Appl. No. 17/812,965, mailed on Nov. 15, 2024, 6 pages.
Notice of Allowance received for U.S. Appl. No. 17/814,455, mailed on Oct. 7, 2024, 10 pages.
Notice of Allowance received for U.S. Appl. No. 18/119,219, mailed on Jul. 22, 2024, 7 pages.
Notice of Allowance received for U.S. Appl. No. 18/317,893, mailed on Jan. 13, 2025, 11 pages.
Notice of Allowance received for U.S. Appl. No. 18/473,180, mailed on Jan. 2, 2025, 12 pages.
Open Source Voxel Editor for Windows, Mac, Linux, iOS, and Android, GOXEL [online]. 2019 [retrieved on Apr. 25, 2024]. Retrieved from the Internet: <URL: https://goxel.xyz/>, 3 pages.
Revopoint POP 2: Handheld 3D Scanner, REVOPOINT [online]. 2022 [retrieved on Apr. 25, 2024]. Retrieved from the Internet: <URL: https://global.revopoint3d.com/products/face-3d-scanner-pop2?_ga=2.182721893.277596832.1650264227-586470518.1640327512&ref=dh0L07OOzRuqo&utm_campaign=pop2_banner&utm_medium=referral&utm_source=Official_Website>, 16 pages.
ShareVOX—Create Voxel Art Together in AR | with Google, PHORIA [online]. 2018 [retrieved on Apr. 25, 2024]. Retrieved from the Internet: <URL: https://www.phoria.com.au/projects/sharevox/>, 2 pages.
VoxEdit Beta Tutorial—Introduction And How To Animate Voxel Creations, YouTube [online]. Jan. 15, 2021 [retrieved on Apr. 25, 2024]. Retrieved from the Internet: <URL: https://www.youtube.com/watch?v=fqcArJWtyqM>, 2 pages.
Voxel World Lens, Snapchat [online]. [retrieved on Apr. 25, 2024]. Retrieved from the Internet: <URL: https://www.snapchat.com/lens/689751dd6a7d446280d903d15d79f104?locale=en-US>, 1 page.
Rossiev, Denis. "Voxelize: making a real-time AR voxel scanner with export on Snapchat", Denis Rossiev [online]. Jan. 31, 2023 [retrieved on Apr. 25, 2024]. Retrieved from the Internet: <URL: https://www.rossiev.pro/voxelize/>, 16 pages.
Qi, et al. "PointNet++: Deep Hierarchical Feature Learning on Point Sets in a Metric Space", Stanford University, Jun. 7, 2017. Retrieved from the Internet: <URL: https://arxiv.org/abs/1706.02413>, 14 pages.
Strand, Robin. "Surface skeletons in grids with non-cubic voxels", Proceedings of the 17th International Conference on Pattern Recognition, 2004, vol. 1, pp. 548-551. Retrieved from the Internet: <URL: https://www.researchgate.net/publication/4090277_Surface_skeletons_in_grids_with_non-cubic_voxels> <DOI: 10.1109/ICPR.2004.1334195>, 5 pages.

* cited by examiner

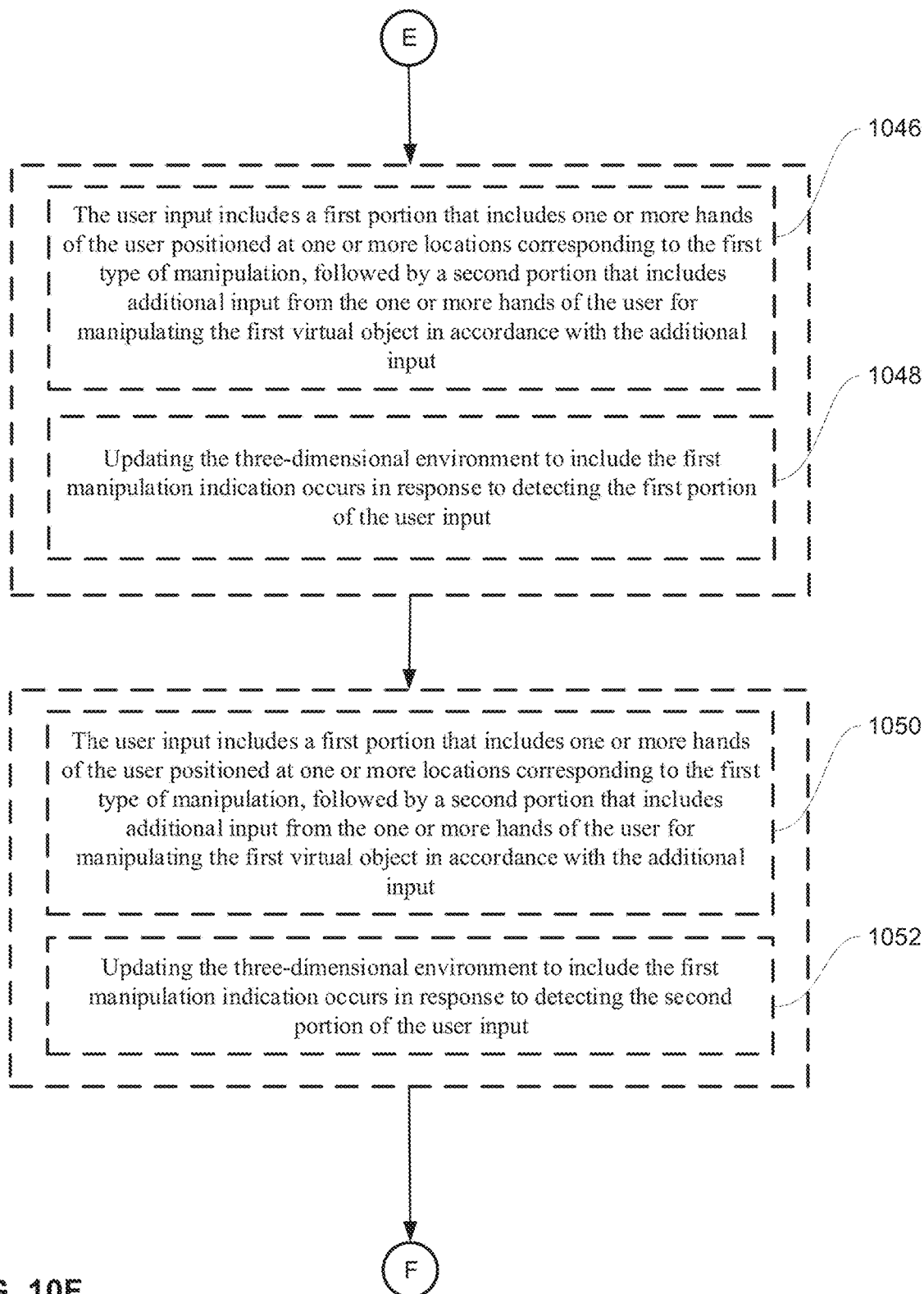

1400

1402
Display, via a display generation component, a three-dimensional environment including a first object at a first location, wherein a second location in the three-dimensional environment, different from the first location, corresponds to a location of a predefined portion of a user of the electronic device in a physical environment 1404
While displaying the three-dimensional environment including the first object at the first location, receive, via one or more input devices, a user input including a movement of the predefined portion of the user that has a first magnitude 1406
In response to receiving the user input:

1407
In accordance with a determination that the first object is a first distance from the second location, move the first object in the three-dimensional environment from the first location by a first amount in accordance with the first magnitude of the user input 1408
In accordance with a determination that the first object is a second distance from the second location, different from the first distance, move the first object in the three-dimensional environment from the first location by a second amount, different from the first amount, in accordance with the first magnitude of the user input (A)

FIG. 14A

METHODS FOR MANIPULATING OBJECTS IN AN ENVIRONMENT

CROSS-REFERENCE TO RELATED APPLICATIONS

This application claims the benefit of U.S. Provisional Application No. 63/077,521, filed Sep. 11, 2020, the content of which is incorporated herein by reference in its entirety for all purposes.

TECHNICAL FIELD

This relates generally to computer systems with a display generation component and one or more input devices that present graphical user interfaces, including but not limited to electronic devices that present three-dimensional environments, via the display generation component, that include virtual objects.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects include digital images, video, text, icons, and control elements such as buttons and other graphics.

But methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious and error-prone, create a significant cognitive burden on a user, and detract from the experience with the virtual/augmented reality environment. In addition, these methods take longer than necessary, thereby wasting energy. This latter consideration is particularly important in battery-operated devices.

SUMMARY

Accordingly, there is a need for computer systems with improved methods and interfaces for providing computer generated experiences to users that make interaction with the computer systems more efficient and intuitive for a user. Such methods and interfaces optionally complement or replace conventional methods for providing computer generated reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems with a display generation component and one or more input devices are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through stylus and/or finger contacts and gestures on the touch-sensitive surface, movement of the user's eyes and hand in space relative to the GUI or the user's body as captured by cameras and other movement sensors, and voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

There is a need for electronic devices with improved methods and interfaces for interacting with objects in a three-dimensional environment. Such methods and interfaces may complement or replace conventional methods for interacting with objects in a three-dimensional environment. Such methods and interfaces reduce the number, extent, and/or the nature of the inputs from a user and produce a more efficient human-machine interface.

In some embodiments, an electronic device interacts with an object in accordance with one or more characteristics of the hands of the user. In some embodiments, an electronic device displays one or more selectable options for enhancing a two-dimensional drawing, such as by replacing it with a three-dimensional object. In some embodiments, an electronic device displays a manipulation indicator while manipulating an object in accordance with gestures and/or movements of the hands of the user. In some embodiments, an electronic device displays a contextual menu or moves an object based on gestures and/or movements of the hands of the user. In some embodiments, an electronic device moves an object in a three-dimensional environment based on the distance between the object and the user. In some embodiments, an electronic device displays a scanning indication to mark portions of a physical object for scanning. In some embodiments, an electronic device displays a magnified view of a distant object to increase visibility and enable direct manipulation of the distant object.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 14A-14G is a flowchart illustrating a method of moving an object in a three-dimensional environment by an amount based on the distance of the object from the user in accordance with some embodiments.

DESCRIPTION OF EMBODIMENTS

Figure 1:
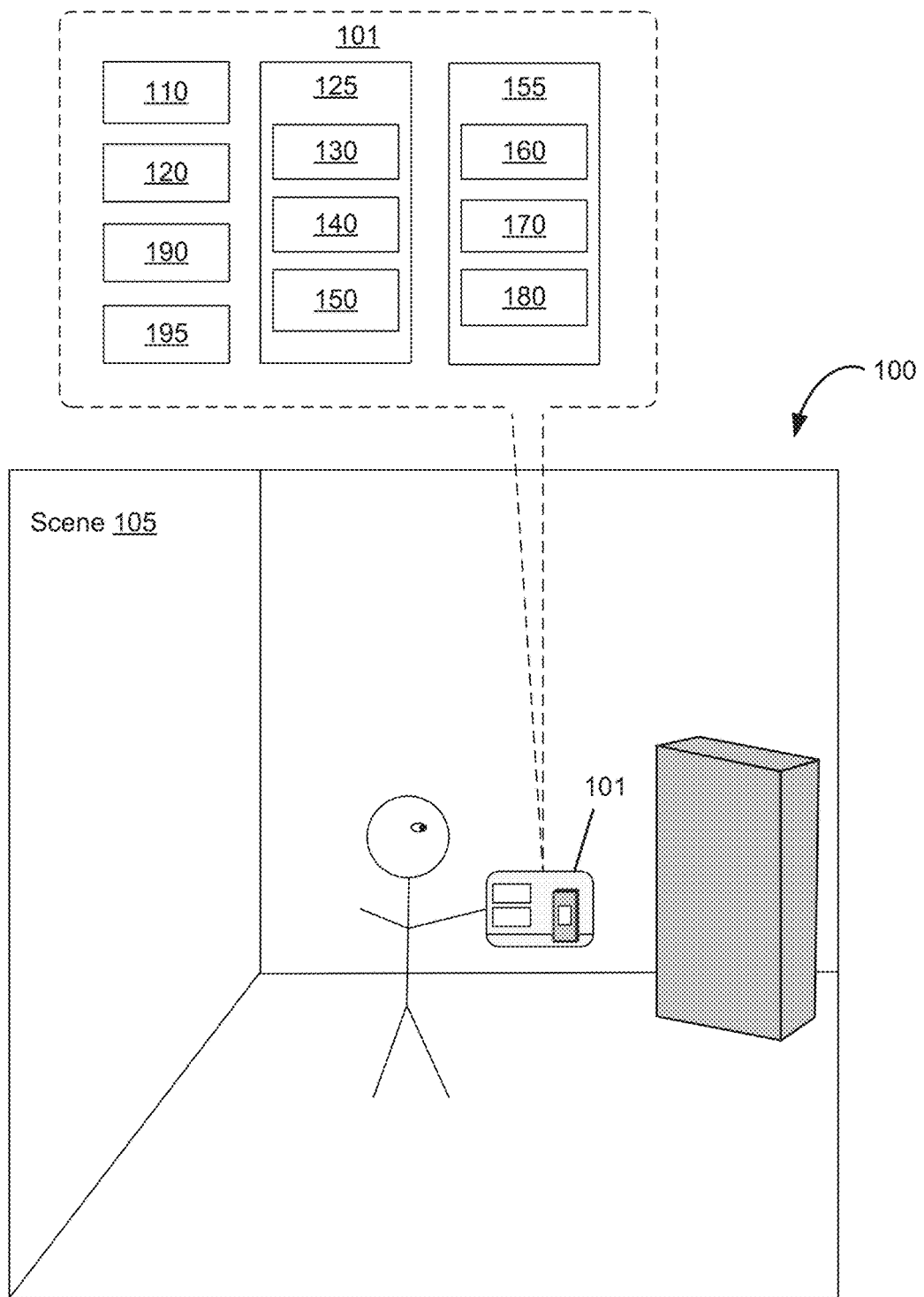
FIG. 1 is a block diagram illustrating an operating environment of a computer system for providing CGR experiences in accordance with some embodiments.

The present disclosure relates to user interfaces for providing a computer generated reality (CGR) experience to a user, in accordance with some embodiments.

The systems, methods, and GUIs described herein provide improved ways for an electronic device to interact with and manipulate objects in a three-dimensional environment.

In some embodiments, a computer system enhances a two-dimensional drawing. A two-dimensional drawing, drawn by the user (e.g., via a stylus device) is identified and analyzed by device, which provides one or more selectable options to enhance the two-dimensional drawing. In some embodiments, enhancing the two-dimensional drawing can include normalizing (e.g., smoothing out) the two-dimensional drawing, performing a fill operation, performing an extrusion operation, and/or performing a volumize operation on the two-dimensional drawing. In some embodiments, enhancing the two-dimensional drawing includes replacing the drawing with a three-dimensional object. In some embodiments, the two-dimensional drawing can be recognized as a drawing of a three-dimensional object and one or more options can be provided to the user to insert a representation of the recognized three-dimensional objects. Enhancing a two-dimensional drawing allows the user to insert and/or generate content more naturally and efficiently. In addition, enhancing a two-dimensional drawing allows a user to generate three-dimensional objects, without requiring the user to draw in three dimensions.

In some embodiments, a computer system manipulates an object in a three-dimensional environment. Based on the distance between a user's hands, the computing system optionally is able to determine the manipulation operation being requested by the user (e.g., movement, rotation, resizing, etc.). In some embodiments, a manipulation indication is displayed, thus guiding the user to perform the requested type of manipulation. For example, a user is able to interact with the manipulation indication to perform the desired type of manipulation. Displaying a manipulation indication while manipulating an object provides the user with guidance and feedback on how to perform a manipulation, the type of manipulation being performed, and how much manipulation is being performed, which allows the user to manipulate content more naturally and efficiently.

In some embodiments, a computer system displays a contextual menu or moves an object in a three-dimensional environment. The computing system optionally determines, based on the gesture performed by the one or more hands of the user, whether the user is requesting display of a contextual menu associated with a virtual object or requesting to move the virtual object towards the user. In some embodiments, the user's gaze is used to determine which virtual object is the object of focus. Displaying a contextual menu or moving an object in a three-dimensional environment allows the user to perform multiple operations on the virtual object, without requiring the user to navigate through multiple user interfaces or menus or use input devices other than the user's hands, which allows the user to interact with virtual objects more naturally and efficiently.

In some embodiments, a computer system moves an object in a three-dimensional environment by an amount based on the distance of the object from the user. Objects in a three-dimensional environment that are farther away from the user optionally have a larger scaling factor for movements than objects in the three-dimensional environment that are closer to the user. In some embodiments, the movements of the hand of the user control the movement of a virtual. Thus, in response to moving the hand of the user by a respective amount, a closer object moves by less than a farther object. Moving an object in a three-dimensional environment by an amount based on the distance of the object from the user allows the user to move distant objects without requiring the user to perform multiple movement operations, which allows the user to move virtual objects more naturally and efficiently (e.g., by amounts proportional to their distance to the user).

In some embodiments, a computer system scans a real world object. Real world objects can be scanned by a computing system, for example, for the purpose of generating a virtual object or computer model based on the real world object. In some embodiments, a real world object can be marked by scanning by a pointing device, such as a stylus. Portions of the real world object that have been marked can be displayed with a scanning indication that indicates that the respective portions have been marked for scanning or have been scanned. In some embodiments, a three-dimensional object can be generated from the scanned portions of the object. Using a pointing device to indicate portions of an object for scanning allows the user to more naturally and efficiently select portions of the object for scanning.

In some embodiments, a computer system manipulates a distant object. In some embodiments, a distant object (e.g., an object that is far away from the user) can be manipulated via indirect manipulation techniques. In some embodiments, a computing system can display a representation of a distant object at a location near the user such that the user is able to manipulate the distant object via direct manipulation techniques, without requiring the user to move or approach the distant object in the three-dimensional environment. In some embodiments, the representation of the distant object is a magnified view of the distant object. In some embodiments, manipulation operations performed on the representation is performed on the distant object (e.g., concurrently). Displaying a representation of a distant object near the user allows the user to more naturally and efficiently perform direct manipulation operations on the distant object.

FIGS. 1-6 provide a description of example computer systems for providing CGR experiences to users (such as described below with respect to methods 800, 1000, 1200, 1400, and 1600, and 1800). In some embodiments, as shown in FIG. 1, the CGR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a CGR experience, various terms are used to differentially refer to several related but distinct environments that the user may sense and/or with which a user may interact (e.g., with inputs detected by a computer system 101 generating the CGR experience that cause the computer system generating the CGR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a CGR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the CGR experience (e.g., at least a visual component of the CGR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a CGR experience to the user while the user is virtually and/or physically present within the scene 105.

In some embodiments, the display generation component is worn on a part of the user's body (e.g., on his/her head, on his/her hand, etc.). As such, the display generation component 120 includes one or more CGR displays provided to display the CGR content. For example, in various embodiments, the display generation component 120 encloses the field-of-view of the user. In some embodiments, the display generation component 120 is a handheld device (such as a smartphone or tablet) configured to present CGR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a CGR chamber, enclosure, or room configured to present CGR content in which the user does not wear or hold the display generation component 120. Many user interfaces described with reference to one type of hardware for displaying CGR content (e.g., a handheld device or a device on a tripod) could be implemented on another type of hardware for displaying CGR content (e.g., an HMD or other wearable computing device). For example, a user interface showing interactions with CGR content triggered based on interactions that happen in a space in front of a handheld or tripod mounted device could similarly be implemented with an HMD where the interactions happen in a space in front of the HMD and the responses of the CGR content are displayed via the HMD. Similarly, a user interface showing interactions with CRG content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operation environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
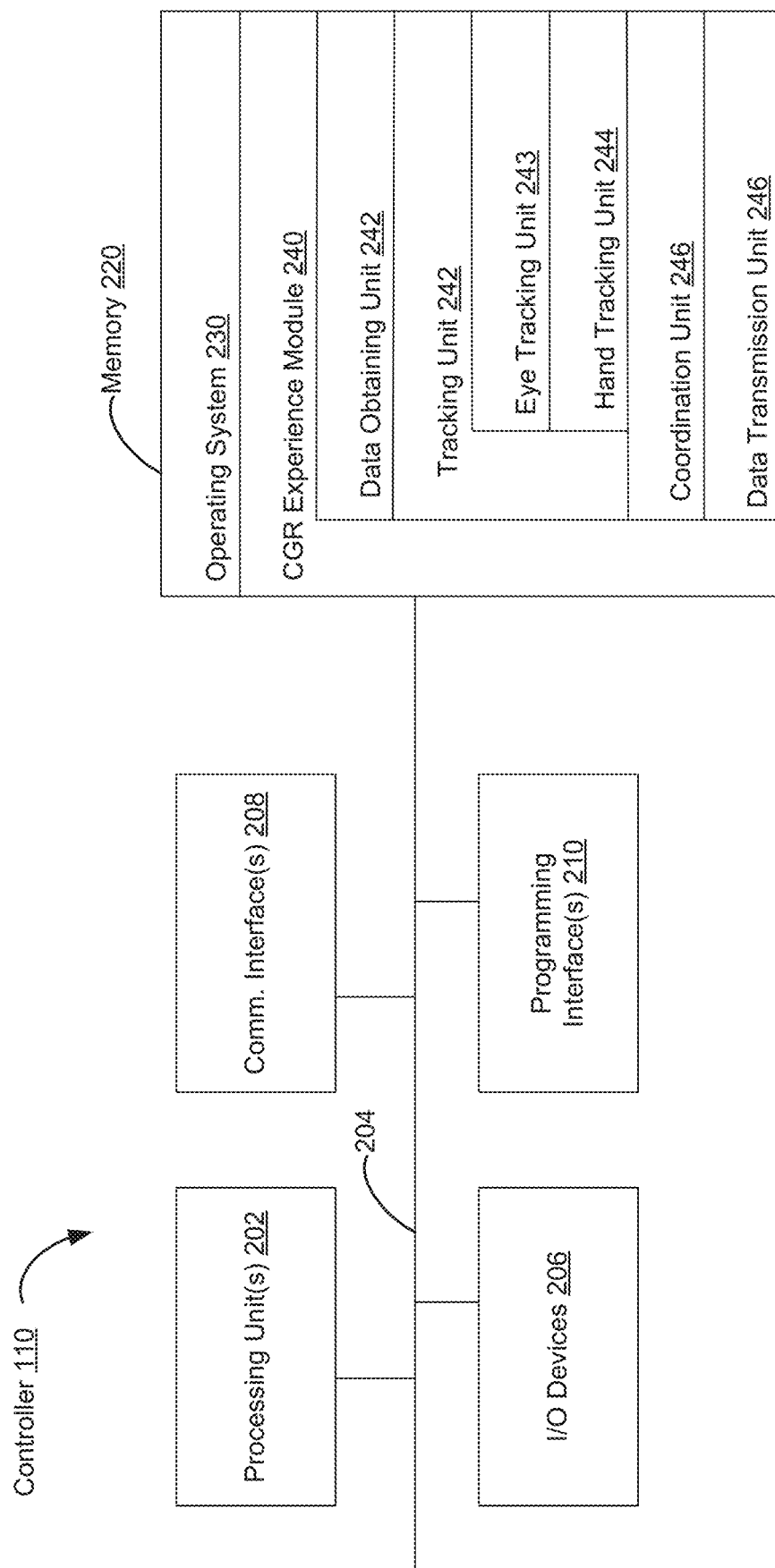
FIG. 2 is a block diagram illustrating a controller of a computer system that is configured to manage and coordinate a CGR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a CGR experience module 240.

The operating system 230 includes instructions for handling various basic system services and for performing hardware dependent tasks. In some embodiments, the CGR experience module 240 is configured to manage and coordinate one or more CGR experiences for one or more users (e.g., a single CGR experience for one or more users, or multiple CGR experiences for respective groups of one or more users). To that end, in various embodiments, the CGR experience module 240 includes a data obtaining unit 242, a tracking unit 244, a coordination unit 246, and a data transmitting unit 248.

In some embodiments, the data obtaining unit 242 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 242 includes instructions and/or logic therefor, and heuristics and metadata therefor.

In some embodiments, the tracking unit 244 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 244 includes instructions and/or logic therefor, and heuristics and metadata therefor. In some embodiments, the tracking unit 244 includes hand tracking unit 243 and/or eye tracking unit 245. In some embodiments, the hand tracking unit 243 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 243 is described in greater detail below with respect to FIG. 4. In some embodiments, the eye tracking unit 245 is configured to track the position and movement of the user's gaze (or more broadly, the user's eyes, face, or head) with respect to the scene 105 (e.g., with respect to the physical environment and/or to the user (e.g., the user's hand)) or with respect to the CGR content displayed via the display generation component 120. The eye tracking unit 245 is described in greater detail below with respect to FIG. 5.

In some embodiments, the coordination unit 246 is configured to manage and coordinate the CGR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 242, the tracking unit 244 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 242, the tracking unit 244 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
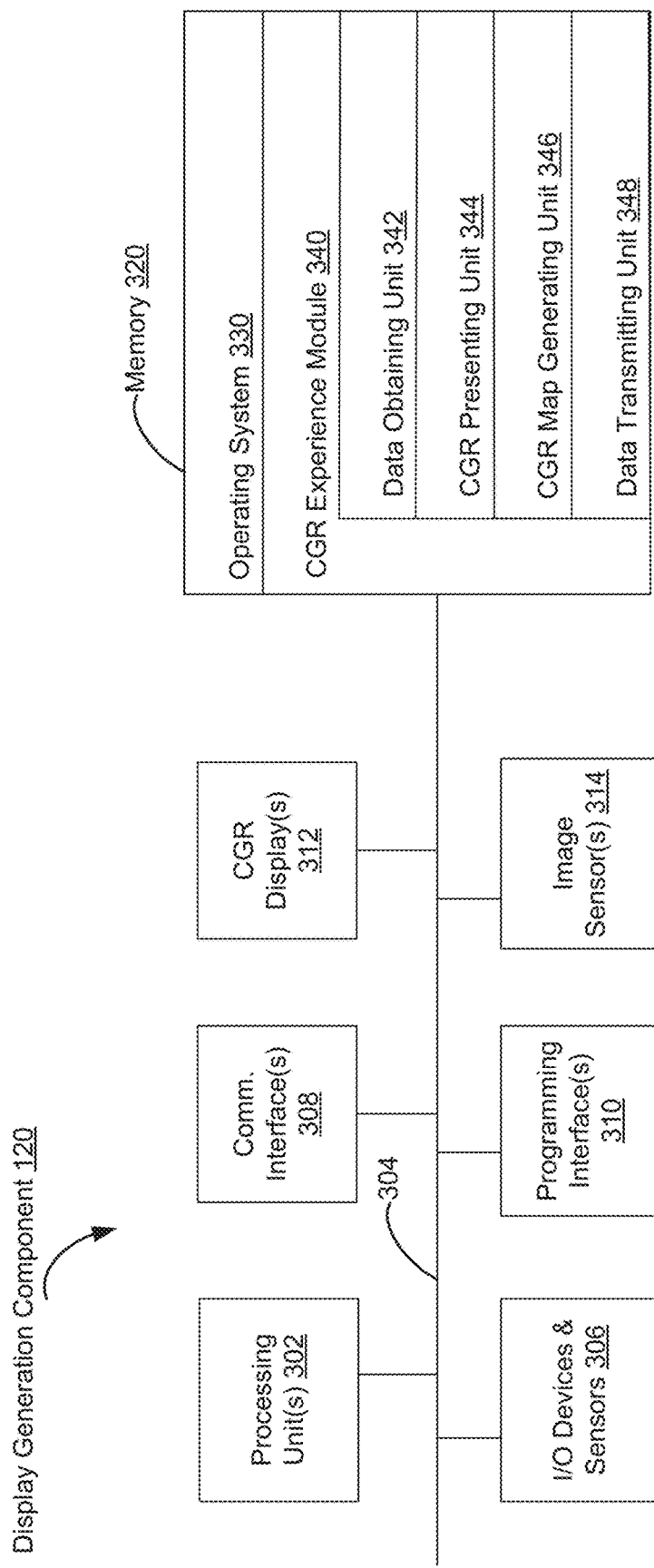
FIG. 3 is a block diagram illustrating a display generation component of a computer system that is configured to provide a visual component of the CGR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more CGR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more CGR displays 312 are configured to provide the CGR experience to the user. In some embodiments, the one or more CGR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more CGR displays 312 correspond to diffractive, reflective, polarized, holographic, etc. waveguide displays. For example, the HMD 120 includes a single CGR display. In another example, the HMD 120 includes a CGR display for each eye of the user. In some embodiments, the one or more CGR displays 312 are capable of presenting MR and VR content. In some embodiments, the one or more CGR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the HMD 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a CGR presentation module 340.

The operating system 330 includes instructions for handling various basic system services and for performing hardware dependent tasks. In some embodiments, the CGR presentation module 340 is configured to present CGR content to the user via the one or more CGR displays 312. To that end, in various embodiments, the CGR presentation module 340 includes a data obtaining unit 342, a CGR presenting unit 344, a CGR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the CGR presenting unit 344 is configured to present CGR content via the one or more CGR displays 312. To that end, in various embodiments, the CGR presenting unit 344 includes instructions and/or logic therefor, and heuristics and metadata therefor.

In some embodiments, the CGR map generating unit 346 is configured to generate a CGR map (e.g., a 3D map of the mixed reality scene or a map of the physical environment into which computer generated objects can be placed to generate the computer generated reality) based on media content data. To that end, in various embodiments, the CGR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the CGR presenting unit 344, the CGR map generating unit 346, and the data transmitting unit 348 are shown as residing on a single device (e.g., the display generation component 120 of FIG. 1), it should be understood that in other embodiments, any combination of the data obtaining unit 342, the CGR presenting unit 344, the CGR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
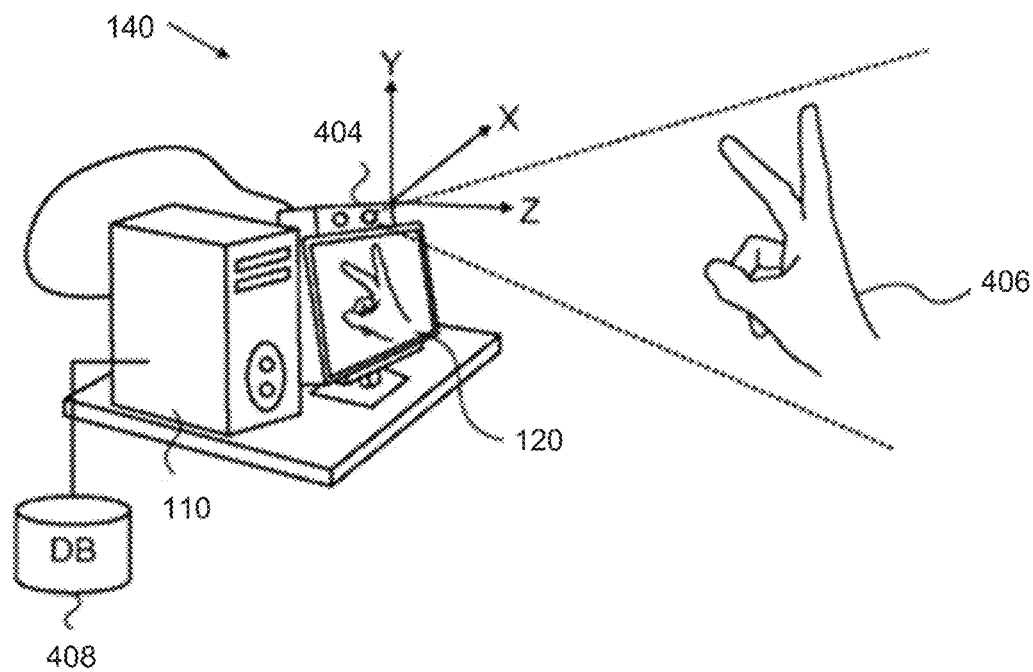
FIG. 4 is a block diagram illustrating a hand tracking unit of a computer system that is configured to capture gesture inputs of the user in accordance with some embodiments.
Figure 4:
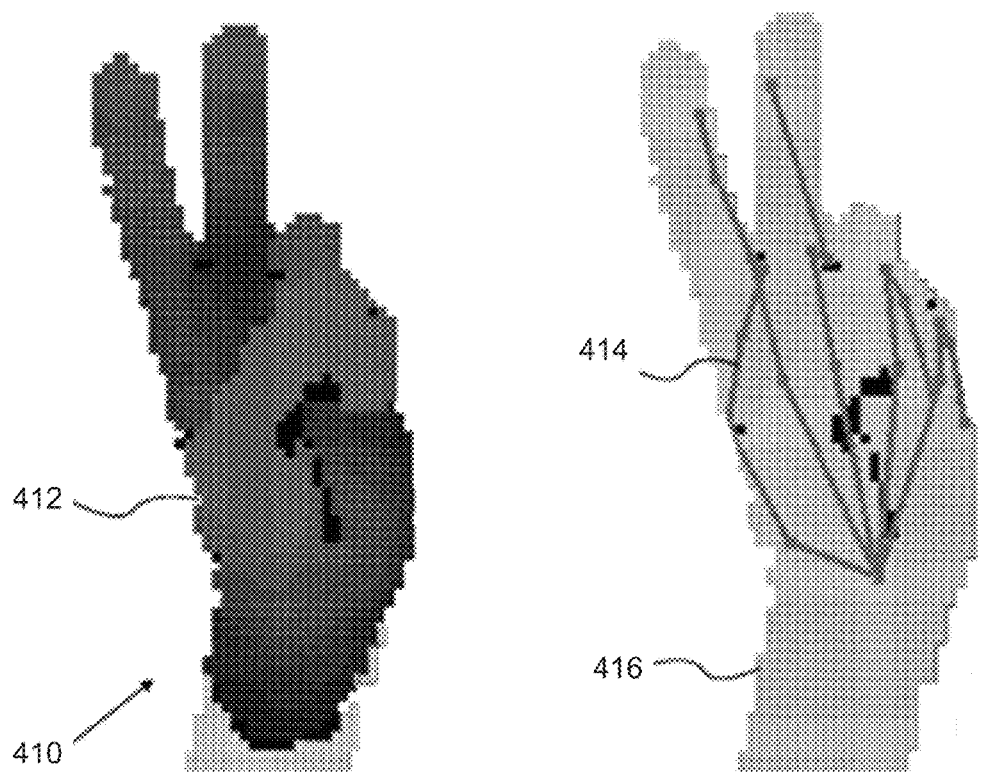

FIG. 4 is a schematic, pictorial illustration of an example embodiment of the hand tracking device 140. In some embodiments, hand tracking device 140 (FIG. 1) is controlled by hand tracking unit 243 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 outputs a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 408 and changing his hand posture.

In some embodiments, the image sensors 404 project a pattern of spots onto a scene containing the hand 406 and captures an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the hand tracking device 440 may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion and gesture information are provided via the above-mentioned API to an application program running on the controller 110. This program may, for example, move and modify images presented on the display generation component 120, or perform other functions, in response to the pose and/or gesture information.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 440, some or all of the processing functions of the controller may be performed by a suitable microprocessor and software or by dedicated circuitry within the housing of the hand tracking device 402 or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
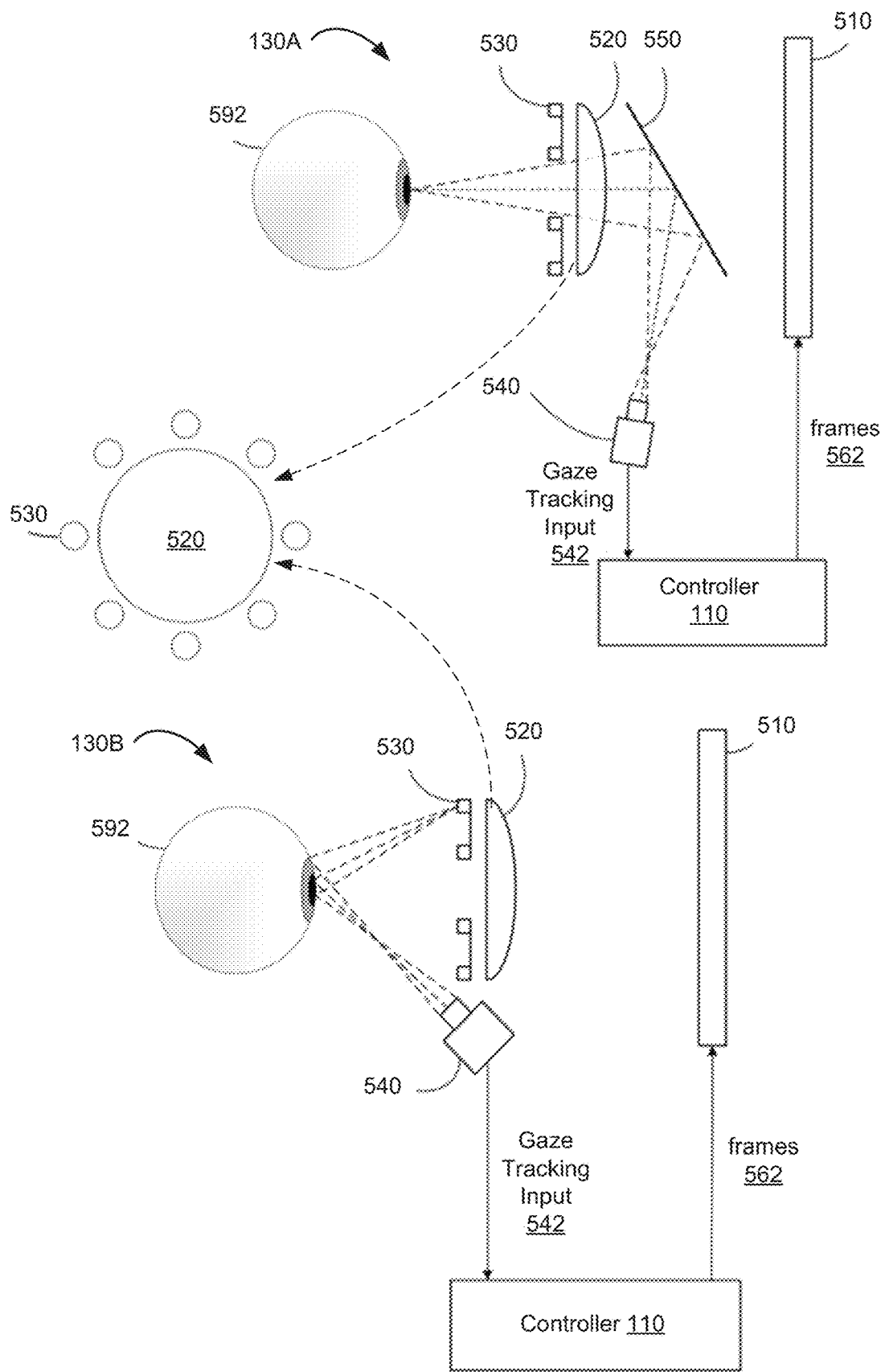
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 245 (FIG. 2) to track the position and movement of the user's gaze with respect to the scene 105 or with respect to the CGR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the CGR content for viewing by the user and a component for tracking the gaze of the user relative to the CGR content. In some embodiments, the eye tracking device 130 is separate from the display generation component 120. For example, when display generation component is a handheld device or a CGR chamber, the eye tracking device 130 is optionally a separate device from the handheld device or CGR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, a gaze tracking device 130 includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The gaze tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provide the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the CGR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lense(s) 520), eye tracking cameras (e.g., eye tracking camera(s) 540), and light sources (e.g., light sources 530 (e.g., IR or NIR LEDs), mounted in a wearable housing. The Light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g. 850 nm) and a camera 540 that operates at a different wavelength (e.g. 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6A:
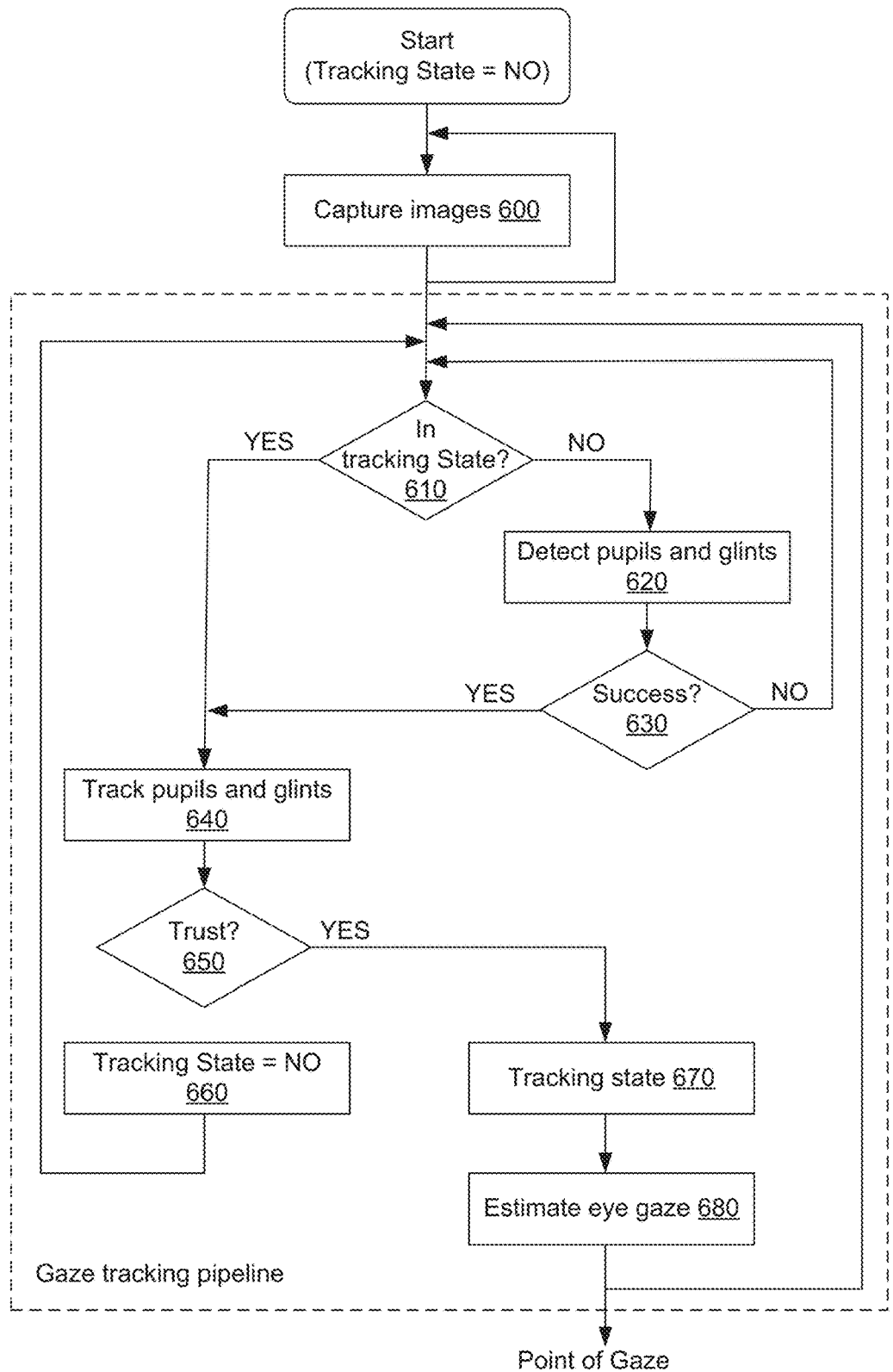
FIG. 6A is a flowchart illustrating a glint-assisted gaze tracking pipeline in accordance with some embodiments.

FIG. 6A illustrates a glint-assisted gaze tracking pipeline, in accordance with some embodiments. In some embodiments, the gaze tracking pipeline is implemented by a glint-assisted gaze tracing system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6A, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 410, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6A is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing CGR experiences to users, in accordance with various embodiments.

Figure 6B:
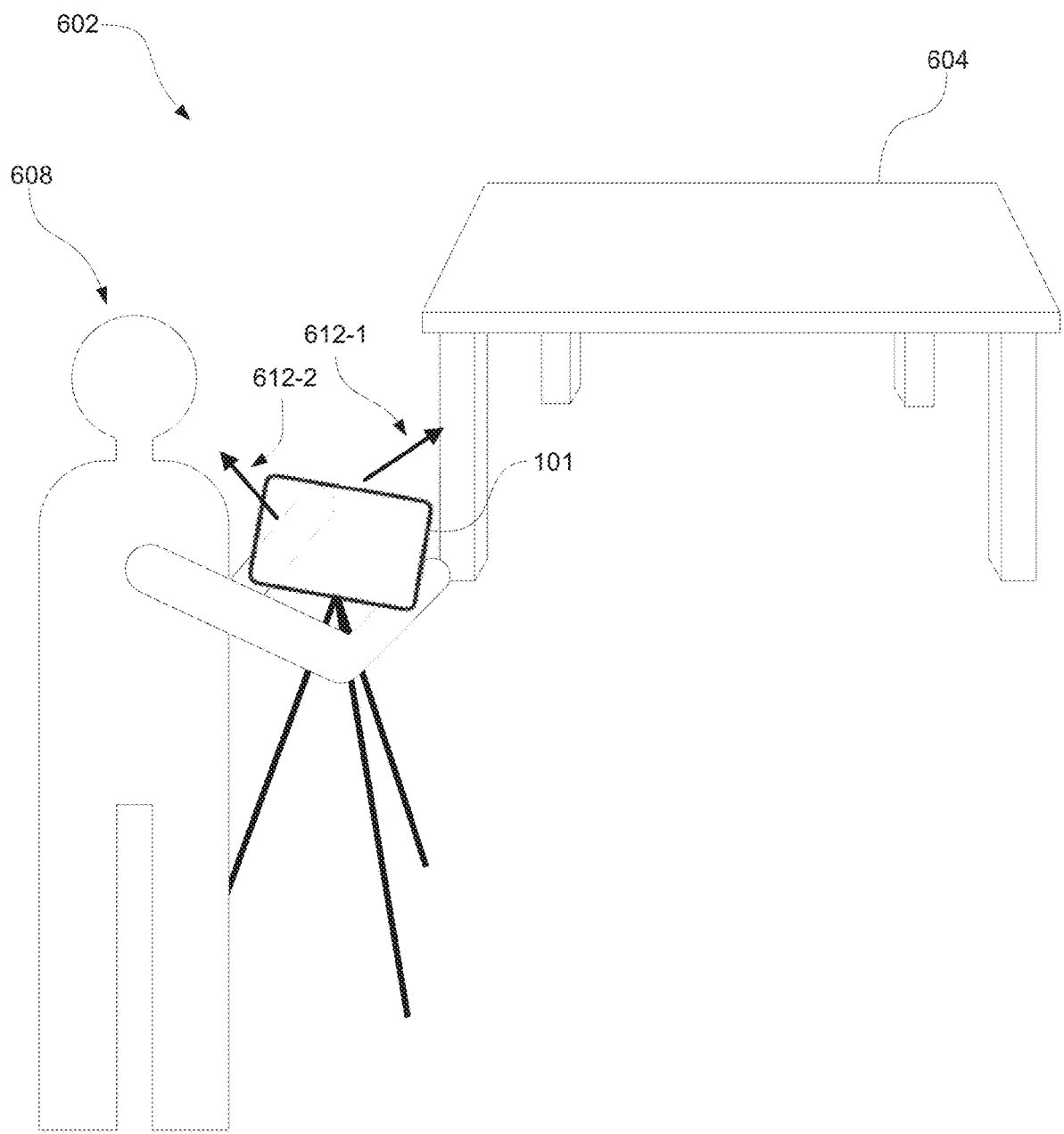
FIG. 6B illustrates an exemplary environment of an electronic device providing a CGR experience in accordance with some embodiments.

FIG. 6B illustrates an exemplary environment of an electronic device 101 providing a CGR experience in accordance with some embodiments. In FIG. 6B, real world environment 602 includes electronic device 101, user 608, and a real world object (e.g., table 604). As shown in FIG. 6B, electronic device 101 is optionally mounted on a tripod or otherwise secured in real world environment 602 such that one or more hands of user 608 are free (e.g., user 608 is optionally not holding device 101 with one or more hands). As described above, device 101 optionally has one or more groups of sensors positioned on different sides of device 101. For example, device 101 optionally includes sensor group 612-1 and sensor group 612-2 located on the "back" and "front" sides of device 101, respectively (e.g., which are able to capture information from the respective sides of device 101). As used herein, the front side of device 101 is the side that is facing user 608, and the back side of device 101 is the side facing away from user 608.

In some embodiments, sensor group 612-2 includes an eye tracking unit (e.g., eye tracking unit 245 described above with reference to FIG. 2) that includes one or more sensors for tracking the eyes and/or gaze of the user such that the eye tracking unit is able to "look" at user 608 and track the eye(s) of user 608 in the manners previously described. In some embodiments, the eye tracking unit of device 101 is able to capture the movements, orientation, and/or gaze of the eyes of user 608 and treat the movements, orientation, and/or gaze as inputs.

In some embodiments, sensor group 612-1 includes a hand tracking unit (e.g., hand tracking unit 243 described above with reference to FIG. 2) that is able to track one or more hands of user 608 that are held on the "back" side of device 101, as shown in FIG. 6B. In some embodiments, the hand tracking unit is optionally included in sensor group 612-2 such that user 608 is able to additionally or alternatively hold one or more hands on the "front" side of device 101 while device 101 tracks the position of the one or more hands. As described above, the hand tracking unit of device 101 is able to capture the movements, positions, and/or gestures of the one or more hands of user 608 and treat the movements, positions, and/or gestures as inputs.

In some embodiments, sensor group 612-1 optionally includes one or more sensors configured to capture images of real world environment 602, including table 604 (e.g., such as image sensors 404 described above with reference to FIG. 4). As described above, device 101 is able to capture images of portions (e.g., some or all) of real world environment 602 and present the captured portions of real world environment 602 to the user via one or more display generation components of device 101 (e.g., the display of device 101, which is optionally located on the side of device 101 that is facing the user, opposite of the side of device 101 that is facing the captured portions of real world environment 602).

In some embodiments, the captured portions of real world environment 602 are used to provide a CGR experience to the user, for example, a mixed reality environment in which one or more virtual objects are superimposed over representations of real world environment 602.

Thus, the description herein describes some embodiments of three-dimensional environments (e.g., CGR environments) that include representations of real world objects and representations of virtual objects. For example, a three-dimensional environment optionally includes a representation of a table that exists in the physical environment, which is captured and displayed in the three-dimensional environment (e.g., actively via cameras and displays of an electronic device, or passively via a transparent or translucent display of the electronic device). As described previously, the three-dimensional environment is optionally a mixed reality system in which the three-dimensional environment is based on the physical environment that is captured by one or more sensors of the device and displayed via a display generation component. As a mixed reality system, the device is optionally able to selectively display portions and/or objects of the physical environment such that the respective portions and/or objects of the physical environment appear as if they exist in the three-dimensional environment displayed by the electronic device. Similarly, the device is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the device optionally displays a vase such that it appears as if a real vase is placed on top of a table in the physical environment. In some embodiments, each location in the three-dimensional environment has a corresponding location in the physical environment. Thus, when the device is described as displaying a virtual object at a respective location with respect to a physical object (e.g., such as a location at or near the hand of the user, or at or near a physical table), the device displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment can interact with virtual objects that exist only in the three-dimensional environment. For example, a three-dimensional environment can include a table and a vase placed on top of the table, with the table being a view of (or a representation of) a physical table in the physical environment, and the vase being a virtual object.

Similarly, a user is optionally able to interact with virtual objects in the three-dimensional environment using one or more hands as if the virtual objects were real objects in the physical environment. For example, as described above, one or more sensors of the device optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were real physical objects in the physical environment. In some embodiments, a user is able to move his or her hands to cause the representations of the hands in the three-dimensional environment to move in conjunction with the movement of the user's hand.

In some of the embodiments described below, the device is optionally able to determine the "effective" distance between physical objects in the physical world and virtual objects in the three-dimensional environment, for example, for the purpose of determining whether a physical object is interacting with a virtual object (e.g., whether a hand is touching, grabbing, holding, etc. a virtual object or within a threshold distance from a virtual object). For example, the device determines the distance between the hands of the user and virtual objects when determining whether the user is interacting with virtual objects and/or how the user is interacting with virtual objects. In some embodiments, the device determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the device optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared against the position of the virtual object of interest in the three-dimensional environment to determine the distance between the one or more hands of the user and the virtual object. In some embodiments, the device optionally determines a distance between a physical object and a virtual object by comparing positions in the physical world (e.g., as opposed to comparing positions in the three-dimensional environment). For example, when determining the distance between one or more hands of the user and a virtual object, the device optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the device optionally performs any of the techniques described above to map the location of the physical object to the three-dimensional environment and/or map the location of the virtual object to the physical world.

In some embodiments, the same or similar technique is used to determine where and what the gaze of the user is directed to and/or where and at what a physical stylus held by a user is pointed. For example, if the gaze of the user is directed to a particular position in the physical environment, the device optionally determines the corresponding position in the three-dimensional environment and if a virtual object is located at that corresponding virtual position, the device optionally determines that the gaze of the user is directed to that virtual object. Similarly, the device is optionally able to determine, based on the orientation of a physical stylus, to where in the physical world the stylus is pointing. In some embodiments, based on this determination, the device determines the corresponding virtual position in the three-dimensional environment that corresponds to the location in the physical world to which the stylus is pointing, and optionally determines that the stylus is pointing at the corresponding virtual position in the three-dimensional environment.

Similarly, the embodiments described herein may refer to the location of the user (e.g., the user of the device) and/or the location of the device in the three-dimensional environment. In some embodiments, the user of the device is holding, wearing, or otherwise located at or near the electronic device. Thus, in some embodiments, the location of the device is used as a proxy for the location of the user. In some embodiments, the location of the device and/or user in the physical environment corresponds to a respective location in the three-dimensional environment. In some embodiments, the respective location is the location from which the "camera" or "view" of the three-dimensional environment extends. For example, the location of the device would be the location in the physical environment (and its corresponding location in the three-dimensional environment) from which, if a user were to stand at that location facing the respective portion of the physical environment displayed by the display generation component, the user would see the objects in the physical environment in the same position, orientation, and/or size as they are displayed by the display generation component of the device (e.g., in absolute terms and/or relative to each other). Similarly, if the virtual objects displayed in the three-dimensional environment were physical objects in the physical environment (e.g., placed at the same location in the physical environment as they are in the three-dimensional environment, and having the same size and orientation in the physical environment as in the three-dimensional environment), the location of the device and/or user is the position at which the user would see the virtual objects in the physical environment in the same position, orientation, and/or size as they are displayed by the display generation component of the device (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or cameras.

FIGS. 7A-7D illustrate examples of how an electronic device enhances a two-dimensional drawing in accordance with some embodiments.

Figure 7A:
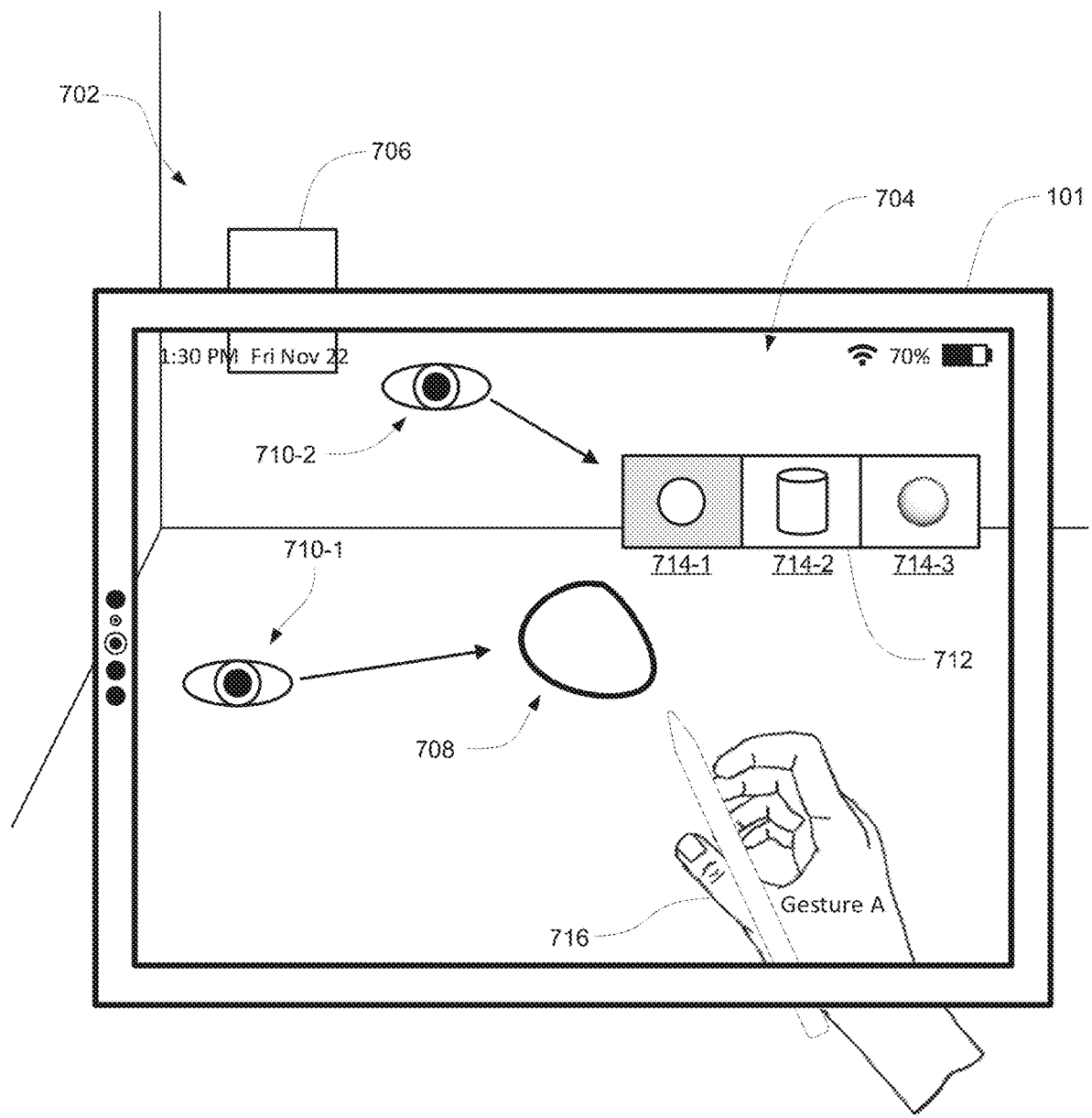
FIGS. 7A-7D illustrate examples of how an electronic device enhances a two-dimensional drawing in accordance with some embodiments.

FIG. 7A illustrates an electronic device 101 displaying, via a display generation component (e.g., display generation component 120 of FIG. 1), a three-dimensional environment 704 on a user interface. As described above with reference to FIGS. 1-6, the electronic device 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the electronic device 101 would be able to use to capture one or more images of a user or a part of the user while the user interacts with the electronic device 101. In some embodiments, the user interfaces shown below could also be implemented on a head-mounted display that includes a display generation component that displays the user interface to the user and sensors to detect the physical environment and/or movements of the user's hands (e.g., external sensors facing outwards from the user), and/or gaze of the user (e.g., internal sensors facing inwards towards the face of the user).

As shown in FIG. 7A, device 101 captures one or more images of the real world environment 702 around device 101 (e.g., operating environment 100), including one or more objects in the real world environment 702 around device 101. In some embodiments, device 101 displays representations of the real world environment in three-dimensional environment 704. For example, three-dimensional environment 704 includes a back corner of a room and a representation of at least a portion of picture frame 706 on the back wall of the room. Similarly, in FIG. 7A, three-dimensional environment 704 includes a representation of a hand 716 holding a stylus. As described above with respect to FIG. 6B, representation of the hand 716 is a representation of the hand of the user of the device that is captured by the one or more sensors of the device.

In FIG. 7A, three-dimensional environment 704 includes two-dimensional drawing 708 at a respective location in three-dimensional environment 704 (e.g., at a respective x, y, and z position). In some embodiments, two-dimensional drawing 708 was inserted into three-dimensional environment 704 via a drawing input, optionally using the stylus held by hand 716. For example, a user performed one or more drawing gestures with the stylus and device 101 detected the movement of the tip of the stylus and inserted two-dimensional drawing 708 into three-dimensional environment 704 at the respective location of the user input as if the user were drawing two-dimensional drawing 708 in the physical environment of device 101. In some embodiments, the one or more drawing gestures includes a selection input while the tip of the stylus is moving. In some embodiments, the selection input includes a tap on the stylus and/or a tap-and-hold on the stylus. In some embodiments, if a selection input is not detected, then two-dimensional drawing 708 is not drawn in three-dimensional environment 704 in response to the movement of the stylus. In some embodiments, the location, orientation, and/or movement of the stylus (and/or the tip of the stylus) is determined and/or captured by one or more sensors on the back side of the device, such as described above in FIG. 6B. In some embodiments, two-dimensional drawing 708 was inserted into three-dimensional environment 704 via any other suitable content drawing process. For example, a user is able to draw two-dimensional drawing 708 by interacting with a touch screen of device 101 that is displaying three-dimensional environment 704 (which is optionally on the front and/or user-facing side of device 101).

In FIG. 7A, device 101 detects that gaze 710-1 of the user is directed at two-dimensional drawing 708. In some embodiments, in response to detecting that gaze 610-1 is directed at two-dimensional drawing 708, device 101 displays drawing enhancement menu 712, as shown in FIG. 7A. In some embodiments, drawing enhancement menu 712 is displayed in response to detecting a selection input while gaze 710-1 is directed at two-dimensional drawing 708, such as a tap input by hand 716 on the stylus, the selection of a selectable option, a selection gesture, such as a pinch by two or more fingers of hand 716 (e.g., by the thumb and forefinger, etc.). In some embodiments, the stylus is an active device and is capable of detecting taps by a finger and transmit information to device 101 that a tap gesture was detected. In some embodiments, the stylus is a passive device and device 101 detects that hand 716 tapped on the stylus via the one or more sensors of device 101 (e.g., device 101 "sees" hand 716 tapping on the stylus using one or more cameras capturing real world environment 702, which includes hand 716 and the stylus held by hand 716).

In some embodiments, drawing enhancement menu 712 is displayed near or at the location of two-dimensional drawing 708 (e.g., such as illustrated in FIG. 7A). In some embodiments, drawing enhancement menu 712 is displayed at or near the location of hand 716 (e.g., the hand that performed the gesture to cause drawing enhancement menu 712 to be displayed).

In some embodiments, drawing enhancement menu 712 includes one or more selectable options (e.g., affordances) that are selectable to enhance two-dimensional drawing 708. For example, as shown in FIG. 7A, drawing enhancement menu 712 includes selectable option 714-1 corresponding to a "simplify" operation, selectable option 714-2 corresponding to an "extrude" operation, and selectable option 714-3 corresponding to a "volumize" option. In some embodiments, more or fewer options are possible. For example, drawing enhancement menu 712 may include a selectable option to fill in two-dimensional object 708 with a solid color that is based on the color of two-dimensional object 708 (e.g., the same or similar color).

In some embodiments, selectable option 714-1 is selectable to replace two-dimensional drawing 708 with a two-dimensional circle. In some embodiments, device 101 recognizes two-dimensional drawing 708 as a drawing of a circle, and selectable option 714-1 enhances two-dimensional drawing 708 by normalizing the circle. For example, device 101 replaces two-dimensional drawing 708 with a circle that is well formed and/or circular (e.g., perfectly circular). In some embodiments, the resulting two-dimensional circle has a size based on the size of two-dimensional drawing 708. In some embodiments, the radius of the resulting two-dimensional circle is determined based on the average radius of two-dimensional drawing 708, the maximum radius of two-dimensional drawing 708, the minimum radius of two-dimensional drawing 708, or any other suitable method of determining the representative size of two-dimensional drawing 708. In some embodiments, the parameters of the two-dimensional circle are based on two-dimensional drawing 708. For example, the resulting two-dimensional circle has a color and/or line width that is based on two-dimensional drawing 708 (e.g., the same or similar). Selectable options 714-2 and 714-3 will be described in further detail below with respect to FIGS. 7B and 7C. As shown in FIG. 7A, each selectable option includes a representation (e.g., icon, graphic, etc.) of the corresponding object that will replace the two-dimensional drawing. For example, selectable option 714-1 includes a representation of a well-formed circle, selectable option 714-2 includes a representation of a cylinder, and selectable option 714-3 includes a representation of a sphere. Thus, in some embodiments, the representations themselves are based on two-dimensional drawing 708.

In FIG. 7A, while displaying drawing enhancement menu 712, device 101 detects that gaze 710-2 of the user is directed to selectable option 714-1 (e.g., a selectable option of drawing enhancement menu 712). In some embodiments, in response to determining that gaze 710-2 is directed to selectable option 714-1, selectable option 714-1 is visually enhanced as compared to the other selectable options, as shown in FIG. 7A. For example, selectable option 714-1 is highlighted or otherwise visually altered. In some embodiments, instead of using gaze 710-2 to determine the option that will be selected, device 101 uses the orientation of the stylus to determine which selectable option the stylus is pointed at. For example, a user is able to use the stylus being held in hand 716 to point at a respective selectable option, optionally causing the selectable option to be highlighted or otherwise visually altered (e.g., at which point a selection input causes actuation of the respective selectable option). Thus, device 101 is able to indicate to the user the selectable option that will be selected (e.g., actuated) in response to a selection input.

In some embodiments, device 101 determines where and what the stylus is pointing at using one or more sensors of device 101 (optionally the sensors on the back side of device 101, which are facing away from the user, if the stylus is held on the back side of device 101, or optionally the sensors on the front side of device 101, which are facing the user, if the stylus is held on the front side of device 101). In some embodiments, device 101 determines that stylus is pointing towards or at a particular location in the physical world (e.g., real world environment 702) and correlates the location in the physical world to a location in three-dimensional environment 704. For example, because three-dimensional environment 704 includes a representation of real world environment 702, locations in real world environment 702 have a corresponding location in three-dimensional environment 704 and vice versa. Thus, for example, if device 101 determines that the stylus, in the real world, is pointed at a particular location in real world environment 702 that correlates to the location in three-dimensional environment 704 of selectable option 714-1, then device 101 determines that the stylus is pointed at selectable option 714-1. In some embodiments, the same or a similar process is used to determine where and what the gaze of the user is directed to (e.g., gaze 710-1 and 710-2) and/or what hand 716 is interacting with (e.g., for direct manipulation interactions).

In some embodiments, a user selects a respective selectable option by looking at the respective selectable option (e.g., as described above), and performing a predetermined gesture (e.g., "Gesture A"). In some embodiments, Gesture A is a gesture performed by hand 716 that is predetermined to correspond to a selection input. For example, a tap of a finger of hand 716 (e.g., by a forefinger, by a thumb, etc.) on the stylus is optionally interpreted as a selection input. In some embodiments, a double tap on the stylus is interpreted as a selection input. In some embodiments, a squeezing gesture on the stylus is interpreted as a selection input. In some embodiments, a pointing or tapping gesture using the stylus is interpreted as a selection input. Other suitable gestures predetermined to correspond to a selection input are possible.

In some embodiments, in response to receiving the user input (e.g., the selection gesture) selecting a respective selectable option, the stylus held by hand 716 generates a tactile feedback indicating that a selection has occurred. For example, the stylus generates a vibrational output that simulates a physical button press. In some embodiments, if the user performed a selection input, but not while properly looking at a selectable option or pointing at a selectable option, then the stylus does not generate a tactile output.

Figure 7B:
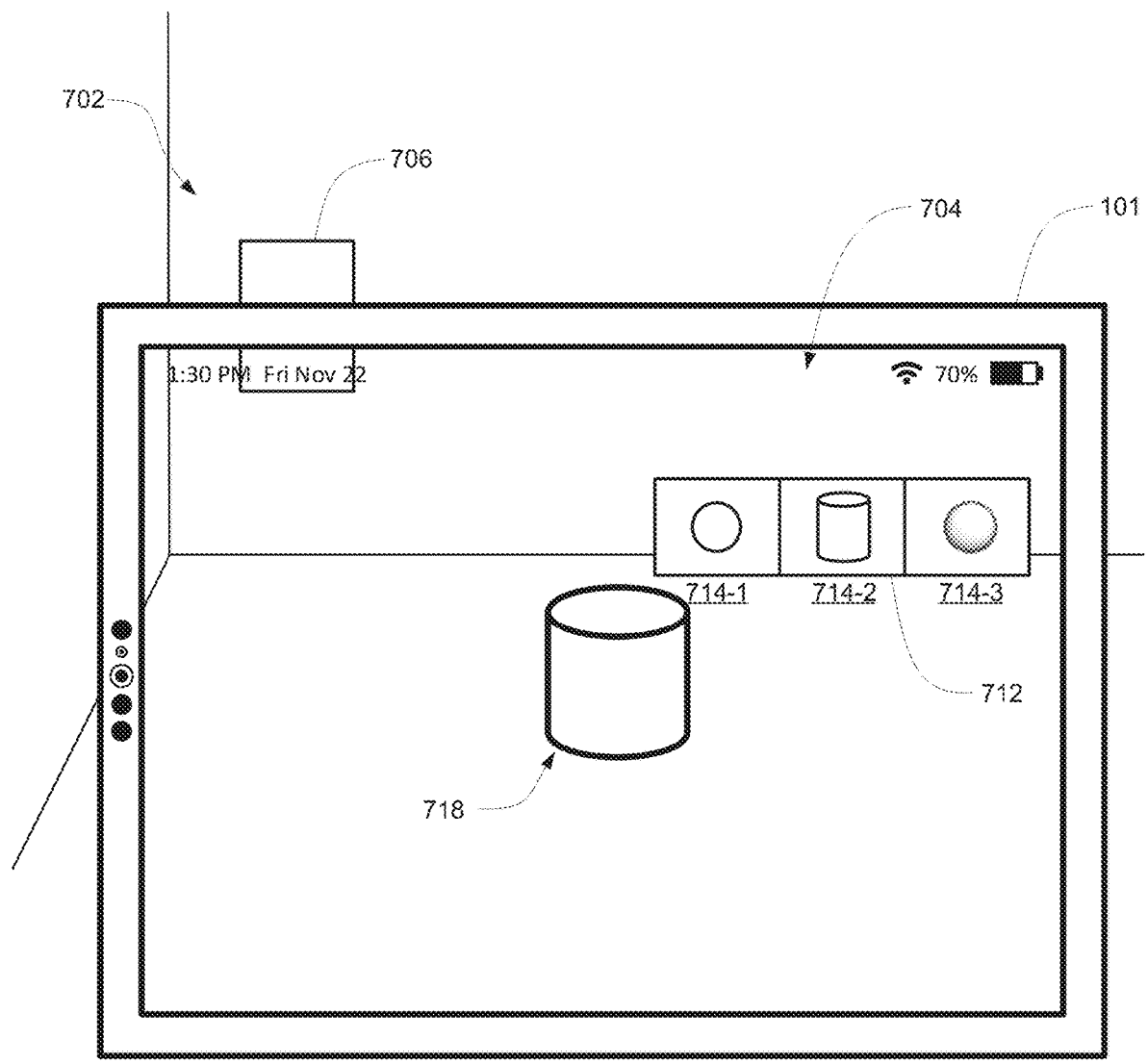

FIG. 7B illustrates two-dimensional drawing 708 having been replaced with cylinder 718 (e.g., in response to a selection input while the user's gaze is directed to selectable option 714-2). In some embodiments, cylinder 718 is located at the same position as two-dimensional drawing 708. In some embodiments, the center of cylinder 718 is located where the center of two-dimensional drawing 708 was. In some embodiments, a border or edge of cylinder 718 is located where a border or edge of two-dimensional drawing 708 was. For example, if two-dimensional drawing 708 was drawn onto a surface of an object (e.g., a table, the floor, etc.), cylinder 718 is placed on the surface of the object.

In some embodiments, cylinder 718 is a three-dimensional cylinder based on two-dimensional drawing 708. For example, the radius of cylinder 718 is based on the radius of two-dimensional drawing 708 (e.g., similarly to described above with selectable option 714-1). In some embodiments, the circular shape of cylinder 718 is a normalized and/or well-formed circle based on two-dimensional drawing 708. In some embodiments, the circular shape of cylinder 718 is the original hand-drawn shape of two-dimensional drawing 708 (e.g., without normalizing and/or smoothing out the circle). Thus, in some embodiments, cylinder 718 is the resulting three-dimensional object after performing an extrusion operation on two-dimensional drawing 708 (e.g., optionally after normalizing and/or smoothing out two-dimensional drawing 708). In some embodiments, performing an extrusion operation on two-dimensional drawing 708 includes taking the shape of two-dimensional drawing 708 (e.g., optionally after normalizing) and expanding the shape laterally to generate the resulting object. In some embodiments, the cross-sectional size and/or shape of the resulting object is constant throughout the object and is the same as or is based on two-dimensional drawing 708.

In some embodiments, as shown in FIG. 7B, drawing enhancement menu 712 continues to be displayed after receiving the user input such that a user is able to selectable another selectable option to replace cylinder 718 with the respective object.

Figure 7C:
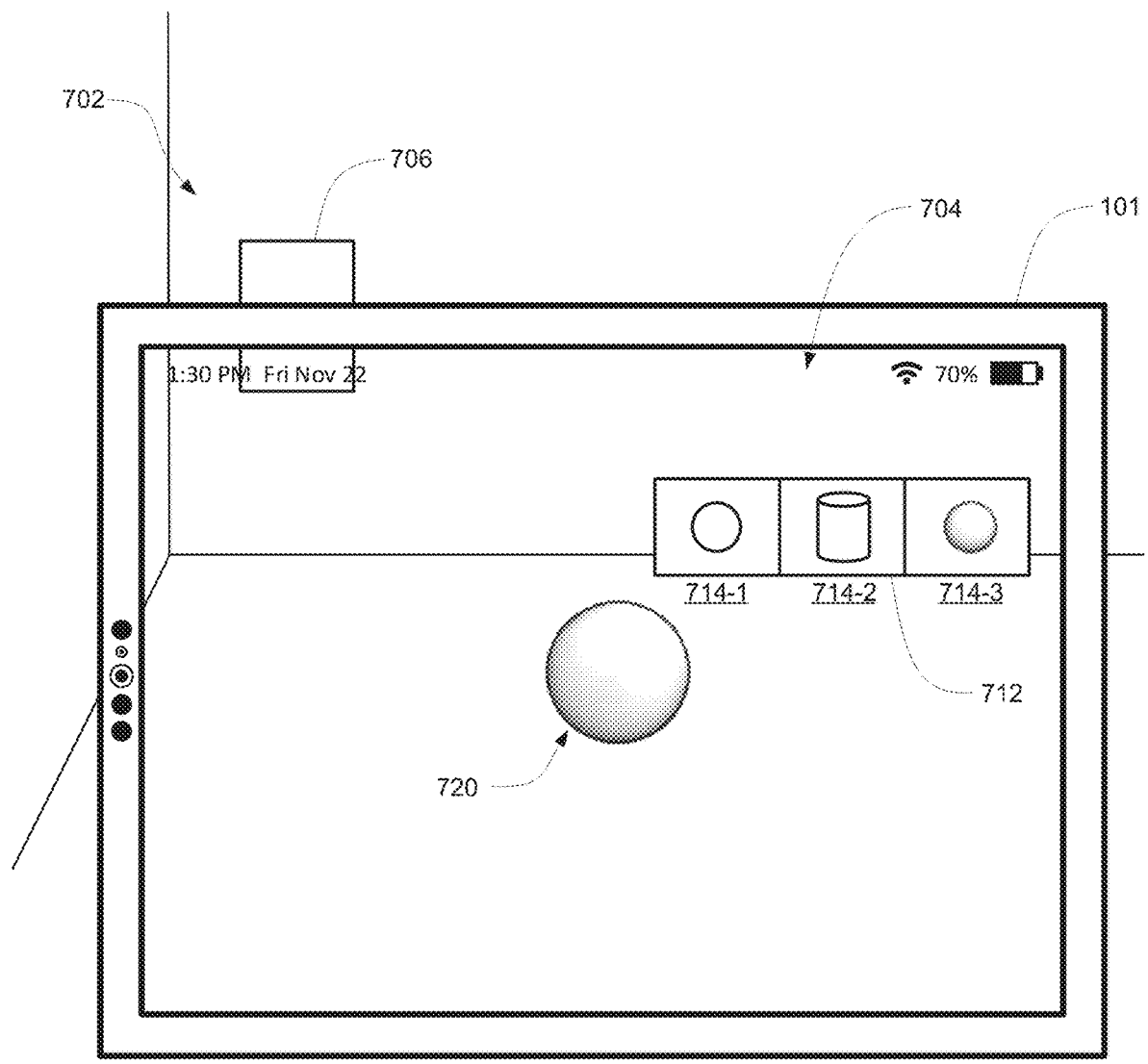

FIG. 7C illustrates two-dimensional drawing 708 having been replaced with sphere 720 (e.g., in response to a selection input while the user's gaze is directed to selectable option 714-3). In some embodiments, sphere 720 is a three-dimensional cylinder based on two-dimensional drawing 708. For example, the radius of sphere 720 is based on the radius of two-dimensional drawing 708 (e.g., similarly to described above with selectable option 714-1). In some embodiments, the shape of sphere 720 is a normalized and/or well-formed circle based on two-dimensional drawing 708. In some embodiments, the shape of sphere 720 is the original hand-drawn shape of two-dimensional drawing 708 (e.g., without normalizing and/or smoothing out the circle). Thus, in some embodiments, sphere 720 is the resulting three-dimensional object after performing a volumizing operation on two-dimensional drawing 708 (e.g., optionally after normalizing and/or smoothing out two-dimensional drawing 708). In some embodiments, performing the volumizing operation on two-dimensional drawing 708 includes rotating two-dimensional drawing 708 (e.g., a 360 degree rotation, a 180 degree rotation, etc.) to generate a three-dimensional object.

In some embodiments, the three-dimensional object is a volumetric object (e.g., a hollow object with a border that is based on two-dimensional drawing 708). In some embodiments, three-dimensional object is a three-dimensional point-cloud that has a shape based on two-dimensional drawing 708).

Thus, as described above, after the user hand-draws a two-dimensional drawing object (e.g., optionally after determining that the user is gazing at the object and/or in response to receiving a selection input), device 101 displays a drawing enhancement menu. Using the drawing enhancement menu, a user optionally is able to enhancement the two-dimensional drawing by performing one or more operations on the two-dimensional drawing to replace the two-dimensional drawing with a two-dimensional object that is based on the original two-dimensional drawing or a three-dimensional object that is based on the original two-dimensional drawing. In some embodiments, the selectable options that are provided in drawing enhancement menu 712 depend on the two-dimensional drawing. For example, in the embodiment illustrated above, if the two-dimensional drawing is recognized as a hand drawn circle, the device provides options for cleaning up and/or smoothing out the circle and/or options corresponding to a circle (e.g., such as selectable option 714-3 corresponding to a sphere). In some embodiments, if the two-dimensional drawing is recognized as a hand drawn square, the device provides options for cleaning up and/or smoothing out the square and/or options corresponding to a square (e.g., such as a selectable option corresponding to a cube). In another example, if the two-dimensional drawing is recognized as a triangle, the device provides options corresponding to a triangle (e.g., such as a selectable option corresponding to a cone and/or a selectable option corresponding to a pyramid). In some embodiments, if the two-dimensional drawing is recognized as handwritten text, the device provides an option for converting the two-dimensional drawing into font-based text (e.g., as a two-dimensional object or a three-dimensional object). Thus, based on the two-dimensional drawing, different options are optionally presented on drawing enhancement menu 712.

In some embodiments, the two-dimensional drawing is recognized as a drawing of a three-dimensional object and device 101 presents selectable options to replace the two-dimensional drawing with representations of the recognized three-dimensional object. By contrast, in the embodiment illustrated in FIGS. 7A-7C, two-dimensional drawing 706 is recognized as a drawing of a shape and device 101 presents options for performing operations on the hand-drawn shape. For example, if device 101 recognizes two-dimensional drawing 706 as a circle, triangle, square, line, rectangle, etc. or any other shape, then device 101 presents options associated with shapes. On the other hand, if device 101 recognizes two-dimensional drawing 706 as a drawing of a physical object e.g., other than a simple shape), then device 101 optionally presents options associated with the physical object, as will be illustrated in FIG. 7D, below.

Figure 7D:
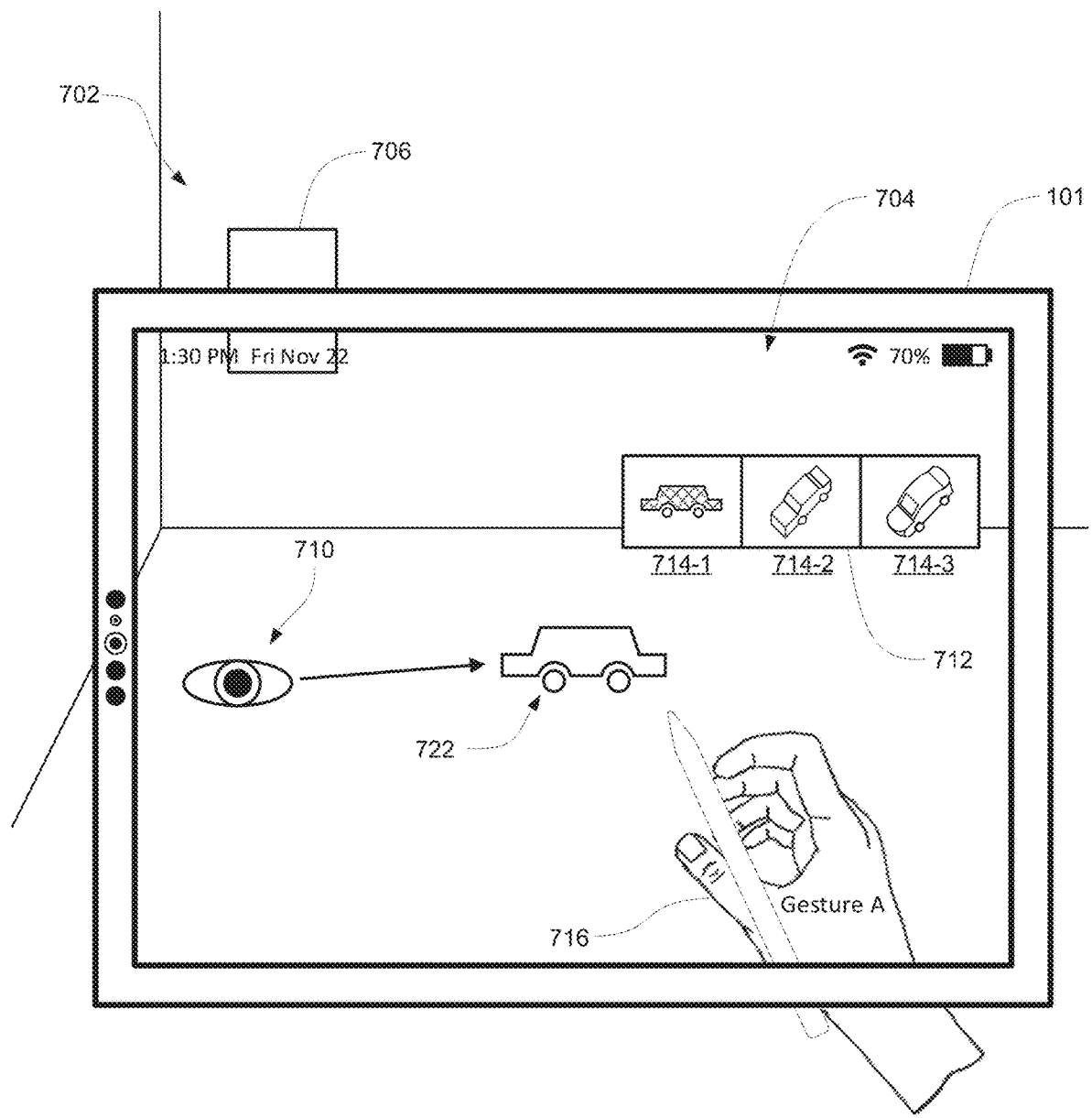
Figure 8A:
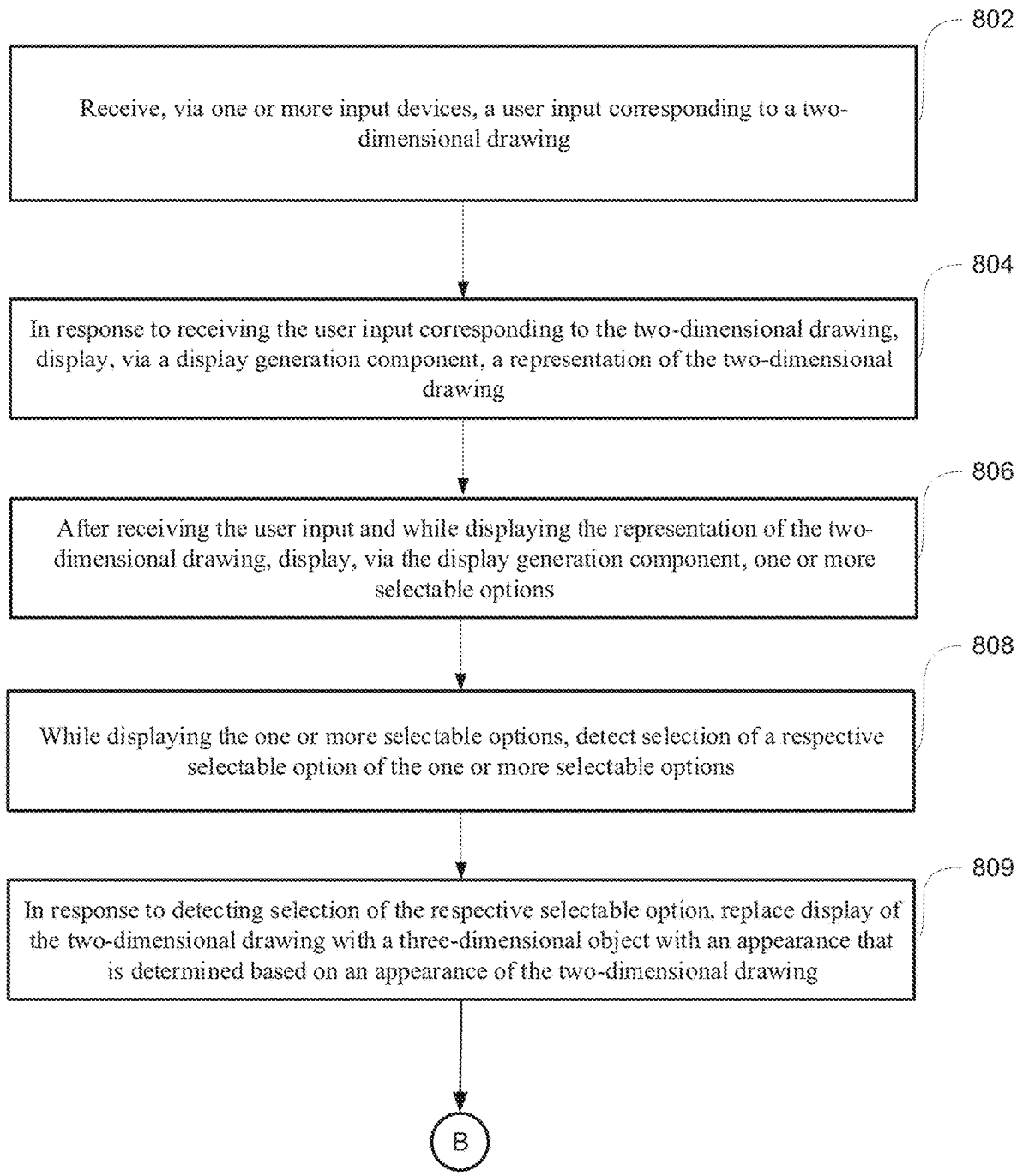
FIGS. 8A-8G is a flowchart illustrating a method of enhancing a two-dimensional drawing in accordance with some embodiments.
Figure 8B:
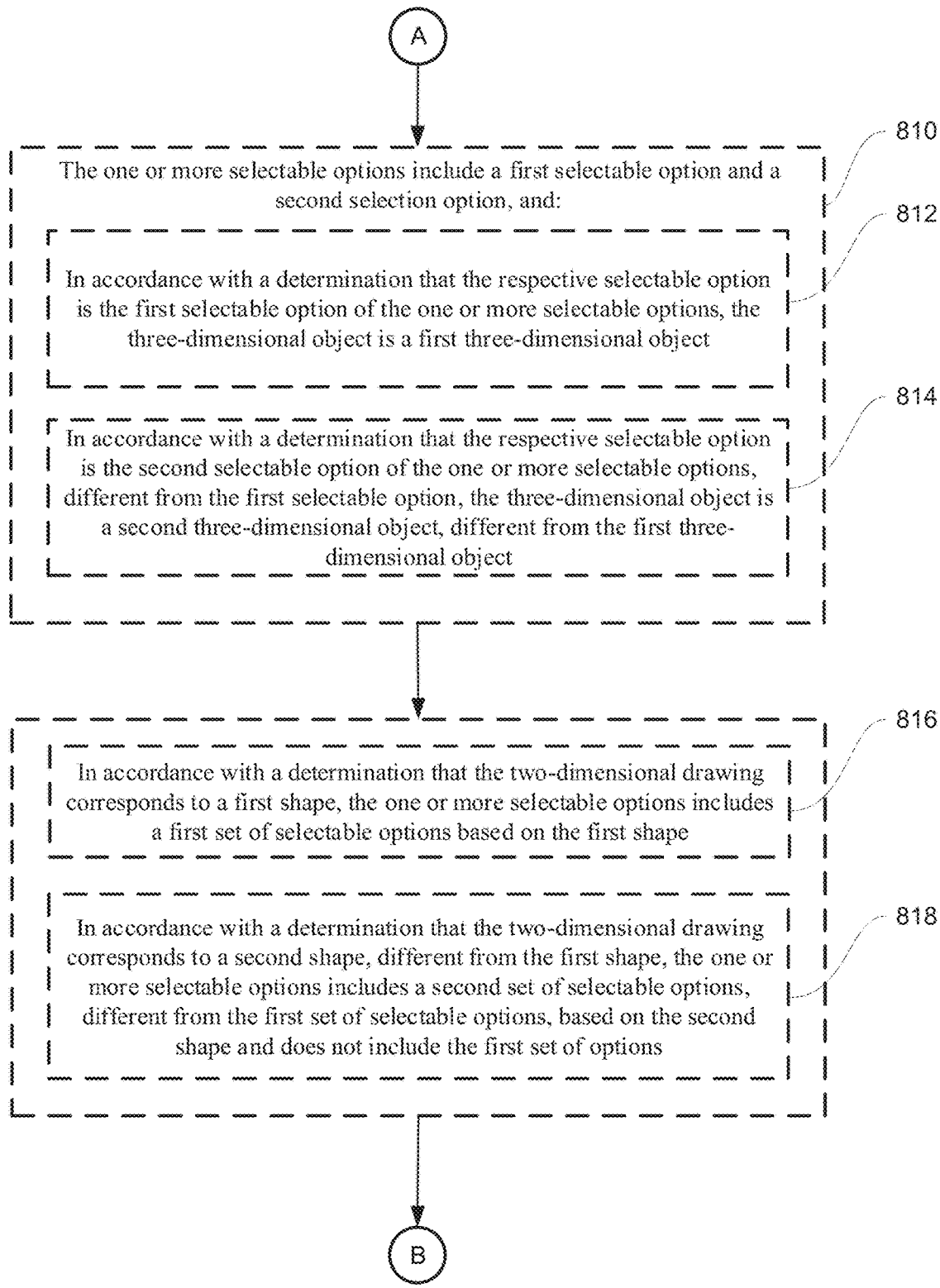
Figure 8C:
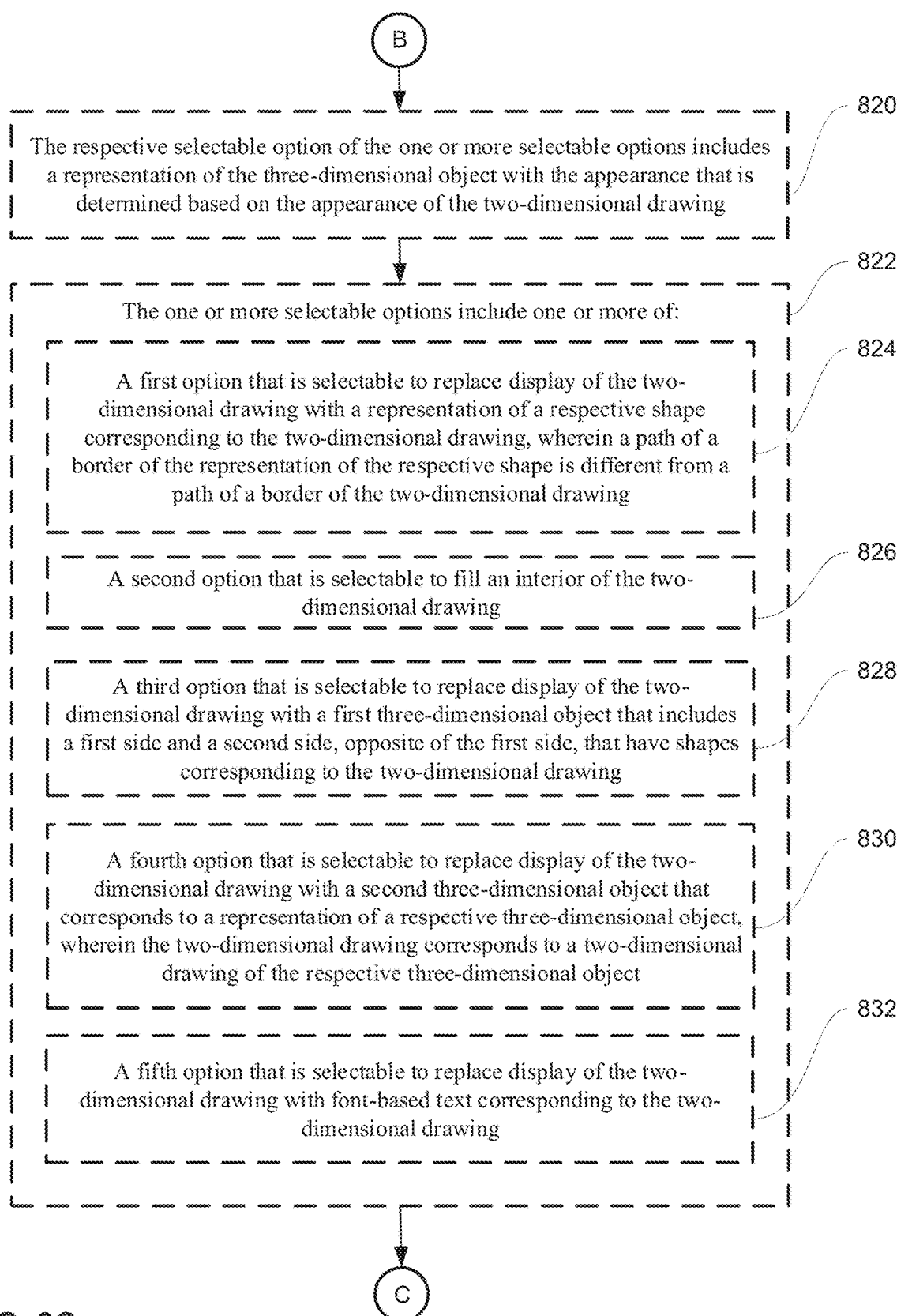
Figure 8D:
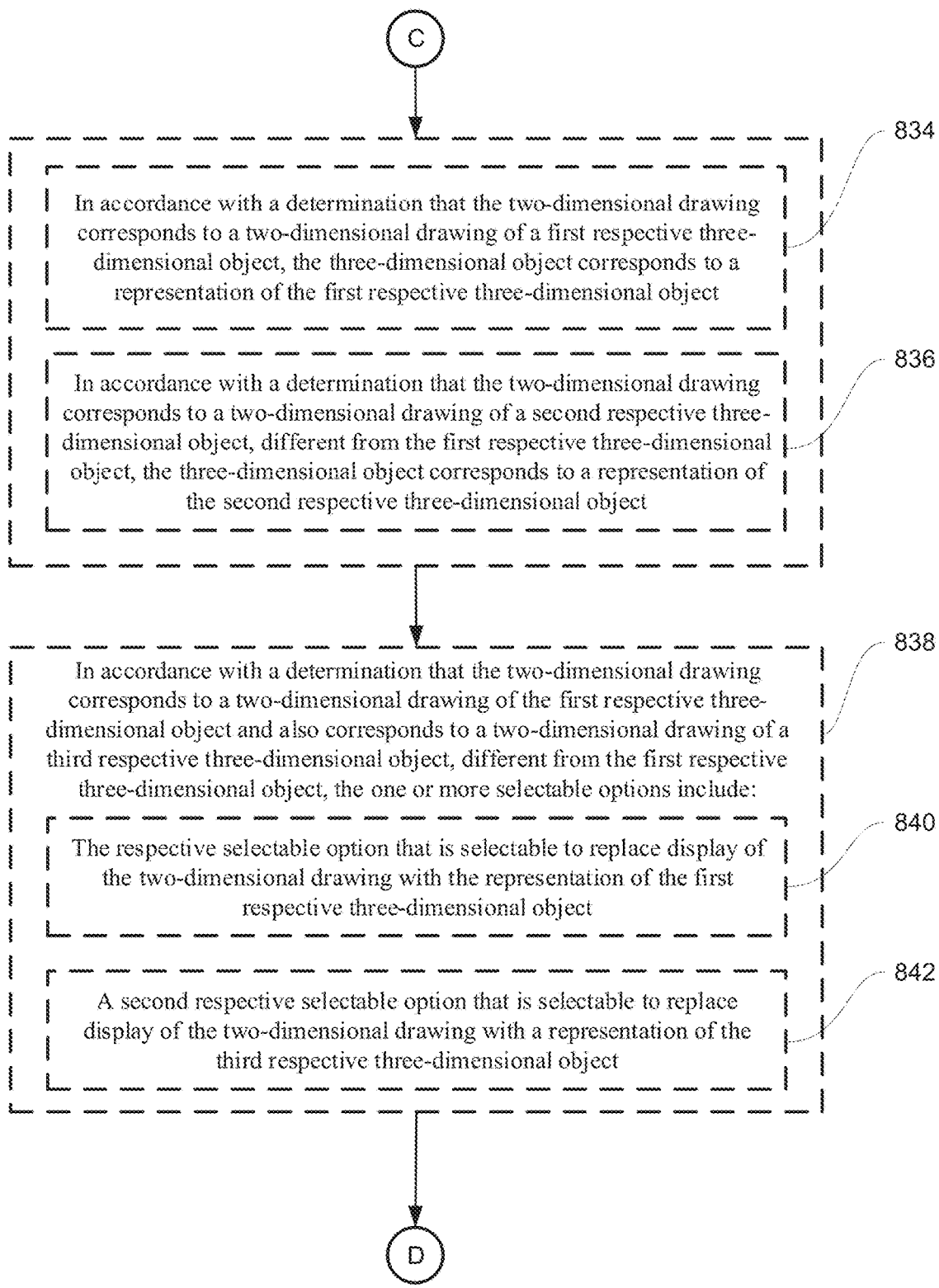
Figure 8E:
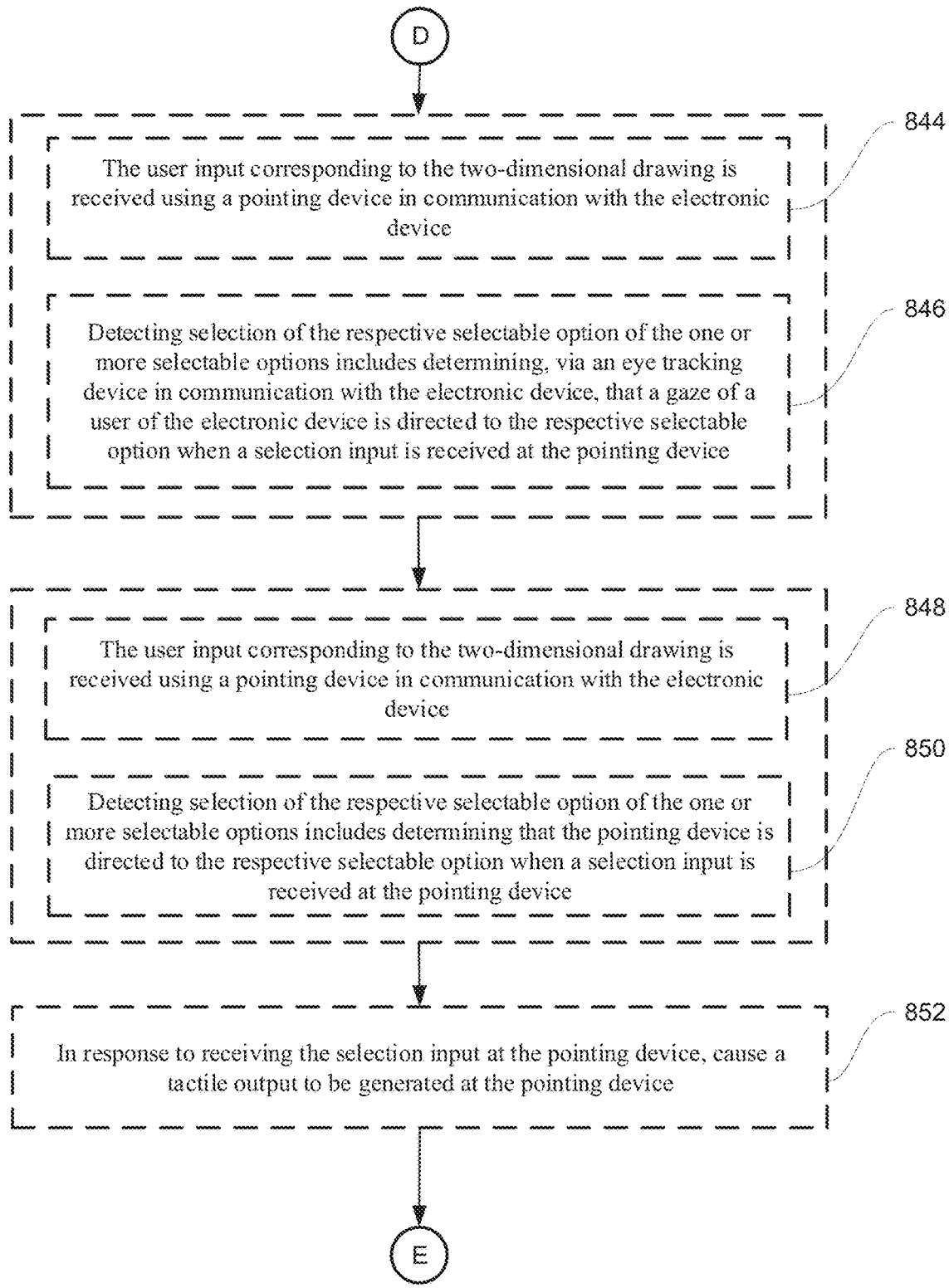
Figure 8F:
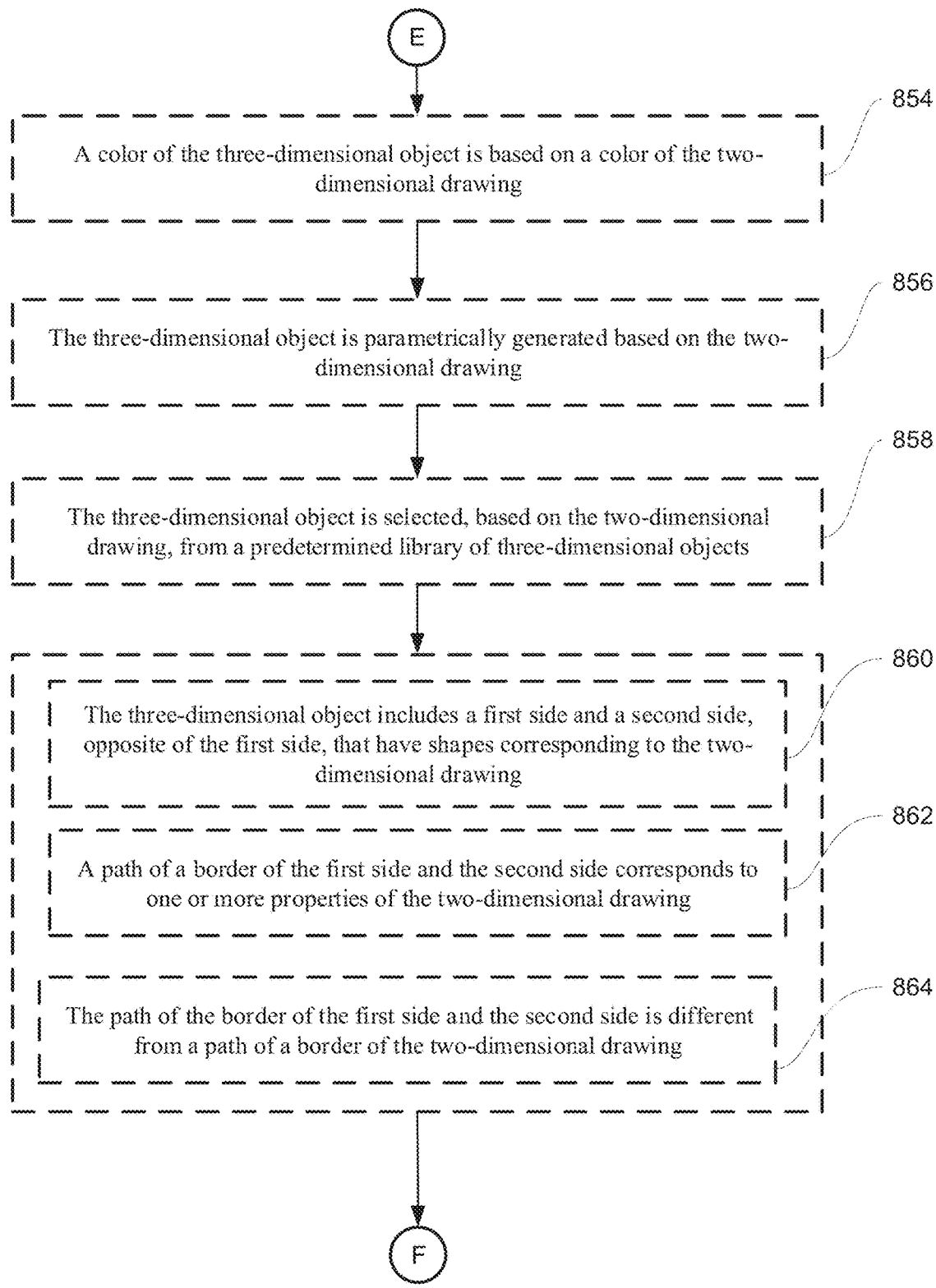
Figure 8G:
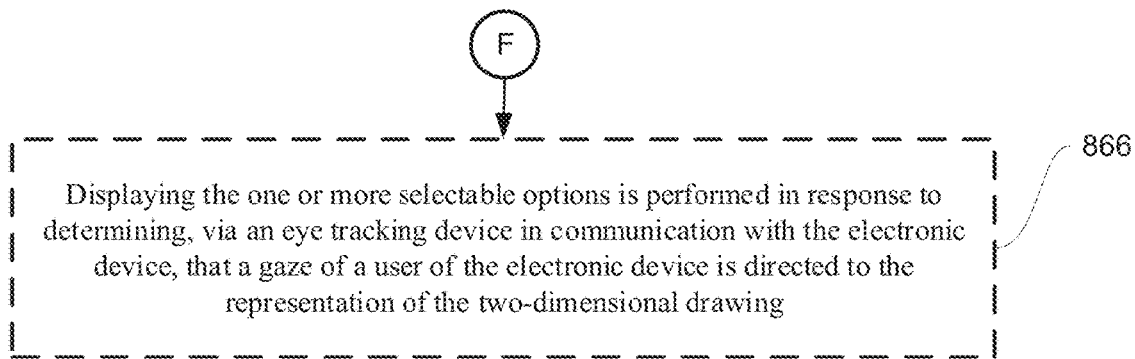

In FIG. 7D, three-dimensional environment 704 includes a hand drawn two-dimensional drawing 722 of a car and drawing enhancement menu 712. As described above, drawing enhancement menu 712 is optionally displayed in response to determining that gaze 710 is directed to two-dimensional drawing 722 (optionally in response to detecting "Gesture A" by hand 716). In some embodiments, drawing enhancement menu 722 includes selectable option 714-1 that is selectable to perform the "fill" operation (e.g., fill the interior of two-dimensional drawing 722 with a solid color that is based on the color of two-dimensional drawing 722 (e.g., the color of the lines). In some embodiments, drawing enhancement menu 712 includes selectable option 714-2 that is selectable to perform the "extrude" operation, similar to described above with respect to FIG. 7B.

As described above, two-dimensional drawing 722 is optionally recognized as a hand-drawn drawing (e.g., a two-dimensional drawing) of a three-dimensional object (e.g., a car). Thus, drawing enhancement menu 712 includes one or more options of representations of the recognized three-dimensional object (e.g., representations of cars). In FIG. 7D, drawing enhancement menu 712 includes selectable option 714-3 that is selectable to replace two-dimensional drawing 722 with a three-dimensional representation of a car. In some embodiments, the three-dimensional representation of the car is selected from a database and/or library of available cars, and one or more three-dimensional objects of cars that are identified as similar (e.g., most similar) to two-dimensional drawing 722 are selected and provided in drawing enhancement menu 712. For example, two-dimensional drawing 722 is recognized as a particular type of car (e.g., sedan, SUV, truck, etc.) or a particular make and model of car, and drawing enhancement menu 712 includes a selectable option corresponding to a three-dimensional model of the recognized type of car or recognized make and model of car. In some embodiments, if two-dimensional drawing 722 is recognized as potentially two or more different types of cars or potentially two models of cars, drawing enhancement menu 712 includes a plurality of selectable options corresponding to the different recognized type or models of cars. In some embodiments, the three-dimensional representation is parametrically generated from two-dimensional drawing 722.

Thus, as described above, a two-dimensional drawing is recognizable and/or identifiable as a drawing of an object (e.g., as opposed to simple shapes as described above with respect to FIGS. 7A-7C) and drawing enhancement menu 712 optionally includes options to replace the two-dimensional drawing with a three-dimensional representation of the recognized object. In the example described in FIG. 7D, the two-dimensional drawing is recognized as a car and drawing enhancement menu 712 includes a selectable option corresponding to a car. The two-dimensional drawing is optionally recognizable as any type of object, such as toys, houses, buildings, tables, chairs, etc.

FIGS. 8A-8G is a flowchart illustrating a method 800 of enhancing a two-dimensional drawing in accordance with some embodiments. In some embodiments, the method 800 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 800 are, optionally, combined and/or the order of some operations is, optionally, changed.

In the method 800, in some embodiments, an electronic device (e.g., computer system 101 in FIG. 1) in communication with a display generation component and one or more input devices (e.g., a mobile device (e.g., a tablet, a smart-phone, a media player, or a wearable device), or a computer) receives (802), via the one or more input devices, a user input corresponding to a two-dimensional drawing, such as a user input drawing two-dimensional drawing 708 in FIG. 7A (e.g., receiving a user input drawing, generating, inserting, or otherwise causing display of a two-dimensional drawing).

In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a stylus, a camera, a depth sensor and/or a motion sensor (e.g., a hand tracking sensor, a hand motion sensor), etc.

In some embodiments, the two-dimensional drawing is a freeform drawing. In some embodiments, the two-dimensional drawing is a pre-determined shape (e.g., generated from a template shape). In some embodiments, the user input includes a movement drawing the two-dimensional drawing. In some embodiments, the user input is received from a stylus interacting with the one or more input devices (e.g., in contact with a touch-sensitive surface, such as a touch screen). In some embodiments, the user input is received from a finger or hand interacting with the one or more input devices (e.g., in contact with a touch-sensitive surface, such as a touch screen). In some embodiments, the user input is a gesture or user movement detected by the one or more input devices (e.g., a hand gesture detected by a hand motion sensor in communication with the electronic device).

In some embodiments, in response to receiving the user input corresponding to the two-dimensional drawing, the electronic device displays (804), via the display generation component, a representation of the two-dimensional drawing, such as two-dimensional drawing 708 in FIG. 7A that is displayed in response to the drawing input (e.g., displaying a representation of the two-dimensional drawing). In some embodiments, the two-dimensional drawing is a freeform drawing, a recognizable shape, etc. In some embodiments, the two-dimensional drawing is displayed on one plane at a respective location of the display area. In some embodiments, the two-dimensional drawing is displayed in a three-dimensional environment that is generated, displayed, or otherwise caused to be viewable by the device (e.g., a computer-generated reality (CGR) environment such as a virtual reality (VR) environment, a mixed reality (MR) environment, or an augmented reality (AR) environment, etc.). In some embodiments, the respective location is a location associated with the location of the user input. For example, if the user performs a freeform drawing input directed to a first location in the display area, the representation of the drawing input is displayed at the first location in the display area, optionally as the user input is being received.

In some embodiments, after receiving the user input (e.g., in response to receiving the user input or in response to detecting an end of the user input) and while displaying the representation of the two-dimensional drawing, the electronic device displays (806), via the display generation component, one or more selectable options, such as selectable options 714-1 to 714-3 on drawing enhancement menu 712 in FIG. 7A (e.g., one or more selectable options or performing a function associated with the two-dimensional drawing). In some embodiments, the two-dimensional drawing is analyzed and the one or more selectable options are presented to convert (e.g., replace) the two-dimensional drawing with a two-dimensional object or a three-dimensional object that is based on the user-drawn two-dimensional drawing.

In some embodiments, while displaying the one or more selectable options, the electronic device detects (808) selection of a respective selectable option of the one or more selectable options, such as detecting a selection input performed by hand 716 (e.g., "Gesture A") while gaze 710-2 is directed to a selectable option in FIG. 7A (e.g., a selection input on a respective selectable option). In some embodiments, the selection input is received via an input device. In some embodiments, the selection input includes a focus and an actuation. For example, selecting the respective selectable option includes detecting that a gaze of the user is directed at (e.g., looking at) the respective selectable option when the actuation is received (e.g., a click of a button, a tap on a touch-sensitive surface, etc.).

In some embodiments, in response to detecting selection of the respective selectable option, the electronic device replaces (809) display of the two-dimensional drawing with a three-dimensional object with an appearance that is determined based on an appearance of the two-dimensional drawing, such as replacing two-dimensional drawing 708 with cylinder 718 in FIG. 7B or sphere 720 in FIG. 7C (e.g., after receiving the user input drawing, inserting, etc. the two-dimensional drawing, presenting one or more options for generating a three-dimensional object based on the two-dimensional drawing).

In some embodiments, the one or more options correspond to different three-dimensional functions or transformations to be performed on the two-dimensional drawing. For example, if the drawing is recognizable as a circle or a circular shape, one option is selectable to generate a sphere based on the drawing (e.g., the radius of the sphere based on the radius as the drawing) and/or a second option is selectable to generate a cylinder (e.g., the radius of the cylinder based on the radius as the drawing). In some embodiments, the one or more options include options for generating a two-dimensional object based on the original two-dimensional drawing. For example, if the drawing is recognizable as a circle or circular shape, one option is selectable to normalize the circle (e.g., generate a smooth circle based on the drawing). In some embodiments, the generated object (e.g., three-dimensional object or two-dimensional object) is displayed in the three-dimensional object, optionally near the location of the two-dimensional object upon which the generated object is based.

The above-described manner of generating a three-dimensional object from a two-dimensional drawing (e.g., by presenting one or more selectable options for displaying three-dimensional objects based on a two-dimensional drawing after displaying a representation of the two-dimensional drawing) provides for quick and efficient creation and/or display of three-dimensional objects (e.g., without requiring the user to draw a three-dimensional object or perform additional inputs to manually transform the two-dimensional drawing into a three-dimensional object), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the one or more selectable options include a first selectable option and a second selection option (810), such as selectable options 714-2 and 714-3 in FIG. 7A (e.g., the selectable options are displayed in a menu user interface that includes multiple selectable options). In some embodiments, in accordance with a determination that the respective selectable option is the first selectable option of the one or more selectable options, the three-dimensional object is a first three-dimensional object (812), such as selectable option 714-2 that is selectable to replace two-dimensional drawing 708 with cylinder 718 in FIG. 7B (e.g., a first selectable option in the menu user interface is selectable to replace the user's two-dimensional drawing with a first three-dimensional object). In some embodiments, in accordance with a determination that the respective selectable option is the second selectable option of the one or more selectable options, different from the first selectable option, the three-dimensional object is a second three-dimensional object, different from the first three-dimensional object (814), such as selectable option 714-3 that is selectable to replace two-dimensional drawing 708 with sphere 720 in FIG. 7C (e.g., a second selectable option in the menu user interface is selectable to replace the user's two-dimensional drawing with a second three-dimensional object).

In some embodiments, the second three-dimensional object is a different object than the first three-dimensional object. In some embodiments, the first and second three-dimensional objects are different types of objects (e.g., a cylinder and a sphere). In some embodiments, the first and second three-dimensional objects are different variations of the same type of object (e.g., two different cars, two of the same car, but different colors, etc.).

The above-described manner of generating a three-dimensional object from a two-dimensional drawing (e.g., by present multiple options and replacing the two-dimensional object with the first three-dimensional object based on the user's selection) provides for quick and efficient creation and/or display of three-dimensional objects (e.g., by automatically presenting the user with multiple options that are based on the two-dimensional drawing, without requiring the user to perform multiple inputs to browse different three-dimensional object to insert), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, in accordance with a determination that the two-dimensional drawing corresponds to a first shape, the one or more selectable options includes a first set of selectable options based on the first shape (816), such as displaying selectable options 714-1 to 714-3 in FIG. 7A that are associated with two-dimensional drawing 708 being a circle (e.g., the selectable options are based on the two-dimensional drawing). In some embodiments, the device detects the type of shape or object in the two-dimensional drawing and presents options that correspond to three-dimensional versions of the recognized shape or object. For example, a drawing of a circle is recognized as a circle and the user is presented with a first option for replacing the circle with a cylinder (e.g., including circles on each end that are based on the user's drawn circle) and a second option for replacing the circle with a sphere (e.g., with a radius based on the user's drawn circle).

In some embodiments, in accordance with a determination that the two-dimensional drawing corresponds to a second shape, different from the first shape, the one or more selectable options includes a second set of selectable options, different from the first set of selectable options, based on the second shape and does not include the first set of options (818), such as displaying selectable options 714-1 to 714-3 in FIG. 7D that re associated with two-dimensional drawing 722 being a car (e.g., if the two-dimensional drawing is of a second shape, the options correspond to three-dimensional versions of the second shape). For example, a drawing of a triangle is recognized as a triangle and the user is presented with a first option for replacing the triangle with a cone and a second option for replacing the triangle with a pyramid.

The above-described manner of generating a three-dimensional object from a two-dimensional drawing (e.g., by presenting one or more selectable options for displaying three-dimensional objects that are based on a two-dimensional drawing) provides for quick and efficient creation and/or display of three-dimensional objects (e.g., without presenting the user with options that are not relevant to the two-dimensional drawing), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the respective selectable option of the one or more selectable options includes a representation of the three-dimensional object with the appearance that is determined based on the appearance of the two-dimensional drawing (820), such as selectable options 714-1 to 714-3 including a thumbnail, icon, or other suitable representation of what the two-dimensional drawing will be replaced with in FIGS. 7A-7D (e.g., the selectable options include a representation of the three-dimensional object that will be inserted). In some embodiments, the representation is an icon, drawing, outline, caricature, etc. of the three-dimensional object. In some embodiments, the representation is a still image or an animation. Thus, in some embodiments, the look of the selectable option is based on the two-dimensional drawing and indicates the type of object that will replace the two-dimensional drawing. For example, if the two-dimensional drawing is of a circle, then the menu includes a selectable option with a representation of a cylinder and a selectable option with a representation of a sphere, but if the two-dimensional drawing is of a triangle, then the menu includes a selectable option with a representation of a cone and a selectable option with a representation of a pyramid.

The above-described manner of generating a three-dimensional object from a two-dimensional drawing (e.g., by presenting one or more selectable options that include representations of their respective three-dimensional objects) provides for quick and efficient creation and/or display of three-dimensional objects (e.g., without requiring the user to remember which selectable option corresponds to which three-dimensional objects and/or perform additional inputs to select a particular selectable option to determine which three-dimensional object is generated), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the one or more selectable options include one or more of (822) a first option that is selectable to replace display of the two-dimensional drawing with a representation of a respective shape corresponding to the two-dimensional drawing, wherein a path of a border of the representation of the respective shape is different from a path of a border of the two-dimensional drawing (824), such as selectable option 714-1 that is selectable to smooth out the circular shape of two-dimensional drawing 708 in FIG. 7A (e.g., a selectable option that normalizes and/or "cleans up" the two-dimensional drawing based on the shape and/or figure recognized in the two-dimensional drawing).

For example, if the two-dimensional drawing is a sketch of a circle, the first option is selectable to replace the user's sketch of the circle with a "clean" and/or (e.g., perfectly) automatically formed circle generated by the electronic device rather than by the user, without (e.g., any) defects that may be in the two-dimensional drawing (e.g., if the user's drawing is not perfect and includes defects). Similarly, if the two-dimensional drawing is of a square, the first option is selectable to replace the user's sketch of the square with a "clean" and/or (e.g., perfectly) automatically formed square (e.g., with even and straight lines and 90 degree angles). In some embodiments, the representation of the respective shape remains a two-dimensional object.

In some embodiments, the one or more selectable options include one or more of a second option that is selectable to fill an interior of the two-dimensional drawing (826), such as selectable option 714-1 that is selectable to fill the interior of two-dimensional drawing 722 with a solid color in FIG. 7D (e.g., an option to fill the interior area of the two-dimensional drawing (e.g., if the drawing is a closed-circuit drawing) with a solid color). In some embodiments, the solid color is based on or is the same as the color of the border of the two-dimensional drawing. In some embodiments, the second option does not cause the two-dimensional drawing to be replaced with a normalized shape. In some embodiments, the second option normalizes the shape and fills in the interior area of the normalized shape with a solid color. In some embodiments, the two-dimensional drawing remains two-dimensional. In some embodiments, selecting the second option does not cause the two-dimensional drawing to be normalized (e.g., as described above with respect to the first option). In some embodiments, the second option is normalized and filled in response to a user selecting the second option.

In some embodiments, the one or more selectable options include one or more of a third option that is selectable to replace display of the two-dimensional drawing with a first three-dimensional object that includes a first side and a second side, opposite of the first side, that have shapes corresponding to the two-dimensional drawing (828), such as selectable option 714-2 that is selectable to perform an extrusion operation in FIG. 7B (e.g., the third option replaces the two-dimensional drawing with a three-dimensional object that is an extrusion of the two-dimensional drawing). For example, the shape of the two-dimensional drawing is used as one side of the three-dimensional object and extruded such that the cross-section of the three-dimensional object is the same shape throughout (e.g., and the same as the two-dimensional drawing). In some embodiments, the third option causes the two-dimensional drawing to be normalized before the extrusion operation is performed. In some embodiments, the third option does not cause the resulting three-dimensional object to be filled with a solid color (e.g., optionally the borders of the three-dimensional object have the same or similar color to the borders of the two-dimensional drawing). In some embodiments, the third option causes the resulting three-dimensional object to be filled with a solid color (e.g., similar to described above with respect to the second option).

In some embodiments, the one or more selectable options include one or more of a fourth option that is selectable to replace display of the two-dimensional drawing with a second three-dimensional object that corresponds to a representation of a respective three-dimensional object, wherein the two-dimensional drawing corresponds to a two-dimensional drawing of the respective three-dimensional object (830), such as selectable option 714-3 that is selectable to replace two-dimensional drawing 718 with sphere 720 in FIG. 7C (e.g., the two-dimensional drawing is recognized as a drawing of a particular three-dimensional object and the two-dimensional drawing is replaced with a three-dimensional representation of the recognized three-dimensional object. For example, if the two-dimensional drawing is a circle, the circle is recognized as a two-dimensional drawing of a sphere and thus the fourth option replaces the drawing of the circle with a sphere (e.g., a three-dimensional object). In some embodiments, the fourth option does not cause the resulting three-dimensional object to be filled with a solid color (e.g., optionally the borders of the three-dimensional object have the same or similar color to the borders of the two-dimensional drawing). In some embodiments, the fourth option causes the resulting three-dimensional object to be filled with a solid color (e.g., similar to described above with respect to the second option).

In some embodiments, the one or more selectable options include one or more of a fifth option that is selectable to replace display of the two-dimensional drawing with font-based text corresponding to the two-dimensional drawing (832), such as replacing two-dimensional drawing 708 in FIG. 7A with the text "circle" (e.g., the two-dimensional drawing is recognized as handwritten text and the fifth option replaces the handwritten text with font-based text). In some embodiments, if the two-dimensional drawing is not a handwritten text and is a drawing of an object or shape, the fifth option is selectable to replace the drawing with a textual description of the recognized object or shape. For example, if the two-dimensional drawing is of a circle, the fifth option is selectable to replace the two-dimensional drawing with the word "circle".

The above-described manner of generating objects from a two-dimensional drawing (e.g., by presenting one or more selectable options to replace the two-dimensional drawing with different two-dimensional and three-dimensional objects) provides for quick and efficient method of creating and/or displaying processed objects based on the user's two-dimensional sketch (e.g., by identifying objects and/or elements within the two-dimensional drawing and automatically suggesting different objects to transform the two-dimensional drawing into), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, in accordance with a determination that the two-dimensional drawing corresponds to a two-dimensional drawing of a first respective three-dimensional object, the three-dimensional object corresponds to a representation of the first respective three-dimensional object (834), such as two-dimensional drawing 722 corresponding to a drawing of a car and selectable option 714-3 being selected to replace two-dimensional drawing 722 with a car object in FIG. 7D (e.g., if the two-dimensional drawing is recognized as a drawing of a particular three-dimensional object, then provide an option to replace the two-dimensional drawing with a three-dimensional representation of the three-dimensional object). For example, if the drawing is a circle, the circle is identified as potentially a two-dimensional drawing of a sphere, and thus an option is provided for converting the two-dimensional circle into a sphere. In another example, if the drawing is a square, the square is identified as potentially a two-dimensional drawing of a cube, and thus an option is provided for converting the two-dimensional circle into a cube. In some embodiments, the two-dimensional drawing is replaced with a volumetric three-dimensional object. In some embodiments, the two-dimensional drawing is replaced with a three-dimensional point-cloud.

In some embodiments, in accordance with a determination that the two-dimensional drawing corresponds to a two-dimensional drawing of a second respective three-dimensional object, different from the first respective three-dimensional object, the three-dimensional object corresponds to a representation of the second respective three-dimensional object (836), such as two-dimensional drawing 722 corresponding to a drawing of a different car and selectable option 714-3 being selected to replace two-dimensional drawing 722 with a different car object in FIG. 7D (e.g., if the two-dimensional drawing is recognized as a drawing of another three-dimensional object, then provide an option to replace the two-dimensional drawing with a three-dimensional representation of the other three-dimensional object). In some embodiments, the device recognizes the drawing as corresponding to either the first respective three-dimensional object or the second respective three-dimensional object, but not both, and provides an option of replacing the two-dimensional drawing with the object that is recognized in the two-dimensional drawing (e.g., optionally a volumetric object or a point-cloud).

The above-described manner of generating a three-dimensional object from a two-dimensional drawing (e.g., by recognizing a three-dimensional object from within the two-dimensional drawing and presenting an option to replace the two-dimensional drawing with a three-dimensional representation of the recognized three-dimensional object) provides for quick and efficient method of creating and/or displaying three-dimensional objects based on a two-dimensional drawing (e.g., by automatically identifying objects within the two-dimensional drawing, without requiring the user to perform additional inputs to select from options that are not relevant to the two-dimensional drawing), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, in accordance with a determination that the two-dimensional drawing corresponds to a two-dimensional drawing of the first respective three-dimensional object and also corresponds to a two-dimensional drawing of a third respective three-dimensional object, different from the first respective three-dimensional object (838), such as two-dimensional drawing 722 corresponding to a drawing of two different in FIG. 7D (e.g., the device identifies that the two-dimensional drawing corresponds to multiple different three-dimensional objects). For example, if the drawing is a circle, the drawing optionally corresponds to both a sphere and a cylinder. In another example, if the drawing is a triangle, the drawing optionally corresponds to a cone and a pyramid.

In some embodiments, the one or more selectable options include the respective selectable option that is selectable to replace display of the two-dimensional drawing with the representation of the first respective three-dimensional object (840), such as if drawing enhancement menu 712 included a first option associated with the first car in FIG. 7D (e.g., the device provides a first selectable option that is selectable to replace the two-dimensional drawing with the first identified three-dimensional object.

In some embodiments, the one or more selectable options include a second respective selectable option that is selectable to replace display of the two-dimensional drawing with a representation of the third respective three-dimensional object (842), such as if drawing enhancement menu 712 included a second option associated with the second car in FIG. 7D (e.g., the device provides a second selectable option that is selectable to replace the two-dimensional drawing with the second identified three-dimensional object). For example, if the drawing is a circle, the devices provides a first option for replacing the circle with a cylinder and a second option for replacing the circle with a sphere. If the drawing is a triangle, the device provides a first option for replacing the triangle with a cone and a second option for replacing the triangle with a pyramid.

The above-described manner of generating a three-dimensional object from a two-dimensional drawing (e.g., by recognizing multiple three-dimensional objects from within the two-dimensional drawing and presenting multiple options to replace the two-dimensional drawing with the recognized three-dimensional objects) provides for quick and efficient method of creating and/or displaying three-dimensional objects based on a two-dimensional drawing (e.g., by automatically identifying different potential three-dimensional objects, without requiring the user to perform additional inputs to select from different types of three-dimensional objects), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the user input corresponding to the two-dimensional drawing is received using a pointing device in communication with the electronic device (844), such as the stylus that is held by hand 716 in FIG. 7A (e.g., the user input is received via a pointing device such as a stylus). In some embodiments, the user input includes using a pointing device to point at a location in the three-dimensional environment associated with the respective selectable option. In some embodiments, the user input includes detecting an interaction with the pointing device, such as a tap detected at a location on the stylus.

In some embodiments, detecting selection of the respective selectable option of the one or more selectable options includes determining, via an eye tracking device in communication with the electronic device, that a gaze of a user of the electronic device is directed to the respective selectable option when a selection input is received at the pointing device (846), such as gaze 710-2 being directed to selectable option 714-1 in FIG. 7A (e.g., the selectable option that the user input is directed at is based on the selectable option that the user's gaze is directed at when the user input (e.g., a tap on the stylus) is received). For example, the device can track the focus of the user's eyes and determine that the user is looking at the respective selectable option when the user performs a selection input such as a tap on the stylus.

The above-described manner of selecting a selectable option (e.g., by determining that the user's gaze is directed at a respective selectable option when a selection input is received at a pointing device) provides for quick and efficient method of replacing a two-dimensional drawing with a three-dimensional object (e.g., by receiving a user input on the same input device as the input device used to draw the two-dimensional object and using the user's gaze to determine which selectable option to select), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the user input corresponding to the two-dimensional drawing is received using a pointing device in communication with the electronic device (848), such as the stylus that is held by hand 716 in FIG. 7A (e.g., the user input is received via a pointing device such as a stylus). In some embodiments, the user input includes detecting an interaction with the pointing device, such as a tap detected at a location on the stylus.

In some embodiments, detecting selection of the respective selectable option of the one or more selectable options includes determining that the pointing device is directed to the respective selectable option when a selection input is received at the pointing device (850), such as detecting that the stylus held by hand 716 is pointed at a location associated with a selectable option on drawing enhancement menu 712 in FIG. 7A (e.g., the selectable option that the user input is directed at is based on the orientation of the pointing device). For example, if the pointing device is pointed at a location in the three-dimensional environment associated with a respective selectable option when the user input is received, then the respective selectable option is selected. For example, the device can track the orientation of the stylus and determine that the stylus is pointed at the respective selectable option when the user performs a selection input such as a tap on the stylus. In some embodiments, the orientation of the stylus is determined via one or more sensors in the stylus itself. In some embodiments, the orientation of the stylus is determined via one or more cameras or sensors of the device.

The above-described manner of selecting a selectable option (e.g., by determining that the user's gaze is directed at a respective selectable option when a selection input is received at a pointing device) provides for quick and efficient method of replacing a two-dimensional drawing with a three-dimensional object (e.g., by receiving a user input on the same input device as the input device used to draw the two-dimensional object and using the user's gaze to determine which selectable option to select), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, in response to receiving the selection input at the pointing device, the electronic device causes (852) a tactile output to be generated at the pointing device, such as generating a tactile output on the stylus being held by hand 716 in response to detecting the selection gesture (e.g., "Gesture A") in FIG. 7A (e.g., generating a tactile feedback indicating that a selection has been performed). In some embodiments, the device communicates to the pointing device that a selection of a valid selectable option has occurred and in response, the pointing device generates a tactile output. In some embodiments, the device transmits a command to the pointing device to generate a tactile output. In some embodiments, the tactile output is a vibration, a click, a tap, etc. In some embodiments, the tactile output is generated at the location on the pointing device that received the selection input (e.g., the location of the tap).

The above-described manner of selecting a selectable option (e.g., by producing a tactile output at the pointing device in response to receiving a selection input) provides for quick and efficient method of providing feedback that a selection has occurred (e.g., by providing tactile feedback on the device that received the input, without requiring the user to visually confirm that a selection has been performed), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, a color of the three-dimensional object is based on a color of the two-dimensional drawing (854), such as cylinder 718 in FIG. 7B having the same color as at least a portion of two-dimensional drawing 708, such as the border of two-dimensional drawing 708 (e.g., the color of the three-dimensional object that replaced the two-dimensional drawing is based on the color of the two-dimensional drawing). In some embodiments, the color of the three-dimensional object is the same as the color of the two-dimensional drawing. In some embodiments, the color of a portion of the three-dimensional object is the same as the color of the two-dimensional drawing. In some embodiments, the color of the two-dimensional drawing is used to identify the three-dimensional object to suggest to the user and the color of the three-dimensional object is similar to the color of the two-dimensional drawing. For example, if the two-dimensional drawing is of a blue car, the three-dimensional object is a midnight blue car or a sky blue car, etc.

The above-described manner of generating a three-dimensional object from a two-dimensional drawing (e.g., by generating a three-dimensional object that has a color that is based on the color of the two-dimensional drawing) provides for quick and efficient creation and/or display of three-dimensional objects (e.g., without requiring the user to perform additional inputs to edit the color of the three-dimensional object after replacing the two-dimensional drawing with the three-dimensional object), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the three-dimensional object is parametrically generated based on the two-dimensional drawing (856), such as cylinder 718 in FIG. 7B and sphere 720 in FIG. 7C being parametrically generated from two-dimensional drawing 708 (e.g., the shape of the three-dimensional object is generated using a parametric model). In some embodiments, the parameters of the parametric model are based on the parameters of the two-dimensional drawing. For example, the size, shape, color, etc. of the two-dimensional drawing are used by the parametric model to generate one or more three-dimensional objects that best represent the object illustrated by the two-dimensional drawing. For example, if the two-dimensional drawing is a drawing of a car, then the device parametrically generates a three-dimensional car based on the two-dimensional drawing. In some embodiments, the three-dimensional object is generated by the device. In some embodiments, the three-dimensional object is generated by a separate device, such as a server, and provided to the device.

The above-described manner of generating a three-dimensional object from a two-dimensional drawing (e.g., by parametrically generating a three-dimensional object based on the two-dimensional drawing) provides for quick and efficient creation and/or display of three-dimensional objects (e.g., by generating a three-dimensional object that is an accurate reflection of the two-dimensional drawing, without requiring the user to perform additional inputs to edit the resulting three-dimensional object after replacing the two-dimensional drawing with the three-dimensional object), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the three-dimensional object is selected, based on the two-dimensional drawing, from a predetermined library of three-dimensional objects (858), such as selecting the car model for selectable option 714-3 in FIG. 7D from a library of available objects (e.g., the selectable options provided to the user are selected from a library and/or database of available three-dimensional objects). In some embodiments, the library and/or database includes the models of three-dimensional objects that are available. In some embodiments, the library and/or database is organized into different types of objects and the device is able to filter the database based on the type of object that the two-dimensional drawing is recognized as. In some embodiments, the device determines one or more objects in the library that most closely correlate to the two-dimensional drawing and presents the user with options to replace the two-dimensional drawing with the determined objects.

The above-described manner of generating a three-dimensional object from a two-dimensional drawing (e.g., by selecting the three-dimensional object from a predetermined library) provides for quick and efficient creation and/or display of three-dimensional objects (e.g., by generating the three-dimensional object once when populating the library, without requiring the device or another device to generate a three-dimensional object on-demand when a three-dimensional object is needed), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the three-dimensional object includes a first side and a second side, opposite of the first side, that have shapes corresponding to the two-dimensional drawing (860), such as cylinder 718 in FIG. 7B (e.g., the three-dimensional object is an extrusion of the two-dimensional drawing such that the three-dimensional drawing includes a first side and a second side, opposite of the first side, that have shapes that are the same as or based on the shape of the two-dimensional drawing). In some embodiments, the cross-section of the three-dimensional object is the same throughout the three-dimensional object (e.g., and has the same shape as the first and second sides of the three-dimensional object).

In some embodiments, a path of a border of the first side and the second side corresponds to one or more properties of the two-dimensional drawing (862), such as the radius of cylinder 718 having the same or similar radius as two-dimensional drawing 708 in FIG. 7B (e.g., the size and/or shape of the sides of the object are based on the size and/or shape of the sides two-dimensional drawing). For example, if the two-dimensional drawing is a circle (e.g., a hand-drawn circle), then the first and second side of the three-dimensional objects are circles that have a radius based on the radius of the hand-drawn circle (e.g., equal to the average radius of the hand-drawn circle, equal to the maximum radius of the hand-drawn circle, equal to the minimum radius of the hand-drawn circle, etc.).

In some embodiments, the path of the border of the first side and the second side is different from a path of a border of the two-dimensional drawing (864), such as the ends of cylinder 718 being a normalized circle (e.g., smoothed) based on two-dimensional drawing 708 in FIG. 7B (e.g., the two-dimensional drawing is normalized before performing the extrusion operation). Thus, the shapes of the sides of the three-dimensional drawing have clean shapes (e.g., perfect circle, perfect square (e.g., straight lines and 90-degree angles), etc.). In some embodiments, the three-dimensional object is generated by first performing the extrusion operation before normalizing the resulting three-dimensional object.

The above-described manner of generating a three-dimensional object from a two-dimensional drawing (e.g., by normalizing the two-dimensional drawing and extruding the normalized shape to generate the three-dimensional object) provides for quick and efficient creation and/or display of three-dimensional objects (e.g., by automatically normalizing the drawing and performing the extrusion operation, without requiring the user to perform additional inputs to first normalize the drawing, then perform the extrusion operation), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, displaying the one or more selectable options is performed in response to determining, via an eye tracking device in communication with the electronic device, that a gaze of a user of the electronic device is directed to the representation of the two-dimensional drawing (866), such as gaze 710-1 that is directed to two-dimensional drawing 708 in FIG. 7A (e.g., after the two-dimensional drawing has been drawn, determining that the gaze of the user is directed to the two-dimensional drawing, and in response, displaying a menu user interface that includes one or more selectable options for replacing the two-dimensional drawing with a three-dimensional object).

In some embodiments, the menu is displayed after the gaze of the user has been on the two-dimensional drawing for longer than a threshold amount of time (e.g., 0.2 seconds, 0.5 seconds, 1 second, 3 seconds, 5 seconds, etc.). In some embodiments the menu is displayed in response to receiving a user input (e.g., a gesture by the hand of the user, an interaction with a pointing device, a selection of a selectable option, etc.) when the gaze of the user is directed to the two-dimensional drawing. In some embodiments, if the gaze of the user is not directed at the two-dimensional drawing after the drawing has been drawn (e.g., within 5 seconds, 10 seconds, 30 seconds 1 minute of completing the drawing) or for longer than the threshold amount of time, the menu is not displayed.

The above-described manner of displaying selectable options (e.g., in response to detecting that the gaze of the user is directed to the two-dimensional drawing) provides for quick and efficient method of providing the user with options for replacing the two-dimensional drawing with a three-dimensional object (e.g., without requiring the user to perform additional inputs and navigate through multiple user interfaces to cause display of the available options), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

Figure 9A:
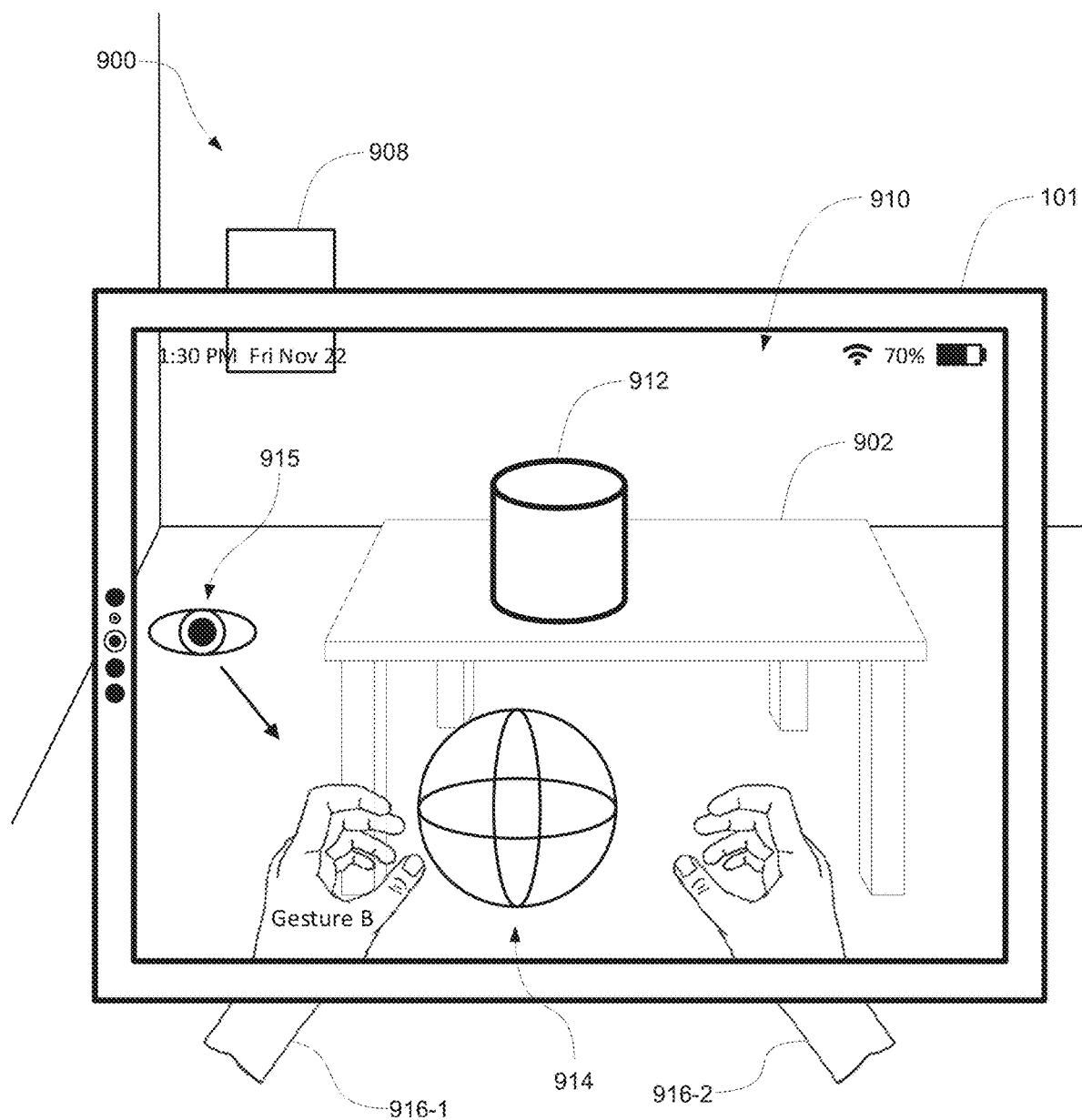
FIGS. 9A-9C illustrate examples of manipulating an object in a three-dimensional environment in accordance with some embodiments.
Figure 9B:
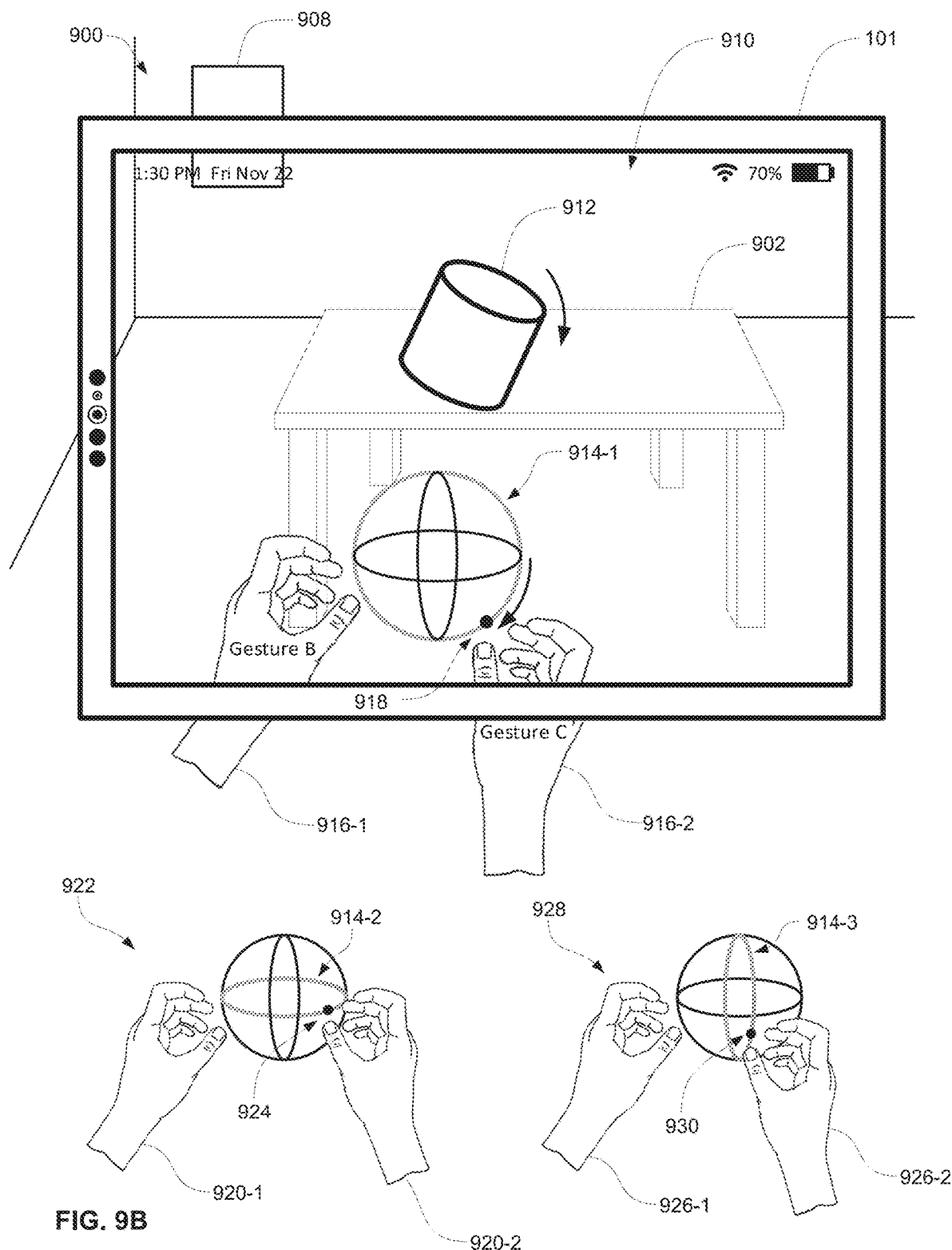
Figure 9C:
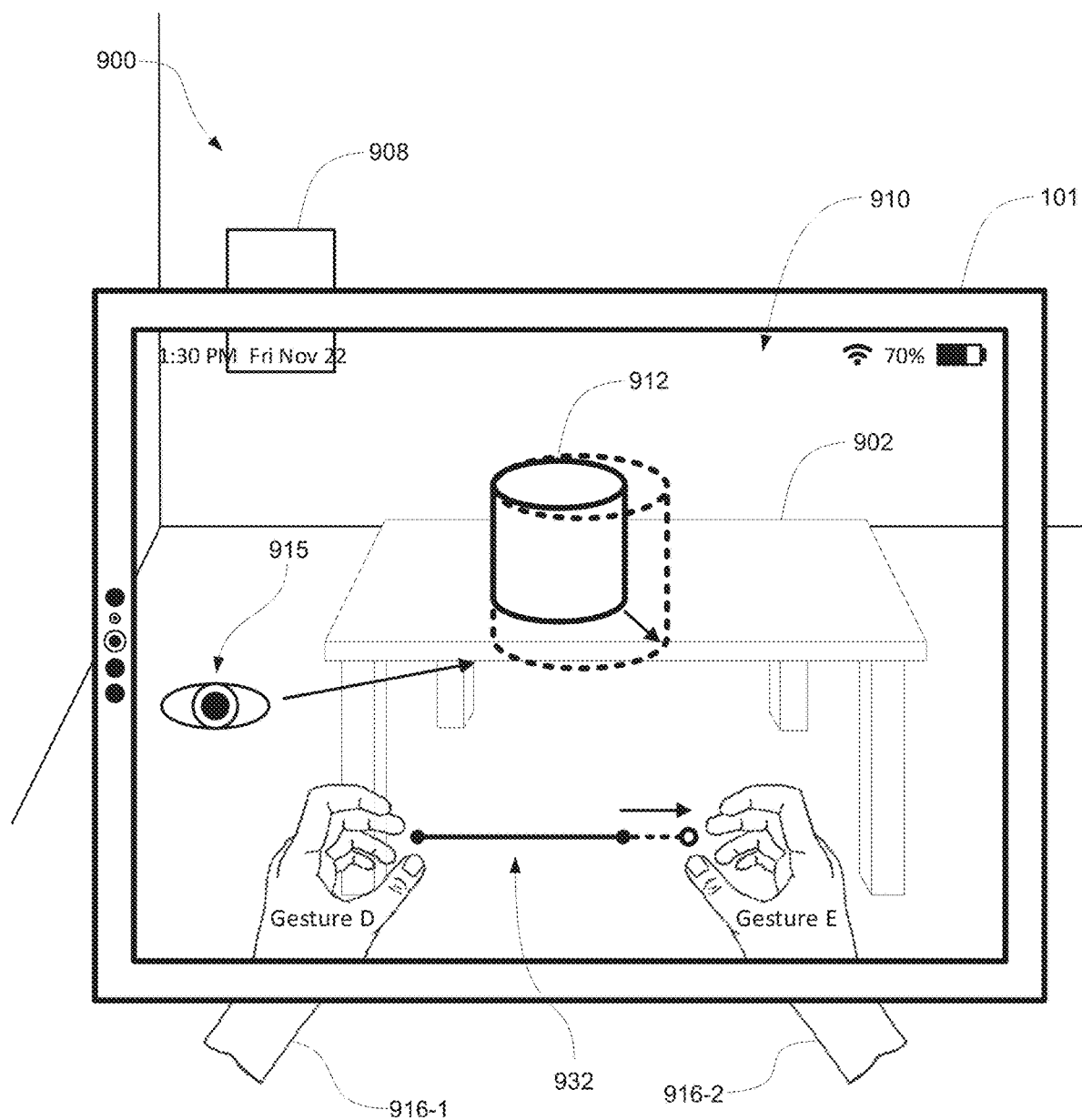

FIGS. 9A-9C illustrate examples of manipulating an object in a three-dimensional environment in accordance with some embodiments.

FIG. 9A illustrates an electronic device 101 displaying, via a display generation component (e.g., display generation component 120 of FIG. 1), a three-dimensional environment 910 on a user interface. As described above with reference to FIGS. 1-6, the electronic device 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the electronic device 101 would be able to use to capture one or more images of a user or a part of the user while the user interacts with the electronic device 101. In some embodiments, the user interfaces shown below could also be implemented on a head-mounted display that includes a display generation component that displays the user interface to the user and sensors to detect the physical environment and/or movements of the user's hands (e.g., external sensors facing outwards from the user), and/or gaze of the user (e.g., internal sensors facing inwards towards the face of the user).

As shown in FIG. 9A, device 101 captures one or more images of the real world environment 900 around device 101 (e.g., operating environment 100), including one or more objects in the real world environment 900 around device 101. In some embodiments, device 101 displays representations of the real world environment in three-dimensional environment 910. For example, three-dimensional environment 900 includes a back corner of a room, a representation of at least a portion of picture frame 908 on the back wall of the room, and a representation of table 902. Similarly, in FIG. 9A, three-dimensional environment 910 includes a representation of a first hand 916-1, and a representation of a second hand 916-2. As described above with respect to FIG. 6B, representation of the first hand 916-1 and the second hand 916-2 are representations of the hands of the user of the device that are held behind device 101 (e.g., on the opposite side of device 101 from the user) and are captured by the one or more sensors of the device (e.g., optionally by the sensors that are on the opposite side of device 101 as the user). In some embodiments, the hands of the user of the device are held in front of the device (e.g., on the same side of device 101 as the user) and are captured by the one or more sensors of device 101 (e.g., optionally by the sensors that are on the same side of device 101 as the user).

In FIG. 9A, three-dimensional environment 910 includes cylinder 912 on top of representation of table 902. As described above, table 902 is an object in real world environment 900 of which device 101 is able to capture an image using the one or more sensors of device 101 and display a representation of table 902 (e.g., a photorealistic representation, a simplified representation, a cartoon, a caricature, etc.) in three-dimensional environment 910 (e.g., a "pass-through" display of table 902 in which the look-and-feel of table 902 is captured and presented to the user, optionally without modification). In some embodiments, the display generation component of device 101 includes a transparent or translucent display, on which a three-dimensional environment 900 is presented, and through which the user is able to see real world environment 900. In some embodiments, the display generation component allows the user to see objects in real world environment 900, for example, by not actively obscuring the view of objects in real world environment 900. In some embodiments, device 101 allows or obstructs the view of portions of real world environment 900 to control what parts of real world environment 900 or what objects from real world environment 900 exist in three-dimensional environment 910.

In some embodiments, cylinder 912 is a three-dimensional virtual object. For example, cylinder 912 is not a physical object in real world environment 900. Instead, cylinder 912 is an object that exists in the virtual environment of three-dimensional environment 910. As shown in FIG. 9A, cylinder 912 is located on the top surface of the representation of table 902. Thus, a virtual object is able to interact with representations of real world objects. In some embodiments, because cylinder 912 is a virtual object, a user is able to manipulate cylinder 912 (e.g., without literally manipulating objects in real world environment 900), such as to perform rotation, movement, and/or resizing operations, as will be described in further detail below.

In FIG. 9A, device 101 detects that the first hand 916-1 of the user has performed a particular gesture (e.g., "Gesture B"). In some embodiments, Gesture B includes a pinch gesture by two or more fingers of first hand 916-1 (e.g., by a thumb and forefinger). In some embodiments, Gesture B is interpreted as a request to manipulate cylinder 912. In some embodiments, in response to detecting that first hand 916-1 performed Gesture B, device 101 displays manipulation globe 914. In some embodiments, manipulation globe 914 is a manipulation indication that optionally indicates the types of manipulation that are available to be performed, the magnitude of the manipulation being performed, and/or the how to perform manipulation operations. For example, manipulation globe 914 includes one or more components and/or elements, each of which corresponds to a different type of manipulation. As shown in FIG. 9A, manipulation globe 914 includes three circles that extend along three different directions, which correspond to three different rotation orientations (e.g., pitch, roll, yaw rotations).

In some embodiments, manipulation globe 914 is displayed only if second hand 916-2 is within a threshold distance (e.g., 1 inch, 3 inches, 6 inches, 1 foot, 3 feet, etc.) of first hand 916-1 when first hand 916-1 performed Gesture B. In some embodiments, if second hand 916-2 is within the threshold distance from first hand 916-1 when first hand 916-1 performed Gesture B, the user input (e.g., the sequence of gestures performed by the one or more hands of the user, optionally including the position of the hands) is interpreted as a request to perform a rotation manipulation. As will be described in further detail below with respect to FIG. 9C, if second hand 916-2 is not within the threshold distance from first hand 916-1 when first hand 916-1 performed Gesture B, then the user input is not interpreted as a request to perform a rotation manipulation (optionally the input is interpreted as a request to perform a resizing manipulation), and device 101 does not display manipulation globe 914.

As discussed above, manipulation globe 914 optionally includes three circular elements (e.g., which will be referred to below as circular elements 914-1 to 914-3 of manipulation globe 914) that correspond to three orientations of rotations (e.g., pitch, roll, and yaw). In some embodiments, virtual objects are rotated in one of the three orientations based on which circular element the user is interacting with. For example, if the user interacts with the circular element corresponding to the pitch rotation, the respective virtual object is rotated in the pitch orientation, if the user interacts with the circular element corresponding to the pitch rotation, the respective virtual object is rotated in the yaw orientation, etc. In some embodiments, a selection indicator is displayed on manipulation globe 914 to indicate which circular element the user will select in response to a selection input by second hand 916-2. For example, device 101 displays a dot at a particular position on the circular element corresponding to the pitch rotation to indicate that if second hand 916-2 performs a selection input (e.g., a pinch gesture), then the pitch rotation is selected and the user is able to cause the virtual object to rotate in the pitch orientation (e.g., by moving second hand 916-2 in a circular arc in a manner indicated by the selected circular element, optionally while maintaining the selection input).

In some embodiments, the circular element that will be selected (e.g., and thus, the circular element that includes the selection indicator) is based on the proximity of second hand 916-2 from the circular elements. For example, when second hand 916-2 approaches to within a second threshold distance from any circular element of manipulation globe 914 (e.g., within 1 inch, 3 inches, 6 inches, 1 foot, etc.), the circular element that is the closest to second hand 916-2 is determined to be the circular element that will selected in response to a selection input by second hand 916-2. Thus, the user need not move second hand 916-2 to the location of a particular circular element to select the circular element, but optionally can move to within the second threshold distance from the desired circular element.

In some embodiments, device 101 determines the proximity of second hand 916-2 from the circular elements based on the distance from second hand 916-2 to the location in real world environment 702 associated with the circular elements. For example, the circular elements of manipulation globe 914 are displayed at a particular location in three-dimensional environment 910 that corresponds to a particular location in real world environment 702. Thus, as second hand 916-2 approaches the particular location in real world environment 702, second hand 916-2 appears in three-dimensional environment 910 to approach manipulation globe 914. In some embodiments, the distance between second hand 916-2 and the respective locations of the circular elements of manipulation globe 914 in real world environment 702 is used to determine the proximity of second hand 916-2 to the circular elements of manipulation globe 914 in three-dimensional environment 910.

In some embodiments, the selection indicator is displayed at the location on manipulation globe 914 that is closest to second hand 916-2. In some embodiments, the selection indicator moves along the circular elements of manipulation globe 914 if second hand 916-2 moves around, causing different portions of manipulation globe 914 to be closest to second hand 916-2. For example, if second hand 916-2 moves upwards, then the selection indicator optionally moves upwards along one of the circular elements of manipulation globe 914 in accordance with the upward movement of second hand 916-2.

In some embodiments, if second hand 916-2 is not within the second threshold distance from manipulation globe 914 (e.g., but optionally still within the first threshold distance from first hand 916-1), then selection indicator is not displayed on manipulation globe 914. In some embodiments, a selection indicator is displayed at a location at or near second hand 916-2 corresponding to a location of a pinch if second hand 916-2 were to perform a pinch gesture. For example, the selection indicator is displayed at a location between the thumb and forefinger of second hand 916-2 (e.g., the location that the user would pinch at if the user were to perform a pinch). In some embodiments, while selection indicator is displayed at or near second hand 916-2, then in response to performing a selection input (e.g., pinch gesture), device 101 inserts content into three-dimensional environment 910 at the location of the selection indicator. For example, pinching with second hand 916-2 while selection indicator is displayed at or near second hand 916-2 (optionally while moving second hand 916-2 while maintaining the pinch gesture) causes content to be "drawn" into three-dimensional environment 910 in accordance with the movement of second hand 916-2 (e.g., as opposed to pinching with second hand 916-2 while selection indicator is displayed on manipulation globe 914, which optionally causes selection of one of the circular elements of manipulation globe 914). In some embodiments, when second hand 916-2 crosses the second threshold distance from manipulation globe 914, the selection indicator is moved from the location associated with second hand 916-2 to a location on manipulation globe 914, or vice versa, as the case may be. In some embodiments, moving the selection indicator includes displaying an animation of the selection indicator flying from one location to the other. In some embodiments, in response to detecting that second hand 916-2 is performing a selection input (e.g., performing a pinching gesture, causing an operation to be performed on a virtual object, etc.), then the selection indicator ceases to be displayed at or near second hand 916-2 (e.g., optionally displayed on a respective circular element of manipulation globe 914).

Thus, as described above, in response to detecting first hand 916-1 performing Gesture B, device 101 displays manipulation globe 914. In some embodiments, if gaze 915 is directed to any of first hand 916-1 or second hand 916-2 when first hand 916-1 performed Gesture B, then manipulation globe 914 is displayed at or near first hand 916-1. As shown in FIG. 9A, manipulation globe 914 is displayed near (e.g., to the right of) the fingers of first hand 916-1. In some embodiments, Gesture B is a pinch gesture and manipulation globe 914 is displayed at or near the location of the pinch by first hand 916-1. In some embodiments, while first hand 916-1 continues to perform Gesture B (e.g., while maintaining the pinch gesture), manipulation globe 914 moves in accordance with the movement of first hand 916-1. For example, if the user moves first hand 916-1 leftwards, manipulation globe 914 moves leftwards in accordance with the move of first hand 916-1 (e.g., as if manipulation globe 914 is attached to first hand 916-1 and/or as if first hand 916-1 is holding and/or pinching manipulation globe 914).

In some embodiments, if gaze 915 is directed to cylinder 912 when first hand 916-1 performed Gesture B, then manipulation globe 914 is displayed at or near cylinder 912. For example, manipulation globe 914 is displayed around cylinder 912 such that the center of manipulation globe 914 is the center of cylinder 912. In some embodiments, the size of manipulation globe 914 depends on the size of cylinder 912. For example, manipulation globe 914 has a diameter that is at least larger than the longest dimension of cylinder 912, such that the circular elements of manipulation globe 914 do not intersection or conflict with cylinder 912. In some embodiments, the size of manipulation globe 914 depends on the location of cylinder 912. For example, when cylinder 912 is within a threshold distance from the user (e.g., within 3 feet, 5 feet, 10 feet, 20 feet, etc.), the size of manipulation globe 914 scales with the size of cylinder 912. For example, if cylinder 912 has a first size when 5 feet away from the user, and manipulation globe 914 is a second size, then if cylinder 912 is moved to be 10 feet away, the size of cylinder 912 is halved (e.g., due to being twice as far away from the user) while the size of manipulation globe 914 is also halved. Thus, manipulation globe 914 changes size proportionally with the change in the size of cylinder 912.

In some embodiments, if cylinder 912 is farther than the threshold distance from the user, then manipulation globe 914 does not scale proportionally with the change in size of cylinder 912. For example, if cylinder 912 is 10 feet away from the user and has a first size while manipulation globe 914 has a second size, then if cylinder 912 moved to be 20 feet away, the size of cylinder 912 is halved (e.g., due to being twice as far away from the user) while the size of manipulation globe 914 decreases by 25%. Thus, manipulation globe 914 only reduced in size by half as much as cylinder 912 reduced in size. Thus, in some embodiments, beyond the threshold distance, manipulation globe 914 reduces in size by a dampened amount of the reduction in size of cylinder 912. In some embodiments, manipulation globe 914 reaches a minimum size at the threshold distance and does not reduce in size in response to cylinder 912 reducing in size. Thus, in some embodiments, at some threshold distance, manipulation globe 914 does not reduce in size as much as the reduction in size of cylinder 912 in order to maintain the visibility of manipulation globe 914. In this way, manipulation globe 914 maintains visibility by optionally preventing manipulation globe 914 from becoming so small that a user is not able to see or interact with manipulation globe 914. In some embodiments, instead of a threshold distance being the trigger for when manipulation globe 914 scales proportionally to when manipulation globe 914 does not scale proportionally, the size of manipulation globe 914 is used to determine when to switch from the proportionate scaling mode to the disproportionate scaling mode. For example, when the radius of manipulation globe 914 reduces to 1 foot, then manipulation globe 914 enters into disproportionate scaling mode in which the size of manipulation globe 914 reduces by less than the reduction of cylinder 912 (optionally no reduction at all).

FIG. 9B illustrates second hand 916-2 performing a selection gesture (e.g., "Gesture C"). In some embodiments, the selection gesture includes a pinch by second hand 916-2 while within the second threshold distance from a respective circular element of manipulation globe 914. As shown in FIG. 9B, second hand 916-2 is closest to circular element 914-1 of manipulation globe 914 corresponding to a roll rotation orientation. Thus, in response to the selection gesture, circular element 914-1 of manipulation globe 914 is selected. In some embodiments, when circular element 914-1 is selected (e.g., while second hand 916-2 is maintaining the selection gesture), circular element 914-1 is visually distinguished from the other circular elements of manipulation globe 914. For example, circular element 914-1 is highlighted or displayed with a different color in response to the selection. In some embodiments, circular element 914-1 increases or decreases in size in response to the selection. In some embodiments, a selection indicator 918 (e.g., similar to the selection indicator described above) on circular element 914-1 (e.g., if displayed) changes visual characteristics when second hand 916-2 is maintaining the selection gesture, indicating that circular element 914-1 has been selected (e.g., as opposed to indicator that circular element 914-1 will be selected in response to a user input). For example, circular element 914-1 changes colors and/or size in response to the selection input.

In some embodiments, circular element 914-1 extends in the direction that cylinder 912 will be rotated. For example, circular element 914-1 is a circle in the x-y axes, with a constant z position. Thus, rotating cylinder 912 using circular 914-1 causes cylinder 912 to rotate along the x-y axes while maintaining a constant z position (e.g., a "roll" rotation). FIG. 9B illustrates second hand 916-2 moving in a circular manner around manipulation globe 914 (e.g., while maintaining Gesture C). In some embodiments, moving second hand 916-2 in a circular manner around manipulation globe 914 causes selection indicator 918 to move in a circular along circular element 914-1 in accordance with the movement of second hand 916-2. In some embodiments, selection indicator 918 follows along circular element 914-1 at the location closest to second hand 916-2. Thus, in some embodiments, the amount of roll rotation performed on cylinder 912 is equal to the angle of the movement of selection indicator 918 along circular element 914-1. For example, if selection indicator 918 moved clockwise along circular element 914-1 by 30 degrees, then cylinder 912 is rotated clockwise by 30 degrees. Similarly, if second hand 916-2 moved in a counter-clockwise manner around circular element 914-1, then selection 918 moved counter-clockwise along circular element 914-1 and cylinder 912 is rotated counter-clockwise accordingly. In some embodiments, the speed of the rotation is based on the speed of the movement of the hand. For example, if second hand 916-2 moves in a circular manner around circular element 914-1 at a speed of 20 degrees per second, then cylinder 912 is rotated in the respective direction at 20 degrees per second.

In some embodiments, the amount of manipulation (e.g., amount of rotation) is based on the movement of second hand 916-2 around a predetermined reference location. In some embodiments, the predetermined reference location is the center of manipulation globe 914, thus a rotation around the center of manipulation globe by a certain angular amount causes that much of angular rotation to the virtual object being manipulated. In some embodiments, the predetermined reference location is the pinch location of first hand 916-1 and thus a rotation of second hand 916-2 around the pinch location of first hand 916-1 by a certain angular amount causes that much of angular rotation to the virtual object being manipulated. In some embodiments, the predetermined reference location is associated with a particular element (e.g., as opposed to an absolute position in the three-dimensional environment), and thus movement of the element causes the predetermined reference location to also move (e.g., and optionally cause manipulation to the first object being manipulated). For example, if the predetermined reference location is the pinch location of first hand 916-1, then if first hand 916-1 rotates around second hand 916-2, second hand 916-2 has effectively rotated around the predetermined reference location, thus causing the virtual object to be rotated by an amount equal to the change in position of second hand 916-2 with respect to the pinch location of first hand 916-1.

In some embodiments, while second hand 916-2 is maintaining the selection gesture (e.g., Gesture C), circular element 914-1 remains selected, regardless of whether second hand 916-2 moves to being farther from the second threshold distance from manipulation globe 914, farther from the first threshold distance from first hand 916-1, or closer to another circular element of manipulation globe 916 (e.g., selection of circular element 914-1 stays locked and does not jump to another circular element as long as second hand 916-2 maintains the selection gesture). In some embodiments, while second hand 916-2 is selecting a respective circular element, if second hand 916-2 moved in a manner that is not around the respective circular element, cylinder 912 does not rotate. For example, if while selecting circular element 914-1 corresponding to the roll rotation, second hand 916-2 moves around manipulation globe 914 in a "yaw" orientation (e.g., toward or away from the user while moving left or right), then because the movement of second hand 916-2 does not include a movement in the "roll" orientation, cylinder 912 does not rotate in either the yaw or roll orientations. Thus, the type of rotation of cylinder 912 is "locked" into the selected rotation orientation and will not rotate in other directions, even if second hand 916-2 moves in those directions. In some embodiments, if the movement of second hand 916-2 includes a component that moves in the corresponding direction, then cylinder 912 is rotated based on the component that moves in the appropriate direction. For example, if second hand 916-2 moved in a manner that rotates around manipulation globe 914 in both the yaw and roll directions, then only the roll component is isolated and the yaw component is discarded, and cylinder 912 is rotated according to the roll component of the movement of the second hand 916-2. In some embodiments, if second hand 916-2 moves maintaining the selection gesture, then cylinder 912 optionally moves in accordance with the movement of second hand 916-2 (e.g., in the same direction as the movement of second hand 916-2, optionally by an amount as described below with reference to method 1400). In some embodiments, cylinder 912 moves in accordance with the movement of second hand 916-2 only if second hand 916-2 is performing a direct manipulation on cylinder 912 (e.g., second hand 916-2 intersected with cylinder 912 or was within a threshold distance from cylinder 912, such as 1 inch, 3 inches, 6 inches, 1 foot, etc.) when the selection input was received.

FIG. 9B also illustrates embodiments 922 and 928 for interacting with the yaw and pitch rotation orientations of manipulation globe 914. For example, in embodiment 922, second hand 920-2 is closest to circular element 914-2 corresponding to the yaw rotation orientation. Thus, selection indicator 924 is displayed on circular element 914-2 and follows along circular element 914-2 according to the movement of second hand 920-2 around circular element 914-2. In embodiment 922, circular element 914-2 is visually distinguished in response to detecting the selection input by second hand 920-2 and in response to a movement of second hand 920-2 around circular element 914-2, cylinder 912 is rotated in the yaw orientation according to the movement of second hand 920-2 (e.g., in a respective direction, by a respective amount, and at a respective speed that is optionally based on the direction, amount, and/or speed of the movement of second hand 920-2).

In embodiment 928, second hand 926-2 is closest to circular element 914-3 corresponding to the pitch rotation orientation. Thus, selection indicator 930 is displayed on circular element 914-2 and follows along circular element 914-3 according to the movement of second hand 926-2 around circular element 914-3. In embodiment 928, circular element 914-3 is visually distinguished in response to detecting the selection input by second hand 926-2 and in response to a movement of second hand 926-2 around circular element 914-3, cylinder 912 is rotated in the pitch orientation according to the movement of second hand 926-2 (e.g., in a respective direction, by a respective amount, and at a respective speed that is optionally based on the direction, amount, and/or speed of the movement of second hand 926-2).

FIG. 9C illustrates an embodiment of performing a resizing manipulation operation. In FIG. 9C, first hand 916-1 is performing a selection gesture (e.g., "Gesture D") while the second hand 916-2 is performing a selection gesture (e.g., "Gesture E") while more than a threshold distance away from first hand 916-1 (e.g., 1 inch, 3 inches, 6 inches, 1 foot, 3 feet, etc.). In some embodiments, because second hand 916-2 was more than the threshold distance away from first hand 916-1 when first hand 916-1 performed the selection gesture, a manipulation globe is not displayed (optionally if second hand 916-2 moved to within the threshold distance while first hand 916-1 is performing the selection gesture, then the manipulation globe is displayed).

In some embodiments, in response to detecting a selection gesture by second hand 916-2 (optionally while gaze 915 is directed to cylinder 912), a resizing operation is selected and resizing indicator 932 is displayed, as shown in FIG. 9C. In some embodiments, resizing indicator 932 is a line displayed between first hand 916-1 and second hand 916-2 (e.g., displayed between the location in three-dimensional environment 910 associated with the pinch of first hand 916-1 and the location in three-dimensional environment 910 associated with the pinch of second hand 916-2). In some embodiments, resizing indicator 932 is a line displayed from the pinch location of first hand 916-1 to the pinch location of second hand 916-2. As shown in FIG. 9C, while maintaining the selection input, second hand 916-2 moves rightwards such that the distance between first hand 916-1 and second hand 916-2 changes. In some embodiments, in response to detecting that the distance between first hand 916-1 and second hand 916-2 has changed, resizing indicator 932 expands and/or contracts according to the change in distance, and cylinder 912 is resized according to the change in distance. For example, in FIG. 9C, the distance between second hand 916-2 and first hand 916-2 increased and in response, the size of cylinder 912 is increased accordingly. In some embodiments, the amount that cylinder 912 is resized is based on the amount of change in the distance between the first hand 916-1 and second hand 916-2. For example, if the distance between the hands increased by 30%, then cylinder 912 is increased in size by 30%, but if the distance between the hands decreased by 50%, then cylinder 912 is reduced in size by 50%. Thus, the amount that cylinder 912 is resized is optionally based on the initial distance between first hand 916-1 and second hand 916-2 and the amount that the distance changes. In some embodiments, the speed of the resizing is based on the speed of the movement of the hand. For example, if second hand 916-2 moves away from first hand 916-1 at a speed of 10% per second, then the size of cylinder 912 increases by 10% per second.

In some embodiments, device 101 and/or an input device held by one or more hands of the user (e.g., first hand 916-1 and/or second hand 916-2) generates a tactile output when manipulation of an object reaches a predetermined increment. For example, in the rotational embodiments illustrated in FIGS. 9A-9B, when the rotation of cylinder 912 reaches a predetermined increment (e.g., a rotation of 30 degrees, 45 degrees, 60 degrees, and/or 90 degrees, etc. from the original orientation), device 101 generates a tactile output to indicate that the manipulation has reached a predetermined increment. In some embodiments, the predetermined increments include a "snapping" functionality in which the manipulation will snap to the increment when the manipulation approaches to within a threshold distance of the snap point. For example, one or more snap points are distributed throughout the manipulation at points of interest (e.g., at the original orientation, every 30 degrees, 45 degrees, 60 degrees and/or 90 degrees) such that when a rotation approaches within a threshold distance from the snap point (e.g., 2 degrees, 5 degrees, 10 degrees, etc.), the rotation will snap to the snap point and optionally generate a tactile output. Similarly, while performing a resizing operation, snap points are optionally located at the original size and at regular increments (e.g., every 10%, 25%, 50% change in size).

Figure 10A:
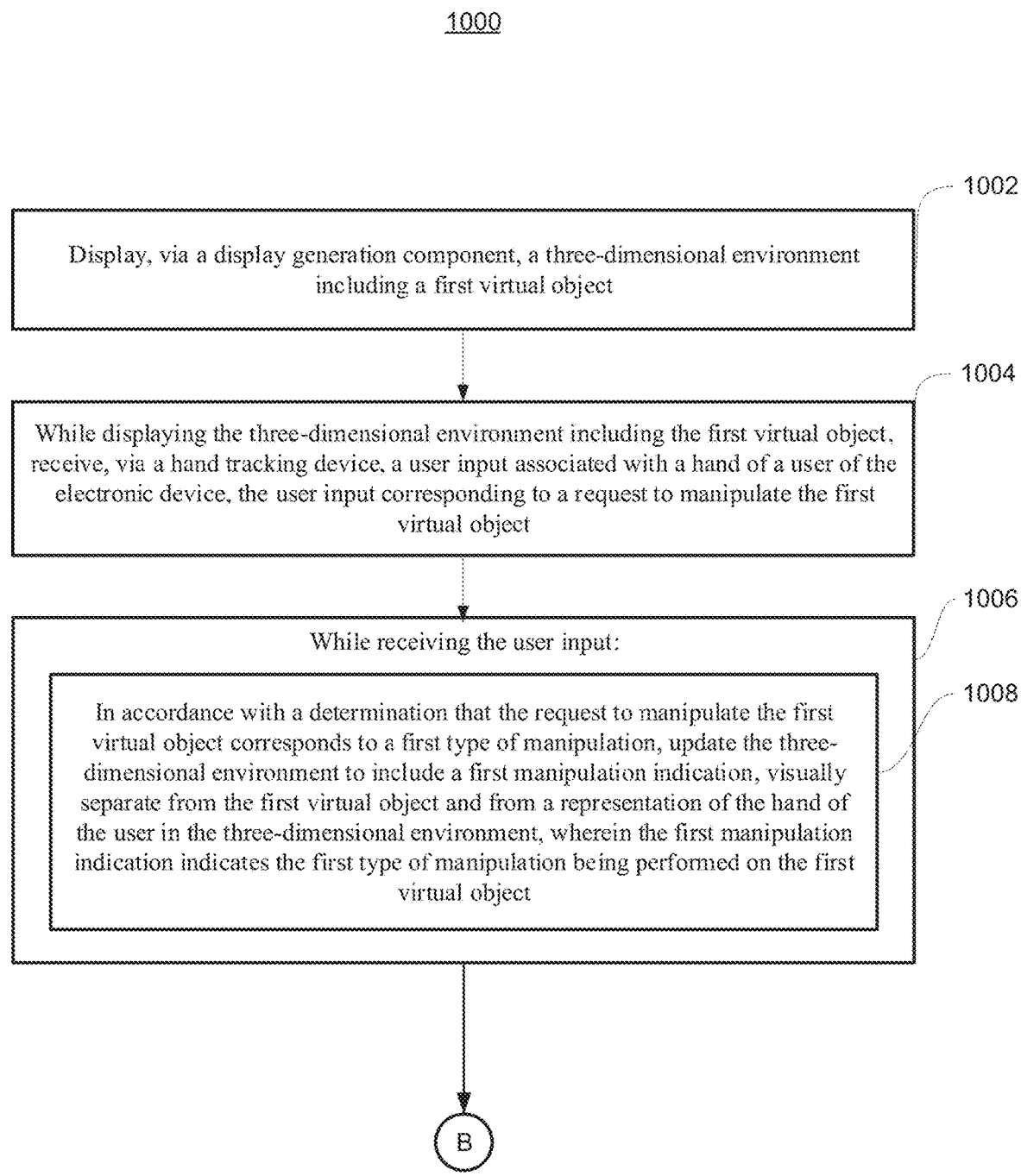
FIGS. 10A-10O is a flowchart illustrating a method of manipulating an object in a three-dimensional environment in accordance with some embodiments.
Figure 10B:
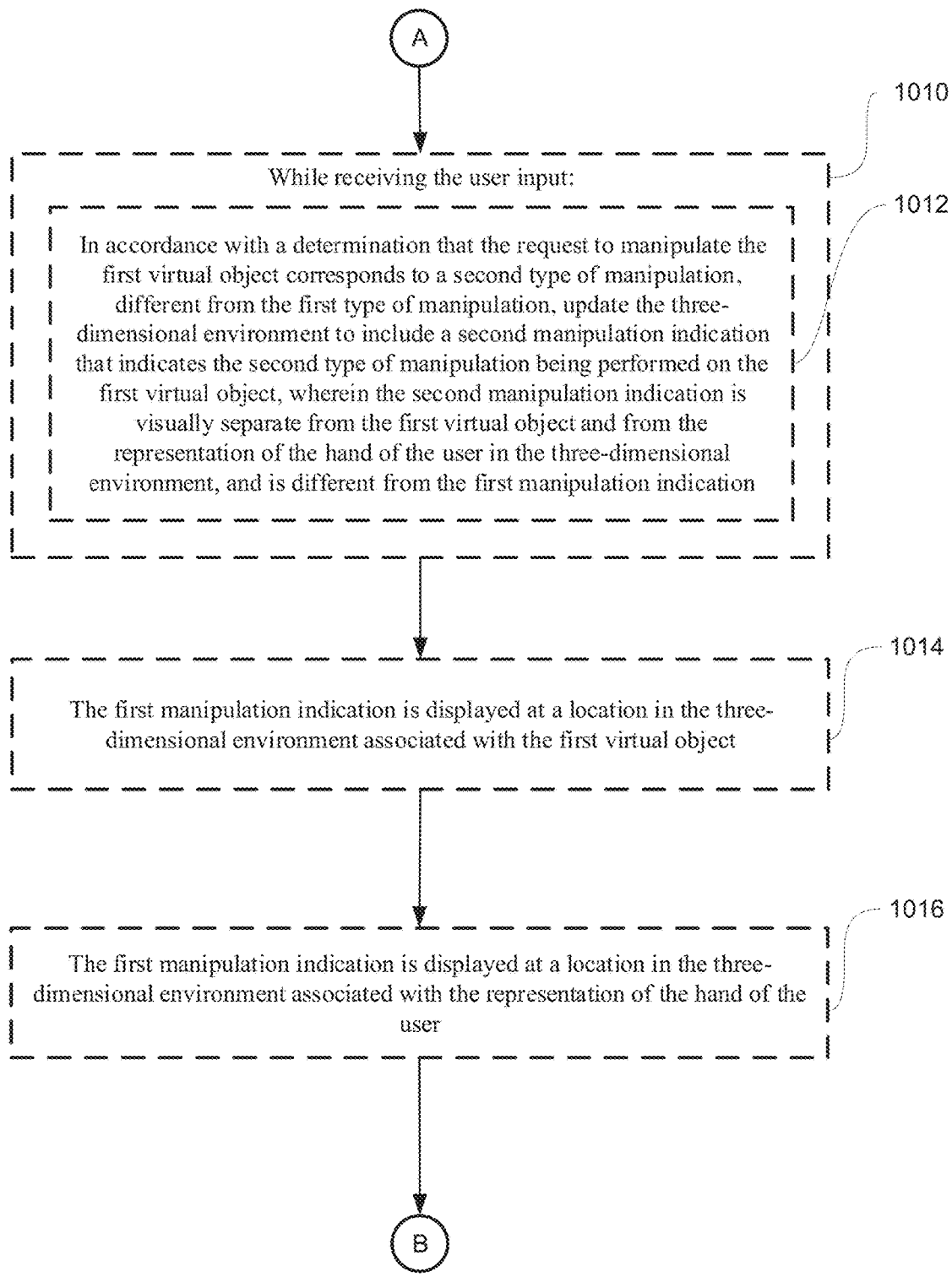
Figure 10C:
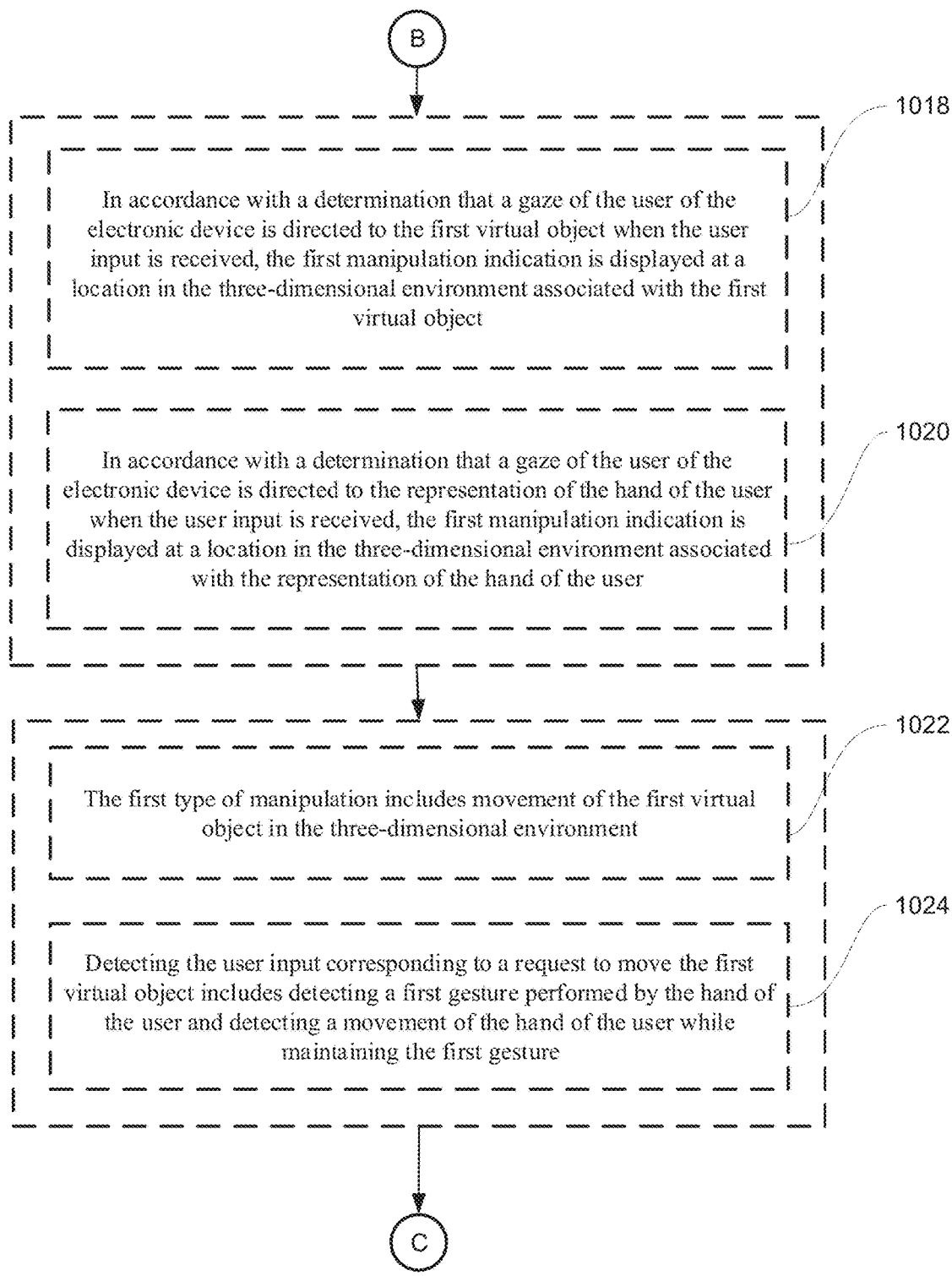
Figure 10D:
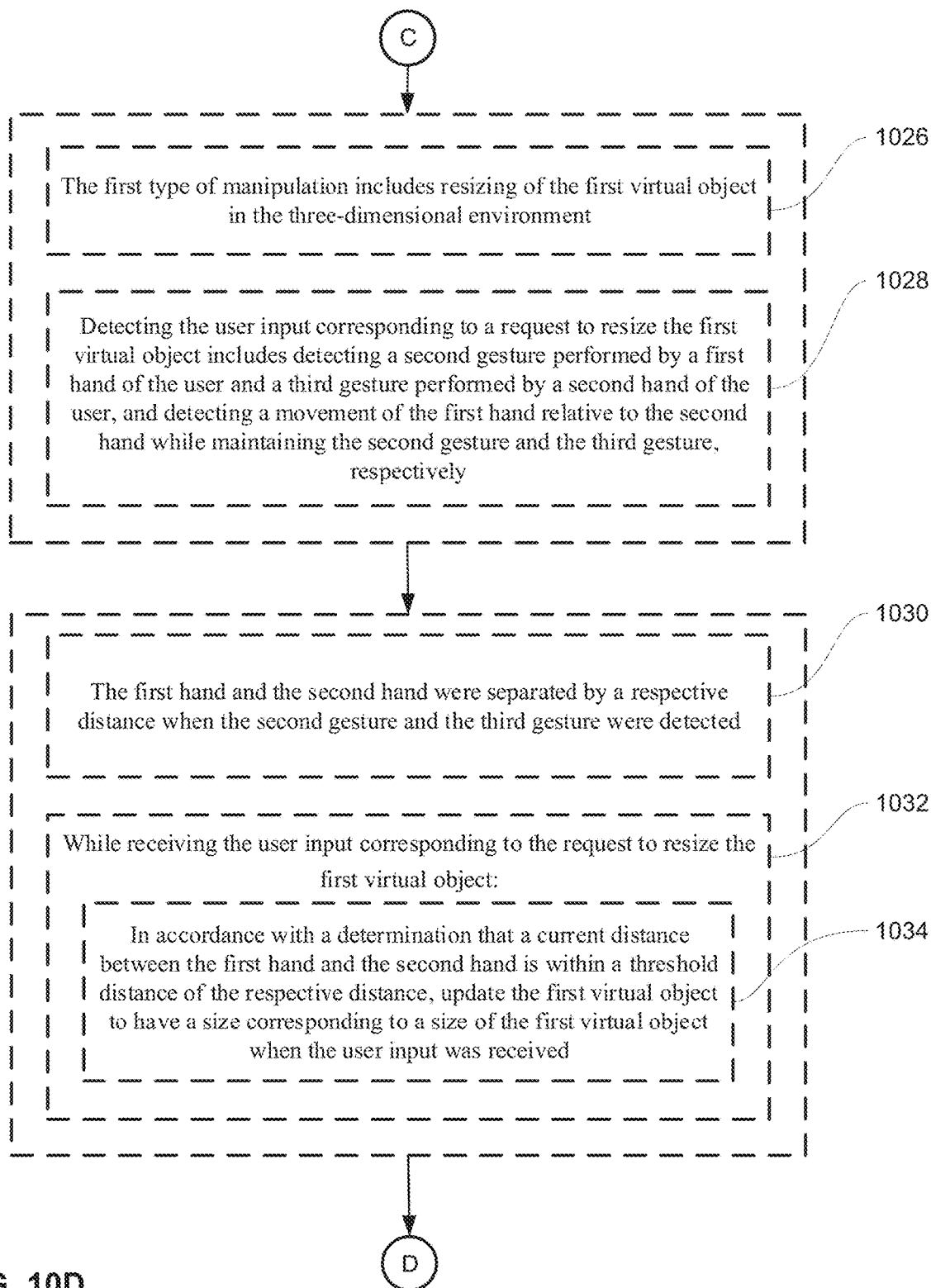
Figure 10E:
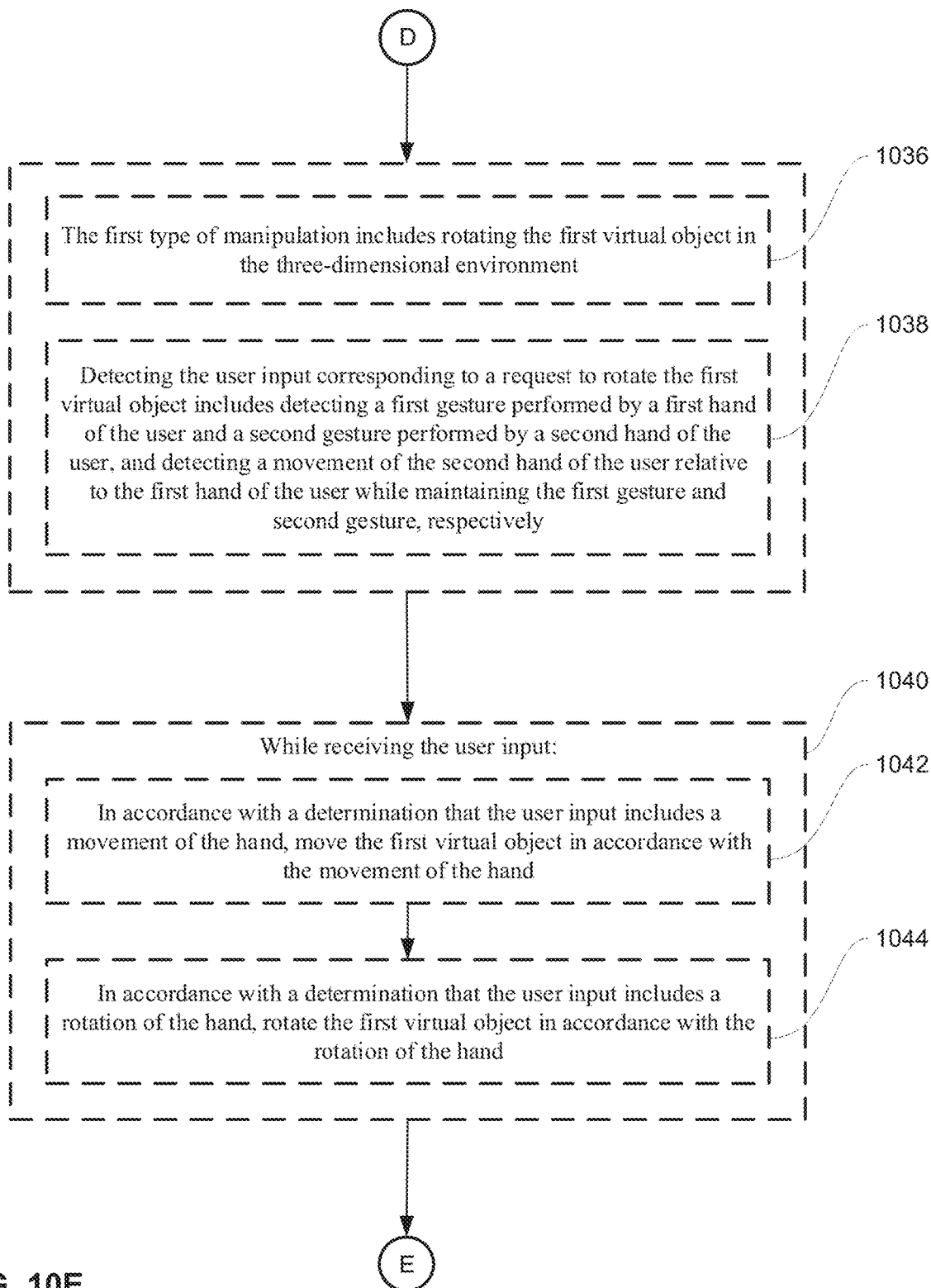
Figure 10G:
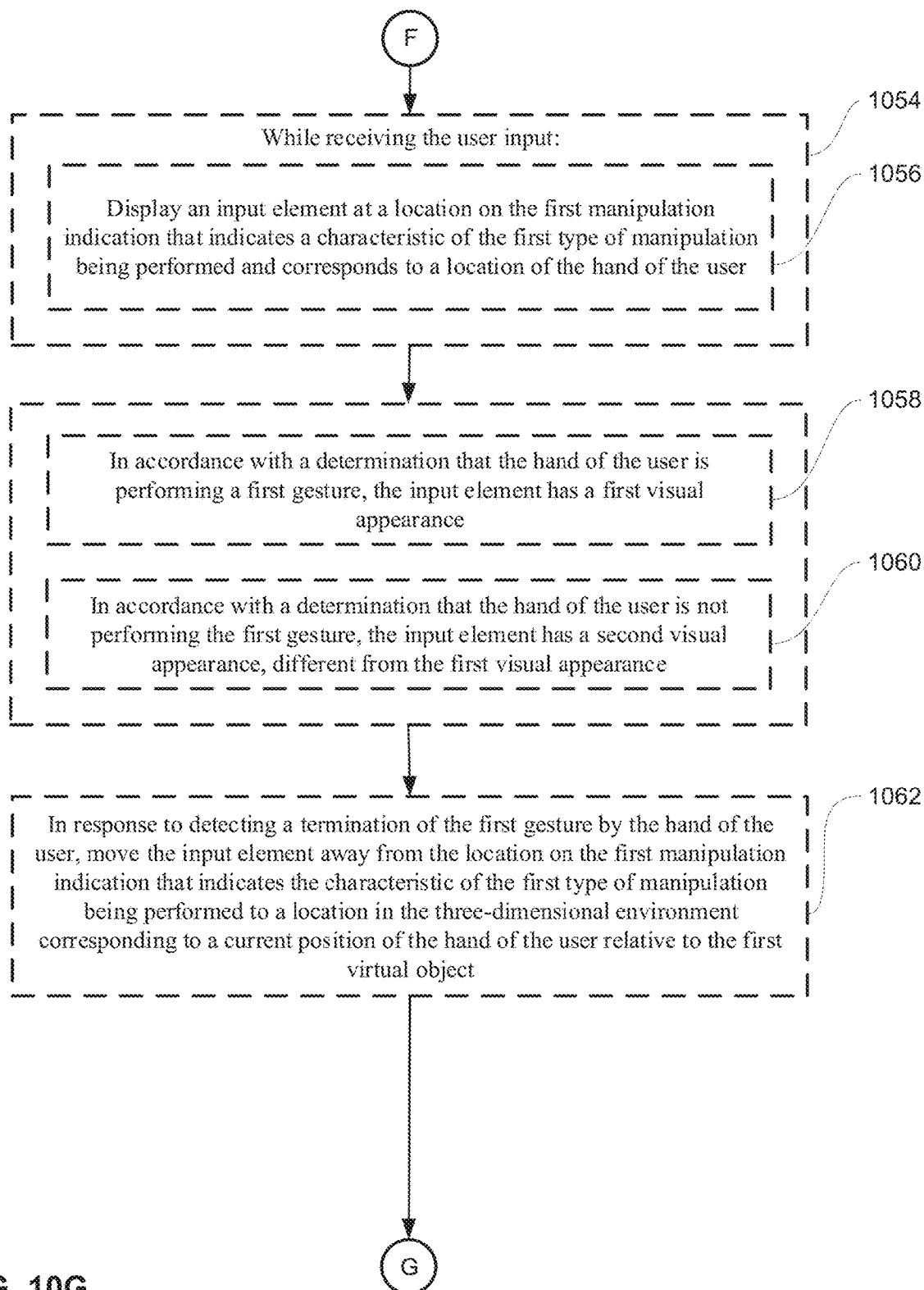
Figure 10H:
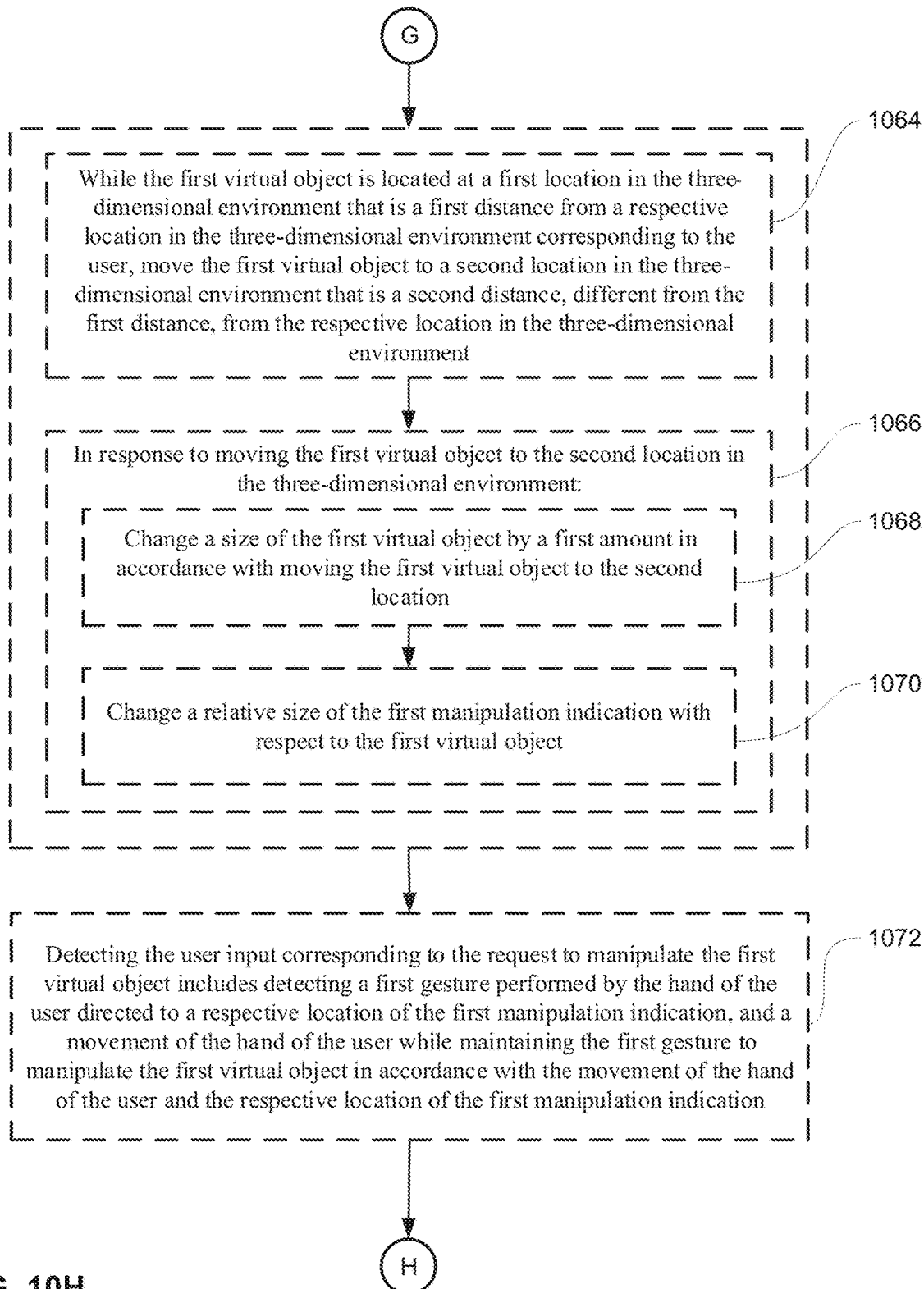
Figure 10I:
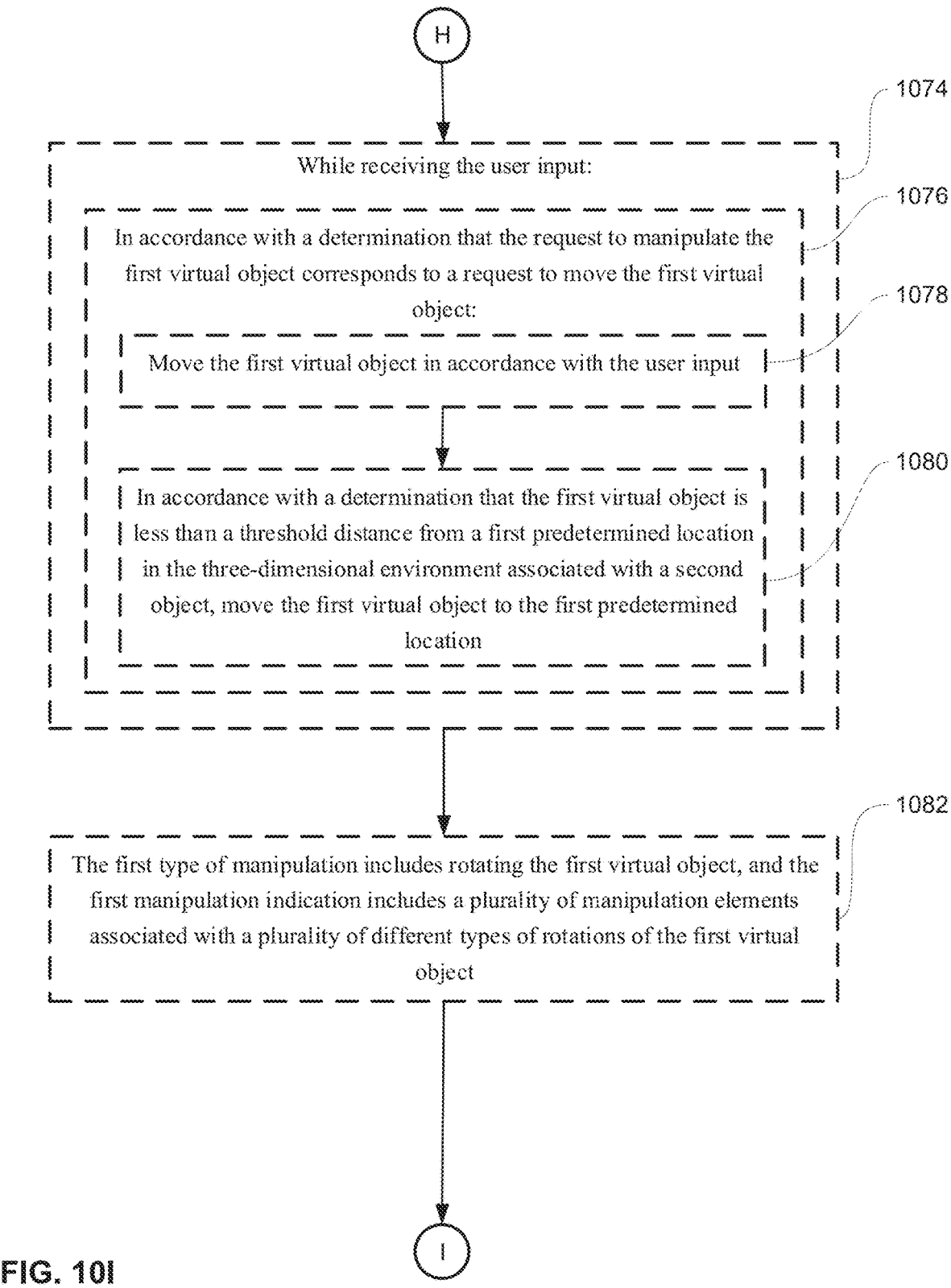
Figure 10J:
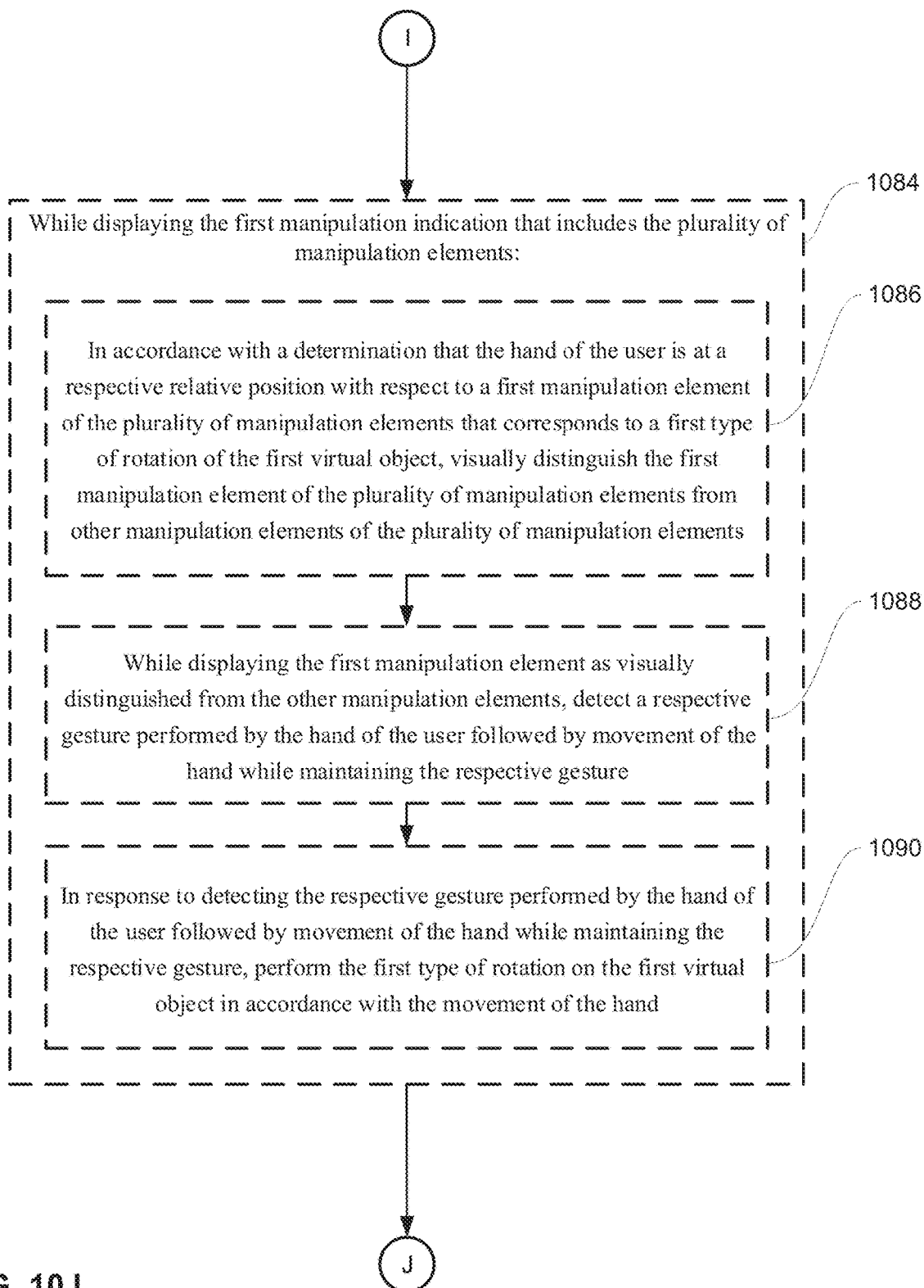
Figure 10K:
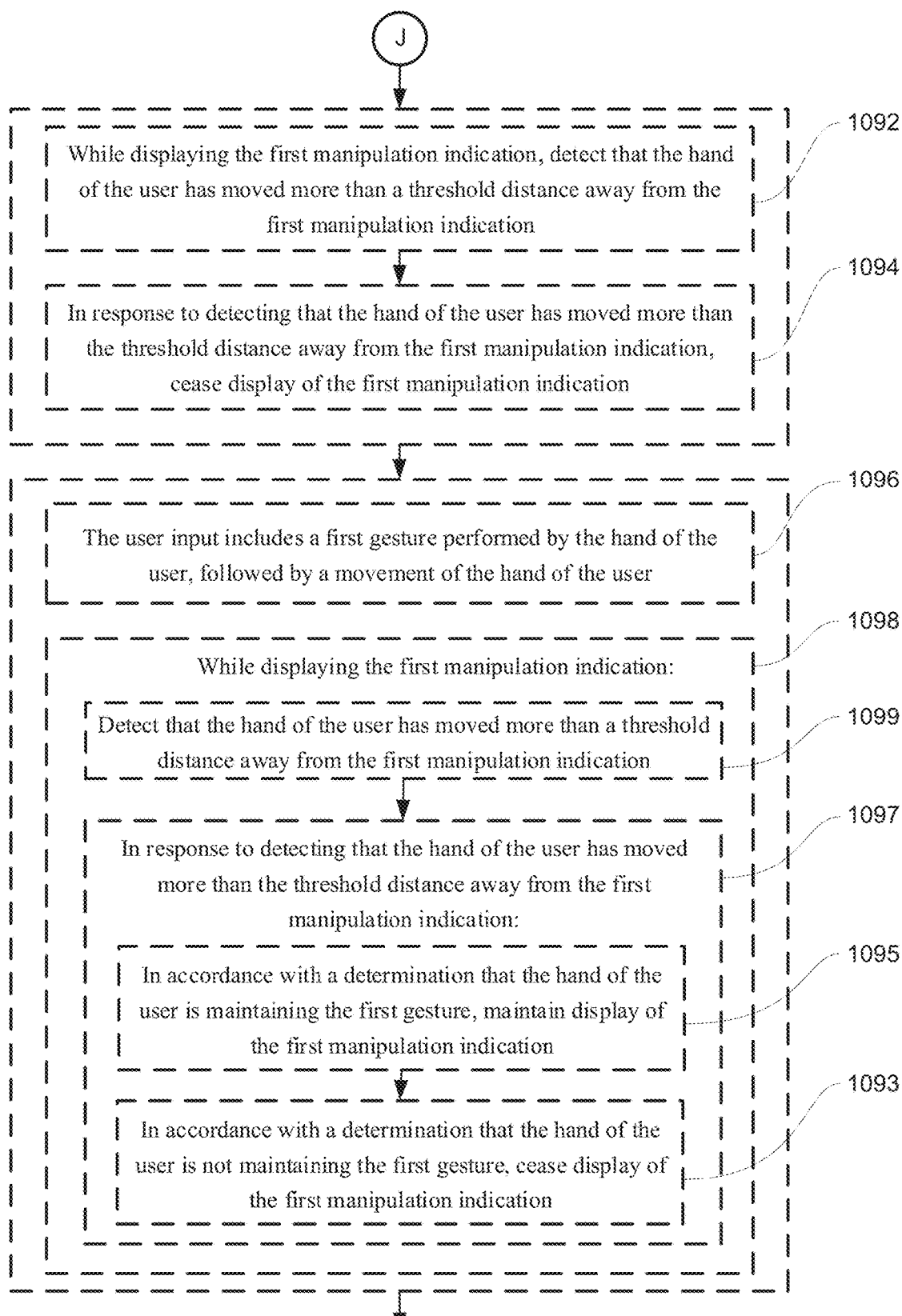
Figure 10L:
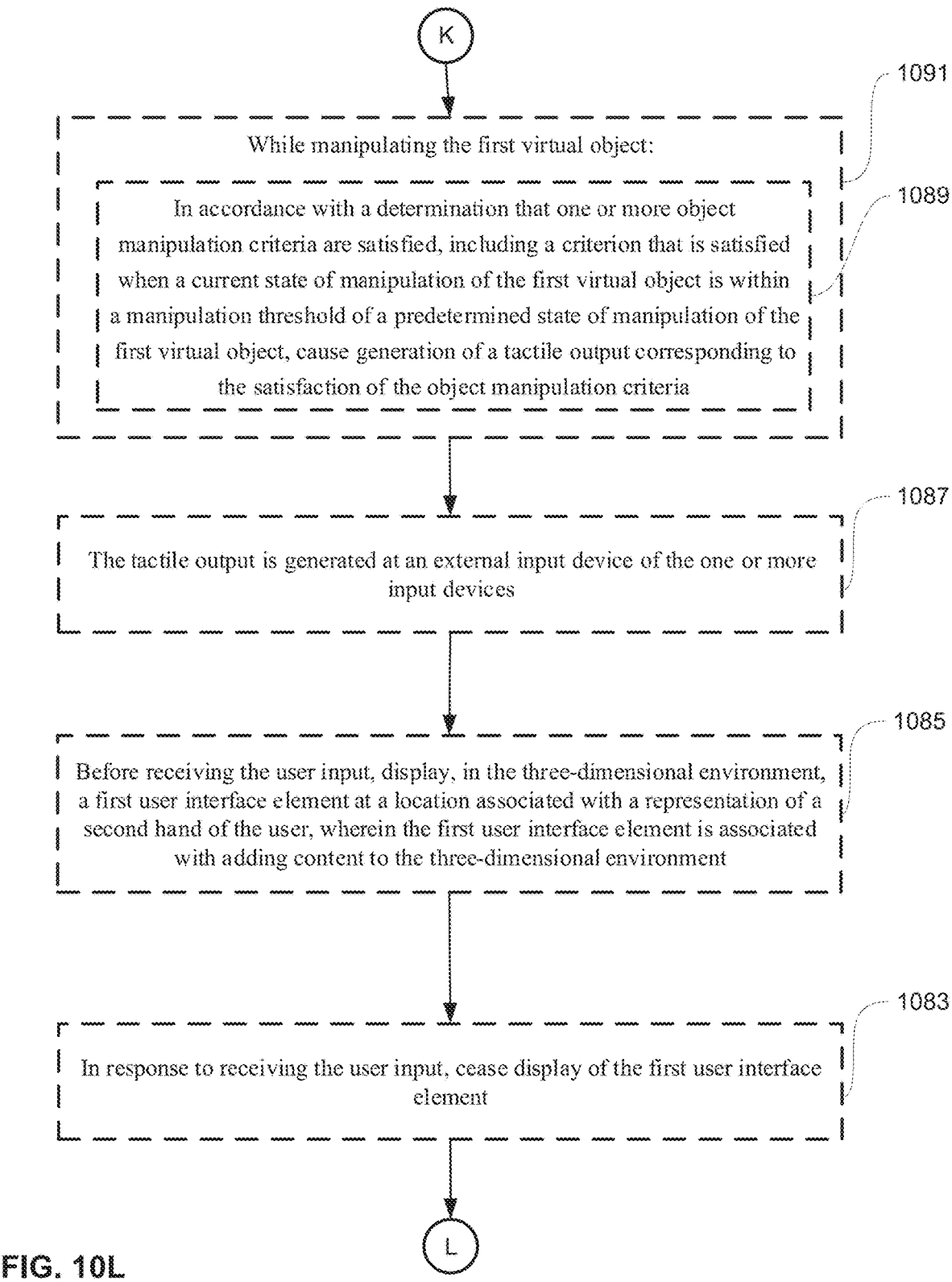
Figure 10M:
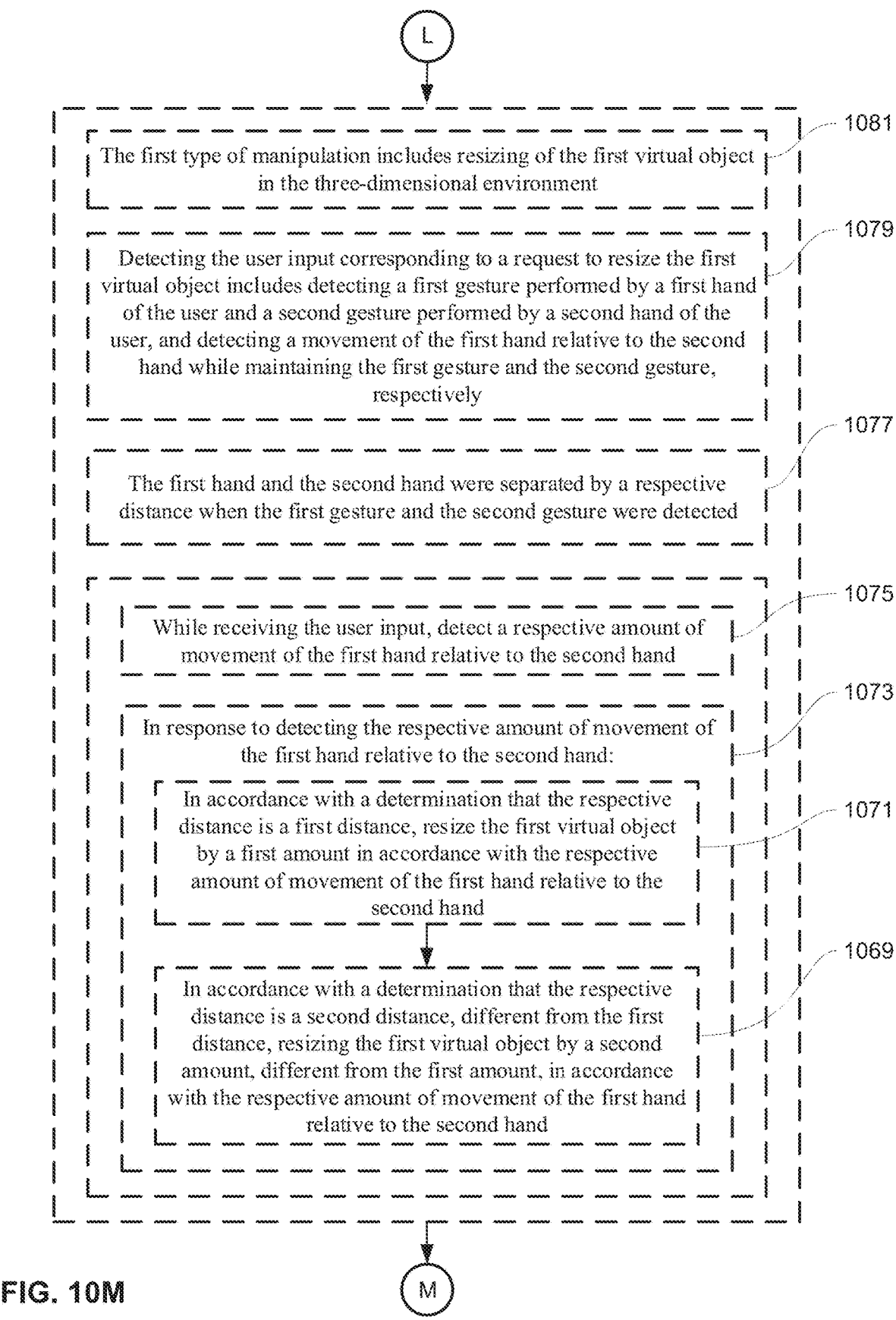
Figure 10N:
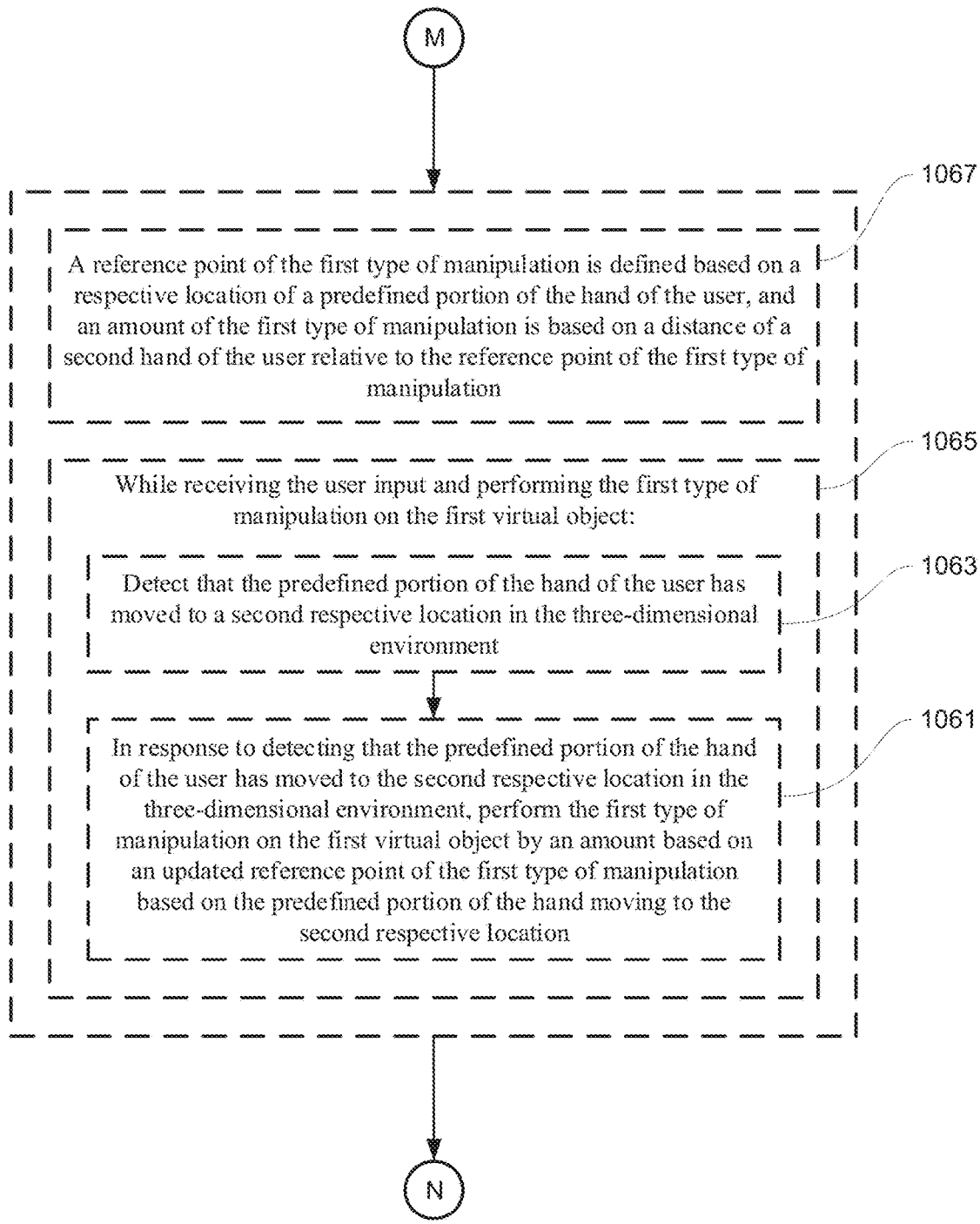
Figure 10O:
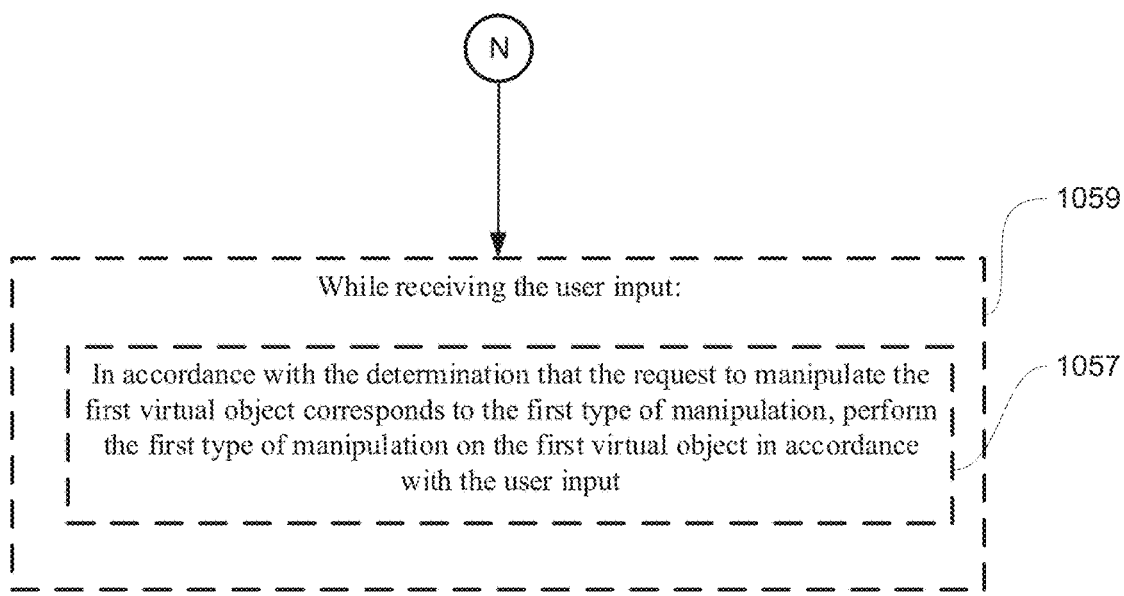

FIGS. 10A-10O is a flowchart illustrating a method 1000 of manipulating an object in a three-dimensional environment in accordance with some embodiments. In some embodiments, the method 1000 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1000 are, optionally, combined and/or the order of some operations is, optionally, changed.

In the method 1000, in some embodiments, an electronic device (e.g., computer system 101 in FIG. 1) in communication with a display generation component and a hand tracking device (e.g., a mobile device (e.g., a tablet, a smartphone, a media player, or a wearable device), or a computer) displays (1002), via the display generation component, a three-dimensional environment including a first virtual object, such as three-dimensional environment 910 in FIG. 9A (e.g., in a computer-generated reality, displaying a first virtual object).

In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the hand tracking device includes an image sensor, a camera, a depth sensor, and/or a motion sensor, etc. that is capable of determining a location of the user's hand in a real-world environment of the electronic device (e.g., absolute location in the real-world environment or relative location as compared to other objects in the real-world environment), the relative movements of the user's hand, and/or the position of the fingers of the hand, etc.

In some embodiments, the computer-generated reality is a virtual reality (VR) environment, a mixed reality (MR) environment, or an augmented reality (AR) environment, etc. and the first virtual object is displayed in the environment (e.g., optionally obstructing the view of at least a portion of the real-world environment). In some embodiments, the first virtual object is manipulable. For example, the first virtual object is capable of being rotated, scaled, moved, etc.

In some embodiments, while displaying the three-dimensional environment including the first virtual object, the electronic device receives (1004), via the hand tracking device, a user input associated with a hand of a user of the electronic device, the user input corresponding to a request to manipulate the first virtual object, such as first hand 916-1 performing a respective gesture (e.g., "Gesture B") in FIG. 9A (e.g., detecting, via the hand tracking device, a movement of one or more hands of the user that corresponds to a pre-determined gesture associated with a respective manipulation operation).

In some embodiments, the user input includes a pinch gesture, a movement while performing a pinch gesture, a movement of one or more hands of the user to predetermined positions (optionally to a predetermined position relative to each other), etc. In some embodiments, the user input corresponds to a request to manipulate the first virtual object if the hand is at a respective position in physical space with respect to the location of the virtual object in the three-dimensional environment (e.g., the user's hand's position in physical space is within a threshold distance (e.g., 0.5 inches, 1 inch, 3 inches, 5 inches, 1 foot, 2 feet, etc.) from the location in physical space that corresponds to the location of the virtual object in the three-dimensional environment). For example, the pre-determined gesture, if performed while the user's hand is not within the threshold distance from the position in physical space corresponding to the virtual object is not interpreted as a request to manipulate the first virtual object.

In some embodiments, while receiving the user input (1006) in accordance with a determination that the request to manipulate the first virtual object corresponds to a first type of manipulation (e.g., the user input corresponds to a first type of manipulation operation. In some embodiments, the device detects that the user input corresponds to a predetermined gesture or movement associated with the first type of manipulation operation. In some embodiments, the first type of manipulation operation includes one or more of a scaling operation, a rotation operation, a movement operation, etc.), the electronic device updates (1008) the three-dimensional environment to include a first manipulation indication, visually separate from the first virtual object and from a representation of the hand of the user in the three-dimensional environment, such as the display of manipulation globe 914 in FIG. 9A in response to a request to rotate cylinder 912 (e.g., a user interface object that moves based on movement of the hand of the user of the electronic device), wherein the first manipulation indication indicates the first type of manipulation being performed on the first virtual object (e.g., displaying a visual element in the three-dimensional environment or modifying a visual characteristic of an element in the three-dimensional environment to indicate the type of manipulation that will be or is being performed (e.g., the type of manipulation that corresponds to the user input)).

The representation of the hand is optionally a view of the user's hand in the real-world environment (e.g., such as in a mixed reality environment or an augmented reality environment). For example, if the display generation component includes a translucent or transparent display, the electronic device is able to allow viewing of the portion of the real-world environment that includes the user's hand (e.g., by not obscuring view of the user's hand). In some embodiments, the representation of a hand is a virtual object that is based on the hand of the user (e.g., such as a pass-through video in an augmented reality environment or a virtual reality environment). For example, the hand tracking device and/or one or more cameras in communication with the electronic device are able to capture the position, location, and/or features of the hand, and display, via the display generation component, a representation of the hand in the three-dimensional environment (e.g., a photorealistic representation, a caricature, a cartoon, etc.) that optionally reflects the position, location, and/or features of the hand.

In some embodiments, the visual element is displayed while the manipulation is occurring (e.g., while receiving the manipulation input). In some embodiments, the visual element is also displayed before the manipulation has occurred. For example, the visual element is displayed in response to an intention to manipulate (e.g., in response to the user performing an initial gesture corresponding to the manipulation operation, before receiving a subsequent user input that causes the manipulation to occur). In some embodiments, the visual element is not displayed in response to the initial gesture and is displayed in response to the manipulation operation actually being performed (e.g., only after the manipulation begins). In some embodiments, the indication is displayed at a location in the three-dimensional environment near, around, next to, etc. the first virtual object and/or one or more hands of the user. In some embodiments, the indication includes a line extending from one hand to another hand (e.g., indicating a scaling manipulation). In some embodiments, the indication includes a curved (e.g., an arc) or circular element (e.g., indicating a rotational manipulation). In some embodiments, the manipulation indication is displayed while the manipulation operation is being performed. In some embodiments, the manipulation indication changes in accordance with the performance and/or progress of the manipulation operation (e.g., providing a guide to the user for how to perform the manipulation and/or the effect of the manipulation).

The above-described manner of indicating the type of manipulation being performed (e.g., by displaying a manipulation indication in the three-dimensional environment based on the type of manipulation operation) provides quick and efficient feedback when manipulating a virtual object (e.g., by displaying an indication separate from the virtual object being manipulated, thus providing the user with another visual element to monitor the manipulation), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while receiving the user input (1010) in accordance with a determination that the request to manipulate the first virtual object corresponds to a second type of manipulation, different from the first type of manipulation, the electronic device updates (1012) the three-dimensional environment to include a second manipulation indication that indicates the second type of manipulation being performed on the first virtual object, wherein the second manipulation indication is visually separate from the first virtual object and from the representation of the hand of the user in the three-dimensional environment, and is different from the first manipulation indication, such as the display of resizing indicator 932 in FIG. 9C in response to a request to resize cylinder 912 (e.g., if the user input is a request to perform a second type of manipulation, then display a different manipulation indication that indicates the second type of manipulation to be performed or is being performed).

In some embodiments, if the manipulation is a rotational manipulation, then based on the type of rotation and/or direction of rotation, the device can display different manipulation indications. For example, if rotating the object in yaw, pitch, or roll directions, different manipulation indications are displayed. In some embodiments, if the manipulation is a resizing manipulation, then a resizing manipulation indication is displayed.

The above-described manner of indicating the type of manipulation being performed (e.g., by displaying different manipulation indications based on the type of manipulation being performed) provides quick and efficient feedback of the type of manipulation being performed on the virtual object (e.g., by using the manipulation indication to provide feedback on the type of manipulation being performed without requiring the user to manipulate the object to determine what type of manipulation has been selected), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the first manipulation indication is displayed at a location in the three-dimensional environment associated with the first virtual object (1014), such as if manipulation globe 914 were displayed around cylinder 912 in FIG. 9A (e.g., the manipulation indication is displayed at, near, or surrounding the object). For example, the manipulation indication is a circle that is displayed around the object such that performing a rotational input following the curvature of the circle causes the first virtual object to rotate in the same manner. In some embodiments, the orientation of the manipulation indication is based on the orientation of the manipulation. For example, a rotation manipulation in the "z" direction causes display of a circle that extends in the "z" direction (e.g., optionally at a constant x and/or y position).

The above-described manner of displaying a manipulation indication (e.g., near or around the virtual object being manipulated) provides quick and efficient feedback of which object is being manipulated (e.g., by displaying the indication near the object being manipulated and not near other objects that are not being manipulated, without requiring the user to perform the manipulation to visually determine whether the correct object is being manipulated), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the first manipulation indication is displayed at a location in the three-dimensional environment associated with the representation of the hand of the user (1016), such as manipulation globe 914 displayed near first hand 916-1 in FIG. 9A (e.g., displayed at, near, or surrounding one of the hands of the user).

In some embodiments, a representation of the hand of the user is displayed in the three-dimensional environment. In some embodiments, the user input includes a gesture performed by the hand of the user and the manipulation indication is displayed at, near, or surrounding the hand that performed the gesture. For example, if the user input includes a pinch gesture by the left hand of the user, and the manipulation indication is displayed in response to the pinch gesture, the manipulation indication is displayed at or adjacent to the location of the pinch point (e.g., a portion of the manipulation indication, the center of the manipulation indication, etc.). In some embodiments, while the manipulation indication is displayed near the left hand of the user, the right hand of the user is able to interact with the manipulation indication to cause the first virtual object to be manipulated. For example, if the manipulation indication is a circle in the "x-y" direction corresponding to a rotation of the first virtual object in the x-y direction (e.g., in the "roll" orientation), the user is able to pinch on the manipulation indication with the right hand and move the right hand while maintaining the pinch in a circular manner while following the curvature of the manipulation indication, thus causing the first virtual object to rotate in the x-y direction accordingly.

The above-described manner of displaying a manipulation indication (e.g., near or around a representation of a hand) provides quick and efficient method to manipulate the virtual object (e.g., by displaying the indication near the hand(s) to is being used or will be used to perform the manipulation of the object), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, in accordance with a determination that a gaze of the user of the electronic device is directed to the first virtual object when the user input is received, the first manipulation indication is displayed at a location in the three-dimensional environment associated with the first virtual object (1018), such as if gaze 915 were directed to cylinder 912 in FIG. 9A (e.g., if the gaze of the user is directed at the virtual object to be manipulated when the user input that causes the manipulation indication to be displayed is received, then the manipulation indication is displayed at, near, or around the virtual object).

In some embodiments, a representation of a hand of the user is not displayed in the three-dimensional environment when the user input is received. In some embodiments, the gaze of the user is not directed at a representation of the hand when the user input is received.

In some embodiments, in accordance with a determination that a gaze of the user of the electronic device is directed to the representation of the hand of the user when the user input is received, the first manipulation indication is displayed at a location in the three-dimensional environment associated with the representation of the hand of the user (1020), such as gaze 915 being directed to first hand 916-1 in FIG. 9A (e.g., if the gaze of the user is directed at the representation of the hand when the user input that causes the manipulation indication to be displayed is received, then the manipulation indication is displayed at, near, or around the representation of the hand).

Thus, the user is able to indicate where the manipulation indication should be displayed. For example, if the user is looking at the representation of the hand, then it is advantageous to display the manipulation indication near where the user is looking, but if the user is looking at the virtual object, then it is advantageous to display the manipulation indication near the virtual object.

The above-described manner of displaying a manipulation indication (e.g., near or around the virtual object if the user is looking at the virtual object or the representation of a hand if the user is looking at the representation of the hand) provides quick and efficient method to manipulate the virtual object (e.g., by displaying the indication near where the user is looking, without requiring the user to perform additional inputs to move the manipulation indication or shift the user's gaze to a different part of the three-dimensional environment), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the first type of manipulation includes movement of the first virtual object in the three-dimensional environment (1022), such as a rotation of cylinder 912 in FIG. 9B (e.g., the first type of manipulation includes a change in the orientation of the first virtual object such as a rotation and/or lateral movement of the first virtual object.

In some embodiments, detecting the user input corresponding to a request to move the first virtual object includes detecting a first gesture performed by the hand of the user and detecting a movement of the hand of the user while maintaining the first gesture (1024), such as the movement of second hand 916-2 in a circular manner in FIG. 9B (e.g., the first gesture corresponds to a request to manipulate the object and the movement of the hand corresponds to the type of manipulation and/or the amount of manipulation).

In some embodiments, the first gesture includes a pinch by a hand of the user (optionally while the gaze is directed at the first virtual object) and a rotational movement of the hand, thus causing a rotation of the first virtual object. For example, if the movement component is a rotation in the yaw orientation, then the first virtual object is rotated in the yaw orientation. In some embodiments, if the movement component includes a rotation in multiple orientations, then the first virtual object is rotated in only one orientation, optionally the orientation with the greatest movement. In some embodiments, if the movement component includes a rotation in multiple orientations, then the first virtual object rotates in the multiple orientations. In some embodiments, while rotating the first virtual object in the three-dimensional environment, an indicator is displayed indicating the type and/or axis of rotation. For example, if the first virtual object is rotated in the yaw orientation, a circular arrow that is displayed indicating that the rotation in the yaw direction. In some embodiments, if the movement component is a lateral movement, then the first virtual object is moved in the three-dimensional environment in the direction of the lateral movement of the hand. In some embodiments, the amount of movement is based on the distance of the first virtual object from the user, such as described below with respect to method 1400.

The above-described manner of manipulating a virtual object (e.g., in response to a first gesture by a hand of the user and a movement of the hand while maintaining the first gesture) provides quick and efficient method to manipulate the virtual object (e.g., in accordance with the movement of the hand, without requiring the user to perform additional inputs to select the type of manipulation to be performed), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the first type of manipulation includes resizing of the first virtual object in the three-dimensional environment (1026), such as the resizing of cylinder 912 in FIG. 9C (e.g., the first type of manipulation includes a change in the size of the first virtual object (e.g., resizing the first virtual object)).

In some embodiments, detecting the user input corresponding to a request to resize the first virtual object includes detecting a second gesture performed by a first hand of the user and a third gesture performed by a second hand of the user, and detecting a movement of the first hand relative to the second hand while maintaining the second gesture and the third gesture, respectively (1028), such as detecting first hand 916-1 performing Gesture D and second hand performing Gesture E and a movement of second hand 916-2 away from first hand 916-1 in FIG. 9C (e.g., the second gesture and third gesture by the first and second hands of the user correspond to a request to resize the object and the movement of the hand corresponds to the amount to resize the object).

In some embodiments, the second and third gestures include pinches by the respective hand of the user (optionally while the gaze of the user is directed to the first virtual object), and the movement of the hand include a change in the distance between the two pinches. For example, moving the two hands apart while maintaining their respective gestures causes the first virtual object to expand while moving the two hands closer together causes the first virtual object to shrink. In some embodiments, while performing the resizing, a line is displayed between the two pinch locations. In some embodiments, the line is a manipulation indication that provides one or more guides on how much the first virtual object has been resized. For example, an indication is optionally displayed on the line, indicating the original size of the first object such that if the hands move back to that distance, the first object will be return to its size before the resizing manipulation was received. In some embodiments, in response to receiving the pinch gesture by the first hand (but before receiving the pinch gesture by the second hand), a rotational manipulation indicator (e.g., which optionally includes one or more curved or circular elements for rotating the first virtual object in the respective direction) is displayed. In some embodiments, if the second hand is more than a threshold distance away from the first hand (and/or more than a threshold distance from an element of the rotational manipulation indicator) when the second hand performs the pinch gesture (e.g., more than 1 inch, more than 3 inches, more than 1 foot, etc.), then the rotational manipulation indicator is replaced with the resizing indicator described above (e.g., the user input is interpreted as a request to resize the first virtual object instead of a request to rotate the first virtual object). In some embodiments, in response to detecting a release of the pinch gesture by the second hand, if the first hand is maintaining the pinch gesture, then cease displaying the resizing indicator and restore display of the rotational manipulation indicator.

The above-described manner of resizing a virtual object (e.g., in response to gestures by both hands of the user and a change in the distance between the two hands) provides quick, efficient, and intuitive method to resize the virtual object (e.g., in accordance with the movement of the hand changing the distance between the hands), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the first hand and the second hand were separated by a respective distance when the second gesture and the third gesture were detected (1030), such as in FIG. 9C (e.g., the original distance between the two hands when the user input was first detected before a change in the distance between the hands).

In some embodiments, while receiving the user input corresponding to the request to resize the first virtual object (1032) in accordance with a determination that a current distance between the first hand and the second hand is within a threshold distance of the respective distance, such as the distance between first hand 916-1 and second hand 916-2 approaching within a threshold distance of the original distance between the hands (e.g., represented by the solid dot) in FIG. 9C (e.g., if the distance between the two hands is within a threshold distance from the original distance between the hands when the user input was first detected (e.g., within a window from the original distance when the user input was received, such as 0.5 inches, 1 inch, 3 inches, 6 inches, etc.)), the electronic device updates (1034) the first virtual object to have a size corresponding to a size of the first virtual object when the user input was received, such as if cylinder 912 were displayed at its originally size in FIG. 9C (e.g., snapping the size of the first virtual object to its original size before the user input was returned). Thus, the device provides a snapping point to cancel the resizing operation when the distance between the hands is returned to their original distance (or a threshold distance from their original distance).

The above-described manner of returning a virtual object back to its original size (e.g., in response to the distance of the two hands being within a threshold distance of the original distance between the two hands when the user input was initially received) provides quick and efficient method to cancel the resizing of the virtual object (e.g., by automatically snapping back to its original size if the user returns his or her hands to within a threshold of its original distance, without requiring the user to perform minute adjustments to return the size of the object to its original size), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the first type of manipulation includes rotating the first virtual object in the three-dimensional environment (1036), such as the rotation of cylinder 912 in FIG. 9B. In some embodiments, detecting the user input corresponding to a request to rotate the first virtual object includes detecting a first gesture performed by a first hand of the user and a second gesture performed by a second hand of the user, and detecting a movement of the second hand of the user relative to the first hand of the user while maintaining the first gesture and second gesture, respectively (1038), such as detecting first hand 916-1 performing Gesture B and second hand 916-2 performing Gesture C and the movement of second hand 916-2 in a circular manner as shown in FIG. 9B (e.g., a pinch gesture performed by a first hand and a pinch gesture performed by the second hand followed by a movement of the second hand rotationally around a respective position in the three-dimensional environment).

For example, if the second hand moves in a circular manner along an arc in space in the x-y direction, the first virtual object rotates in the x-y direction (e.g., rotate in the "roll" orientation), and if the second hand moves along an arc in the y-z direction, the first virtual object rotates in the y-z direction (e.g., rotate in the "pitch" orientation). In some embodiments, the pinch gesture is performed by the second hand when the second hand is within a threshold distance from a respective manipulation indicator. For example, if the first manipulation indication includes a plurality of manipulation elements corresponding to three different rotation orientations, then if the second hand is within a threshold distance of the manipulation element associated with the "roll" orientation, then the "roll" rotation is selected when the second hand performs the pinch gesture and a movement along the x-y direction causes the first virtual object to rotate in the roll orientation. In some embodiments, if the pinch gesture is performed by the second hand when the second hand is more than the threshold distance from a respective manipulation indicator, then none of the rotational manipulations are selected and, instead, a resizing manipulation operation is selected, as described above (e.g., a resizing manipulation indication is displayed).

The above-described manner of rotating a virtual object (e.g., in response to gestures by the two hands of the user followed by a rotational movement of one of the hands of the user) provides quick, efficient, and intuitive method of rotating the virtual object (e.g., by rotating the virtual object by an amount and direction based on the amount and orientation of the movement of the hand of the user), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

Figure 13A:
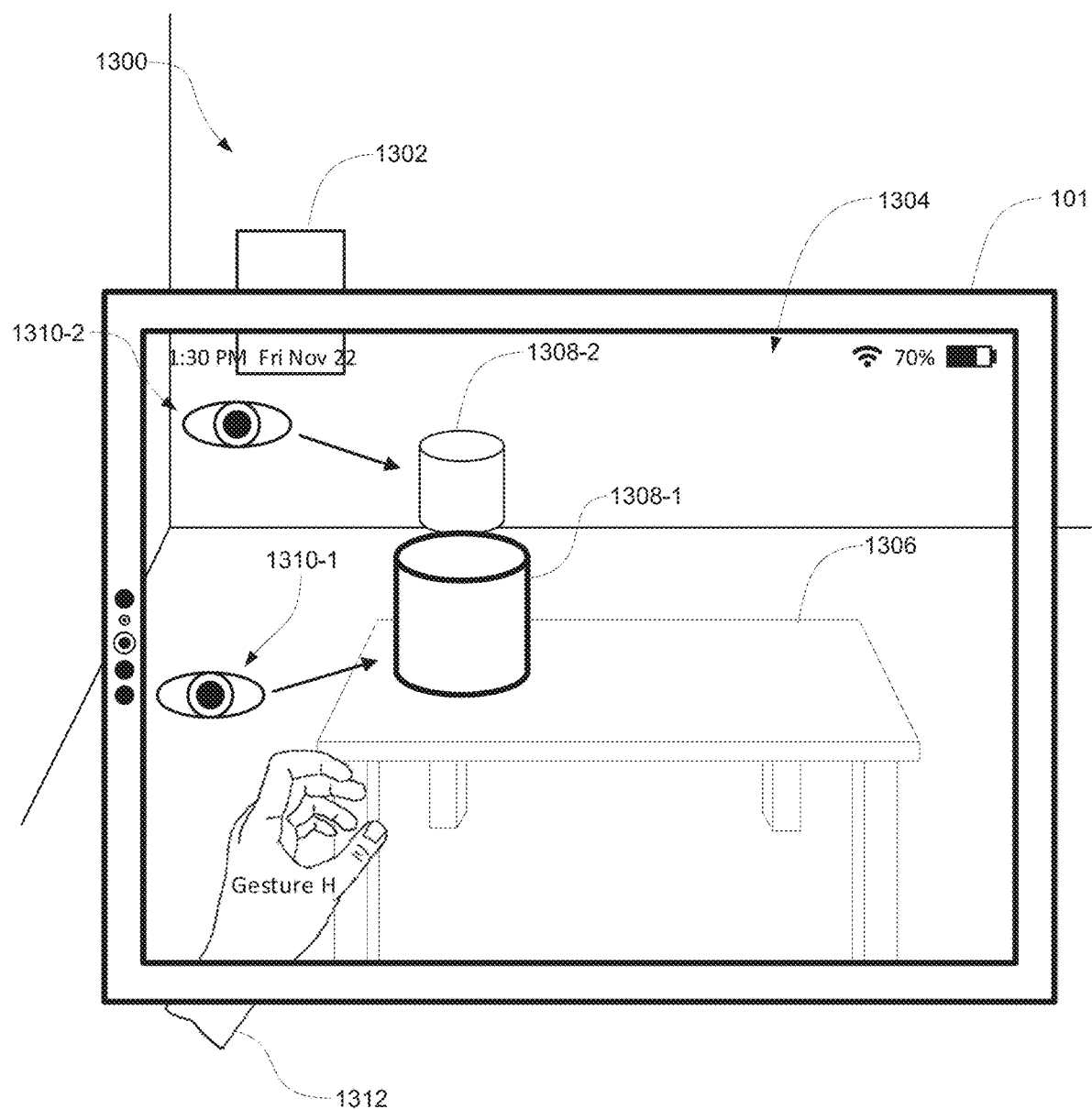
FIGS. 13A-13B illustrate examples of moving an object in a three-dimensional environment by an amount based on the distance of the object from the user in accordance with some embodiments.
Figure 13B:
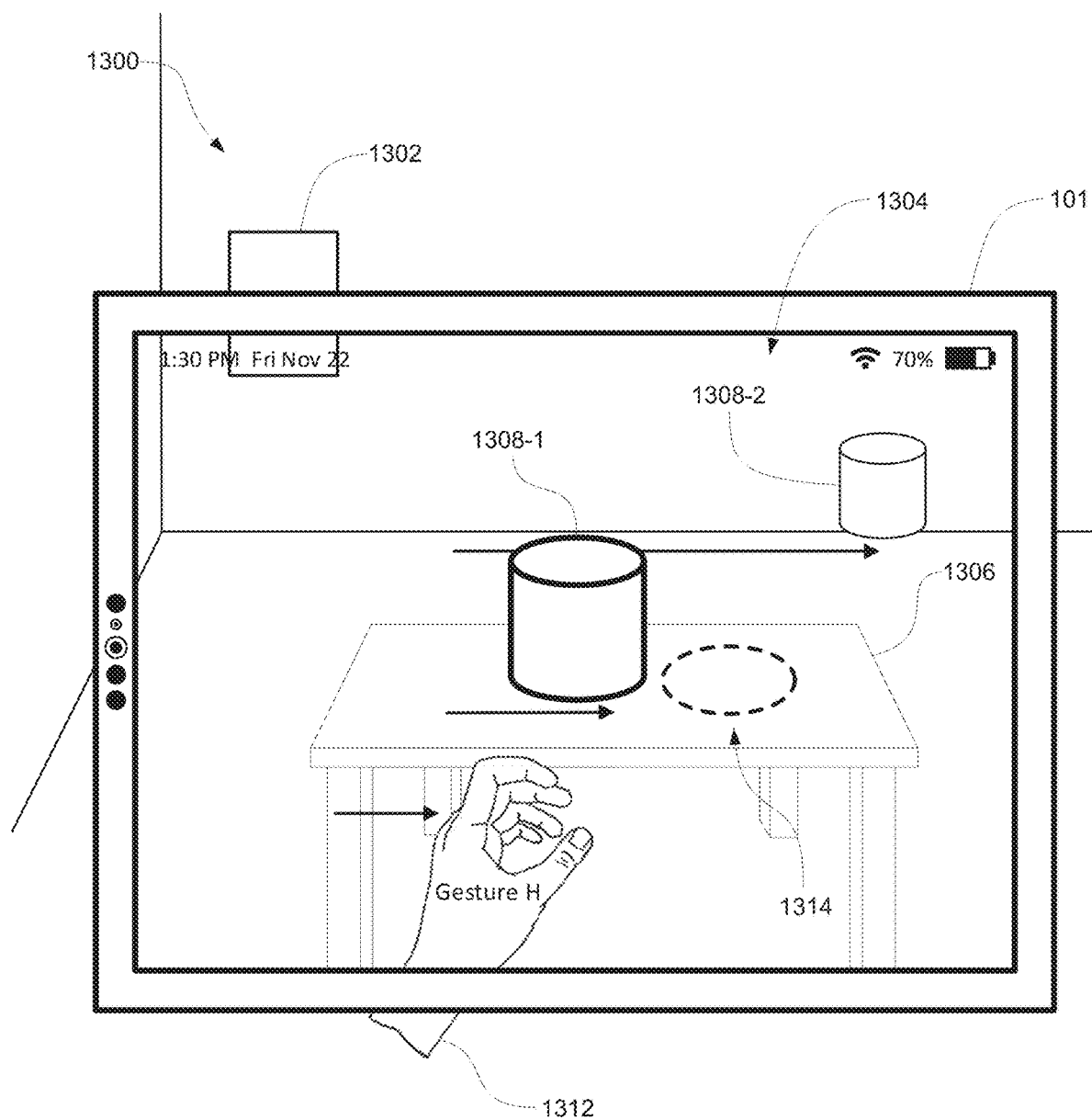
Figure 14B:
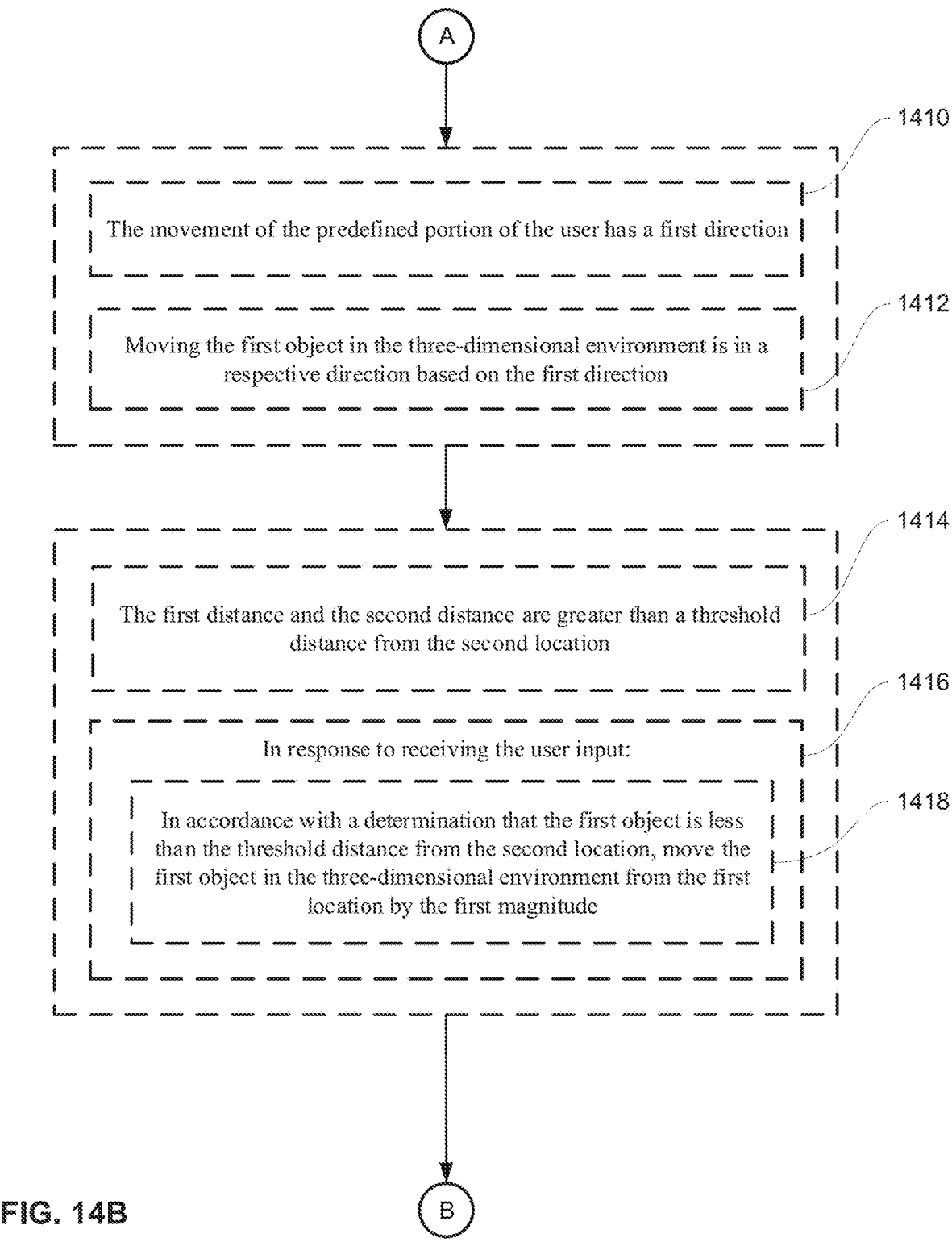
Figure 14C:
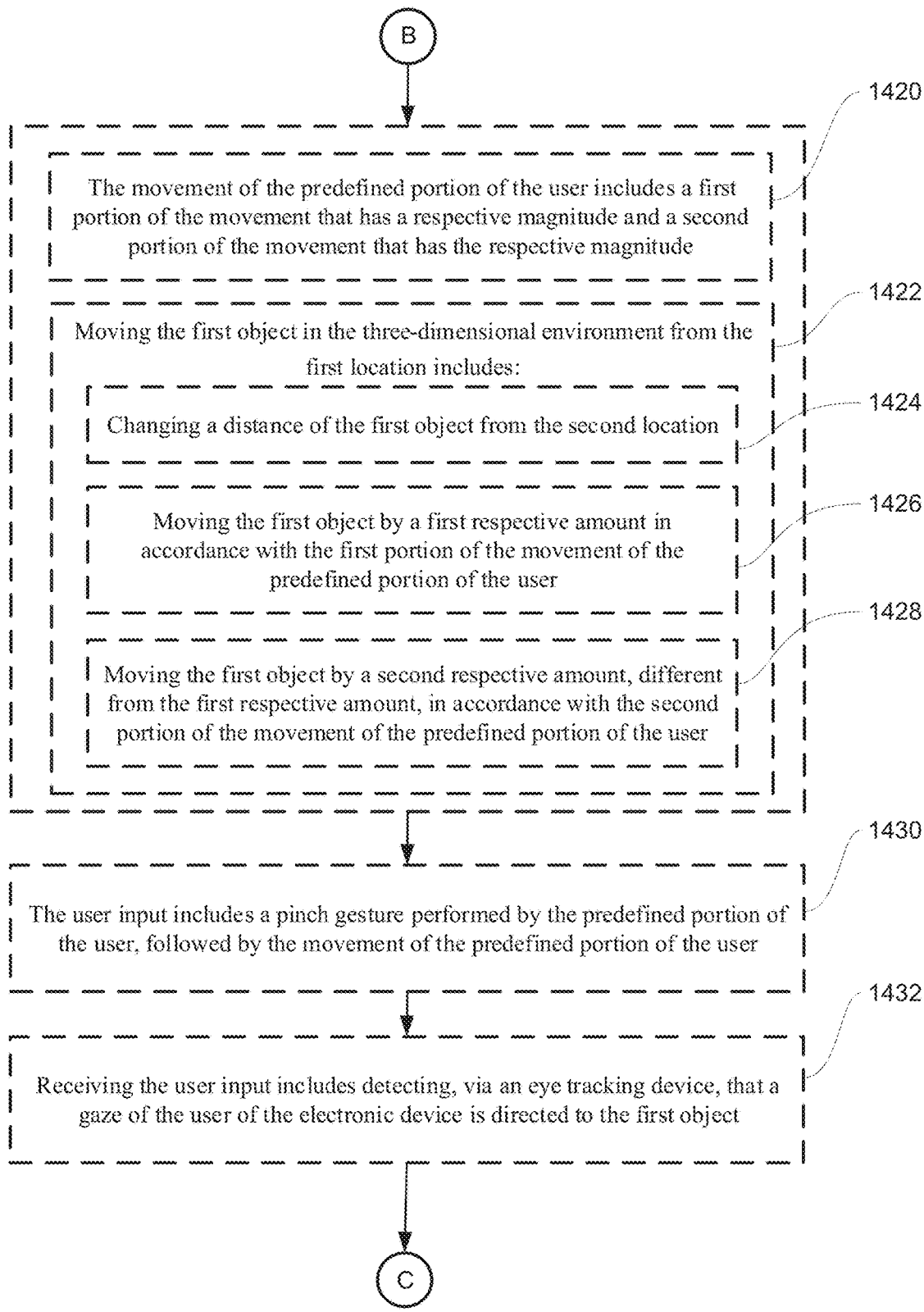
Figure 14D:
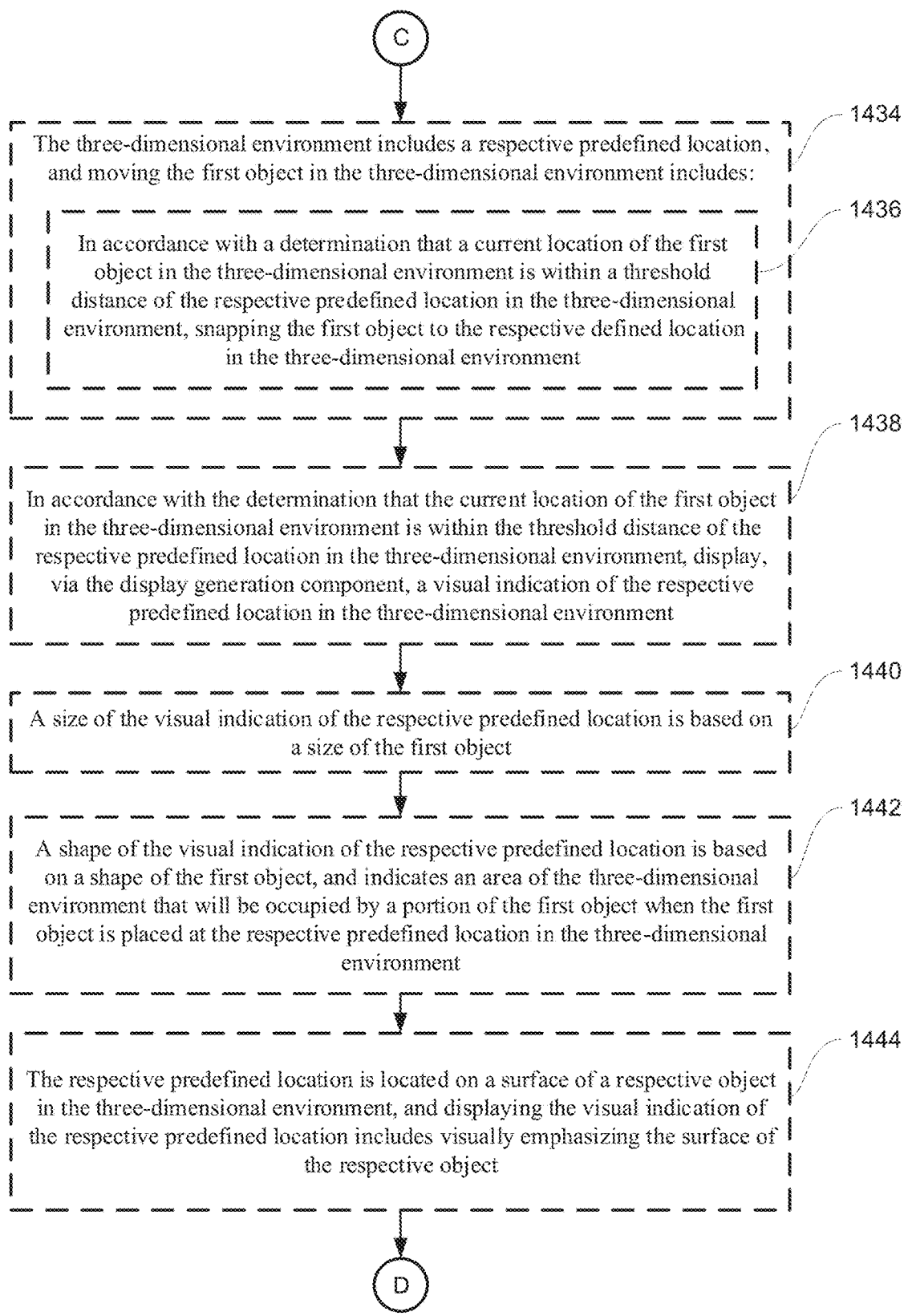
Figure 14E:
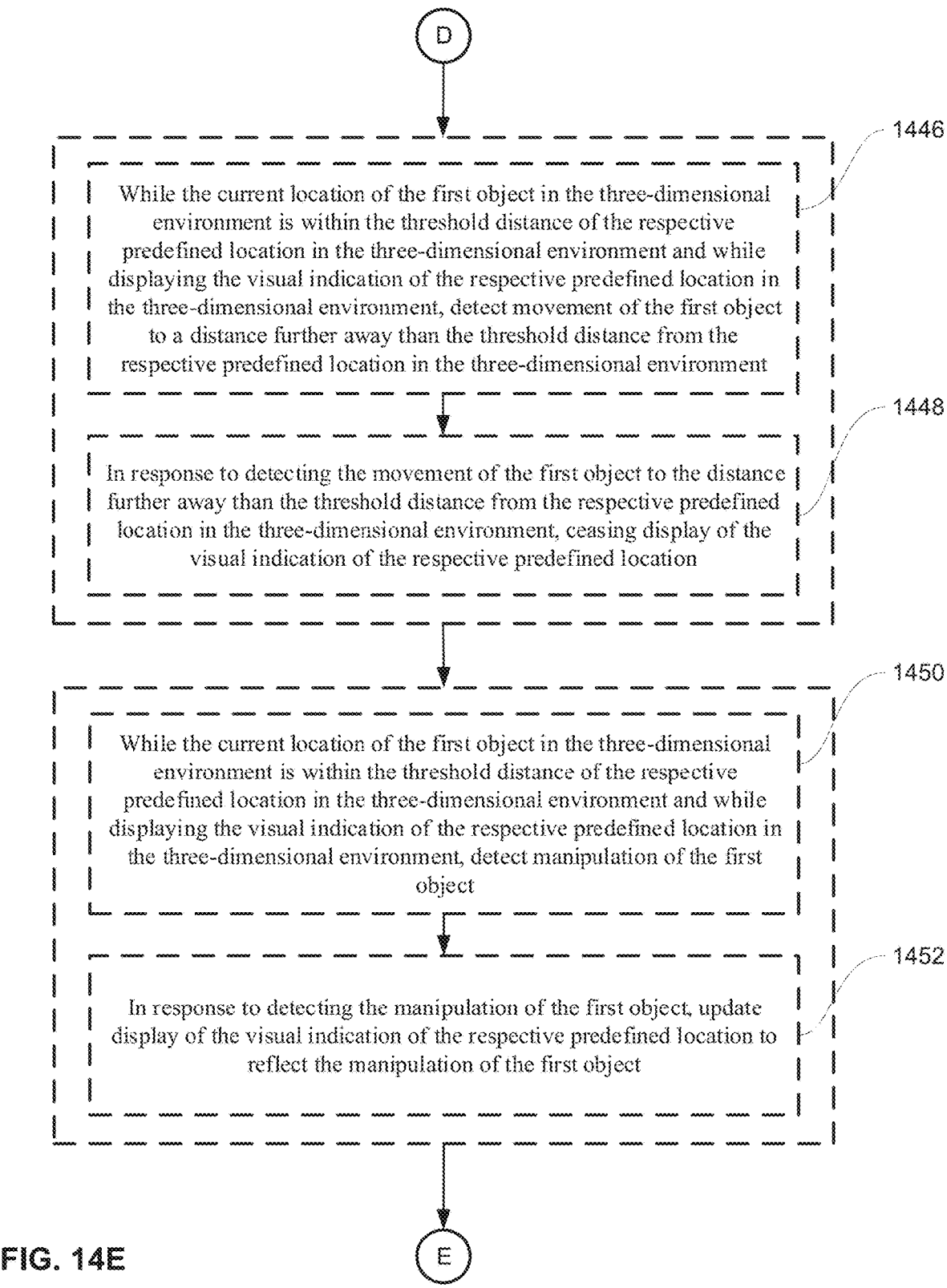
Figure 14F:
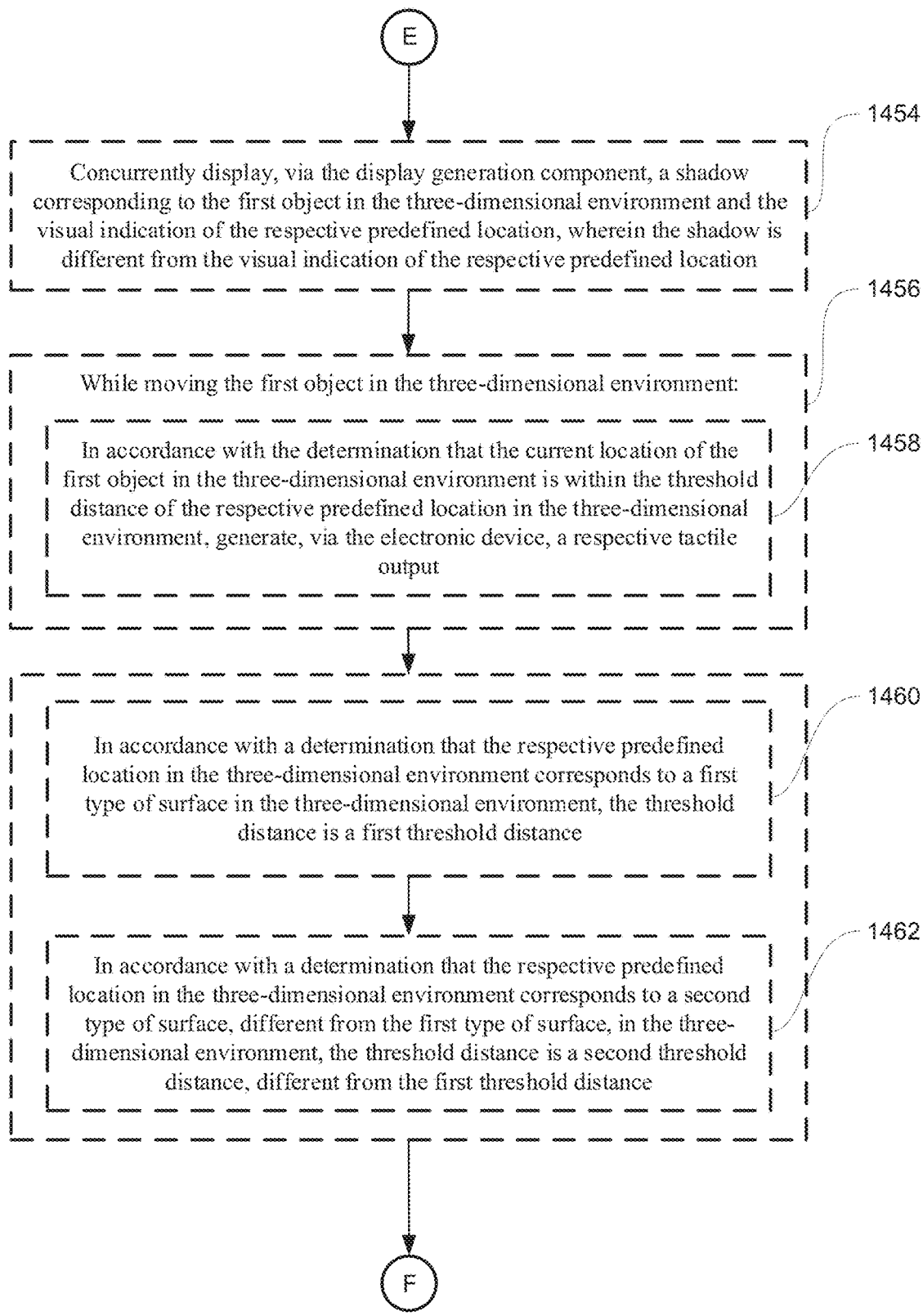
Figure 14G:
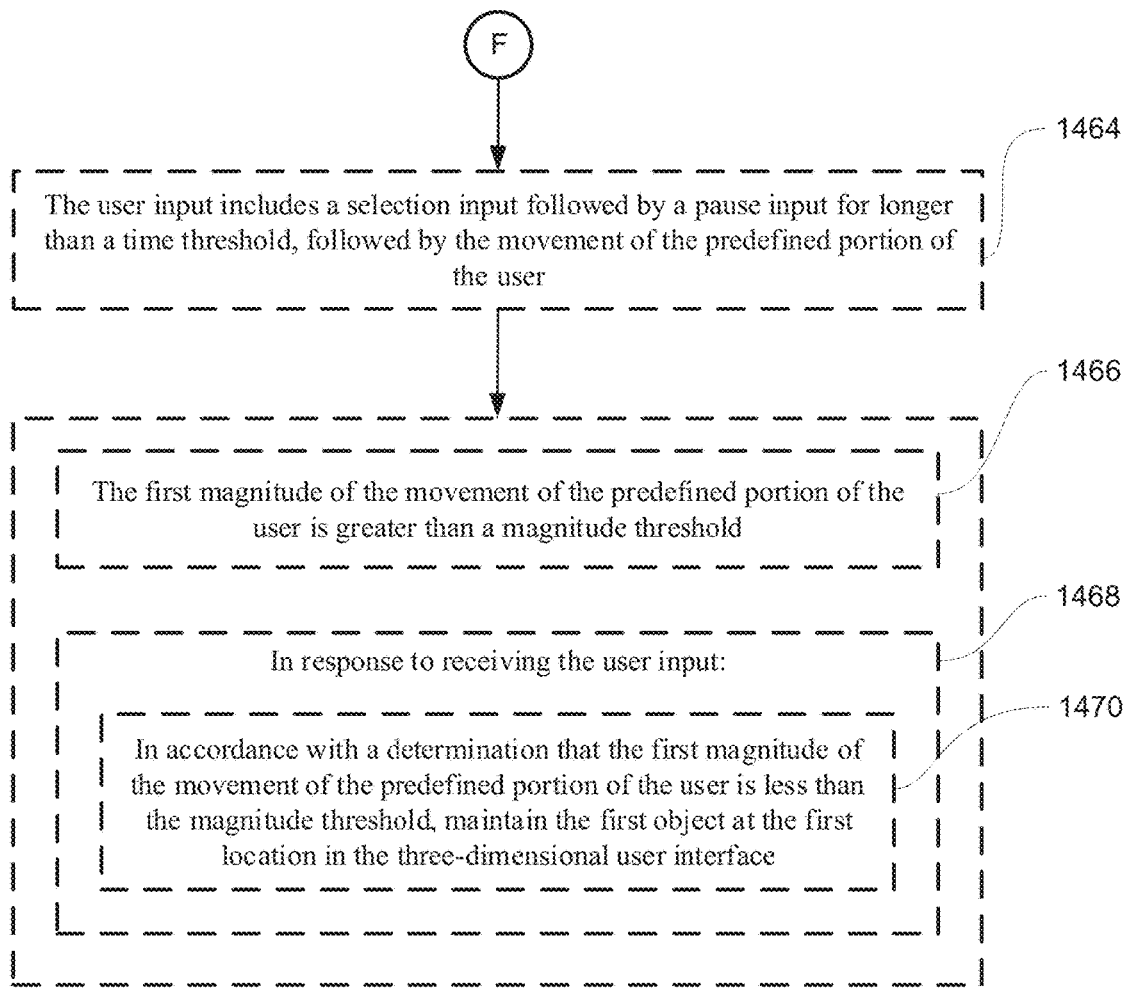

In some embodiments, while receiving the user input (1040) in accordance with a determination that the user input includes a movement of the hand, the electronic device moves (1042) the first virtual object in accordance with the movement of the hand, such as the movement of cylinder 1308 in FIGS. 13A-13B (e.g., while performing the one or more gestures, detecting a movement of the hand of the user). In some embodiments, the movement of the hand is a lateral movement in physical space (e.g., substantially straight, in the x, y, and/or z directions). In some embodiments, in response to the movement of the hand, and in accordance with a determination that the movement is a lateral movement, moving the first virtual object by an amount and direction based on the movement of the hand. For example, if the hand moved rightwards, then the first virtual object moves rightwards. In some embodiments, the amount of the movement depends on the distance of the object from the user, such as described below with respect to method 1400.

In some embodiments, in accordance with a determination that the user input includes a rotation of the hand, the electronic device rotates (1044) the first virtual object in accordance with the rotation of the hand, such as the movement of second hand 916-2 in a rotational manner around manipulation globe 914 in FIG. 9B (e.g., while performing the one or more gestures, detecting a change in the orientation of the hand, such as a rotation of the hand).

In some embodiments, in response to detecting a rotation of the hand, the first virtual object rotates in accordance with the rotation of the hand. For example, if the hand rotated counter-clockwise, then the first virtual object also rotates counter-clockwise. In some embodiments, the rotation of the first virtual object is performed while also moving the first virtual object if, for example, the hand of the user is performing a lateral movement as well as a rotation. In some embodiments, the first virtual object locks into one type of manipulation at a time and thus the first virtual object either moves or rotates based on whether the initial movement of the hand is a lateral movement or a rotational movement or whether the lateral movement or rotational movement is the larger component of the movement of the hand. In some embodiments, the first virtual object is able to perform both the movement and rotation if the user input is a direct manipulation of the first virtual object. For example, if the hand of the user intersected with at least a portion of the first virtual object (or within a threshold distance of a portion of the first virtual object, such as 1 inch, 3 inches, 6 inches, etc.), when the gesture was received.

The above-described manner of moving and rotating a virtual object (e.g., in response to the hand of the user moving and/or rotating, respectively) provides quick, efficient, and intuitive method of moving and rotating the virtual object (e.g., by rotating the virtual object if the orientation of the hand rotated, and moving the virtual object if the hand moved in physical space, without requiring the user to perform additional inputs and select between either rotation or movement manipulations), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the user input includes a first portion that includes one or more hands of the user positioned at one or more locations corresponding to the first type of manipulation, such as in FIG. 9A (e.g., the user input includes a pinch with the left hand and while maintaining the pinch, the right hand approaches to within a threshold distance from the left hand (e.g., 3 inches, 6 inches, 1 foot, 2 feet, 3 feet, etc.).), followed by a second portion that includes additional input from the one or more hands of the user for manipulating the first virtual object in accordance with the additional input (1046), such as in FIG. 9B (e.g., while the hands are within the threshold distance, detecting a pinch with right hand, followed by a movement of the right hand).

In some embodiments, the first manipulation indication is displayed in response to the first and second portion of the user input. In some embodiments, the first manipulation indication is displayed in response to the first portions of the user input.

In some embodiments, updating the three-dimensional environment to include the first manipulation indication occurs in response to detecting the first portion of the user input (1048), such as the display of manipulation globe 914 in FIG. 9A (e.g., displaying the first manipulation indication in response to the first portion of the user input). In some embodiments, while displaying the first manipulation indication and while receiving the second portion of the user input, the first virtual object is manipulated in accordance with the second portion of the user input. In some embodiments, in response to the second portion of the user input, the first manipulation indication is updated to indicate the type of manipulation being performed and/or provide feedback as the manipulation operation is being performed on the first virtual object. In some embodiments, the type of manipulation and/or the amount of manipulation depends on the user's interaction with a portion of the first manipulation indication.

The above-described manner of indicating the type of manipulation being performed (e.g., by displaying a manipulation indication in response to a first portion of a user input corresponding to a request to manipulate a virtual object, before the manipulation is performed) provides quick and efficient feedback of the type of manipulation to be performed before the manipulation occurs (e.g., by displaying an indication before the manipulation occurs, without requiring the user to perform additional inputs and manipulate the object to determine what type of manipulation has been selected), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the user input includes a first portion that includes one or more hands of the user positioned at one or more locations corresponding to the first type of manipulation, such as in FIG. 9A (e.g., the user input includes a pinch with the left hand and while maintaining the pinch, the right hand approaches to within a threshold distance from the left hand (e.g., 3 inches, 6 inches, 1 foot, 2 feet, 3 feet, etc.)), followed by a second portion that includes additional input from the one or more hands of the user for manipulating the first virtual object in accordance with the additional input (1050), such as in FIG. 9B (e.g., while the hands are within the threshold distance, detecting a pinch with right hand, followed by a movement of the right hand).

In some embodiments, the first manipulation indication is displayed in response to the first and second portion of the user input. In some embodiments, the first manipulation indication is displayed in response to the first portions of the user input. In some embodiments, the second portion of the input includes a pinch by the right hand and the first manipulation indication is displayed in response to the pinch by the right hand. In some embodiments, the second portion of the input includes a pinch by the right hand followed by a movement of the right hand and the first manipulation indication is displayed in response to the pinch and movement by the right hand.

In some embodiments, updating the three-dimensional environment to include the first manipulation indication occurs in response to detecting the second portion of the user input (1052), such as visually distinguishing circular element 914-1 in FIG. 9B (e.g., displaying the first manipulation indication in response to the second portion of the user input). In some embodiments, the first manipulation indication indicates the type of manipulation being performed and/or the amount of manipulation being performed. For example, if the manipulation is a rotation of the first virtual object, the manipulation indication is a circle that includes an indicator that travels along the curve of the circle to indicate the current position of the user input and how the first virtual object will be rotated. In some embodiments, the circle is oriented in the same orientation as the rotation (e.g., if the object is being rotated in the x-y direction, the circle extends in the x-y direction, etc.).

The above-described manner of displaying an indication of a manipulation (e.g., while receiving the input for performing the manipulation and while the virtual object is being manipulated) provides quick and efficient feedback of the manipulation as the manipulation is occurring (e.g., by displaying an indication during manipulation, thus providing the user with feedback on the type of manipulation being performed, how much manipulation is being performed or has been performed, and how to continue performing the manipulation), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while receiving the user input (1054) the electronic device displays (1056) an input element at a location on the first manipulation indication that indicates a characteristic of the first type of manipulation being performed and corresponds to a location of the hand of the user, such as selection indicator 918 in FIG. 9B (e.g., display an indicator on the first manipulation indication corresponding the location of the first manipulation indication that the user is interacting with).

For example, if the hand of the user approaches a portion of the first manipulation indication, the portion of the first manipulation indication closest to the hand includes the indicator. In some embodiments, if the hand of the user performs a respective gesture, such as a pinch gesture, the indication is updated to indicate that the user has selected the respective type of manipulation to be performed on the first virtual object. In some embodiments, as the hand moves around and/or as the hand follows the curvature of the first manipulation indication (e.g., if the first manipulation indication is a circle), the indicator on the first manipulation indication moves along the border of the first manipulation indication following the movement of the hand. Thus, in some embodiments, the indicator indicates a position on the first manipulation indication that corresponds to the position of the hand of the user (e.g., the indicator is a proxy for the location of the hand that is displayed on the first manipulation indication) and the user is able to cause the indicator to move along the first manipulation indication by moving along the curvature of the first manipulation indication. In some embodiments, the first manipulation indication is only displayed in response to the user input if the user input is an indirect manipulation input (e.g., if the representation of the hand is not near the first virtual object, at the location of the first virtual object, or is more than a threshold distance from the first virtual object, such as 3 inches, 6 inches, 1 foot, 3 feet, etc.).

The above-described manner of displaying an indication of a manipulation (e.g., displaying an input element on the first manipulation indication that indicates the corresponding selection location of the hand of the user) provides quick and efficient feedback that the user is correctly performing a manipulation (e.g., by displaying the input element on the manipulation indication itself, without requiring the user to perform additional inputs to determine whether the user is performing the correct gestures to manipulate the virtual object), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, in accordance with a determination that the hand of the user is performing a first gesture, the input element has a first visual appearance (1058), such as selection indicator 918 having a unselected appearance in FIG. 9B (e.g., while displaying the input element on the first manipulation indication, if the hand of the user is performing a pinch or selection gesture, then the input element is displayed with a first visual appearance indicating that the user has performed the selection gesture). For example, the input element is displayed smaller, larger, and/or with a different color than if the user were not performing the first gesture. Thus, while the hand of the user is performing the first gesture, the input element indicates what manipulation is being performed (e.g., by being displayed on the portion of the first manipulation indication associated with the type of manipulation) and how the manipulation is being performed (e.g., by moving along the portion of the first manipulation indication based on the amount of the manipulation and the amount of movement of the hand).

In some embodiments, in accordance with a determination that the hand of the user is not performing the first gesture, the input element has a second visual appearance, different from the first visual appearance (1060), such as selection indicator 918 having a selected appearance in FIG. 9B (e.g., while displaying the input element on the first manipulation indication, if the hand of the user is not performing a pinch or selection gesture, then the input element is displayed with a second visual appearance indicating that the user is not performing the selection gesture). For example, the input element is displayed smaller, larger, and/or with a different color than if the user were performing the first gesture. Thus, while the hand of the user is not performing the first gesture, the input element indicates which manipulation will be performed (e.g., by being displayed on the portion of the first manipulation indication associated with a respective type of manipulation) and how to perform the manipulation once selected (e.g., by moving along the portion of the first manipulation indication indicating the movement of the hand required to perform the respective manipulation).

The above-described manner of displaying an indication of a manipulation (e.g., displaying an input element on the first manipulation indication that changes visual appearance if the user is performing a gesture) provides quick and efficient feedback that the user is correctly performing a manipulation (e.g., by changing the visual characteristic of the input element when the user is properly performing the gesture to perform the manipulation, without requiring the user to perform additional inputs to determine whether the user is performing the correct gestures to manipulate the virtual object), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, in response to detecting a termination of the first gesture by the hand of the user (e.g., the user no longer maintaining the pinch gesture by the hand), the electronic device moves (1062) the input element away from the location on the first manipulation indication that indicates the characteristic of the first type of manipulation being performed to a location in the three-dimensional environment corresponding to a current position of the hand of the user relative to the first virtual object, such as if selection indicator 918 moved to a potential pinch location of second hand 916-2 in FIG. 9B (e.g., detaching the input element (e.g., a selection point indicator) off the first manipulation indication and re-positioning the input element at a location associated with the hand of the user).

In some embodiments, the input element is located between the thumb and forefinger of the hand of the user (e.g., the location of a pinch if the thumb and forefinger were performing a pinch). In some embodiments, an animation is displayed moving the input element from the position on the first manipulation indication to the position of the hand. Thus, in some embodiments, the input element indicates that the user is not yet interacting with the first manipulation indication and/or that the hand of the user is farther than the threshold distance from the first manipulation indication that a selection input would not cause the selection of the first manipulation indication.

The above-described manner of moving a selection point indicator from the manipulation indicator to the representation of the hand (e.g., in response to detecting a termination of the selection input) provides quick and efficient feedback that the user is no longer performing a gesture required for manipulation (e.g., by moving the input element that indicates the user's selection from the manipulation indicator to the representation of the hand to indicate that the user is no longer performing a selection of a manipulation operation, without requiring the user to perform additional inputs to determine whether the user is performing the correct gestures to manipulate the virtual object), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while the first virtual object is located at a first location in the three-dimensional environment that is a first distance from a respective location in the three-dimensional environment corresponding to the user (e.g., while the first virtual object is at a first location in the three-dimensional environment and the manipulation indication is displayed at, around, or near the first virtual object), the electronic device moves (1064) the first virtual object to a second location in the three-dimensional environment that is a second distance, different from the first distance, from the respective location in the three-dimensional environment, such as if manipulation globe 914 were displayed around cylinder 912 and cylinder 912 were moved farther away from the user in FIG. 9A (e.g., moving the first virtual object to a second location that is a second distance away from the user, such as in response to a user input to move the first virtual object or detecting that the user has moved farther away from the first virtual object). In some embodiments, the amount that the first virtual object is moved depends on the distance of the first virtual object to the user, as described below with respect to method 1400.

In some embodiments, in response to moving the first virtual object to the second location in the three-dimensional environment (1066), the electronic device changes (1068) a size of the first virtual object by a first amount in accordance with moving the first virtual object to the second location, such as if the size of cylinder 912 changed due to moving further from the user in FIG. 9A (e.g., changing the size of the first virtual object proportionally to the change in distance of the first virtual object from the user (e.g., changing the displayed size of the first virtual object due to the perspective effect)).

In some embodiments, the electronic device changes (1070) a relative size of the first manipulation indication with respect to the first virtual object, such as if the size of manipulation globe 914 does not change by the same proportionate amount as the change in size of manipulation globe 914 (e.g., as the first virtual object moves in the three-dimensional environment (e.g., closer, farther, or laterally), the first manipulation indication maintains its position with respect to the first virtual object (e.g., moves in accordance with the movement of the first virtual object)).

In some embodiments, the size of the first manipulation indication is changed by an amount that is not proportional to the amount that the first virtual object changed (e.g., less than or more than the change in the size of the first virtual object, even though the first manipulation indication moved in the three-dimensional environment in accordance with the movement of the first virtual object). In some embodiments, as the first virtual object moves farther away from the user, the change in the size of the first manipulation indication is less than the change in size of the first virtual object. In some embodiments, the size of the first manipulation indication is not decreased proportionately with the first virtual object to maintain the viewability of the first manipulation indication. For example, if the first virtual object is five feet away from the user and is displayed with a first size and the first manipulation indication is displayed around the first virtual object, and the first virtual object is then moved to be ten feet away from the user and is displayed at half of its original size (e.g., due to being twice as far away), the first manipulation indication moves with the first virtual object to remain displayed around the first virtual object, but instead of reducing its size in half (e.g., as the change in distance would otherwise suggest), the first manipulation indication does not reduce in size or reduces size by only 10% (e.g., to maintain visibility of the first manipulation indication). In some embodiments, at less than a first threshold distance (e.g., less than 1 foot, 3 feet, 5 feet, 10 feet, etc.), the first manipulation indication changes size by the same proportionate amount of change as the first virtual object. In some embodiments, at a distance greater than a threshold distance (e.g., more than 5 feet, 10 feet, 20 feet, 30 feet, etc.), the size of the first manipulation indication is fixed and does not change in response to the first virtual object changing size and/or distance.

The above-described manner of displaying the manipulation indication (e.g., while displaying the indication at or near the first virtual object, in response to the first virtual object moving farther away or closer to the user and changing a size in response, changing the size of the manipulation indication disproportionately from the change in the size of the first virtual object) provides quick and efficient indication of the manipulation of the virtual object (e.g., by not proportionally reducing the size of the manipulation indication to maintain viewability of the manipulation indicate, without requiring the user to perform additional inputs to move the virtual object closer to the user), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, detecting the user input corresponding to the request to manipulate the first virtual object includes detecting a first gesture performed by the hand of the user directed to a respective location of the first manipulation indication (e.g., while the first manipulation indication is displayed, receiving a pinch gesture from the hand of the user pinching a portion of the first manipulation indication), and a movement of the hand of the user while maintaining the first gesture to manipulate the first virtual object in accordance with the movement of the hand of the user and the respective location of the first manipulation indication (1072), such as pinching at or near a respective circular element as shown in FIG. 9B (e.g., the movement of the hand while pinching (e.g., selecting) a respective circular element (or respective curved element) causes the virtual object to rotate in the respective orientation based on the movement of the hand).

In some embodiments, the first manipulation indication includes one or more portions corresponding to different types of manipulations. For example, the first manipulation indication includes three circular elements (or curved elements), each corresponding to a different rotation orientation (e.g., pitch, row, and yaw) and interacting with a respective circular element (or respective curved element) performs the respective rotation on the first virtual object.

In some embodiments, a rotational movement of the hand in the direction of the circular element (or curved element) causes the virtual object to rotate by an amount proportional to the amount of rotation around the circular element (or curved element). For example, if the hand moved around the circular element (or curved element) by 90 degrees, then the virtual element is rotated 90 degrees.

The above-described manner of manipulating a virtual object (e.g., in response to a gesture directed to a portion of the manipulation location and a movement of the hand while maintaining the gesture) provides quick and efficient method of manipulating the virtual object (e.g., by rotating the virtual object based on which portion of the manipulation indication is selected and the amount of movement of the hand), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while receiving the user input (1074), in accordance with a determination that the request to manipulate the first virtual object corresponds to a request to move the first virtual object (1076) (e.g., a request to move the first virtual object to a different location in the three-dimensional environment), the electronic device moves (1078) the first virtual object in accordance with the user input, such as in FIGS. 13A-13B (e.g., moving the first virtual object in the three-dimensional environment). In some embodiments, the user input includes a movement component and the first virtual object moves in accordance with the movement component of the user input.

In some embodiments, in accordance with a determination that the first virtual object is less than a threshold distance from a first predetermined location in the three-dimensional environment associated with a second (e.g., virtual) object, the electronic device moves (1080) the first virtual object to the first predetermined location, such as snapping cylinder 1308 to the snap location associated with target 1314 in FIG. 13B (e.g., if the first virtual object is moved to a location that is less than a threshold distance from a predetermined snap location (e.g., 1 inch, 3 inches, 6 inches, 1 foot, etc.), snapping the first virtual object to the predetermined snap location). In some embodiments, the predetermined snap location is a portion of another object (e.g., virtual or real), the surface of another object, the surface of a wall, the floor, etc.

The above-described manner of moving a virtual object (e.g., by snapping the virtual object to a particular location in the three-dimensional environment if the object is brought to within a threshold distance of another object) provides quick and efficient method of moving the virtual object (e.g., by automatically aligning the virtual object with another object, without requiring the user to perform additional inputs to perfectly position the virtual object), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the first type of manipulation includes rotating the first virtual object, and the first manipulation indication includes a plurality of manipulation elements associated with a plurality of different types of rotations of the first virtual object (1082), such as manipulation globe 914-1 including a plurality of circular elements associated with different rotation orientations in FIG. 9A (e.g., the first manipulation indication includes a plurality of elements corresponding to different types of manipulations). For example, the first manipulation indication includes a set of three circular elements (or curved elements), each of which corresponds to a different orientation of rotation (e.g., pitch, yaw, and roll rotations). In some embodiments, interacting with a respective circular element (or respective curved element) causes the first virtual object to rotate in the corresponding orientation (and optionally the first virtual object will not rotate in the other orientations while the respective circular element is selected).

The above-described manner of rotating a virtual object (e.g., by displaying a plurality of manipulation elements associated with different types of rotations) provides quick and efficient method of rotating the virtual object (e.g., by providing the user multiple elements for performing different types of rotations, without requiring the user to perform additional inputs to change the type of rotation to perform on the first virtual object), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while displaying the first manipulation indication that includes the plurality of manipulation elements (1084), in accordance with a determination that the hand of the user is at a respective relative position with respect to a first manipulation element of the plurality of manipulation elements that corresponds to a first type of rotation of the first virtual object, the electronic device visually distinguishes (1086) the first manipulation element of the plurality of manipulation elements from other manipulation elements of the plurality of manipulation elements, such as the highlighting of a respective circular element in FIG. 9B (e.g., if the representation of the hand is within a threshold distance (e.g., within 1 inch, 3 inches, 6 inches, 1 foot, 3 feet, etc.) of a respective manipulation element (and optionally not closer to another manipulation element), then highlight, change the color of, or otherwise visually distinguish the respective manipulation element from the other manipulation elements).

In some embodiments, while displaying the first manipulation element as visually distinguished from the other manipulation elements, the electronic device detects (1088) a respective gesture performed by the hand of the user followed by movement of the hand while maintaining the respective gesture, such as in detecting Gesture C performed by second hand 916-2 and a movement of second hand 916-2 rotating around manipulation globe 914 in FIG. 9B (e.g., detecting a pinch gesture by the hand of the user followed by a movement of the hand). In some embodiments, a pinch gesture while the first manipulation element is visually distinguished corresponds to a selection of the first manipulation element and a request to perform the manipulation associated with the first manipulation element.

In some embodiments, in response to detecting the respective gesture performed by the hand of the user followed by movement of the hand while maintaining the respective gesture, the electronic device performs (1090) the first type of rotation on the first virtual object in accordance with the movement of the hand, such as the rotation of cylinder 912 in FIG. 9B (e.g., performing the type of rotation associated with the first manipulation element. For example, if the hand is closest to the "roll" manipulation element (e.g., of the "roll", "pitch" and "yaw" manipulation elements), then a pinch gesture causes selection of the "roll" manipulation, and a movement of the hand causes the virtual object to rotate in the "roll" orientation).

In some embodiments, the amount of rotation (e.g., magnitude), direction of rotation, and/or speed of rotation is based on the movement of the hand of the user. For example, if the movement of the hand of the user rotated clockwise around the first manipulation element, then the first virtual object is rotated clockwise. In some embodiments, if the movement of the hand rotates by 90 degrees, then the first virtual object is rotated by 90 degrees in the respective direction (e.g., clockwise or counter-clockwise based on how the direction of rotation of the hand). In some embodiments, if the speed of the movement of the hand is 45 degrees per second, then the first virtual object is rotated at 45 degrees per second.

The above-described manner of rotating a virtual object (e.g., by visually distinguishing the manipulation element that is selected and rotating the virtual object in accordance with the movement of the hand based on the selected manipulation element) provides quick and efficient method of rotating the virtual object (e.g., by providing the user multiple elements for performing different types of rotations and performing the rotation type that was highlighted when the respective gesture was performed by the hand of the user, without requiring the user to perform additional inputs to select the type of rotation to perform on the first virtual object), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while displaying the first manipulation indication, the electronic device detects (1092) that the hand of the user has moved more than a threshold distance away from the first manipulation indication, such as if second hand 916-2 moved to farther than a threshold distance from manipulation globe 914 in FIG. 9B (e.g., the hand of the user has moved away from the first manipulation indication by a threshold amount (e.g., 6 inches, 1 foot, 3 feet, 5 feet, etc.), optionally while not performing the first gesture).

In some embodiments, in response to detecting that the hand of the user has moved more than the threshold distance away from the first manipulation indication, the electronic device ceases (1094) display of the first manipulation indication, such as ceasing display of manipulation globe 914 in FIG. 9B. In some embodiments, the first manipulation indication is displayed in response to detecting that a first hand of the user is performing a first gesture and the second hand is within a threshold distance of the first hand. Thus, in some embodiments, if the first hand is no longer performing the first gesture and/or if the second hand is no longer within the threshold distance of the first hand, then the first manipulation indication is no longer displayed. In some embodiments, if the user is interacting with the first manipulation indication (e.g., maintaining a pinch gesture) and moves the hand farther than the threshold distance away, then the first manipulation indication continues to be displayed and respective movements of the hand continue to interact with the first manipulation indication to cause performance of the respective manipulation on the first virtual object.

The above-described manner of ceasing display of a manipulation indication (e.g., in response to detecting that the hand of the user has moved away from the manipulation indication) provides quick and efficient method of removing the manipulation indication from display when it is not likely to be used (e.g., when the hand of the user is more than a threshold distance away from the manipulation indication, without requiring the user to perform additional inputs to manually remove the manipulation indication from distance), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the user input includes a first gesture performed by the hand of the user, followed by a movement of the hand of the user (1096), such as second hand 916-2 performing Gesture C in FIG. 9B. In some embodiments, while displaying the first manipulation indication (1098), the electronic device detects (1099) that the hand of the user has moved more than a threshold distance away from the first manipulation indication, such as if second hand 916-2 moved more than the threshold distance away from manipulation globe 914 in FIG. 9B (e.g., the hand of the user has moved away from the first manipulation indication by a threshold amount (e.g., 6 inches, 1 foot, 3 feet, 5 feet, etc.)).

In some embodiments, in response to detecting that the hand of the user has moved more than the threshold distance away from the first manipulation indication (1097), in accordance with a determination that the hand of the user is maintaining the first gesture, the electronic device maintains (1095) display of the first manipulation indication, such as if second hand 916-2 maintained Gesture C while moving to more than the threshold distance away from manipulation globe 914 in FIG. 9B, maintain display of manipulation globe 914 (e.g., if the hand of the user is maintaining the first gesture, then the first manipulation indication is active (e.g., still selected) and a manipulation is being performed or will be performed).

In some embodiments, if the hand of the user is maintaining the first gesture, then movement of the hand causes a manipulation to be performed on the first virtual object. For example, if the user is performing a resizing manipulation, if the hand of the user moved more than the threshold distance away from the first manipulation indication, then the first object is enlarged (e.g., resized to a larger size) while maintaining display of the manipulation indication. In another example, if the user is performing a rotation manipulation, if the hand of the user moved more than the threshold distance away from the first manipulation indication, the rotation manipulation is still active and a user is able to move the hand in a circular motion to cause rotation of the first virtual object.

In some embodiments, in accordance with a determination that the hand of the user is not maintaining the first gesture, the electronic device ceases (1093) display of the first manipulation indication, such as if second hand 916-2 did not maintain Gesture C while moving to more than the threshold distance away from manipulation globe 914 in FIG. 9B, cease display of manipulation globe 914 (e.g., if the hand of the user is not performing the first gesture, then no manipulation is being performed, and thus cease display of the first manipulation indication and do not perform the manipulation on the first virtual object).

The above-described manner of ceasing display of a manipulation indication (e.g., in response to detecting that the hand of the user has moved away from the manipulation indication if the hand is not performing the first gesture, but maintaining display of the manipulation indication if the hand is performing the first gesture) provides quick and efficient method of providing the manipulation indication (e.g., maintaining the display of the manipulation indication when the hand of the user is actively performing a manipulation, but not maintaining the display of the manipulation indication when the hand is not actively performing a manipulation, without requiring the user to perform additional inputs to manually remove the manipulation indication from distance), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while manipulating the first virtual object (1091), in accordance with a determination that one or more object manipulation criteria are satisfied, including a criterion that is satisfied when a current state of manipulation of the first virtual object is within a manipulation threshold of a predetermined state of manipulation of the first virtual object, the electronic device causes (1089) generation of a tactile output corresponding to the satisfaction of the object manipulation criteria, such as if rotation of cylinder 912 in FIG. 9B and/or resizing of cylinder 912 in FIG. 9C reaches and/or approaches a predetermined snap point, generate a tactile output to indicate that the cylinder 912 has snapped to a particular rotation or size (e.g., generating a tactile output when the object manipulation criteria are satisfied).

In some embodiments, the one or more object manipulation criteria are satisfied when a manipulation of the first virtual object snaps into a respective snap position. For example, if the manipulation is a rotational input, then if rotation of the first virtual object is within a threshold angle from a preset rotation interval (e.g., every 15 degrees, 30 degrees, 45 degrees, 90 degrees, 180 degrees, etc.), the first virtual object snaps to the preset rotation, and a tactile output is generated. In another example, if the manipulation is a movement manipulation, then if the first virtual object is within a threshold distance from a respective object or surface, the first virtual object snaps to the respective object or surface, and a tactile output is generated. In some embodiments, the device communicates to the pointing device that one or more object manipulation criteria are satisfied and in response, the pointing device generates a tactile output. In some embodiments, the device transmits a command to the pointing device to generate a tactile output.

The above-described manner of generating a tactile output (e.g., when manipulation of the first virtual output snaps to a respective magnitude of manipulation) provides quick and efficient method of providing feedback that the manipulation has reached a respective position (e.g., by generating a tactile output when the first virtual object snaps to a particular amount of manipulation, without requiring the user to visually determine whether the object has snapped to a particular amount of manipulation), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the tactile output is generated at an external input device of the one or more input devices (1087), such as at a stylus being held by a hand of the user, such as in FIG. 7A (e.g., generating the tactile output at an input device that is external to and in communication with the electronic device). In some embodiments, the input device is a stylus device being held by a hand of the user and the tactile output is generated at the stylus device, optionally at the location where the user input is performed (e.g., where the forefinger contacts the stylus). In some embodiments, the user input includes a user interacting with the stylus. For example, a selection input includes detecting a tap-and-hold gesture on the stylus and detecting the termination of the user input includes detecting a lift-off of the finger from the stylus. In some embodiments, if the user is using a stylus for user input, the device uses the location of the tip of the stylus instead of the location of the hand and/or the location of the pinch gesture.

The above-described manner of generating a tactile output (e.g., at an input device that is external to the electronic device) provides quick and efficient method of providing feedback to the user (e.g., by generating a tactile output at the input device with which the user is performing inputs), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, before receiving the user input, the electronic device displays (1085), in the three-dimensional environment, a first user interface element at a location associated with a representation of a second hand of the user, wherein the first user interface element is associated with adding content to the three-dimensional environment, such as displaying an indicator, similar to selection indicator 918 in FIG. 9B, at a potential pinch position of second hand 916-2 (e.g., display a drawing indicator at a location associated with a representation of the second hand of the user).

In some embodiments, the drawing indicator is a curved (e.g., an arc) or circular element displayed at a location between the thumb and forefinger of the representation of the second hand (e.g., at a location of a pinch, if the second hand were to pinch the thumb and forefinger, a location associated with the pinch, or a predetermined location relative to the location of the pinch, such as one inch in front of the location of the pinch, two inches, six inches, etc.). In some embodiments, in response to detecting a pinch gesture by the second hand of the user, the device enters into a drawing mode in which content is drawn (e.g., inserted) in the three-dimensional environment at the location of the pinch, as the representation of the second hand moves around the three-dimensional environment (e.g., in accordance with the movement of the second hand).

The above-described manner of drawing in a three-dimensional environment (e.g., by displaying a drawing indicator at the representation of the second hand such that when the user performs a pinch gesture, the user is able to draw in the three-dimensional environment) provides quick and efficient method of indicating the location where the drawn content will be inserted (e.g., by displaying a drawing indicator at the location where drawn content will be inserted when the user performs a pinch gesture, without requiring the user to perform additional inputs to determine where drawn content will be inserted), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, in response to receiving the user input, the electronic device ceases (1083) display of the first user interface element (e.g., in response to a user input for manipulating a virtual object, cease displaying the drawing indicator). In some embodiments, when the drawing indicator is no longer displayed, movements of the hand of the user cause manipulation of the virtual object. In some embodiments, upon detecting a termination of the user input, the first user interface element is re-displayed and the device enters into content entry mode (e.g., as opposed to object manipulation mode) such that a selection input followed by movement of the hand of the user causes content to be added to the three-dimensional environment (e.g., the user is able to "drawn" into the three-dimensional environment).

The above-described manner of ceasing display of a drawing indicator (e.g., in response to and when the user is performing a manipulation on a virtual object) provides quick and efficient method of removing the drawing indicator when the device is not in a state to insert drawn content (e.g., automatically remove display of the drawing indicator when the user is not able to draw content due to manipulating a virtual object, without requiring additional inputs to manually disable display of the drawing indicator), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the first type of manipulation includes resizing of the first virtual object in the three-dimensional environment (1081), such as in FIG. 9C. In some embodiments, detecting the user input corresponding to a request to resize the first virtual object includes detecting a first gesture performed by a first hand of the user and a second gesture performed by a second hand of the user, and detecting a movement of the first hand relative to the second hand while maintaining the first gesture and the second gesture, respectively (1079), such as in FIG. 9C (e.g., the user input for resizing the first virtual object includes performing a pinch gesture with both hands of the user and moving the hands such that the distance between the two pinches increases or decreases (e.g., to cause an enlarging or shrinking of the first virtual object, respectively). In some embodiments, the first hand and the second hand were separated by a respective distance when the first gesture and the second gesture were detected (1077), such as in FIG. 9C (e.g., when the pinches were initially performed by both hands, the distance between the two pinches is a respective distance).

In some embodiments, while receiving the user input, the electronic device detects (1075) a respective amount of movement of the first hand relative to the second hand, such as the movement of second hand 916-2 away from first hand 916-1 in FIG. 9C (e.g., a movement by one or both hands such that the distance between the two hands changes (e.g., the distance between the pinch location of the two hands changes) by a respective amount).

In some embodiments, in response to detecting the respective amount of movement of the first hand relative to the second hand (1073), in accordance with a determination that the respective distance is a first distance, the electronic device resizes (1071) the first virtual object by a first amount in accordance with the respective amount of movement of the first hand relative to the second hand, such as in FIG. 9C (e.g., if the initial distance between the two pinch locations is a first distance, then resize the first virtual object by a first amount), and in accordance with a determination that the respective distance is a second distance, different from the first distance, the electronic device resizes (1069) the first virtual object by a second amount, different from the first amount, in accordance with the respective amount of movement of the first hand relative to the second hand (e.g., if the initial distance between the two pinch locations is a second distance, then resize the first virtual object by a second amount).

Thus, the amount and/or speed that the first virtual object is resized is based on one or both of the initial distance between the pinch locations of the two hands and the change in the distance between the pinch locations. In some embodiments, the amount that the first virtual object is resized is based on the proportionate amount of change in the distance between the hands. In some embodiments, if the distance between the two hands is a first distance, then in response to a change in the distance between the two hands by a first amount, the first virtual object is resized by a first amount, but if the distance between the two hands is a second distance, then in response to the same change in distance between the two hands (e.g., by the first amount), the first virtual object is resized by a second, different amount. In some embodiments, if the initial distance between the two hands is small and the distance increases by a certain amount, then the object is resized (e.g., increased) by more than if the distance between the two hands is large and the distance increased by the same amount. For example, because the amount of change is a greater percentage when the initial distance between the two hands is small, the amount of resizing is greater than when the initial distance between the two hands is small. For example, if the initial distance between the hands is 1 foot and the change in the distance is 1 foot (e.g., resulting in the final distance being 2 feet), then because the change in the distance is a 100% increase, the size of the first virtual object is increased by 100% (e.g., doubled in size). In another example, if the initial distance between the hands is 2 feet and the change in the distance is a foot, then because the change in the distance is a 50% increase, the size of the first virtual object is increased by 50% (e.g., even though the change in the distance is the same 1 foot as in the previous example). In some embodiments, if the initial distance between the two hands is small and the distance decreased by a certain amount, then the object is resized (e.g., decreased) by more than if the distance between the two hands is large and the distance decreased by the same amount. For example, because the amount of change is a greater percentage when the initial distance between the two hands is small, the amount of resizing is greater than when the initial distance between the two hands is small. In some embodiments, if the initial distance between the two hands is small and the distance increases by a certain amount, then the object is resized by less than if the distance between the two hands is large and the distance increased by the same amount (e.g., the opposite of described above). In some embodiments, the speed of resizing the first virtual object is based on the speed of change in the distance between the two hands. For example, in some embodiments, the first virtual object is resized contemporaneously with the change in the distance between the two hands (e.g., at the same time, or within a threshold time after the change in the distance of the two hands, such as 0.5 seconds, 1 second, 3 seconds, 5 seconds, etc.), and as the distance between the hand changes, the first virtual object is resized accordingly. Thus, in some embodiments, if the distance between the hands changes quickly, the first virtual object is resized quickly, and if the distance between the hands changes slowly, the first virtual object is resized slowly, etc.

The above-described manner of resizing a virtual object (e.g., by an amount based on the initial distance between the hands of the user and the change in distance between the hands of the user) provides quick and efficient method of resizing the virtual object (e.g., based on the proportionate amount of increase or decrease in distance between the hands of the user, without requiring the user to perform additional inputs to change the scale of the resizing), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, a reference point of the first type of manipulation is defined based on a respective location of a predefined portion of the hand of the user (e.g., a respective manipulation reference point is set at a predefined location with respect to the left hand of the user), and an amount of the first type of manipulation is based on a distance of a second hand of the user relative to the reference point of the first type of manipulation (1067), such as if the reference point were at the pinch point of first hand 916-1 in FIG. 9B (e.g., the amount of manipulation is based on the distance of the right hand from the reference point for the manipulation).

In some embodiments, the reference point is a current location, in the three-dimensional environment, of a pinch point of a pinch gesture performed by a first hand of the user. In some embodiments, the reference point is a location between the pinch gestures of the left hand and the right hand of the user. For example, if the user is performing a resizing manipulation operation and the distance between the right hand and the reference point is 3 inches, and the right hand moved away from the reference point by 3 inches, then in some embodiments, the first virtual object is doubled in size (e.g., the distance doubled), but if the right hand moved away by 6 inches, then the first virtual object is tripled in size (e.g., the distance tripled). In another example, if the right hand moved closer to the reference point by 1.5 inches (e.g., halved the distance), then the size of the first virtual object is halved. Thus, in some embodiments, the defined reference point determines the magnitude of the manipulation based on the change in the distance from the one or more hands of the user to the reference point, or a change in the orientation of the one or more hands from the reference point.

In some embodiments, while receiving the user input and performing the first type of manipulation on the first virtual object (1065), the electronic device detects (1063) that the predefined portion of the hand of the user has moved to a second respective location in the three-dimensional environment, such as if first hand 916-1 moved in FIG. 9B (e.g., the first hand of the user moved such that the pinch location is at a different location, thus causing the reference point for the manipulation to move accordingly).

For example, if the reference point is the location of the pinch by the first hand, then in response to the movement of the first hand, the reference point also moves with the movement of the first hand. In some embodiments, if the reference point is a location between the first and second hands (e.g., halfway between), then in response to the movement by the first hand, the reference point adjusts accordingly to remain at the same relative position between (e.g., halfway between) the first and second hands.

In some embodiments, in response to detecting that the predefined portion of the hand of the user has moved to the second respective location in the three-dimensional environment, the electronic device performs (1061) the first type of manipulation on the first virtual object by an amount based on an updated reference point of the first type of manipulation based on the predefined portion of the hand moving to the second respective location, such as if cylinder 912 is resized due to the distance between the pinch point of first hand 916-1 and second hand 916-2 changing (e.g., performing the first type of manipulation on the first virtual object based on the change in the position of the hands with respect to the reference point of the manipulation).

For example, if the reference point is the location of the pinch of the left hand, then if the left hand moved away from the right hand while the right hand remains unmoved, then in response to determining that the distance and/or orientation between the right hand and the reference point (e.g., the location of the pinch of the left hand) has changed, the first virtual object is manipulated accordingly. In some embodiments, if the reference point is the location of the pinch of the left hand and if the left hand does not move but the right hand moves, then in response to determining that the distance and/or orientation between the right hand and the reference point changes, the first virtual object is manipulated accordingly. In some embodiments, the reference point is a predetermined location relative to the predefined portion of a first hand of the user (e.g., the location of the pinch, a predefined distance from the pinch, such as 2 inches, 3 inches, 6 inches, etc.) without regard to whether the user is performing a direct manipulation input or an indirect manipulation input. For example, if the user is pinching (e.g., with the left hand) on a portion of the first virtual object (e.g., direct manipulation), then the reference point of the manipulation is optionally defined as the pinch location, which optionally coincides with the portion of the first virtual object that is pinched. Thus, while the object is being manipulated, the portion of the first object that corresponds to the reference point optionally remains at the location of the pinch (e.g., if the hand that is pinching the first portion of the first object does not move, then the first portion of the first object remains fixed while other portions of the first object are manipulated in accordance with the manipulation operation). In another example, if the user is performing an indirect manipulation of the first virtual object (e.g., manipulating the object while the hand(s) of the user are not in contact with the first virtual object or not within a threshold distance of the first virtual object), the portion of the first virtual object that remains fixed when the manipulation is performed optionally does not necessarily correspond to the pinch location of the hand (e.g., as in the direct manipulation example described above). For example, if the user performs a resizing manipulation by maintaining the position of the left hand while moving the right hand away from the left hand, the first virtual object optionally is resized by expanding the right portion of the first virtual object away from the left portion of the first virtual object (e.g., such that the left portion of the first virtual object remains in the same place while the right portion of the first virtual object moves), or the first virtual object is resized by expanding the borders of the first virtual object away from (or towards, as the case may be) the center of the first virtual object (e.g., such that the center of the first virtual object remains in the same place while other portions of the first virtual object move). In some embodiments, during a rotational manipulation, the center of the manipulation is the point on the virtual object that does not move while the other points of the virtual object rotate around the center. During a resizing manipulation, the center of the manipulation is optionally the point that remains fixed while the other points of the virtual object expand or contract in accordance with the resizing. Thus, while manipulating the virtual object, the center of the manipulation is optionally a position on the virtual object that does not move in response to movements by the hand. In some embodiments, the center of the manipulation is a different location than the center of the object. In some embodiments, the center of the manipulation is based on the predefined portion of the hand (e.g., coincides with the left hand pinch point, and optionally, the reference point for the manipulation defined by the left hand pinch point), for example, when performing direct manipulations of the virtual object. By defining the reference point of the manipulation based on the user's hand(s) (e.g., rather than based on or with respect to the object), the electronic device ensures that the user has control over the manipulation, even if the hand(s) of the user move relative to the object during the manipulation.

The above-described manner of manipulating a virtual object (e.g., by manipulating the virtual object based on a reference point based on the position of the hand of the user) provides quick and efficient method of manipulating the virtual object (e.g., by selecting the reference point of the manipulation to be a particular portion of the hand of the user, such that manipulations are performed around that portion of the hand of the user, which enhances the control of the amount of manipulation), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while receiving the user input (1059), in accordance with the determination that the request to manipulate the first virtual object corresponds to the first type of manipulation, the electronic device performs (1057) the first type of manipulation on the first virtual object in accordance with the user input, such as the rotation of cylinder 912 in FIG. 9B (e.g., if the user input is a request to rotate the first virtual object, then rotate the first virtual object).

In some embodiments, if the user input is a request to move or resize the first virtual object, then move or resize the first virtual object, respectively. In some embodiments, the first manipulation indication is displayed while the first type of manipulation is performed on the first virtual object. In some embodiments, the first manipulation indication indicates the amount of manipulation while the manipulation is occurring (e.g., the first manipulation indication provides live feedback on the magnitude of the manipulation). In some embodiments, the amount of manipulation (e.g., magnitude), direction of manipulation, and/or speed of manipulation is based on the movement of the hand of the user. For example, for a rotation manipulation, the direction of the movement of the hand determines the direction of the rotation, the amount of movement of the hand determines the amount of rotation, and/or the speed of the movement determines the speed of the rotation. Similarly, for a resizing manipulation, increasing the distance between the hands increases the size of the object while decreasing the distance between the hands decreases the size of the object, and/or the speed of the change in distance determines the speed of the resizing.

The above-described manner of manipulating a virtual object (e.g., by performing the requested type of manipulation on the virtual object in accordance with the user input) provides quick and efficient method of manipulating the virtual object, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

Figure 11A:
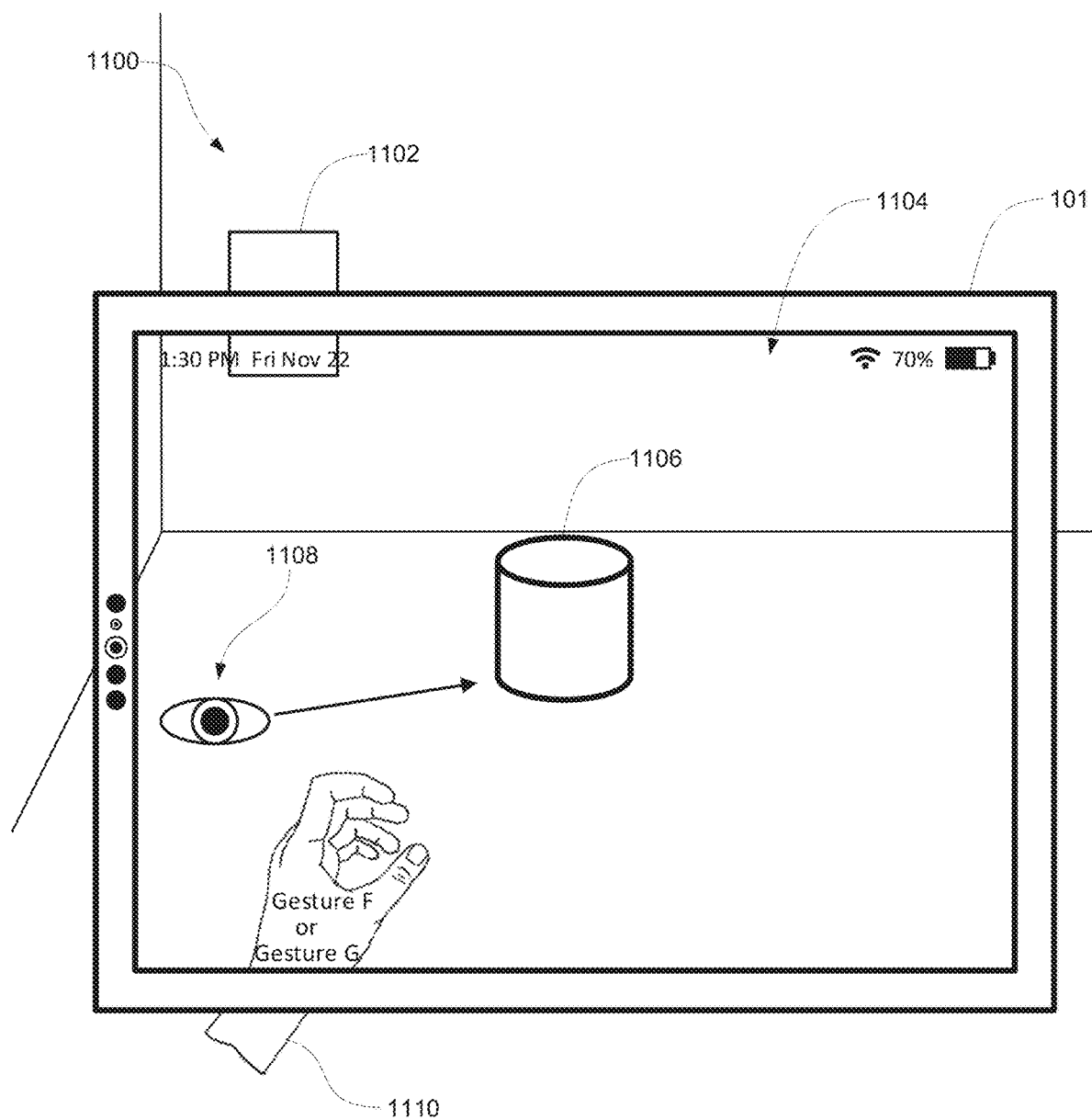
FIGS. 11A-11C illustrate examples of displaying a contextual menu or moving an object in a three-dimensional environment in accordance with some embodiments.
Figure 11B:
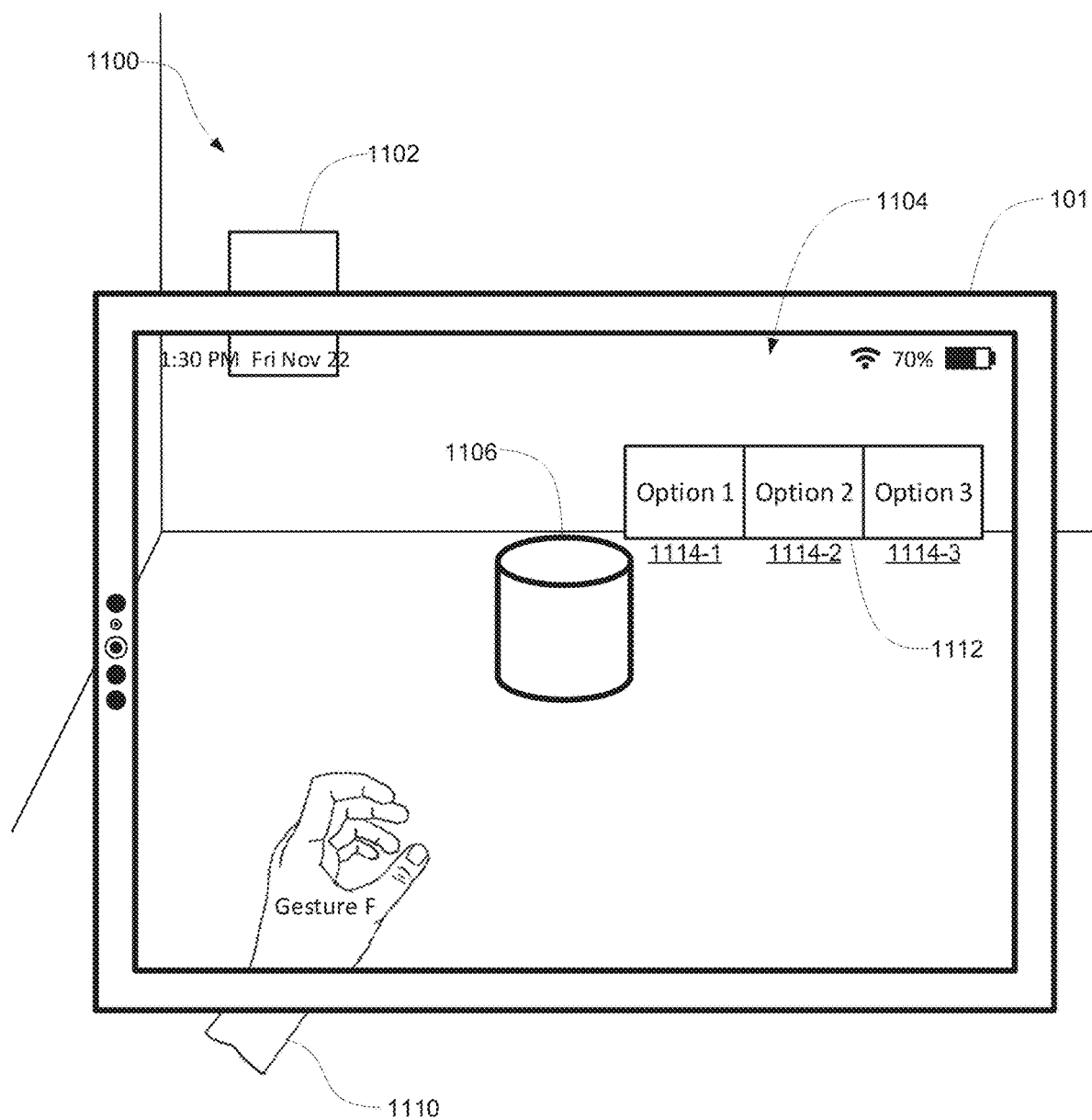
Figure 11C:
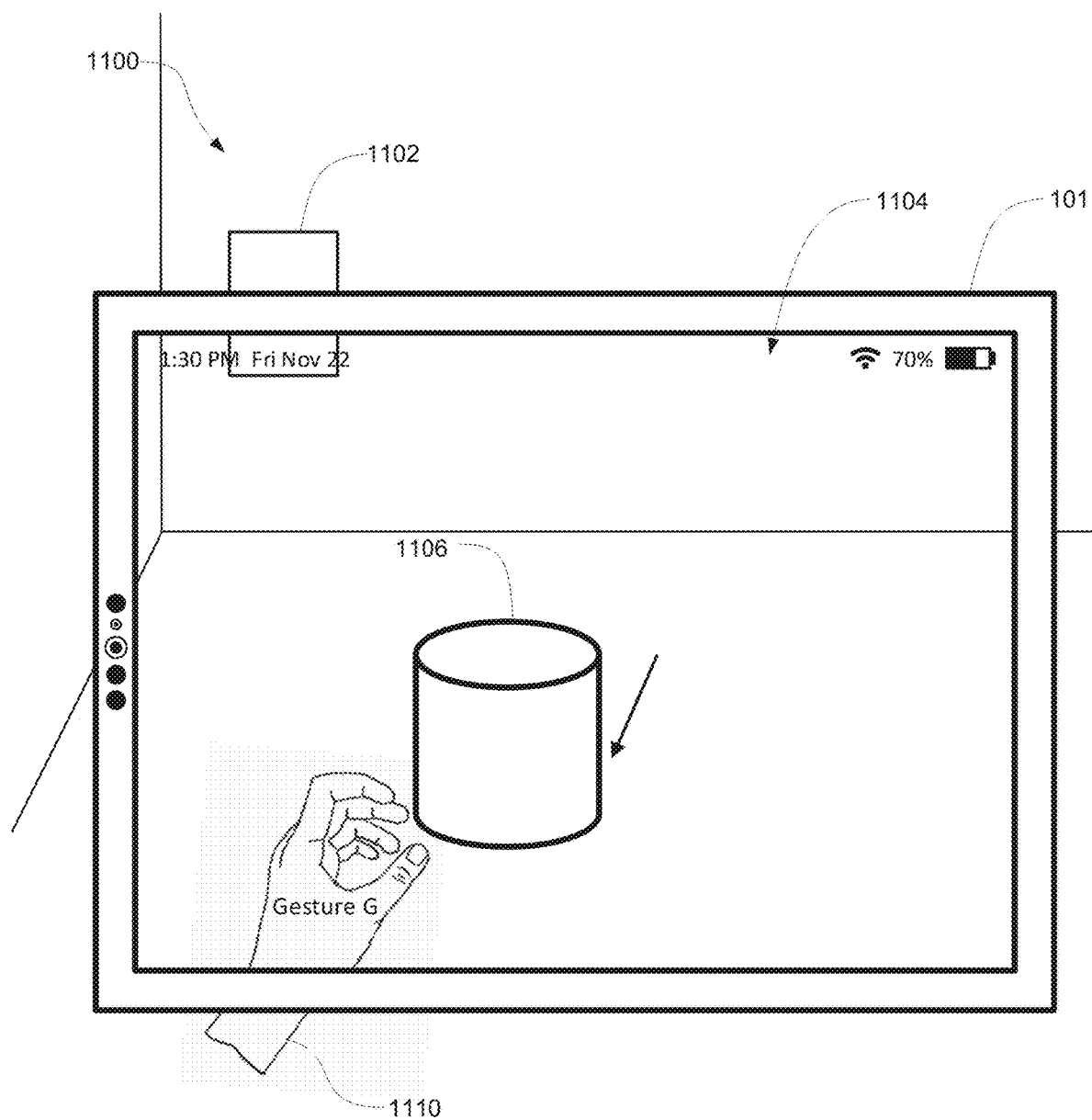
Figure 12A:
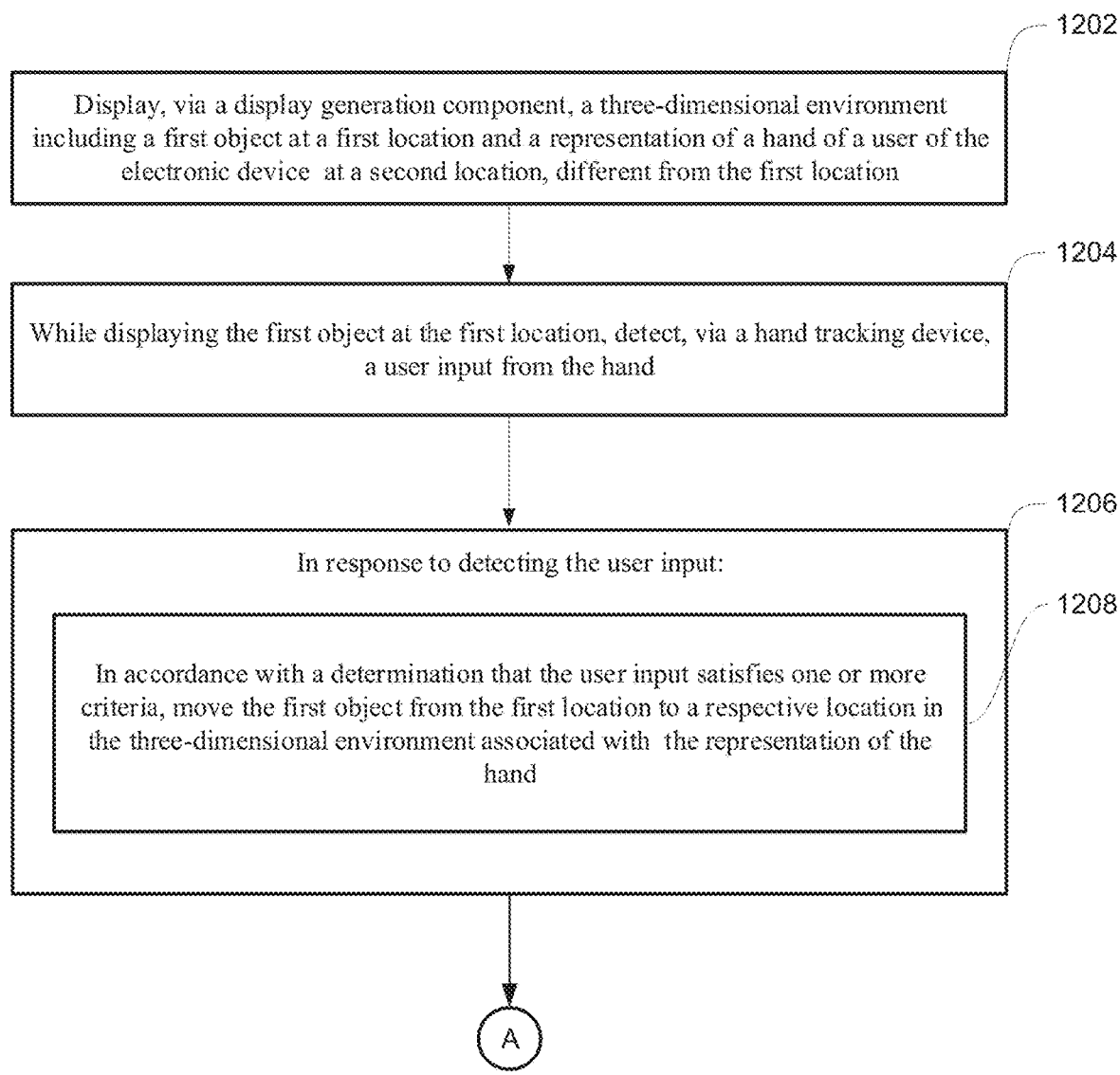
FIGS. 12A-12G is a flowchart illustrating a method of displaying a contextual menu or moving an object in a three-dimensional environment in accordance with some embodiments.
Figure 12B:
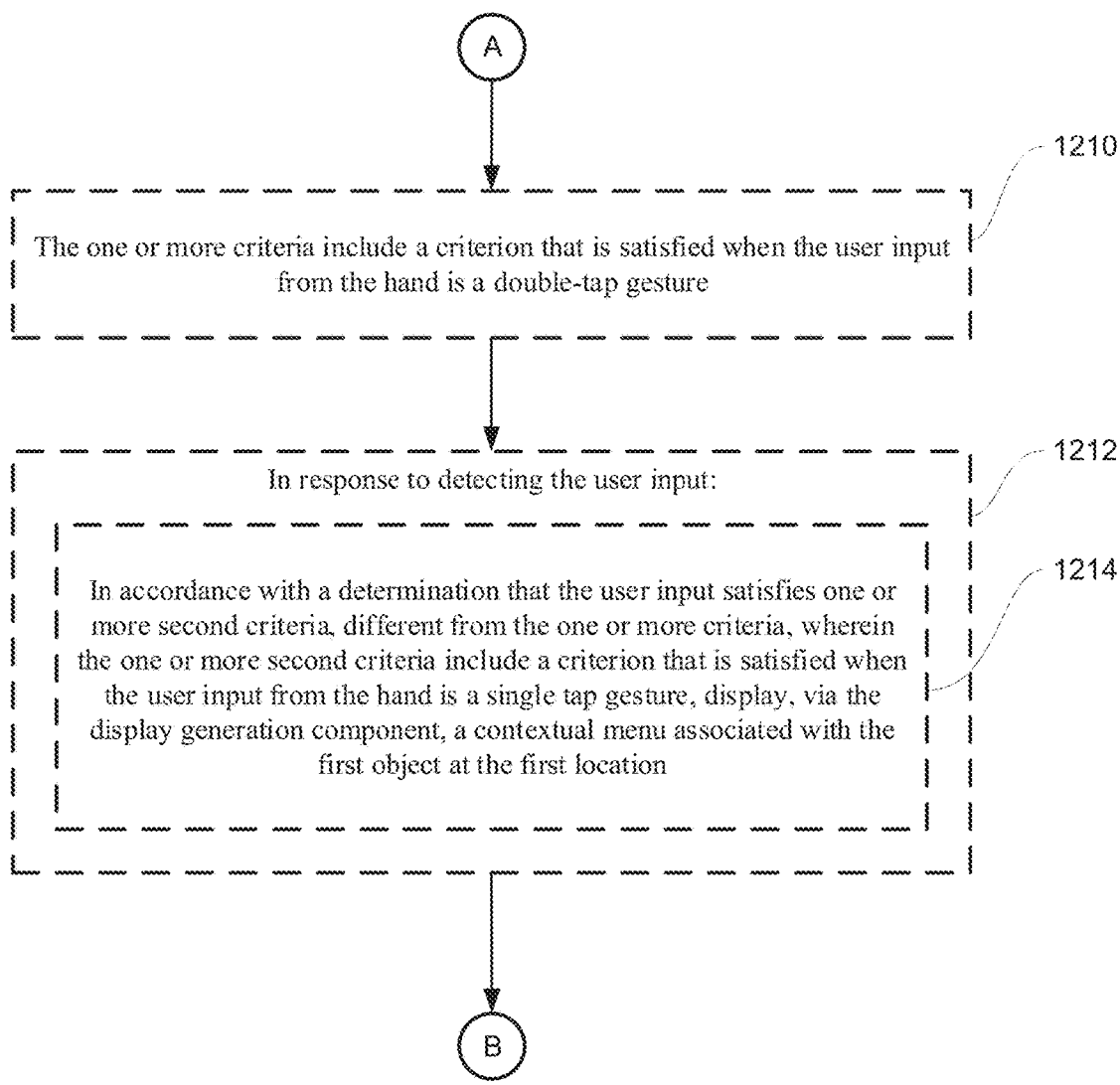
Figure 12C:
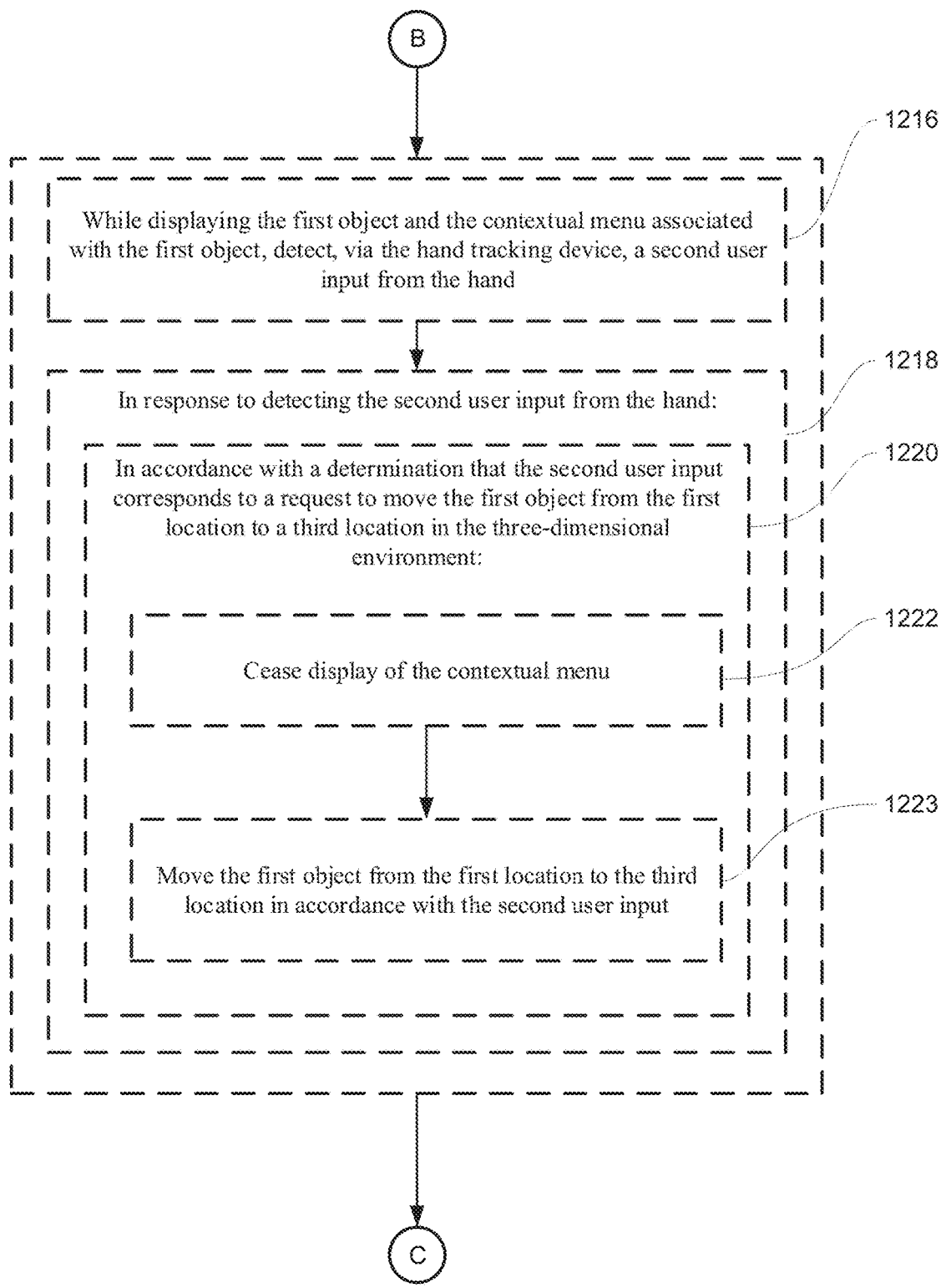
Figure 12D:
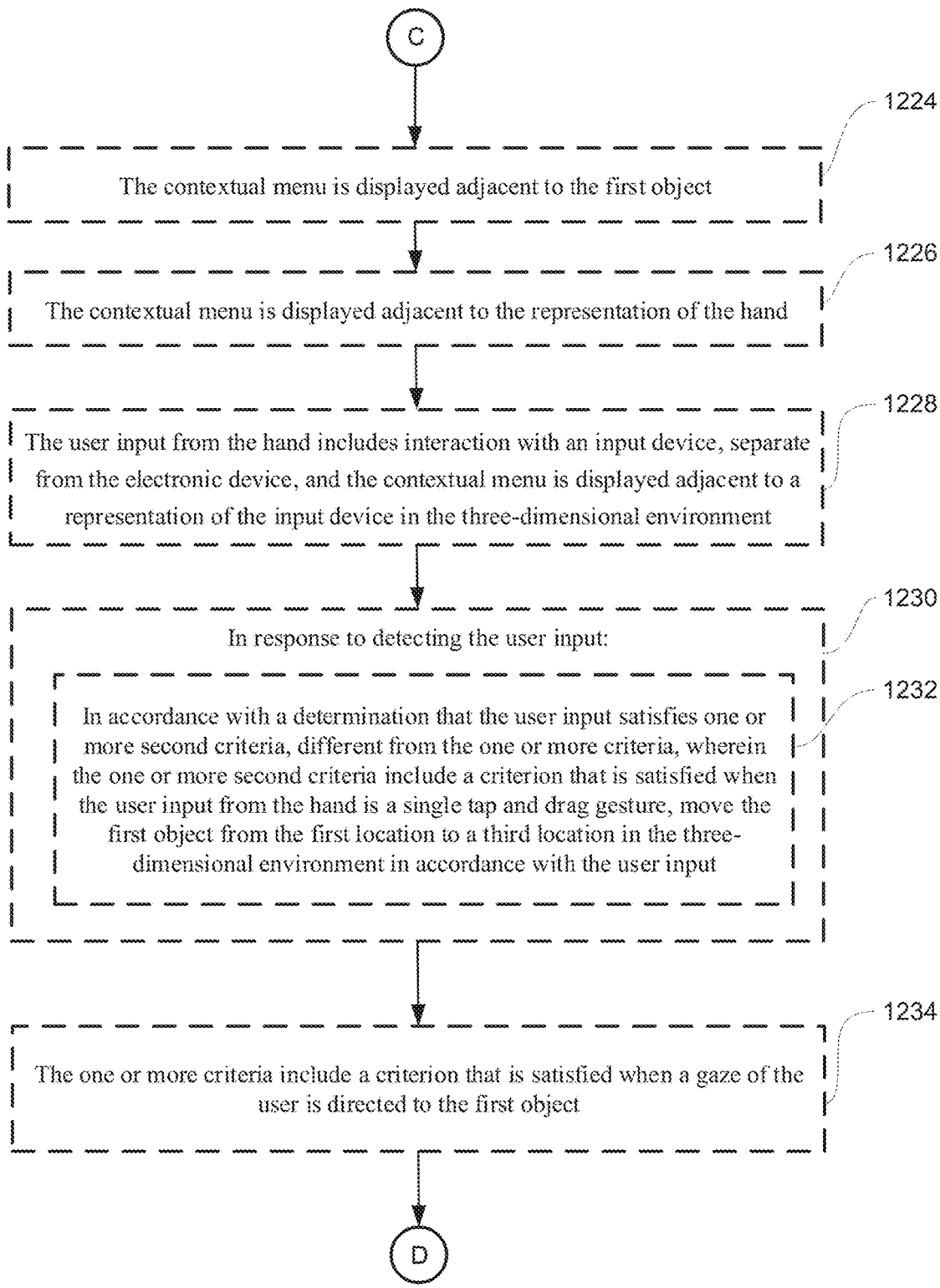
Figure 12E:
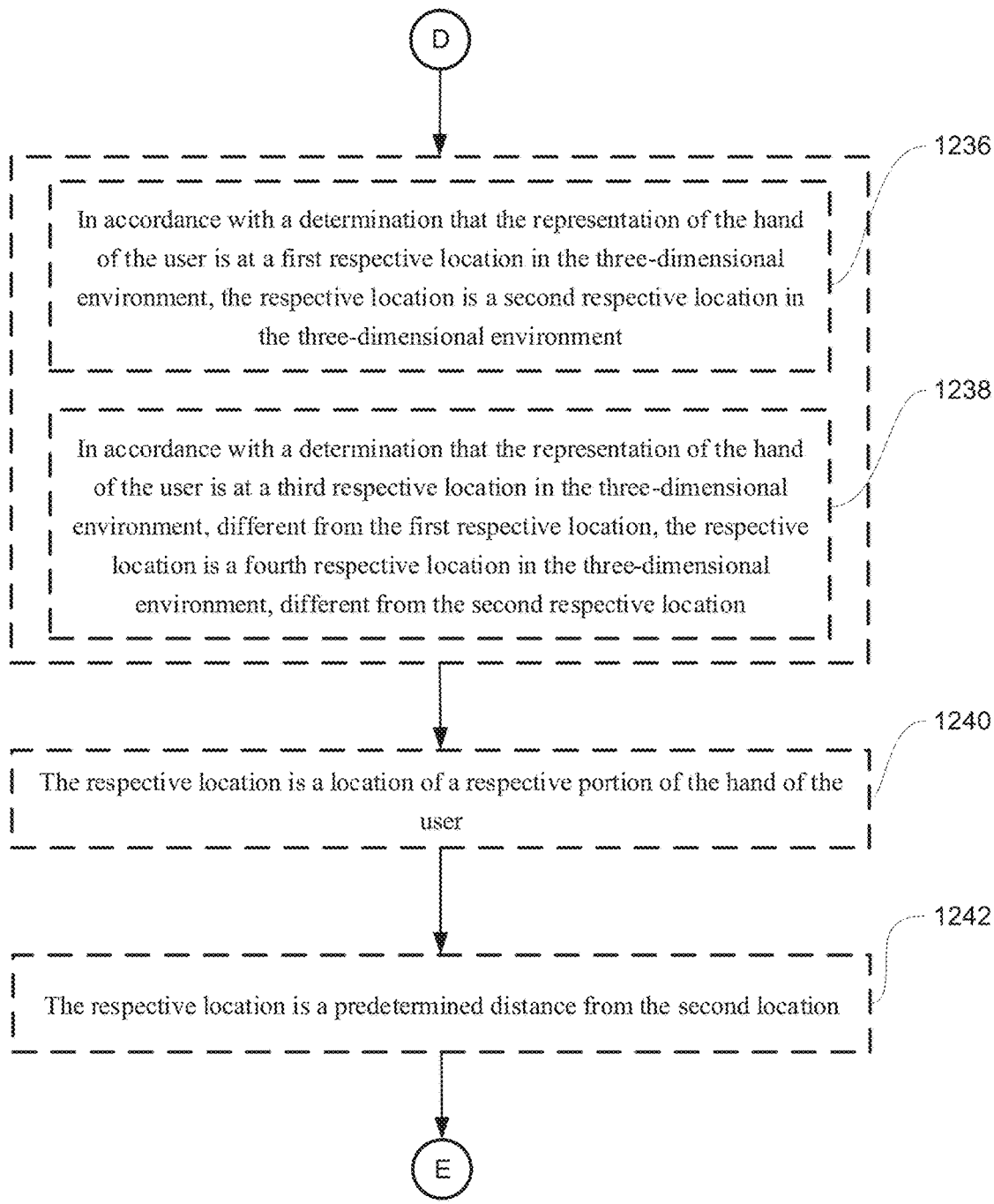
Figure 12F:
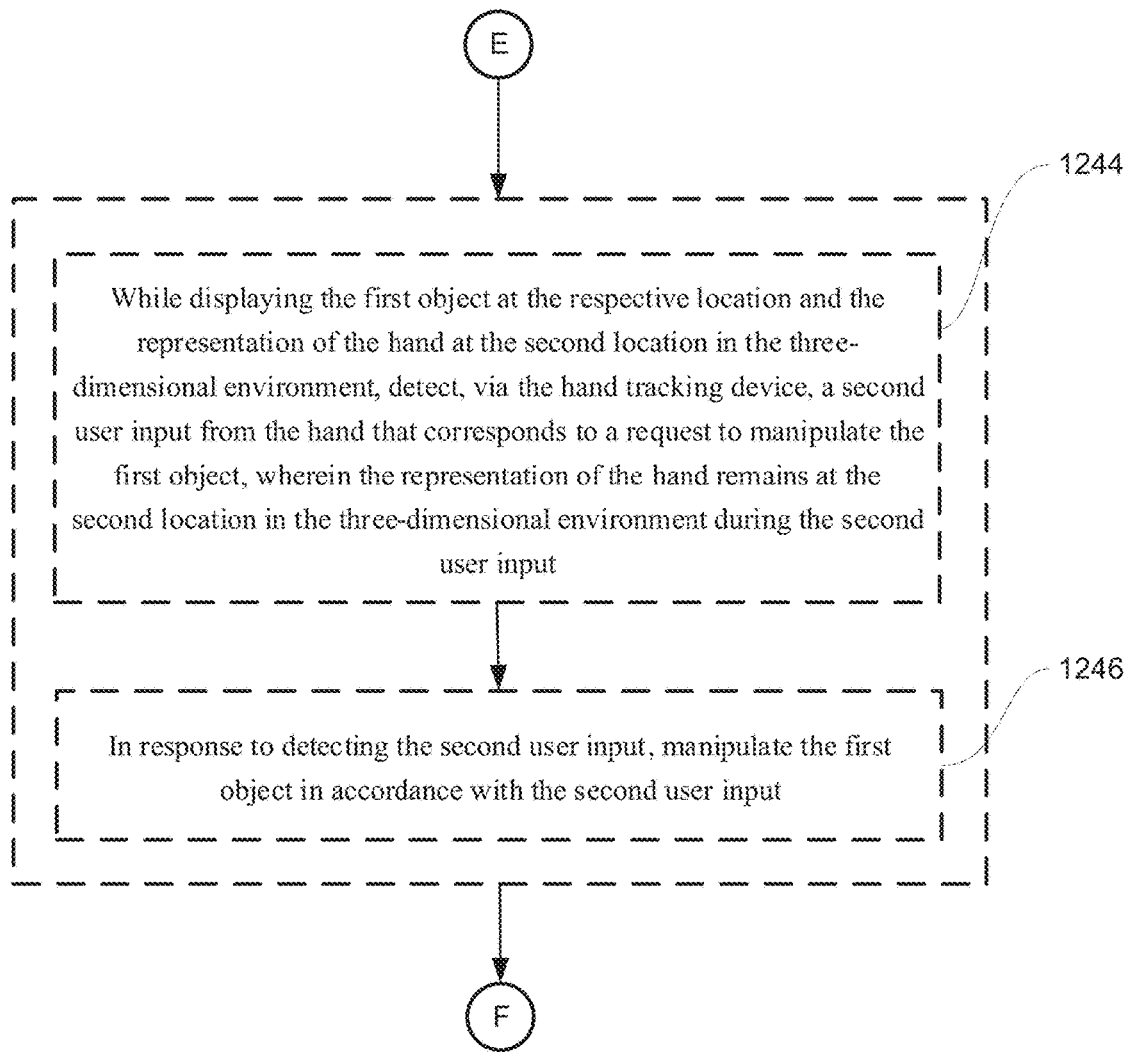
Figure 12G:
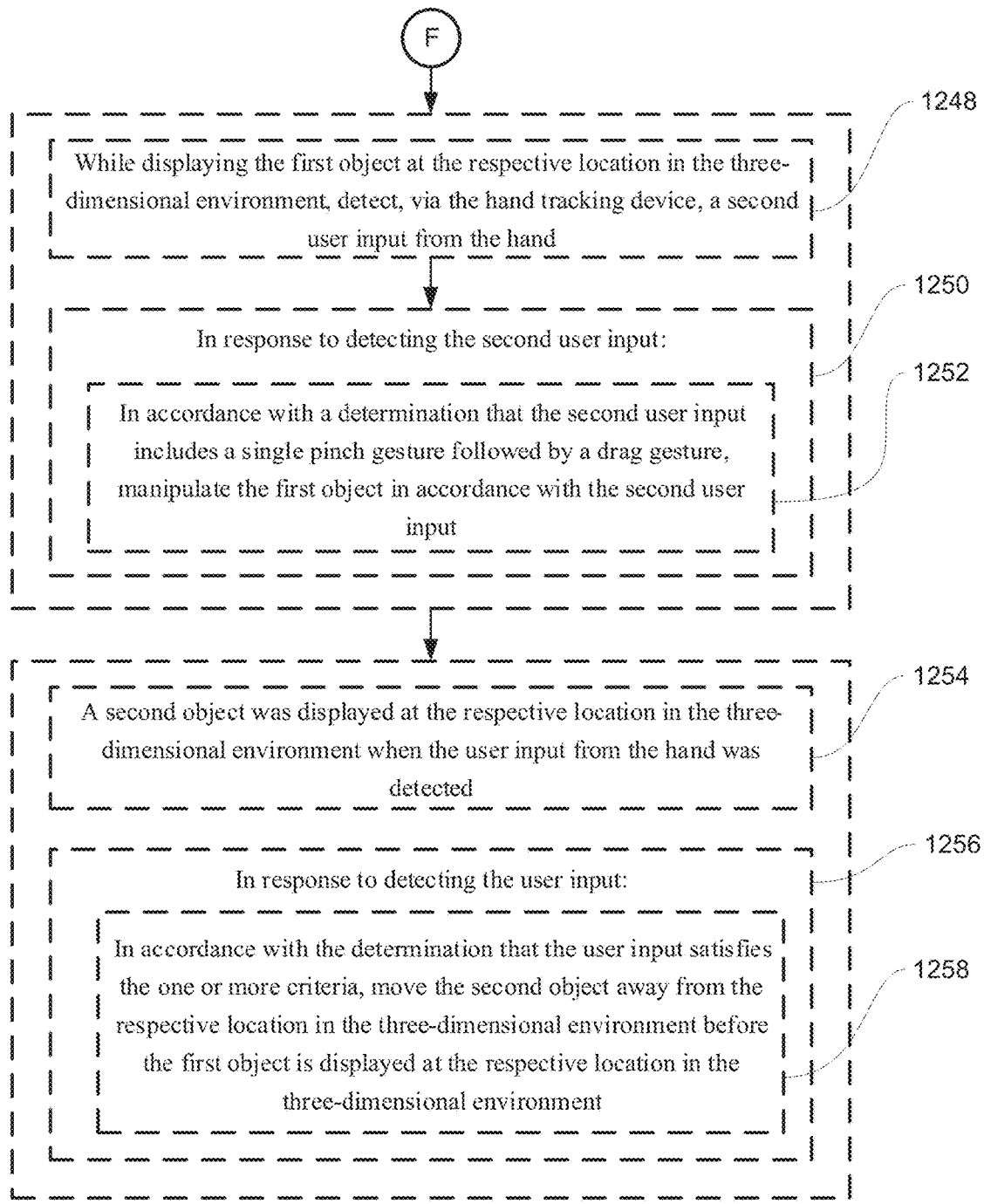

FIGS. 11A-11C illustrate examples of displaying a contextual menu or moving an object in a three-dimensional environment in accordance with some embodiments.

FIG. 11A illustrates an electronic device 101 displaying, via a display generation component (e.g., display generation component 120 of FIG. 1), a three-dimensional environment 1104 on a user interface. As described above with reference to FIGS. 1-6, the electronic device 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the electronic device 101 would be able to use to capture one or more images of a user or a part of the user while the user interacts with the electronic device 101. In some embodiments, the user interfaces shown below could also be implemented on a head-mounted display that includes a display generation component that displays the user interface to the user and sensors to detect the physical environment and/or movements of the user's hands (e.g., external sensors facing outwards from the user), and/or gaze of the user (e.g., internal sensors facing inwards towards the face of the user).

As shown in FIG. 11A, device 101 captures one or more images of the real world environment 702 around device 101 (e.g., operating environment 100), including one or more objects in the real world environment 702 around device 101. In some embodiments, device 101 displays representations of the real world environment in three-dimensional environment 1104. For example, three-dimensional environment 1104 includes a back corner of a room and a representation of at least a portion of picture frame 1102 on the back wall of the room. Similarly, in FIG. 11A, three-dimensional environment 1104 includes a representation of a hand 1110. As described above with respect to FIG. 6B, representation of the hand 1110 is a representation of the hand of the user of the device that is held behind device 101 (e.g., on the opposite side of device 101 from the user) and is captured by the one or more sensors of the device (e.g., optionally by the sensors that are on the opposite side of device 101 as the user). In some embodiments, the hand of the user of the device is held in front of the device (e.g., on the same side of device 101 as the user) and is captured by the one or more sensors of device 101 (e.g., optionally by the sensors that are on the same side of device 101 as the user).

In FIG. 11A, three-dimensional environment 1104 includes cylinder 1106. In some embodiments, cylinder 1106 is a three-dimensional virtual object. For example, cylinder 1106 is not a physical object in real world environment 1104. Instead, cylinder 1106 is optionally an object that exists in the virtual environment of three-dimensional environment 1104. In FIG. 11A, device 101 detects hand 1110 performing either Gesture F or Gesture G. In some embodiments, Gesture F is predetermined to correspond to a request to display a contextual menu and Gesture G is predetermined to correspond to a request to bring cylinder 1106 to hand 1110, as will be described in further detail below. In some embodiments, device 101 detects that hand 1110 is performing either Gesture F or Gesture G when gaze 1108 is directed to cylinder 1106. In some embodiments, if gaze 1108 is not directed to cylinder 1106 when device 101 detects Gesture F or Gesture G, then the user input (e.g., the gestures by hand 1110) is not directed to cylinder 1106 (and is optionally directed to another object if gaze 1108 is directed to another object).

In some embodiments, in response to detecting hand 1110 performing Gesture F when gaze 1108 is directed to cylinder 1106, device 101 displays contextual menu 1112 at a location in three-dimensional environment 1104 associated with cylinder 1106, as shown in FIG. 11B. In some embodiments, Gesture F is a single pinch gesture performed by hand 1110 or a single tap gesture on a stylus held by hand 1110. In some embodiments, contextual menu 1112 is displayed at or near the location of cylinder 1106. In some embodiments, contextual menu 1112 is displayed at or near the representation of hand 1110 (or the stylus if hand 1110 is holding a stylus). As described above, contextual menu 1112 is displayed at a respective location in three-dimensional environment 1104 such that it appears as if contextual menu 1112 is floating at a respective location in real world environment 1100. As described above, each position in three-dimensional environment 1104 optionally has a corresponding location in real world environment 1100 (e.g., due to three-dimensional environment 1104 being based on real world environment 1100) and displaying a virtual object at a particular location in three-dimensional environment 1104 has the effect of appearing as if the virtual object is located at the corresponding position in real world environment 1100.

In some embodiments, contextual menu 1112 includes one or more selectable options (e.g., selectable option 1114-1 to 1114-3) that are selectable to perform one or more operations associated with cylinder 1106. For example, contextual menu 1112 includes one or more options for replacing cylinder 1106 with a three-dimensional object, such as described above with respect to method 800. In some embodiments, contextual menu 1112 includes an option to copy cylinder 1106 into a clipboard, delete cylinder 1106, and/or duplicate cylinder 1106, etc.

In some embodiments, contextual menu 1112 is displayed until a user input is received selecting an option from contextual menu 1112. In some embodiments, contextual menu 1112 is displayed until the user performs a manipulation on cylinder 1106. For example, a user is able to move cylinder 1106 by performing a pinch gesture and movement while holding the pinch gesture (or optionally a tap-and-hold gesture on the stylus and a movement while maintaining contact with the stylus) and in response to moving cylinder 1106, contextual menu 1112 is dismissed until a future input is received causing display of contextual menu 1112.

In some embodiments, in response to detecting hand 1110 performing Gesture G when gaze 1108 is directed to cylinder 1106, device 101 moves cylinder 1106 in three-dimensional environment 1104 to a location associated with hand 1110 (e.g., towards the user), as shown in FIG. 11C. In some embodiments, Gesture G is a double pinch gesture performed by hand 1110 or a double tap gesture on a stylus held by hand 1110. In some embodiments, cylinder 1106 is moved to a location associated with the pinch and/or tap (e.g., at or near the location of the pinch and/or tap). In some embodiments, cylinder 1106 is moved to within a threshold distance (e.g., 1 inch, 3 inches, 6 inches, 1 foot, etc.) of the representation of hand 1110 such that a pinch gesture by hand 1110 is interpreted as a selection of cylinder 1106 (e.g., without requiring hand 1110 to move towards cylinder 1106 to select cylinder 1106). For example, a user is able to perform a direct manipulation operation on cylinder 1106 without moving the position of hand 1110. For example, a user is able to directly manipulate cylinder 1106 to perform a movement operation, rotation, resizing operation, etc. optionally in a manner similar to those described herein with respect to methods 1000 and 1400.

Thus, cylinder 1106 is optionally moved to a position that is based on the position of hand 1110. If, for example, the representation of hand 1110 is located near the left side of the display area, then cylinder 1106 is moved to near the left side of the display area, but if the representation of hand 1110 is located near the right side of the display area, then cylinder 1106 is moved to near the right side of the display area. In some embodiments, if the user input is a tap gesture on a stylus, then cylinder 1106 is moved to a location associated with the stylus.

In some embodiments, if another virtual object is located at a position that would at least partially overlap with cylinder 1106 when it is moved to the location of hand 1110, then the other virtual object is bumped away or otherwise moved such that the other virtual object does not overlap or conflict with cylinder 1106 (e.g., because two objects cannot be at the same location at the same time). In some embodiments, if the other virtual object is at the location of hand 1110 due to a previous user input causing the other virtual object to move to the location of hand 1110, similar to the process described above (e.g., in response to detecting Gesture G), then the other virtual object is optionally returned to its position before the user input was received (e.g., its original position before it was moved to the location of hand 1110).

In some embodiments, after moving cylinder 1106 to the location of hand 1110, a user is able to return cylinder 1106 to its original position before cylinder 1106 was moved to hand 1110. In some embodiments, in response to performing a respective gesture (e.g., a releasing gesture) and/or in response to detecting a termination of the selection gesture (e.g., "Gesture G") by hand 1110, device 101 returns cylinder 1106 back to its original position before cylinder 1106 was moved to hand 1110.

FIGS. 12A-12G is a flowchart illustrating a method 1200 of displaying a contextual menu or moving an object in a three-dimensional environment in accordance with some embodiments. In some embodiments, the method 1200 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1200 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1200 are, optionally, combined and/or the order of some operations is, optionally, changed.

In the method 1200, in some embodiments, an electronic device (e.g., computer system 101 in FIG. 1) in communication with a display generation component and a hand tracking device (e.g., a mobile device (e.g., a tablet, a smartphone, a media player, or a wearable device), or a computer) displays (1202), via the display generation component, a three-dimensional environment including a first object at a first location and a representation of a hand of a user of the electronic device (e.g., a user interface object that moves based on movement of the hand of the user of the electronic device) at a second location, different from (e.g., more than a threshold distance from) the first location, such as three-dimensional environment 1104 including cylinder 1106 and a representation of hand 1110 in FIG. 11A (e.g., displaying a first object in the three-dimensional environment (e.g., a computer-generated reality (CGR) environment such as a virtual reality (VR) environment, a mixed reality (MR) environment, or an augmented reality (AR) environment, etc.).

In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the hand tracking device includes an image sensor, a camera, a depth sensor, and/or a motion sensor, etc. that is capable of determining a location of the user's hand in a real-world environment of the electronic device (e.g., absolute location in the real-world environment or relative location as compared to other objects in the real-world environment), the relative movements of the user's hand, and/or the position of the fingers of the hand, etc.

The representation of the hand is optionally a view of the user's hand in the real-world environment (e.g., such as in a mixed reality environment or an augmented reality environment). For example, if the display generation component includes a translucent or transparent display, the electronic device is able to allow viewing of the portion of the real-world environment that includes the user's hand (e.g., by not obscuring view of the user's hand). In some embodiments, the representation of a hand is a virtual object that is based on the hand of the user (e.g., such as a pass-through video in an augmented reality environment or a virtual reality environment). For example, the hand tracking device and/or one or more cameras in communication with the electronic device are able to capture the position, location, and/or features of the hand, and display, via the display generation component, a representation of the hand in the three-dimensional environment (e.g., a photorealistic representation, a caricature, a cartoon, etc.) that optionally reflects the position, location, and/or features of the hand. The first object is optionally a virtual object displayed in the three-dimensional environment by the electronic device (e.g., generated and/or rendered by the electronic device). In some embodiments, the three-dimensional environment includes a hand of the user of the device.

In some embodiments, while displaying the first object at the first location (e.g., at a location in the three-dimensional environment that is more than the threshold distance from the representation of the hand), the electronic device detects (1204), via the hand tracking device, a user input from the hand, such as hand 1110 performing Gesture F or Gesture G in FIG. 11A (e.g., detecting a gesture, movement, motion, and/or a sequence of gestures, movements, and/or motions of the hand corresponding to a request to perform a respective operation). In some embodiments, the user input is detected by monitoring one or more hands of the user using a hand tracking device. Examples of the user input include a pinch gesture by the thumb and forefinger of the hand (or any other two or more fingers of the hand), a movement of the hand, a tap gesture by a finger of the hand, a pointing gesture by a finger of the hand, etc.

In some embodiments, in response to detecting the user input (1206), in accordance with a determination that the user input satisfies one or more criteria, the electronic device moves (1208) the first object from the first location to a respective location in the three-dimensional environment associated with (e.g., that is less than the threshold distance from) the representation of the hand, such as if hand 1110 performed Gesture G, cylinder 1106 is moved towards hand 1110 in FIG. 11C (e.g., if the user input includes a predetermined gesture corresponding to a request to bring the first object to the user's hand, then move the first object in the three-dimensional environment to the user's hand).

In some embodiments, the gesture includes a pinch gesture (e.g., a single pinch, two pinches in quick succession, a pinch and a movement, etc.) and the first object is moved to a location in the three-dimensional environment such that it appears as if the hand is pinching a portion of the first object or the object is within a threshold distance (e.g., 1 inch, 2 inches, etc.) of the user's hand and/or the position of the user's pinch. In some embodiments, the request to bring the first object to the user's hand does not include a movement by the user's hand reaching out to directly select the first object (e.g., grabbing at least a portion of the first object). In some embodiments, the user input is performed when the representation of the hand is at a different location than the first object.

The above-described manner of manipulating a virtual object in a three-dimensional environment (e.g., by moving the object to the location of the user's hand in response to receiving a predetermined gesture by the user's hand) provides quick and efficient method of manipulating a virtual object (e.g., by moving the object to the user's hand such that the user is able to directly manipulate the object, without requiring the user to reach out to the object or move to within arms-reach of the object), which simplifies the interaction between the user and the electronic device and enhances the operability of the electronic device and makes the user-device interface more efficient (e.g., without requiring the user to perform additional inputs to directly manipulate the object), which additionally reduces power usage and improves battery life of the electronic device by enabling the user to use the electronic device more quickly and efficiently, while reducing errors in usage.

In some embodiments, the one or more criteria include a criterion that is satisfied when the user input from the hand is a double-tap gesture (1210), such as hand 1110 performing Gesture G in FIG. 11C (e.g., a short tap (e.g., a contact with the input device for less than a threshold amount of time, such as 0.1 seconds, 0.5 seconds, 1 second, 3 seconds, etc., without movement of the contact by more than a threshold amount, such as 0.1 mm, 0.5 mm, 1 mm, 5 mm, etc.) followed by a second short tap (e.g., within a threshold amount of time such as 0.25 seconds, 0.5 seconds, 1 second, 3 seconds, 5 seconds, etc.) optionally detected via the hand tracking device). In some embodiments, a tap gesture includes a pinch between a thumb and a forefinger (or any other two or more fingers of the hand) for less than a threshold amount of time (e.g., 0.25 seconds, 0.5 seconds, 1 second, 3 seconds, etc.).

The above-described manner of moving a virtual object in a three-dimensional environment (e.g., in response to a double-tap gesture by the hand of the user) provides quick and efficient method of manipulating a virtual object (e.g., by performing a predetermined gesture using the user's hand, without requiring the user to perform additional inputs to select an affordance or use an input device), which simplifies the interaction between the user and the electronic device and enhances the operability of the electronic device and makes the user-device interface more efficient (e.g., without requiring the use of a dedicated input device), which additionally reduces power usage and improves battery life of the electronic device by enabling the user to use the electronic device more quickly and efficiently, while reducing errors in usage.

In some embodiments, in response to detecting the user input (1212), in accordance with a determination that the user input satisfies one or more second criteria, different from the one or more criteria, wherein the one or more second criteria include a criterion that is satisfied when the user input from the hand is a single tap gesture (e.g., a single short tap that is not followed by a second short tap within the threshold amount of time, optionally detected via the hand tracking device), the electronic device displays (1214), via the display generation component, a contextual menu associated with the first object at the first location, such as the display of contextual menu 1112 in response to hand 1110 performing Gesture F in FIG. 11B (e.g., without moving the first object from the first location to the respective location in the three-dimensional environment).

In some embodiments, the contextual menu includes one or more selectable options that are selectable to perform a function associated with the first object. For example, the contextual menu includes a selectable option to copy the object, a selectable option to cut the object, a selectable option to duplicate the object, etc. In some embodiments, the contextual menu is displayed at a location in the three-dimensional environment at or near the first object. In some embodiments, the contextual menu is displayed above the first object (e.g., floating above the object, optionally at the same z-depth as the first object). In some embodiments, the contextual menu includes one or more selectable options for replacing a two-dimensional drawing with a three-dimensional object, such as described above with respect to method 800.

The above-described manner of displaying a menu associated with a virtual object (e.g., in response to a single tap gesture by the hand of the user) provides quick and efficient method of displaying options for manipulating the virtual object (e.g., by performing a predetermined gesture using the user's hand, without requiring the user to perform additional inputs to select an affordance or use an input device), which simplifies the interaction between the user and the electronic device and enhances the operability of the electronic device and makes the user-device interface more efficient (e.g., without requiring the use of a dedicated input device), which additionally reduces power usage and improves battery life of the electronic device by enabling the user to use the electronic device more quickly and efficiently, while reducing errors in usage.

In some embodiments, while displaying the first object and the contextual menu associated with the first object, the electronic device detects (1216), via the hand tracking device, a second user input from the hand, such as hand 1312 performing Gesture H and a movement of hand 1312 in FIG. 13B (e.g., detecting a gesture, movement, motion, and/or a sequence of gestures, movements, and/or motions of the hand corresponding to a request to perform a respective operation). In some embodiments, the user input is detected by monitoring one or more hands of the user using a hand tracking device.

In some embodiments, in response to detecting the second user input from the hand (1218), in accordance with a determination that the second user input corresponds to a request to move the first object from the first location to a third location in the three-dimensional environment (1220) (e.g., a gesture by the hand including a movement of the hand, a selection of a selectable option from the contextual menu to move the first object, etc.), the electronic device ceases (1222) display of the contextual menu, such as if contextual menu 1112 in FIG. 11B ceased to be displayed (e.g., automatically terminating display of the contextual menu (e.g., without receiving a user input other than or in addition to the request to move the first object)), and moves (1223) the first object from the first location to the third location in accordance with the second user input, such as in FIG. 13B (e.g., moving the first object in the three-dimensional environment in accordance with the movement request).

In some embodiments, if the second user input is a direct manipulation input (e.g., a manipulation of the hand of the user when the hand reaches out to directly interact with the first object) that includes a movement component by the hand of the user, then the first object moves in accordance with the movement of the hand of the user, optionally by the same amount and/or at the same speed as the movement component of the user input. In some embodiments, if the second user input is an indirect manipulation input (e.g., a manipulation when the hand is not reaching out to directly interact with the first object, such as when the hand is more than a threshold distance away from the first object) that includes a movement component by the hand of the user, then the first object moves by a scaled amount based on the distance of the object to the user, such as described below with respect to method 1400.

The above-described manner of ceasing display of the menu (e.g., in response to manipulation of the virtual object) provides quick and efficient method of simplifying the user interface (e.g., by automatically removing the menu when the user is performing a manipulation operation on the virtual object and not interacting with the menu), which simplifies the interaction between the user and the electronic device and enhances the operability of the electronic device and makes the user-device interface more efficient (e.g., by simplifying the user interface, without requiring the user to perform additional inputs to close the menu), which additionally reduces power usage and improves battery life of the electronic device by enabling the user to use the electronic device more quickly and efficiently, while reducing errors in usage.

In some embodiments, the contextual menu is displayed adjacent to the first object (1224), such as in FIG. 11B (e.g., the contextual menu is displayed at a location in the three-dimensional environment that is at or near the first object). For example, the contextual menu is displayed to the left, right, above, or below the first object, optionally at the same z-depth as the first object. In some embodiments, when the contextual menu is displayed adjacent to the first object, a user is able to select the selectable options by looking at a respective selectable option and performing a selection input or optionally by reaching out with a hand to interact with and/or select the respective selectable option.

The above-described manner of displaying a menu associated with a virtual object (e.g., at a location adjacent to the first object) provides quick and efficient method of indicating that the menu is associated with the virtual object (e.g., by placing it near the virtual object), which simplifies the interaction between the user and the electronic device and enhances the operability of the electronic device and makes the user-device interface more efficient (e.g., without requiring the perform additional inputs to determine whether the menu is associated with the virtual object or another virtual object), which additionally reduces power usage and improves battery life of the electronic device by enabling the user to use the electronic device more quickly and efficiently, while reducing errors in usage.

In some embodiments, the contextual menu is displayed adjacent to the representation of the hand (1226), such as if contextual menu 1112 were displayed at or near hand 1112 in FIG. 11B similar to manipulation globe 914 being displayed near first hand 916-1 in FIG. 9A (e.g., the contextual menu is displayed at a location in the three-dimensional environment that is at or near the representation of the hand of the user). For example, the contextual menu is displayed to the left, right, above, or below the representation of the hand. In some embodiments, when the contextual menu is displayed adjacent to the representation of the hand, a user is more easily able to reach out and directly interact with the selectable options of the contextual menu to activate a respective selectable option. In such embodiments, the contextual menu is displayed at a location that is not associated with the first object and/or not adjacent to the first object, described above.

The above-described manner of displaying a menu associated with a virtual object (e.g., at a location adjacent to the user's hand) provides quick and efficient method of interacting with the menu (e.g., by placing it near the user's hand such that the user is able to interact with the menu while minimizing the amount of movement required by the user's hand), which simplifies the interaction between the user and the electronic device and enhances the operability of the electronic device and makes the user-device interface more efficient (e.g., without requiring the user to perform additional inputs to move the menu to a location closer to the hand and without requiring the user to extend his or her hand to reach a menu that is not located near the hand), which additionally reduces power usage and improves battery life of the electronic device by enabling the user to use the electronic device more quickly and efficiently, while reducing errors in usage.

In some embodiments, the user input from the hand includes interaction with an input device, separate from the electronic device, such as a stylus held by hand 1110 (e.g., an input device, external to the electronic device, that is in communication with the electronic device, such as a wireless mouse, wireless keyboard, a remote control device, another mobile device, a handheld device, a stylus, a pointing tool, a controller, etc.), and the contextual menu is displayed adjacent to a representation of the input device in the three-dimensional environment (1228), such as if contextual menu 1112 were displayed at or near the stylus being held by 1110 (e.g., the three-dimensional environment includes display of a representation of the hand of the user and/or including a representation of the input device being held by the hand of the user). In some embodiments, the electronic device recognizes the input device being held by the user and/or the hand of the user and displays the contextual menu at a location that is at or near the input device. For example, the contextual menu is displayed to the left, right, above, or below the representation of the input device. In such embodiments, the contextual menu is displayed at a location that is not associated with the first object and/or not adjacent to the first object or the representation of the hand, describe above.

The above-described manner of displaying a menu associated with a virtual object (e.g., at a location adjacent to the input device that received the user input) provides quick and efficient method of interacting with the menu (e.g., by placing it near the input device such that the user is able to interact with the menu while minimizing the amount of movement required by the user's hand), which simplifies the interaction between the user and the electronic device and enhances the operability of the electronic device and makes the user-device interface more efficient (e.g., without requiring the user to perform additional inputs to move the menu to a location closer to the input device and without requiring the user to extend his or her hand to reach a menu that is not located near the input device), which additionally reduces power usage and improves battery life of the electronic device by enabling the user to use the electronic device more quickly and efficiently, while reducing errors in usage.

In some embodiments, in response to detecting the user input (1230), in accordance with a determination that the user input satisfies one or more second criteria, different from the one or more criteria, wherein the one or more second criteria include a criterion that is satisfied when the user input from the hand is a single tap and drag gesture (e.g., the hand of the user is holding an input device and the user performed a tap gesture on the input device (e.g., a short contact with the input device by a forefinger and release, or optionally a contact with the input device by a forefinger and continued contact)), the electronic device moves (1232) the first object from the first location to a third location in the three-dimensional environment in accordance with the user input, such as moving cylinder 1106 to a location associated with hand 1110 in FIG. 11C (e.g., moving the first object in the three-dimensional environment based on the drag gesture).

In some embodiments, while maintaining the tap gesture or within a threshold time after the tap gesture (e.g., 0.5 seconds, 1 second, 3 seconds, 5 seconds, 10 seconds, etc.), detecting a drag gesture (e.g., a movement of the hand of the user, a movement of the input device, a change in the orientation of the hand of the user, and/or a change in the orientation of the input device).

For example, if the drag gesture includes a rightward movement in the physical environment, then the first object includes a rightward movement in the three-dimensional environment. In some embodiments, the amount of movement and/or direction of movement is based on the movement of the user input (e.g., optionally scaled, reduced, amplified, etc.). In some embodiments, the amount of movement is based on the distance of the first object from the user, as discussed below with respect to method 1400. In some embodiments, the speed of movement is based on the speed of the movement of the user input (e.g., optionally scaled, reduced, amplified, etc. in a manner similar to discussed below with respect to method 1400).

The above-described manner of moving a virtual object (e.g., in response to a tap gesture followed by a movement gesture) provides quick and efficient method of moving the object (e.g., by providing an intuitive method of moving the object based on the movement of the hand of the user), which simplifies the interaction between the user and the electronic device and enhances the operability of the electronic device and makes the user-device interface more efficient (e.g., without requiring the user to use a dedicated input device to move the virtual object), which additionally reduces power usage and improves battery life of the electronic device by enabling the user to use the electronic device more quickly and efficiently, while reducing errors in usage.

In some embodiments, the one or more criteria include a criterion that is satisfied when a gaze of the user is directed to the first object (1234), such as gaze 1108 being directed at cylinder 1106 in FIG. 11A (e.g., if the gaze of the user is directed at (e.g., focused on, looking toward, looking at, etc.) the first object when the user input is received, then the first object is selected for input such that manipulation inputs (e.g., the user's hand input) cause manipulations to be performed on the first object).

If the gaze is directed at a second object when the user input is received, then manipulations inputs (e.g., the user's hand input) would cause manipulations on the second object, instead of the first object. Thus, in some embodiments, the gaze of the user determines the object that is selected and/or manipulated. In some embodiments, the gaze of the user is determined via one or more eye tracking devices in communication with the electronic device (e.g., a camera and/or a motion sensor capable of determining the direction and/or location of the user's gaze).

The above-described manner of selecting a virtual object for input (e.g., when the gaze of the user is directed at the virtual object) provides quick and efficient method of determining the virtual object that user inputs are directed to (e.g., by automatically determining which virtual object user inputs are directed to based on the object that the user is looking at, without requiring the user to perform additional inputs to switch the focus from one virtual object to another), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, in accordance with a determination that the representation of the hand of the user is at a first respective location in the three-dimensional environment, the respective location is a second respective location in the three-dimensional environment (1236), such as in FIG. 11C (e.g., the first object is moved to a location associated with the representation of the hand such that if the representation of the hand is at a first location in the three-dimensional environment, the first object is moved to a location associated with that first location (e.g., at, near, etc. the first location, such as within 3 inches, 6 inches, 1 foot, 2 feet, 5 feet, etc.).

In some embodiments, in accordance with a determination that the representation of the hand of the user is at a third respective location in the three-dimensional environment, different from the first respective location, the respective location is a fourth respective location in the three-dimensional environment, different from the second respective location (1238), such as in FIG. 11C (e.g., if the representation of the hand is at a third location in the three-dimensional environment, the first object is moved to a location associated with that third location).

Thus, the location that the first object is moved to is based on the location of the representation of the hand. In some embodiments, the first object is moved to a location between the thumb and forefinger of the representation of the hand (or optionally any two or more fingers of a hand, or optionally any two or more fingers or different hands).

The above-described manner of moving a virtual object (e.g., by moving the object to the location of the representation of the user's hand) provides quick and efficient method of manipulating the virtual object (e.g., by moving the object to the user's hand such that the user is able to directly manipulate the object, without requiring the user to reach out to the object or move to within arms-reach of the object), which simplifies the interaction between the user and the electronic device and enhances the operability of the electronic device and makes the user-device interface more efficient (e.g., without requiring the user to perform additional inputs to directly manipulate the object), which additionally reduces power usage and improves battery life of the electronic device by enabling the user to use the electronic device more quickly and efficiently, while reducing errors in usage.

In some embodiments, the respective location is a location of a respective portion of the hand of the user (1240), such as the location of the pinch point of hand 1110 in FIG. 11C (e.g., the first object is moved to a location on the representation of the user's hand). In some embodiments, the first object is moved into the palm of the representation of the user's hand (e.g., as if the hand is gripping the first object). In some embodiments, the first object is moved to between the thumb and forefinger of the representation of the user's hand (e.g., as if the hand is pinching the first object).

The above-described manner of moving a virtual object (e.g., by moving the object to the location of the representation of the user's hand) provides quick and efficient method of manipulating the virtual object (e.g., by moving the object to the user's hand such that the user is able to directly manipulate the object, without requiring the user to reach out to the object or move to within arms-reach of the object), which simplifies the interaction between the user and the electronic device and enhances the operability of the electronic device and makes the user-device interface more efficient (e.g., without requiring the user to perform additional inputs to directly manipulate the object), which additionally reduces power usage and improves battery life of the electronic device by enabling the user to use the electronic device more quickly and efficiently, while reducing errors in usage.

In some embodiments, the respective location is a predetermined distance from the second location (1242), such as if cylinder 1106 were placed a couple inches out from the pinch point of hand 1110 in FIG. 11C (e.g., the first object is moved to a location that is a certain distance away from the representation of the hand). For example, the first object is moved to a location that is just in front of the hand (e.g., having a z-depth and/or x/y distances that are 1 inch, 6 inches, 1 foot, 3 feet, 5 feet away from a particular point on the representation of the hand, such as the pinch location, the tip of the forefinger, etc.

The above-described manner of moving a virtual object (e.g., by moving the object to a location that is a predetermined distance from the representation of the hand) provides quick and efficient method of manipulating the virtual object (e.g., by moving the object near the user's hand, which provides the user with some freedom of movement when manipulating the object), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while displaying the first object at the respective location and the representation of the hand at the second location in the three-dimensional environment, the electronic device detects (1244), via the hand tracking device, a second user input from the hand that corresponds to a request to manipulate the first object, wherein the representation of the hand remains at the second location in the three-dimensional environment during the second user input, such as detecting a manipulation gesture by hand 1110 after cylinder 1106 is moved to the location of the hand in FIG. 11C (e.g., detecting a gesture, movement, or series of gestures or movements from the hand of the user that correspond to a request to manipulate the first object).

In some embodiments, the second user input includes pinch gestures, grabbing gestures, pointing gestures. In some embodiments, the gestures from the hand are interpreted as directed to the first object (e.g., optionally because the hand is within a threshold distance of the first object and/or the object is displayed as being held by the hand). In some embodiments, after performing the gestures, a user is able to perform one or more movements, rotations, etc. to cause the object to move, rotate, etc. In some embodiments, a user is able to select the first object for manipulation without reaching the hand towards the first object. For example, the first object is automatically brought to a location that allows the user to begin performing direct manipulations on the first object without requiring the user to make any further changes to the position of the user's hand (e.g., without needing to reach out, move, or otherwise adjust the position of the user's hand).

In some embodiments, in response to detecting the second user input, the electronic device manipulates (1246) the first object in accordance with the second user input, such as to resize, move, rotate, etc. cylinder 1106 in FIG. 11C (e.g., manipulating the first object in accordance with the request to manipulate the first object).

In some embodiments, the request to manipulate the first object includes a pinch gesture by the hand of the user followed by a movement or change in orientation of the hand while maintaining the pinch gesture. For example, if the second user input is a request to rotate the first object (e.g., a rotation of the hand while maintaining the pinch gesture), rotate the first object accordingly. If the second user input is a request to move the first object (e.g., a movement of the hand while maintaining the pinch gesture), optionally move the first object accordingly. In some embodiments, the first object is manipulated by the same amount as the change in the first hand. For example, if the hand rotates by 90 degrees, the first object is rotated 90 degrees. If the hand moves to the right by 1 foot, the first object moves to the right by 1 foot. In some embodiments, the speed of the manipulation is based on the speed of the movement of the hand. Thus, in some embodiments, the first object maintains the same relative position and/or distance from the representation of the hand.

The above-described manner of moving a virtual object (e.g., by moving the virtual object to a location such that the user is able to directly manipulate the object) provides quick and efficient method of manipulating the virtual object (e.g., without perform additional inputs or movements to reach out and interact with the virtual object), which simplifies the interaction between the user and the electronic device and enhances the operability of the electronic device and makes the user-device interface more efficient (e.g., without requiring the user to perform additional inputs to directly manipulate the object), which additionally reduces power usage and improves battery life of the electronic device by enabling the user to use the electronic device more quickly and efficiently, while reducing errors in usage.

In some embodiments, while displaying the first object at the respective location in the three-dimensional environment, the electronic device detects (1248), via the hand tracking device, a second user input from the hand, such as detecting a manipulation gesture by hand 1110 after cylinder 1106 is moved to the location of the hand in FIG. 11C (e.g., after moving the first object to the respective location associated with the representation of the hand, or while the first object is at the respective location associated with the representation of the hand, receiving a user input corresponding to a request to perform a function with respect to the first object).

In some embodiments, in response to detecting the second user input (1250), in accordance with a determination that the second user input includes a single pinch gesture followed by a drag gesture (e.g., detecting that the hand of the user includes or has performed a pinch gesture (e.g., a pinch with the thumb and forefinger) and a movement of the hand while maintaining the pinch gesture), the electronic device manipulates (1252) the first object in accordance with the second user input, such as to resize, move, rotate, etc. cylinder 1106 in FIG. 11C (e.g., performing a manipulation function on the first object based on the second user input).

In some embodiments, the gestures are detected via the hand tracking device. For example, if the gesture is a lateral movement of the hand, then perform a movement function on the first object and if the gesture is a rotational movement of the hand (e.g., twisting of the hand), then perform a rotation function on the first object. In some embodiments, the direction and speed of the manipulation is based on the direction and speed of the movement of the hand.

The above-described manner of manipulating a virtual object (e.g., by manipulating the object in response to a pinch and drag gesture after the object is moved to the location associated with the representation of the user) provides quick and efficient method of manipulating the virtual object (e.g., by moving the object to the user's hand such that the user is able to directly manipulate the object, without requiring the user to reach out to the object or move to within arms-reach of the object), which simplifies the interaction between the user and the electronic device and enhances the operability of the electronic device and makes the user-device interface more efficient (e.g., without requiring the user to perform additional inputs to directly manipulate the object), which additionally reduces power usage and improves battery life of the electronic device by enabling the user to use the electronic device more quickly and efficiently, while reducing errors in usage.

In some embodiments, a second object was displayed at the respective location in the three-dimensional environment when the user input from the hand was detected (1254), such as a virtual object other than cylinder 1106 that is displayed in three-dimensional environment 1104 at a location at or near the pinch point of hand 1110 in FIG. 11C (e.g., the three-dimensional environment includes a second virtual object that is at least overlapping with the respective location and/or is within a threshold distance from the respective location (e.g., within 1 inch, 6 inches, 1 foot, 3 feet, 5 feet, etc.)). For example, if a second object is at a location in the three-dimensional environment that would at least partially overlap with the first object if the first object were placed at the respective location (e.g., the volumes of the two objects would conflict, intersect, and/or overlap).

In some embodiments, in response to detecting the user input (1256), in accordance with the determination that the user input satisfies the one or more criteria, the electronic device moves (1258) the second object away from the respective location in the three-dimensional environment before the first object is displayed at the respective location in the three-dimensional environment, such as moving the other virtual object that is at or near the pinch point of hand 1110 to make room for cylinder 1106 in FIG. 11C (e.g., if the one or more criteria are satisfied, the first object is moved to the respective location and if the second object is at least partially located at the respective location, then the second object is moved away from the respective location (optionally moved to at least a threshold distance away from the respective location, such as 1 inch, 6 inches, 1 foot, 3 feet, 5 feet, etc.)).

In some embodiments, moving the second object prevents two virtual objects from occupying the same space. In some embodiments, an animation is displayed moving the second object away as the first object moves towards the respective location. In some embodiments, an animation is displayed of the first object displacing the second object (e.g., making contact and pushing the second object away). In some embodiments, the second object is relocated to a location adjacent or near the respective location. In some embodiments, if the second object was at the respective location in response to a previous input that satisfied the one or more criteria (e.g., if the second object was moved to the respective location by a similar user input as the one that is causing the first object to move to the respective location), then the second object is returned to the location that it had before it was moved to the respective location. In some embodiments, after moving the second object, the user is able to manipulate and/or interact with the second object without moving or otherwise changing the location of the hand. In some embodiments, after moving the second object, the user is able to interact with the second object by moving the representation of the hand to the new location of the second object (e.g., the second object is moved to more than a threshold distance away such that the hand is not able to interact with the second object without moving, such as 3 inches, 6 inches, 1 foot, 3 feet, etc.).

The above-described manner of moving a virtual object to a respective location (e.g., by moving other virtual objects that are at the respective location away from the respective location) provides quick and efficient method of moving the virtual object (e.g., by automatically moving away other objects that would otherwise intrude on the virtual object, without requiring the user to perform additional inputs to move the other objects away), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

FIGS. 13A-13B illustrate examples of moving an object in a three-dimensional environment by an amount based on the distance of the object from the user in accordance with some embodiments.

FIG. 13A illustrates an electronic device 101 displaying, via a display generation component (e.g., display generation component 120 of FIG. 1), a three-dimensional environment 1304 on a user interface. As described above with reference to FIGS. 1-6, the electronic device 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the electronic device 101 would be able to use to capture one or more images of a user or a part of the user while the user interacts with the electronic device 101. In some embodiments, the user interfaces shown below could also be implemented on a head-mounted display that includes a display generation component that displays the user interface to the user and sensors to detect the physical environment and/or movements of the user's hands (e.g., external sensors facing outwards from the user), and/or gaze of the user (e.g., internal sensors facing inwards towards the face of the user).

As shown in FIG. 13A, device 101 captures one or more images of the real world environment 1300 around device 101 (e.g., operating environment 100), including one or more objects in the real world environment 1300 around device 101. In some embodiments, device 101 displays representations of the real world environment in three-dimensional environment 1304. For example, three-dimensional environment 1304 includes a back corner of a room, a representation of at least a portion of picture frame 1302 on the back wall of the room, and a representation of table 1306. Similarly, in FIG. 13A, three-dimensional environment 1304 includes a representation of a hand 1312. As described above with respect to FIG. 6B, representation of hand 1312 is a representation of the hand of the user of the device that is held behind device 101 (e.g., on the opposite side of device 101 from the user) and is captured by the one or more sensors of the device (e.g., optionally by the sensors that are on the opposite side of device 101 as the user). In some embodiments, the hand of the user of the device is held in front of the device (e.g., on the same side of device 101 as the user) and is captured by the one or more sensors of device 101 (e.g., optionally by the sensors that are on the same side of device 101 as the user).

In FIG. 13A, three-dimensional environment 1304 includes a cylinder in two different positions. For example, cylinder 1308-1 is displayed on top of representation of table 1306 at a first distance from the user, and cylinder 1308-2 is displayed in three-dimensional environment 1304 at a second, farther distance from the user. As shown in FIG. 13A, cylinder 1308-1 and 1308-2 are the same cylinder (e.g., herein referred to as cylinder 1308), but placed at two different distances from the user to illustrate how movement of a virtual object is based on the distance of the object to the user. For example, cylinder 1308-1 and cylinder 1308-2 are not concurrently displayed by the display generation component (e.g., cylinder 1308-1 and cylinder 1308-2 are displayed at different times and have the respective behavior described below). In some embodiments, cylinder 1308 is a three-dimensional virtual object. For example, cylinder 1308 is not a physical object in real world environment 1304. Instead, cylinder 1308 is an object that exists in the virtual environment of three-dimensional environment 1304. In some embodiments, because cylinder 1308 is a virtual object, a user is able to manipulate cylinder 1308 (e.g., without literally manipulating objects in real world environment 1304), such as to perform a movement operation, as will be described in further detail below.

In FIG. 13A, device 101 detects hand 1312 performing a selection gesture (e.g., "Gesture H") while the gaze of the user is directed to cylinder 1308. For example, in a first embodiment, gaze 1310-1 is directed to cylinder 1308-1 (e.g., cylinder 1308 when displayed at a first distance from the device), and in a second embodiment, gaze 1310-2 is directed to cylinder 1308-2 (e.g., cylinder 1308 when displayed at a second distance from the device). In some embodiments, the selection gesture is a pinch gesture by hand 1312. In some embodiments, in response to detecting the selection gesture by hand 1312 while the gaze is on cylinder 1308, cylinder 1308 is selected for manipulation.

In FIG. 13B, while maintaining the selection gesture by hand 1312 (e.g., while maintaining the pinch gesture), device 101 detects a movement by hand 1312 corresponding to a request to move cylinder 1308. As shown in FIG. 13B, in response to detecting the movement by hand 1312, cylinder 1308 is moved in accordance with the movement of hand 1312 (e.g., in the same direction as the movement of hand 1312). In some embodiments, a minimum threshold amount of movement of hand 1312 is required before cylinder 1308 is moved (e.g., 1 inch, 3 inches, 6 inches, etc.), for example, to prevent unintentional movements of cylinder 1308. FIG. 13B illustrates cylinder 1308-1 and cylinder 1308-2 both moving in response to the movement of hand 1312, but it is understood that cylinder 1308-1 and cylinder 1308-2 are not concurrently displayed and cylinder 1308-1 illustrates an example in which cylinder 1308 is at a first distance from the user and cylinder 1308-2 illustrates an example in which cylinder 1308 is at a second distance from the user (e.g., the user input for moving cylinder 1308-1 and the user input for moving cylinder 1308-2 are received at different times, but optionally include the same amount of rightward movement).

In some embodiments, cylinder 1308 is moved by the amount that hand 1312 is moved scaled by a scaling factor. In some embodiments, the scaling factor is based on the distance of cylinder 1308 from the user. For example, in FIG. 13B, cylinder 1308-1 (e.g., the cylinder when placed at the first distance from the user) moved rightwards in response to the rightward movement of hand 1312 by a first amount while cylinder 1308-2 (e.g., the cylinder when placed at the second, farther distance from the user) moved rightwards in response to the same rightward movement of hand 1312 by a second, larger amount. Thus, in some embodiments, the movement of a virtual object that is farther from the user has a larger scaling factor than the movement of a virtual object that is closer to the user (or vice versa). In this way, a user is able to move a faraway object across the three-dimensional environment (e.g., the portion of the three-dimensional environment displayed by the display generation component) without requiring the user to perform multiple movement operations In some embodiments, if cylinder 1308 is within a threshold distance from the user and/or hand 1312 (e.g., within 3 inches, 6 inches, 1 foot, 3 feet, etc.), then the scaling factor cylinder 1308 is 1 (e.g., cylinder 1308 moves by the same amount as the movement of hand 1312. In some embodiments, if cylinder 1308 is greater than the threshold distance from the user and/or hand 1312, then the movement of cylinder 1308 is scaled by an amount greater than 1 and varies based on the distance to the user and/or hand 1312. For example, if cylinder 1308-1 is 5 feet away from the user, then in response to a rightward movement of hand 1312 by 1 foot, cylinder 1308-1 moves rightwards by 2 feet (e.g., scaling factor of 2), and if cylinder 1308-2 is 10 feet away from the user, then in response to a rightward movement of hand 1312 by 1 foot, cylinder 1308-2 moves rightwards by 4 feet (e.g., scaling factor of 4). In some embodiments, the scaling factor is proportional to the distance (e.g., the scaling factor increases linearly with distance). In some embodiments, the scaling factor does not increase proportionally with distance (e.g., the scaling factor is a stepwise function, a piecewise function, increases logarithmically, exponentially, according to a polynomial function, etc.). In some embodiments, the scaling factor has a maximum value such that for distances from the user beyond a second threshold distance (e.g., 5 feet, 10 feet, 30 feet, 50 feet, etc.), the scaling factor is at its maximum value and no longer increases.

In some embodiments, the speed of the movement of a virtual object is based on the speed of the movement of the hand. For example, if hand 1312 moves rightwards, as shown in FIG. 13B, at a slow speed, then cylinder 1308-1 and cylinder 1308-2 moves rightwards at a slow speed, but if hand 1312 moves rightwards at a fast speed, then cylinder 1308-1 and cylinder 1308-2 moves rightwards at a fast speed. In some embodiments, the speed of the movement of cylinder 1308 is scaled by the same amount as the scaling of the magnitude of the movement (e.g., if the magnitude of the movement is scaled by two times, the speed is scaled by two times).

In some embodiments, only horizontal and vertical movements (e.g., in the x and y directions) are scaled based on the distance of the object from the user and movements in the z direction (e.g., movements of the virtual object away from or toward the user) optionally do not scale based on distance of the object from the user. In some embodiments, if the user moves cylinder 1308 in a diagonal direction that changes distance while simultaneously moving horizontally and vertically, the scaling of the movement changes as the distance changes. For example, as a virtual object is moved farther away while moving horizontally, the object first moves horizontally at a low scaling factor, then moves horizontally at a higher scaling factor (e.g., as the object moves farther from the user). Thus, the scaling factor optionally changes dynamically during a single movement (e.g., without requiring the user to release the selection input and re-perform the selection input).

In some embodiments, as shown in FIG. 13B, when cylinder 1308 is moved to within a threshold distance (e.g., 1 inch, 3 inches, 6 inches, 1 foot, 3 feet, etc.) of a predetermined snap point, device 101 displays target 1314 that indicates the location of the predetermined snap point. In some embodiments, the predetermined snap point is on the surface of a virtual object (or at a point of interest on a virtual object). In some embodiments, the predetermined snap point is on the surface of a representation of a physical object (or at a point of interest on a virtual object).

In FIG. 13B, the predetermined snap point corresponding to target 1314 is a respective location on the top surface of table 1306. In some embodiments, target 1314 has a shape that is based on the shape of cylinder 1308. For example, target 1314 is the footprint of cylinder 1308 (e.g., the size and shape of cylinder 1308 that will make contact with table 1306 when placed at the respective snap point). For example, in FIG. 13B, if cylinder 1308 were flipped on its side, target 1314 would optionally change size and shape to be a line (e.g., the portion of cylinder 1308 that would make contact with table 1306 has the shape of a line). In some embodiments, target 1314 is a silhouette of cylinder 1308.

In some embodiments, while displaying target 1314 corresponding to the predetermined snap point, in response to detecting a termination of the selection input (e.g., a termination of the pinch gesture), cylinder 1308-1 snaps to the predetermined snap point (e.g., moves to the location associated with the predetermined snap point, optionally even if cylinder 1308-1 were not at the location associated with the predetermined snap point when the selection input was terminated). In some embodiments, when cylinder 1308-1 snaps to the predetermined snap point, device 101 generates a tactile output indicating that cylinder 1308-1 has snapped to a snap point. In some embodiments, the tactile output is a vibrational output generated at device 101 or at an input device being held by one or more hands of the user. In some embodiments, snap points are located at one or more points of interest, such as the surface of a table, the floor, the wall, on a chair, etc. In some embodiments, if cylinder 1308 is moved to be farther from the threshold distance to the predetermined snap point, device 101 ceases to display target 1314. In some embodiments, the threshold distance for a snap point depends on the type of surface on which the snap point is located and/or the object that is being snapped to the respective snap point. For example, if the user is moving a vase towards the surface of a table, the threshold distance for a snap point at the surface of the table is greater than if the user is moving a vase to the floor. Because a vase is more appropriately placed on a table than the floor, the target is optionally displayed on the surface of the table for the vase when the vase is 3 feet away from the surface of the table (e.g., if the user ceases the selection gesture while the vase is 3 feet away, the vase will snap to the surface of the table), while a target is optionally displayed on the floor only when the vase reaches 6 inches away from the floor (e.g., if the user ceases the selection gesture while the vase is 6 inches away, the vase will snap to the floor).

In some embodiments, additionally or alternatively to displaying target 1314 at the location that cylinder 1308 will snap to, the surface of table 1306 is visually highlighted or visually altered to indicate that cylinder 1308 will snap to the surface of table 1306. In some embodiments, additionally or alternatively to displaying target 1314, device 101 displays a shadow of cylinder 1308 (e.g., an element different from target 1314, optionally displayed concurrently with target 1314). For example, while cylinder 1308 is floating in the air (e.g., due to the user moving cylinder 1308), device 101 displays a shadow of cylinder 1308 (e.g., silhouette of cylinder 1308) on the surface of table 1306 or on the surface of the floor, as the case may be. In some embodiments, the shadow of cylinder 1308 is based on the size and/or shape of cylinder 1308 and optionally depends on the distance of cylinder 1308 above the surface on which the shadow is displayed. For example, if cylinder 1308 is close to table 1308, then the size of the shadow is similar to or the same as the size of cylinder 1308, but if cylinder 1308 is high above table 1308, then the size of the shadow is larger than the size of cylinder 1308.

FIGS. 14A-14G is a flowchart illustrating a method 1400 of moving an object in a three-dimensional environment by an amount based on the distance of the object from the user in accordance with some embodiments. In some embodiments, the method 1400 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1400 are, optionally, combined and/or the order of some operations is, optionally, changed.

In the method 1400, in some embodiments, an electronic device (e.g., computer system 101 in FIG. 1) in communication with a display generation component and one or more input devices (e.g., a mobile device (e.g., a tablet, a smartphone, a media player, or a wearable device), or a computer) displays (1402), via the display generation component, a three-dimensional environment (e.g., a computer-generated reality (CGR) environment such as a virtual reality (VR) environment, a mixed reality (MR) environment, or an augmented reality (AR) environment, etc.) including a first object at a first location, wherein a second location in the three-dimensional environment, different from the first location, corresponds to a location of a predefined portion of a user (e.g., hand of the user, head of the user, etc.) of the electronic device in a physical environment, such as three-dimensional environment 1304 in FIG. 13A that includes cylinder 1308-1 and cylinder 1308-2 at a location different from the location of hand 1312 (e.g., displaying a first object in the three-dimensional environment).

In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor and/or a motion sensor (e.g., a hand tracking sensor, a hand motion sensor), etc.

The first object is optionally a virtual object displayed in the three-dimensional environment by the electronic device (e.g., generated and/or rendered by the electronic device). In some embodiments, the second location in the three-dimensional environment represents the location of the user of the device (e.g., the hand of the user, the head of the user, etc.) in the physical environment (e.g., the physical environment around the electronic device). For example, the displayed view of the three-dimensional environment is from the perspective of a user standing at that location in the three-dimensional environment looking in a respective direction in the three-dimensional environment.

In some embodiments, while displaying the three-dimensional environment including the first object at the first location, the electronic device receives (1404), via the one or more input devices, a user input including a movement of the predefined portion of the user that has a first magnitude, such as detecting Gesture H being performed by hand 1312 and a rightward movement of hand 1312 in FIG. 13B (e.g., receiving a user input that includes a movement of a hand of the user in the physical environment (e.g., movement of the user's hand in the real world) by a first magnitude).

In some embodiments, the user input is a motion or gesture of a hand of the user that is detected via a hand tracking device (e.g., a hand tracking sensor, a hand motion sensor, etc.) in communication with the electronic device. In some embodiments, the user input is a request to move the first object closer to the user (e.g., toward the location in the three-dimensional environment that represents the user). In some embodiments, the user input is a request to move the first object farther from the user (e.g., away from the location that represents the user). In some embodiments, the user input is a request to move the first object laterally (e.g., across the three-dimensional environment while maintaining the same distance from the location that represents the user). In some embodiments, the user input is a pinch gesture and while maintaining the pinch gesture, moving the hand closer to the body of the user, farther from the body of the user, or across the body of the user.

In some embodiments, in response to receiving the user input (1406), in accordance with a determination that the first object is a first distance from the second location, the electronic device moves (1407) the first object in the three-dimensional environment from the first location by a first amount in accordance with the first magnitude of the user input, such as cylinder 1308-1, which is a first distance from the user, moving rightwards by a first amount in FIG. 13B (e.g., if the first object is a first distance from the location of the user, then in response to the input, the first object moves by a first amount in the direction of the movement component of the user input). In some embodiments, the first amount is based on the amount of movement of the movement component of the user input (e.g., the first magnitude of the user input), optionally scaled by a first factor, as will be described in more detail below.

In some embodiments, in accordance with a determination that the first object is a second distance from the second location, different from the first distance, the electronic device moves (1408) the first object in the three-dimensional environment from the first location by a second amount, different from the first amount, in accordance with the first magnitude of the user input, such as cylinder 1308-2, which is a second distance from the user, moving rightwards by a second amount in FIG. 13B (e.g., if the first object is a second distance from the location of the user, then in response to the input, the first object moves by a second amount, different from the first amount, in the direction of the movement component of the user input).

In some embodiments, the second amount is based on the amount of movement of the movement component of the user input (e.g., the first magnitude of the user input). In some embodiments, the first amount and second amount are the amount of movement of the movement component of the user input scaled (e.g., multiplied) by a factor (optionally scaled by different factors). In some embodiments, the amount of scaling is based on the distance of the object from the location of the user (e.g., initial distance when the user input was received, or instantaneous distance when the object is moved). In some embodiments, if an object is farther away, then the movement is scaled by a larger amount than if the object is closer, thus allowing a user to bring a far-away object closer with less movement than if the movement was not scaled, allowing a user to move an object far away with less movement than if the movement was not scaled, and/or allowing a user to move an object laterally with less movement than if the movement was not scaled. In some embodiments, as the object approaches the user, the scaling factor decreases accordingly. In some embodiments, the scaling factor changes proportionally with the distance (e.g., decreased distance optionally causes decreased scaling, and increased distance optionally causes increased scaling). In some embodiments, the scaling factor changes as the object moves in accordance with the user input (continuously or periodically). In some embodiments, the scaling factor is set at the time that the selection input was received and does not change while the object moves in accordance with the user input. In some embodiments, the scaling factor decreases (as the object gets closer to the user) linearly, logarithmically, exponentially, according to a polynomial function, etc. In some embodiments, the scaling factor is proportional to the distance of the first object from the user to the distance of the hand from the body of the user. In some embodiments, the scaling effect is only applied when the first object is being moved towards the user (e.g., scaling is not applied when the user is moving the object farther away).

The above-described manner of moving a virtual object in a three-dimensional environment (e.g., by moving the object by an amount based on the distance of the object to the location of the user) provides quick and efficient method of moving a virtual object in the three-dimensional environment (e.g., by moving the object by a greater amount if it's further away, thus allowing the user to bring the object close to the user with fewer movements and without requiring the user to perform multiple movement inputs to bring the object closer to the user), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the movement of the predefined portion of the user has a first direction (1410), such as in FIG. 13B (e.g., detecting, via a hand tracking device or other sensing mechanism, a movement of the user's hand in a respective direction by a first amount/magnitude, such as to the left, right, forward, or backward with respect to the position of the electronic device in the three-dimensional environment).

In some embodiments, moving the first object in the three-dimensional environment is in a respective direction based on the first direction (1412), such as cylinder 1308-1 and cylinder 1308-2 moving in the same direction as the movement of hand 1312 in FIG. 13B (e.g., the first object is moved in the same direction as the movement of the user's hand). For example, if the user's hand moved horizontally to the right, then the first object is moved horizontally to the right. In some embodiments, if the user's hand changes depth (e.g., is brought closer to the user's torso or farther away from the user's torso), then the first object is moved closer or farther away from the user in the three-dimensional environment.

The above-described manner of moving a virtual object (e.g., by moving the object in the same direction as the movement of the predefined portion of the user) provides a quick and efficient method of moving a virtual object (e.g., by intuitively moving the object in the same way as the movement of the user), which simplifies the interaction between the user and the electronic device and enhances the operability of the electronic device and makes the user-device interface more efficient (e.g., without requiring the user to perform additional inputs to switch the direction of movement or perform unintuitive gestures), which additionally reduces power usage and improves battery life of the electronic device by enabling the user to use the electronic device more quickly and efficiently, while reducing errors in usage.

In some embodiments, the first distance and the second distance are greater than a threshold distance from the second location (1414), such as cylinder 1308-1 and cylinder 1308-2 being more than a threshold distance from hand 1312 in FIG. 13A. In some embodiments, in response to receiving the user input (1416), in accordance with a determination that the first object is less than the threshold distance from the second location, the electronic device moves (1418) the first object in the three-dimensional environment from the first location by the first magnitude, such as if cylinder 1308 is closer than the threshold distance from hand 1312 and in response to the rightward movement of hand 1312, cylinder 1308 moves rightwards by the same amount as the rightward movement of hand 1312 in FIG. 13B (e.g., if the distance from the first object and the location representative of the user is less than a threshold distance (e.g., 6 inches, 1 foot, 3 feet, 5 feet, 10 feet, etc.), then the movement of the first object is not scaled and moves by the same amount as the movement of the user's hand).

For example, if the user moves his or her hand horizontally to the right by 1 foot, then the first object moves to the right by 1 foot. In some embodiments, when the first object is less than the threshold distance from the second location, then manipulations of the first object are in a direct manipulation mode, such that the first object is manipulated in such a way that the distance between first object and the user's hand is maintained throughout the manipulation. In some embodiments, when the first object is more than the threshold distance from the second location, then manipulations of the first object are in an indirect manipulation mode. In some embodiments, while in indirect manipulation mode, the first object is manipulated by an amount equal to the first magnitude, scaled by a scaling factor. In some embodiments, the scaling factor is based on the distance of the first object from the second location, as described above.

The above-described manner of moving a virtual object (e.g., by moving the object by the same amount as the movement of the predefined portion of the user if the object is within a threshold distance of the user) provides a quick and efficient method of moving a virtual object (e.g., by intuitively moving the object by the same amount as the movement of the user if the object is nearby), which simplifies the interaction between the user and the electronic device and enhances the operability of the electronic device and makes the user-device interface more efficient (e.g., without requiring the user to perform additional inputs to change the scale of the movement of the object when the object is nearby), which additionally reduces power usage and improves battery life of the electronic device by enabling the user to use the electronic device more quickly and efficiently, while reducing errors in usage.

In some embodiments, the movement of the predefined portion of the user includes a first portion of the movement that has a respective magnitude and a second portion of the movement that has the respective magnitude (1420), such as if the movement of hand 1312 moves forward or closer to the user while simultaneously moving laterally in FIG. 13B (e.g., the movement of the user input includes a first movement by a first amount and a second movement by the same amount). In some embodiments, the movement of the user input includes at least a movement towards or away from the user (e.g., away from the second location).

In some embodiments, moving the first object in the three-dimensional environment from the first location includes (1422) changing a distance of the first object from the second location (1424), such as moving cylinder 1308 closer or farther from the user based on hand 1312 moving closer or farther from the user in FIG. 13B (e.g., moving the first object closer or farther away from the user in accordance with the user input), moving the first object by a first respective amount in accordance with the first portion of the movement of the predefined portion of the user (1426), such as moving cylinder 1308 by a first amount based on the distance of cylinder 1308 from the user during the first portion of the movement of hand 1312, such as in FIG. 13B (e.g., moving the first object by a first respective amount that is based on the distance of the first object from the user), and moving the first object by a second respective amount, different from the first respective amount, in accordance with the second portion of the movement of the predefined portion of the user (1428), such as moving cylinder 1308 by a second amount based on the distance of cylinder 1308 from the user during the second portion of the movement of hand 1312, such as in FIG. 13B (e.g., moving the first object by a second respective amount that is based on the distance of the first object from the user).

In some embodiments, if the movement of the user input includes a z component (e.g., in a direction towards or away from the second location). In some embodiments, the first portion of the movement input is received when the first object is a first distance from the user and in response to the first portion of the movement, the object moves by the respective magnitude scaled by a first scaling factor, where the first scaling factor is based on the first distance. In some embodiments, the second portion of the movement input is received when the first object is a second distance from the user (e.g., after changing the distance of the first object from the second location) and in response to the second portion of the movement, the object moves by the respective magnitude scaled by a second scaling factor different from the first scaling factor, where the second scaling factor is based on the second distance. In some embodiments, as the distance between the first object and the second location changes, the scaling factor changes. In some embodiments, the scaling factor changes continuously (e.g., as a smooth function). In some embodiments, the scaling factor changes in increments (e.g., step-wise).

The above-described manner of moving a virtual object (e.g., by changing the scaling of how much the object moves if the object becomes closer to or farther away from the user) provides a quick and efficient method of moving a virtual object (e.g., by automatically changing the scale of movement without requiring the user to terminate the manipulation and restart the manipulation to change the scaling factor or perform additional inputs to change or update the scaling factor), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the user input includes a pinch gesture performed by the predefined portion of the user, followed by the movement of the predefined portion of the user (1430), such as hand 1312 performing Gesture H and moving rightwards while maintaining Gesture H in FIG. 13B (e.g., the user input includes a pinch gesture by the hand of the user that corresponds to a selection gesture, and while maintaining the pinch gesture, a movement of the hand of the user that corresponds to a request to move the virtual objects.

The above-described manner of moving a virtual object (e.g., by detecting a pinch gesture from the hand of the user, followed by a movement of the hand while maintaining the pinch gesture) provides a quick, efficient, and intuitive method of moving a virtual object (e.g., by providing the user with a mechanism of moving an object as if the object were a physical object, without requiring the user to perform additional or unintuitive inputs to move an object), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, receiving the user input includes detecting, via an eye tracking device, that a gaze of the user of the electronic device is directed to the first object (1432), such as gaze 1310-1 directed to cylinder 1308-1 or gaze 1310-2 directed to cylinder 1308-2 in FIG. 13A (e.g., an eye tracking device detects that the gaze of the user is directed at and/or focused on the first object when the selection input was received (e.g., a pinch gesture)).

In some embodiments, if the gaze of the user is directed to the first object when the selection input is received, the first object is selected (e.g., such that movements of the hand cause the first object to move), but if the gaze of the user is directed to a second object when the selection input is received, then the second object is selected (e.g., such that movements of the hand cause the second object to move and not the first object).

The above-described manner of selecting a virtual object for manipulation (e.g., by determining that the gaze of the user is directed to the virtual object when the selection and/or manipulation input was received) provides a quick and efficient method of selecting a virtual object (e.g., by automatically determining the object that the user is focused on, without requiring the user to perform additional inputs or gestures to select the virtual object), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the three-dimensional environment includes a respective predefined location, such as a snap location on the surface of table 1306 associated with target 1314 in FIG. 13B (e.g., the three-dimensional includes one or more predefined locations to which objects will "snap" when the object is moved. In some embodiments, the one or more predefined locations are based on a uniform grid. In some embodiments, the one or more predefined locations are based on other objects (e.g., locations and size and shape of other objects). In some embodiments, the predefined locations are boundaries, surfaces, and/or points of interests of virtual objects or boundaries, surfaces, and/or points of interests of representations of physical objects (e.g., objects in the physical environment around the device that are presented in the three-dimensional environment).), and moving the first object in the three-dimensional environment includes (1434), in accordance with a determination that a current location of the first object in the three-dimensional environment is within a threshold distance of the respective predefined location in the three-dimensional environment, snapping the first object to the respective defined location in the three-dimensional environment (1436), such as snapping cylinder 1308-1 to the snap location associated with target 1314 in FIG. 13B (e.g., if the first object is moved to within a threshold distance of a snap location (e.g., 3 inches, 6 inches, 1 foot, 3 feet, 5 feet, 10 feet, etc.), then the first object is snapped to the snap location).

In some embodiments, snapping to the snap location includes moving the center of the first object to the snap location. In some embodiments, snapping to the snap location includes moving the first object such that a boundary/surface of the first object is at the snap location.

The above-described manner of moving a virtual object (e.g., by snapping the object to a nearby location) provides a quick and efficient method of moving a virtual object (e.g., by automatically aligning the object with a predefined location, without requiring the user to perform additional inputs or perform minute adjustments to align the object with the predefined location), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, in accordance with the determination that the current location of the first object in the three-dimensional environment is within the threshold distance of the respective predefined location in the three-dimensional environment (e.g., if the first object is within the threshold distance from a predefined location such that the first object will be snapped to the predefined location), the electronic device displays (1438), via the display generation component, a visual indication of the respective predefined location in the three-dimensional environment, such as target 1314 in FIG. 13B (e.g., display an indication that the first object sill be snapped to the predefined location).

In some embodiments, upon detecting a termination of a selection input while the indication is displayed, the first object is snapped to the predefined location. In some embodiments, the indication is an outline of the first object (e.g., a silhouette or other suitable preview of the first object).

The above-described manner of moving a virtual object (e.g., by displaying a visual indication of the location to which the virtual object will snap) provides a quick and efficient method of moving a virtual object (e.g., by displaying a visual indication of a snap location when the virtual object will snap to the snap location upon termination of the user input, without requiring the user to separately determine the predefined snap locations or experiment with object placements to find a snap location), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, a size of the visual indication of the respective predefined location is based on a size of the first object (1440), such as the size of target 1314 being based on the size of the bottom side of cylinder 1308-1 in FIG. 13B (e.g., the visual indication has a size that is equal to the size of the first object if the first object were located at the predefined snap location).

In some embodiments, the visual indication is a preview of the silhouette or footprint of the first object when snapped to the predefined location (e.g., the size and shape of the first object that is in contact with the first object). In some embodiments, the shape of the visual indication is based on the shape of the first object. In some embodiments, the visual indication is an outline of the portion of the first object that will intersect with and/or make contact with the snap location. For example, if the object is a vase with a circular base and the snap location is the top surface of a table, the visual indication is an outline of a circle (e.g., the size and shape of the circular base).

The above-described manner of displaying a snap target (e.g., by displaying a visual indication of the snap target that has a size that is based on the size of the object to be snapped to the snap target) provides a quick and efficient method of displaying a visual indication of the snap target (e.g., by visually displaying a preview of the area that would be encompassed by the first object when snapped to the snap target, without requiring the user to snap the object to the snap target), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, a shape of the visual indication of the respective predefined location is based on a shape of the first object, and indicates an area of the three-dimensional environment that will be occupied by a portion of the first object when the first object is placed at the respective predefined location in the three-dimensional environment (1442), such as the shape of target 1314 being based on the shape of the bottom side of cylinder 1308-1 in FIG. 13B (e.g., the visual indication has a size and/or shape that is equal to the size and/or shape of the first object if the first object were located at the visual indication). In some embodiments, the visual indication is a preview of the silhouette or footprint of the first object when snapped to the predefined location (e.g., the size and shape of the first object that is in contact with the first object).

The above-described manner of displaying a snap target (e.g., by displaying a visual indication of the snap target that has a shape that is based on the shape of the object to be snapped to the snap target) provides a quick and efficient method of displaying a visual indication of the snap target (e.g., by visually displaying a preview of the area that would be encompassed by the first object when snapped to the snap target, without requiring the user to snap the object to the snap target), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the respective predefined location is located on a surface of a respective object in the three-dimensional environment (e.g., the snap location is located on a surface of an object. In some embodiments, the surface is a wall, a tabletop, the top of a coffee table, the floor, etc. In some embodiments, the surface is a surface of a virtual object or a real-world physical object (e.g., a real world object in the environment about the device which is presented in the three-dimensional environment).), and displaying the visual indication of the respective predefined location includes visually emphasizing the surface of the respective object (1444), such as highlighting the top surface of table 1306 in FIG. 13B (e.g., highlighting the surface of the respective object as compared to other portion(s) of the respective object).

In some embodiments, displaying the visual indication includes changing a color, shading, brightness, contrast, or any other visual characteristic of the surface of the object. In some embodiments, the visual indication is displayed on a portion of the surface. In some embodiments, the visual indication is displayed on the entirety of the surface.

The above-described manner of displaying a snap target (e.g., by visually emphasizing the surface that the object will be snapped to) provides a quick and efficient method of displaying a visual indication of the snap target (e.g., without requiring the user to separately determine the predefined snap locations or experiment with object placements to find a snap location), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while the current location of the first object in the three-dimensional environment is within the threshold distance of the respective predefined location in the three-dimensional environment and while displaying the visual indication of the respective predefined location in the three-dimensional environment, the electronic device detects (1446) movement of the first object to a distance further away than the threshold distance from the respective predefined location in the three-dimensional environment, such as a movement of hand 1312 moving cylinder 1308-1 away from target 1314 in FIG. 13B (e.g., receiving a user input that includes a movement to move the first object to farther than the threshold distance from the snap point).

In some embodiments, in response to detecting the movement of the first object to the distance further away than the threshold distance from the respective predefined location in the three-dimensional environment, the electronic device ceases (1448) display of the visual indication of the respective predefined location, such as ceasing display of target 1314 in FIG. 13B (e.g., in response to and/or when the first object is farther than the threshold distance away from the snap point, ceasing display of the visual indication of the snap point).

In some embodiments, only one visual indication is displayed at any one time. In some embodiments, more than one visual indication associated with multiple snap points are concurrently displayed (e.g., if the first object is within the threshold distance from two or more snap points). In some embodiments, if multiple visual indications of multiple snap points are displayed, then if the object moves farther away than the threshold distance from a respective visual indication, then the respective visual indication ceases to be displayed (optionally, the display of the other snap points are maintained if the object is still within the threshold distance from those snap points).

The above-described manner of moving a virtual object (e.g., by displaying a visual indication of a snap target when the object approaches the snap target, but ceasing display of the visual indication when the virtual object moves away) provides a quick and efficient method of displaying a visual indication of the snap target (e.g., by automatically removing display of the visual indication when the object moves beyond the snap distance of the snap target), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while the current location of the first object in the three-dimensional environment is within the threshold distance of the respective predefined location in the three-dimensional environment and while displaying the visual indication of the respective predefined location in the three-dimensional environment (e.g., while the visual indication of the snap point is displayed such that upon termination of the user input, the first object will snap to the snap point), the electronic device detects (1450) manipulation of the first object, such as if cylinder 1308-1 were rotated while displaying target 1314 in FIG. 13B (e.g., a change in the orientation of the first object such that the footprint and/or silhouette of the first object from the perspective of the user and/or relative to the three-dimensional environment changes).

In some embodiments, in response to detecting the manipulation of the first object, the electronic device updates (1452) display of the visual indication of the respective predefined location to reflect the manipulation of the first object, such as if target 1314 changed size and/or shape based on the rotation of cylinder 1308-1 in FIG. 13B (e.g., changing the visual indication in accordance with the change in footprint or silhouette).

In some embodiments, the visual indication has the size and shape of the footprint of the first object (e.g., the amount of space on the surface that will be taken up by the first object), and if the first object is rotated or otherwise manipulated, then the footprint of the first object changes and the visual indication changes to reflect the new size, shape, orientation, etc. For example, if the first object is a pyramid, then when the pyramid is upright (e.g., the triangular ends are up and down), then the visual indication (e.g., on the surface of a table) is a square (e.g., the shape of the base of the pyramid) and equal to the size and/or shape of the base of the pyramid (e.g., reflecting the space that the pyramid will take when placed at that location), but if the pyramid is rotated such that the triangular ends would be placed on the surface (e.g., instead of the base), then the visual indication changes to be triangular and optionally equal to the size and shape of the triangular sides of the pyramid (e.g., reflecting the space that the pyramid will take when placed at that location).

The above-described manner of displaying a snap target (e.g., by displaying a visual indication that changes size and/or shape when the virtual object rotates based on the rotation of the object) provides a quick and efficient method of displaying a visual indication of the snap target (e.g., by updating the size and/or shape of the visual indication if the footprint of the virtual object changes due to a rotation of the virtual object, without requiring the user to perform additional inputs to update the visual indication after manipulating the virtual object), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the electronic device concurrently displays (1454), via the display generation component, a shadow corresponding to the first object in the three-dimensional environment and the visual indication of the respective predefined location, wherein the shadow is different from the visual indication of the respective predefined location, such as if a shadow of cylinder 1308-1 were displayed on the surface of table 1306 concurrently with target 1314 in FIG. 13B (e.g., show a shadow of the first object, optionally on the same surface as the visual indication of the snap location, and optionally on a different surface (e.g., of the same object or a different object) as the visual indication of the snap location).

In some embodiments, the shadow of the first object has a shape based on the silhouette of the object if light were being cast from a respective location in the three-dimensional environment. In some embodiments, the light is being cast downwards from the top of the three-dimension environment. In some embodiments, the shape of the shadow is a different shape than the visual indication. In some embodiments, the size of the shadow is based on the distance of the first shape from the surface that the shadow is on (e.g., how much the shape is floating above the surface). In some embodiments, the footprint does not change a size and/or shape based on the distance of the first shape from the surface.

The above-described manner of moving a virtual object (e.g., by displaying a visual indication of the snap target and a shadow of the virtual object) provides feedback of the movement of the virtual object (e.g., by concurrently displaying a shadow of the virtual object which indicates the current position of the virtual object with respect to the surface below the virtual object and the visual indication of the snap point, which indicates the position that the virtual object will be at when the object snaps to the snap point), which simplifies the interaction between the user and the electronic device and enhances the operability of the electronic device and makes the user-device interface more efficient (e.g., by providing a method to compare the current location of the object with the snap location), which additionally reduces power usage and improves battery life of the electronic device by enabling the user to use the electronic device more quickly and efficiently, while reducing errors in usage.

In some embodiments, while moving the first object in the three-dimensional environment (1456), in accordance with the determination that the current location of the first object in the three-dimensional environment is within the threshold distance of the respective predefined location in the three-dimensional environment, the electronic device generates (1458), via the electronic device, a respective tactile output, such as if device 101 causes a tactile output to be generated when cylinder 1308-1 snaps to the location associated with target 1314 in FIG. 13B (e.g., generating a tactile output, such as a vibration, a bump, etc. at one or more human-device interfaces). In some embodiments, the tactile output is generated at an input device. For example, generating a vibration output on a stylus that is in communication with the electronic device. In some embodiments, the tactile output is generated at a wearable device (e.g., the electronic device), such as a watch, armband, headband, etc.

The above-described manner of snapping a virtual object to a snap location (e.g., by generating a tactile output when the virtual object is snapped to the snap location) provides tactile feedback that the virtual object has snapped or can snap to the snap location, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, in accordance with a determination that the respective predefined location in the three-dimensional environment corresponds to a first type of surface in the three-dimensional environment, the threshold distance is a first threshold distance (1460), such as the snap distance being a first distance for the surface of table 1306 in FIG. 13B (e.g., if the snap location is a surface on a first type of object, such as the surface of a table, then the distance at which the visual indication is displayed and/or the distance at which a virtual object will snap to the snap location is a first threshold distance, based on the first type of surface).

In some embodiments, in accordance with a determination that the respective predefined location in the three-dimensional environment corresponds to a second type of surface, different from the first type of surface, in the three-dimensional environment, the threshold distance is a second threshold distance, different from the first threshold distance (1462), such as the snap distance being a second, different, distance for the floor in FIG. 13B (e.g., if the snap location is a surface on a second type of object, such as the surface of the floor, then the distance at which the visual indication is displayed and/or the distance at which a virtual object will snap to the snap location is a second threshold distance, based on the second type of surface).

In some embodiments, the electronic device is able to determine, based on the first object, whether certain surfaces are more appropriate or less appropriate and vary the snap distances on the determination. For example, the snap distance to place a vase on a table is more than the snap distance to place a vase on the floor, because it may be determined that the vase is more likely to be placed on the table than the floor. Thus, to snap the vase to the floor, the vase would have to be brought much closer to the floor than for snapping the vase to the surface of a table. In another example, the snap distance to place a chair on the floor is more than the snap distance to place a chair on a table, because it may be determined that a chair is more likely to be placed on the floor than the table. Thus, to snap the chair to the floor, the chair would have to be brought much closer to the table than for snapping the chair to the floor.

The above-described manner of snapping a virtual object to a snap location (e.g., by requiring a first distance to snap to a snap location that is on a first type of surface, but requiring a second, different, distance to snap to a snap location that is on a second type of surface) provides a quick and efficient method of displaying a visual indication of the snap target (e.g., by automatically displaying an indication of the snap location earlier or later based on the object to be snapped and type of surface that the object will be snapped to), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the user input includes a selection input followed by a pause input for longer than a time threshold, followed by the movement of the predefined portion of the user (1464), such as a pause after detecting Gesture H by hand 1312 and before detecting the movement of hand 1312 in FIGS. 13A and 13B (e.g., a pinch gesture while looking at the object for more than a threshold amount of time, followed by a movement of the hand of the user).

In some embodiments, the object moves in the three-dimensional environment in accordance with the movement of the hand (optionally scaled by a scaling factor). In some embodiments, if the selection input is not followed by a pause for longer than the time threshold (e.g., the movement occurs right after the selection input or the selection input is not held for a threshold amount of time before the movement), then the object is not moved in the three-dimensional environment.

The above-described manner of moving a virtual object (e.g., by requiring a selection input to be held for a threshold amount of time before a movement of the hand of the user) provides a quick and efficient method of ensuring that the user input is a request to move the virtual object (e.g., by determining that the selection gesture is intentional), which simplifies the interaction between the user and the electronic device and enhances the operability of the electronic device and makes the user-device interface more efficient (e.g., by reducing the chance of falsely detecting a request to move the object), which additionally reduces power usage and improves battery life of the electronic device by enabling the user to use the electronic device more quickly and efficiently, while reducing errors in usage.

In some embodiments, the first magnitude of the movement of the predefined portion of the user is greater than a magnitude threshold (1466), such as the movement of hand 1312 in FIG. 13B being larger than a minimum amount. In some embodiments, in response to receiving the user input (1468), in accordance with a determination that the first magnitude of the movement of the predefined portion of the user is less than the magnitude threshold, the electronic device maintains (1470) the first object at the first location in the three-dimensional user interface, such as if cylinder 1308 were not moved in FIG. 13B due to the movement of hand 1312 being less than the minimum amount (e.g., if the magnitude of the movement of the hand of the user is less than a threshold amount (e.g., 0.5 inches, 1 inch, 3 inches, 6 inches, 1 foot), then do not move the first object in accordance with the movement of the hand).

In some embodiments, requiring a minimum movement prevents small or unintentional movements from causing the first object to move. In some embodiments, if the movement of the hand is more than the magnitude threshold, then the first object moves in accordance with the movement of the hand.

The above-described manner of moving a virtual object (e.g., by moving the virtual object if the movement of the hand of the user is more than a threshold distance) provides a quick and efficient method of ensuring that the user input is an intentional request to move the virtual object (e.g., by requiring a minimum movement), which simplifies the interaction between the user and the electronic device and enhances the operability of the electronic device and makes the user-device interface more efficient (e.g., by reducing the chance of falsely detecting a request to move the object), which additionally reduces power usage and improves battery life of the electronic device by enabling the user to use the electronic device more quickly and efficiently, while reducing errors in usage.

FIGS. 15A-15F illustrate examples of scanning a real world object in accordance with some embodiments.

Figure 15A:
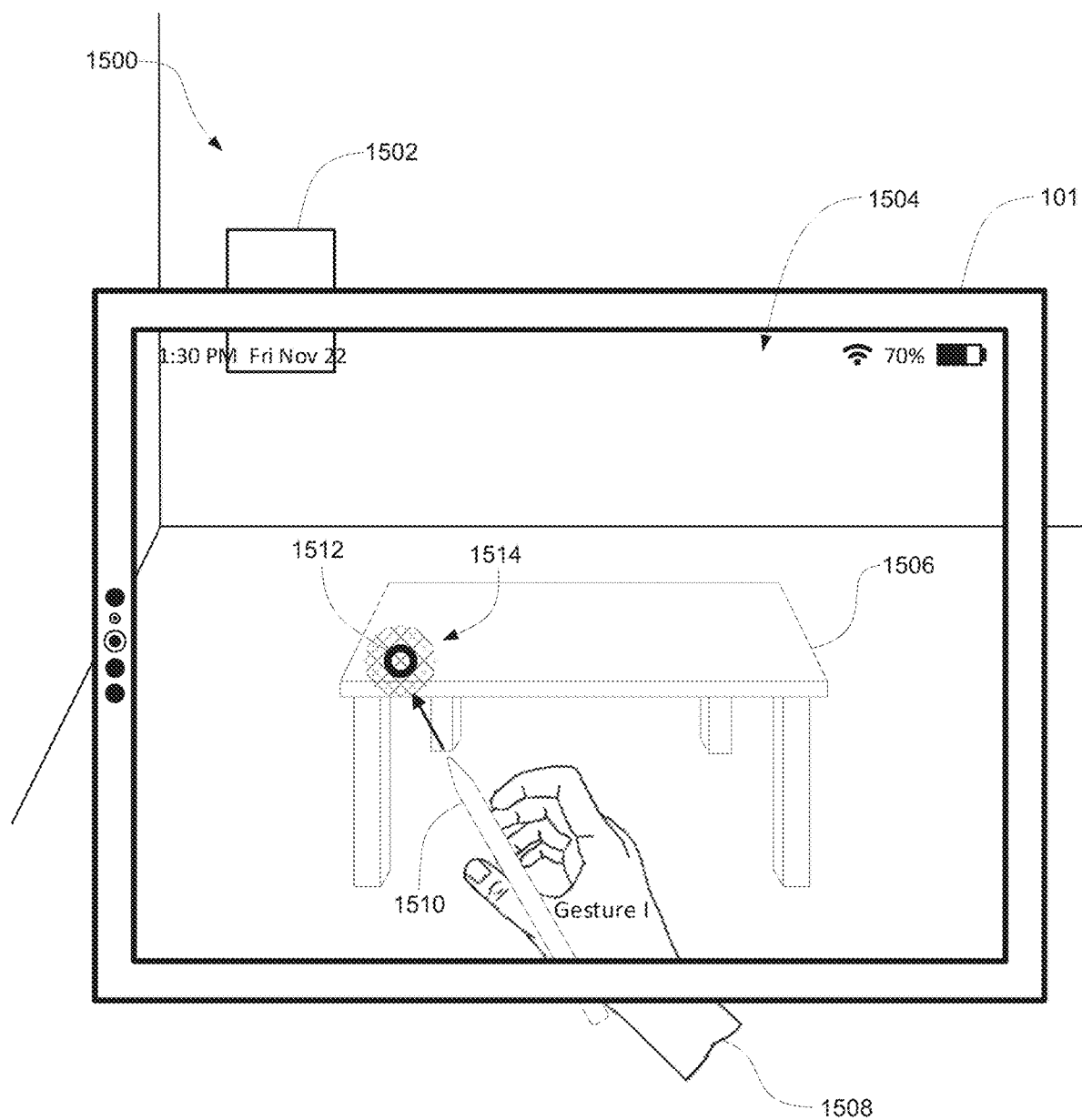
FIGS. 15A-15F illustrate examples of scanning a real world object in accordance with some embodiments.

FIG. 15A illustrates an electronic device 101 displaying, via a display generation component (e.g., display generation component 120 of FIG. 1), a three-dimensional environment 1504 on a user interface. As described above with reference to FIGS. 1-6, the electronic device 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the electronic device 101 would be able to use to capture one or more images of a user or a part of the user while the user interacts with the electronic device 101. In some embodiments, the user interfaces shown below could also be implemented on a head-mounted display that includes a display generation component that displays the user interface to the user and sensors to detect the physical environment and/or movements of the user's hands (e.g., external sensors facing outwards from the user), and/or gaze of the user (e.g., internal sensors facing inwards towards the face of the user).

As shown in FIG. 15A, device 101 captures one or more images of the real world environment 1500 around device 101 (e.g., operating environment 100), including one or more objects in the real world environment 1500 around device 101. In some embodiments, device 101 displays representations of the real world environment in three-dimensional environment 1504. For example, three-dimensional environment 1504 includes a back corner of a room, a representation of at least a portion of picture frame 1502 on the back wall of the room, and a representation of table 1506. Similarly, in FIG. 15A, three-dimensional environment 1504 includes a representation of a hand 1508 holding stylus 1510. In some embodiments, as described above in FIG. 6B, hand 1508 is held in front or behind device 101 (e.g., on the opposite side of device 101 from the user) and is captured by the one or more sensors of the device (e.g., optionally by the sensors that are on the opposite side of device 101 as the user as illustrated above in FIG. 6B). In some embodiments, hand 1508 of the user is holding stylus 1510 and thus, device 101 displays representation of the hand 1508 holding a representation of the stylus 1510. In some embodiments, the hand of the user of the device is held in front of the device (e.g., on the same side of device 101 as the user) and is captured by the one or more sensors of device 101 (e.g., optionally by the sensors that are on the same side of device 101 as the user).

In some embodiments, stylus 1510 is an active device that includes one or more sensors such as an orientation sensor (e.g., accelerometer and/or gyroscope), one or more tactile output generators, one or more contact sensors (e.g., for detecting user inputs) that is in communication with device 101. In some embodiments, stylus 1510 is a passive pointing device (e.g., a pencil, a pen, a laser pointer, a pointing stick, etc.) that device 101 is able to track with one or more sensors of device 101 (e.g., optionally by the sensors that are on the opposite side of device 101 as the user).

In some embodiments, a real world object is partially or wholly scanned (e.g., by device 101) to generate a partial or complete three-dimensional model of the real world object. In some embodiments, the real world object is scanned by performing multiple captures of the respective object from multiple angles and/or perspectives. In some embodiments, the captures are performed using one or more cameras and/or one or more time of flight sensors (e.g., depth sensors). In some embodiments, the captures are performed by sensors (e.g., cameras and/or time of flight sensors) of device 101. In some embodiments, the captures are performed by sensors of another device. In some embodiments, a user is able to use a pointing device, such as a stylus, to mark portions of the real world object for scanning. In some embodiments, the captures are performed by sensors of the stylus. In some embodiments, portions of the real world object are scanned in response to the user marking the portions of the real world object for scanning. In some embodiments, portions of the real world object that have been marked are scanned at a separate, future time. As discussed above, the stylus is used for marking portions of the real world object for scanning and sensors in device 101 (e.g., not in the stylus) are used to scan the portions that are marked for scanning.

In some embodiments, the scanned portions of the real world object are used to generate a model of the scanned portions of the real world object, for example, for creating a virtual object that is based on the scanned portions of the real world object. In this way, a user is able to insert virtual objects into a three-dimensional environment that are optionally identical to a real world object.

In FIG. 15A, device 101 detects that stylus 1510 is pointed at a respective portion of table 1506 (e.g., a real world object in real world environment 1500). In some embodiments, in accordance with a determination that stylus 1510 is pointed at a respective portion of table 1506, device 101 displays a reticle 1512 indicating the respective portion of table 1506 that is being marked for scanning or will be marked for scanning by stylus 1510, as shown in FIG. 15A. In some embodiments, reticle 1512 has a size based on the distance of stylus 1510 from the portion to be marked for scanning. For example, if stylus 1510 is close to the portion of table 1506 to be marked for scanning, reticle 1512 has a small size (e.g., smaller diameter), but if stylus 1510 is far away from the portion of table 1506 to be marked for scanning, reticle 1512 has a large size (e.g., larger diameter). Thus, in some embodiments, reticle 1512 exhibits a flashlight-like behavior in which increasing the distance from the target causes reticle 1512 to increase in size and decreasing the distance from the target causes reticle 512 to decrease in size. As described above, if stylus 1512 is farther away from table 1506, a larger portion of table 1506 is marked for scanning (e.g., corresponding to the larger sized reticle) and if stylus 1512 is closer to table 1506, a smaller portion of table 1506 is marked for scanning (e.g., corresponding to the smaller sized reticle).

In some embodiments, device 101 determines the portion of table 1506 that stylus 1510 is pointed at based on the orientation and/or angle of stylus 1506. In some embodiments, device 101 marks the respective portion of table 1506 for scanning in response to detecting a selection gesture by hand 1508 (e.g., "Gesture I"). In some embodiments, the selection gesture includes a tap gesture on stylus 1510 and/or a tap-and-hold gesture on stylus 1510. In some embodiments, a tap gesture is a contact by a finger of hand 1508 (e.g., a forefinger, a thumb, etc.) with stylus 1510 for less than a threshold amount of time (e.g., 0.1 seconds, 0.5 seconds, 1 second, 3 seconds, etc.) followed by a lift-off of the contact. In some embodiments, a tap-and-hold gesture is a contact by a finger of hand 1508 with stylus 1510 for less than a threshold amount of time, followed by a lift-off of the contact, further followed by a continued contact by the same finger of hand 1508 within a threshold amount of time from the lift-off (e.g., within 0.1 second, 0.5 seconds, 1 second, 3 seconds, etc.). In some embodiments, in response to detecting the selection gesture, the portions of table 1506 that stylus 1510 is pointed at are marked for scanning, as described above. In some embodiments, if a selection gesture is not detected (e.g., the selection gesture was not detected before stylus 1510 pointed at a portion of table 1506, or the selection gesture is not maintained while stylus 1510 points at portions of table 1506), then portions of table 1506 are not marked for scanning.

In some embodiments, after a portion of table 1506 has been marked for scanning, device 101 displays a scanning indicator 1514 that indicates the portions of table 1506 that have been marked for scanning (e.g., optionally portions of table 1506 that have been scanned, for example, in the embodiments in which table 1506 is scanned live). In some embodiments, scanning indicator 1514 is a shading, highlighting, mesh pattern, or other suitable method of indicating areas that have been marked for scanning.

In some embodiments, as hand 1508 moves and/or changes orientation such that stylus 1510 is pointed at different portions of table 1506 (optionally while the user maintains Gesture I), reticle 1512 moves along table 1506 to follow the portions of table 1506 at which stylus 1510 is pointing. In some embodiments, as reticle 1512 moves across different portions of table 1506, different portions of table 1506 are marked for scanning. For example, in FIG. 15B, the user has moved stylus 1510 to scan a leg of table 1506. In some embodiments, in response to detecting the movement of stylus 1510 across the leg of table 1506, device 101 expands scanning indicator 1514 to include the portions of the table 1506 at which stylus 1510 has pointed so far during the current scanning session. For example, marking additional portions of table 1506 adds the additionally marked portions to the portions of table 1506 that were previously marked for scanning. In some embodiments, a user is able to reset the marked portions of table 1506 (e.g., by selecting a selectable option to undo or clear the scanning indicators) such that no portions of table 1506 are marked for scanning.

In some embodiments, the user is able to move around the object and/or change the orientation of the object to scan portions of the object that are not otherwise visible without changing the view of the object. For example, in FIG. 15B, a user is able to walk around to the sides of table 1506 and/or rotate table 1506 to mark the left, right, and/or far side of table 1506 for scanning. In some embodiments, device 101 detects that the orientation of the user and/or orientation of table 1506 has changed and is able to move scanning indicator 1514 to follow the change in perspective. For example, if the user walks to the back of table 1506 and faces table 1506 from the back, scanning indicator 1514 is maintained displayed at the front-left corner of table 1506, which is now displayed at the back-right from the new perspective of the user.

In some embodiments, if table 1506 is rotated or if the user moves around table 1506 while the user is maintaining the selection input and pointing stylus 1510 towards table 1506, device 101 marks portions of table 1506 to which stylus 1510 points during the movement due to the change in perspective. For example, if the user it pointed at a corner of table 1506 with stylus 1510, and then rotates around table 1506 while maintaining the orientation of stylus 1510, the movement around table 1506 causes stylus 1510 to be pointed at another corner of table 1506 (e.g., and optionally other portions table 1506 that stylus 1510 pointed at while the user rotated around table 1506) and in response, device 101 marks the new corner of table 1506 (e.g., and optionally any additional portions of table 1506 that stylus 1510 pointed at while the user rotated around table 1506) for scanning (e.g., and expands scanning indication 1514 accordingly). Thus, a user is able to scan different portions of table 1506 by either moving stylus 1510, moving table 1506, and/or changing positions with respect to table 1506.

In some embodiments, after completing the process for marking portions of table 1506 for scanning (e.g., after having marked all portions for scanning and/or in response to detecting a user input indicating the completion of marking portions for scanning, etc.), device 101 displays one or more selectable options (e.g., optionally in a contextual menu) for performing operations associated with the scanned portions of table 1506. For example, the one or more selectable options include an option to undo the most recent operation (e.g., un-mark the most recently marked portion for scanning), a copy and/or duplicate option (e.g., to generate a three-dimensional object based on the portions that have been marked for scanning so far, as will be described in more detail below), and/or an option to complete the scanning process (e.g., to discard the scan results and cease display of scanning indicator 1514. In some embodiments, after completing the process for marking portions of table 1506 for scanning, device 101 displays a movement affordance at or near scanning indicator 1514 that is selectable and moveable to move scanning indicator 1514 away from table 1506 (e.g., thus generating a three-dimensional object, as will be described below with reference to FIG. 15C).

Figure 15B:
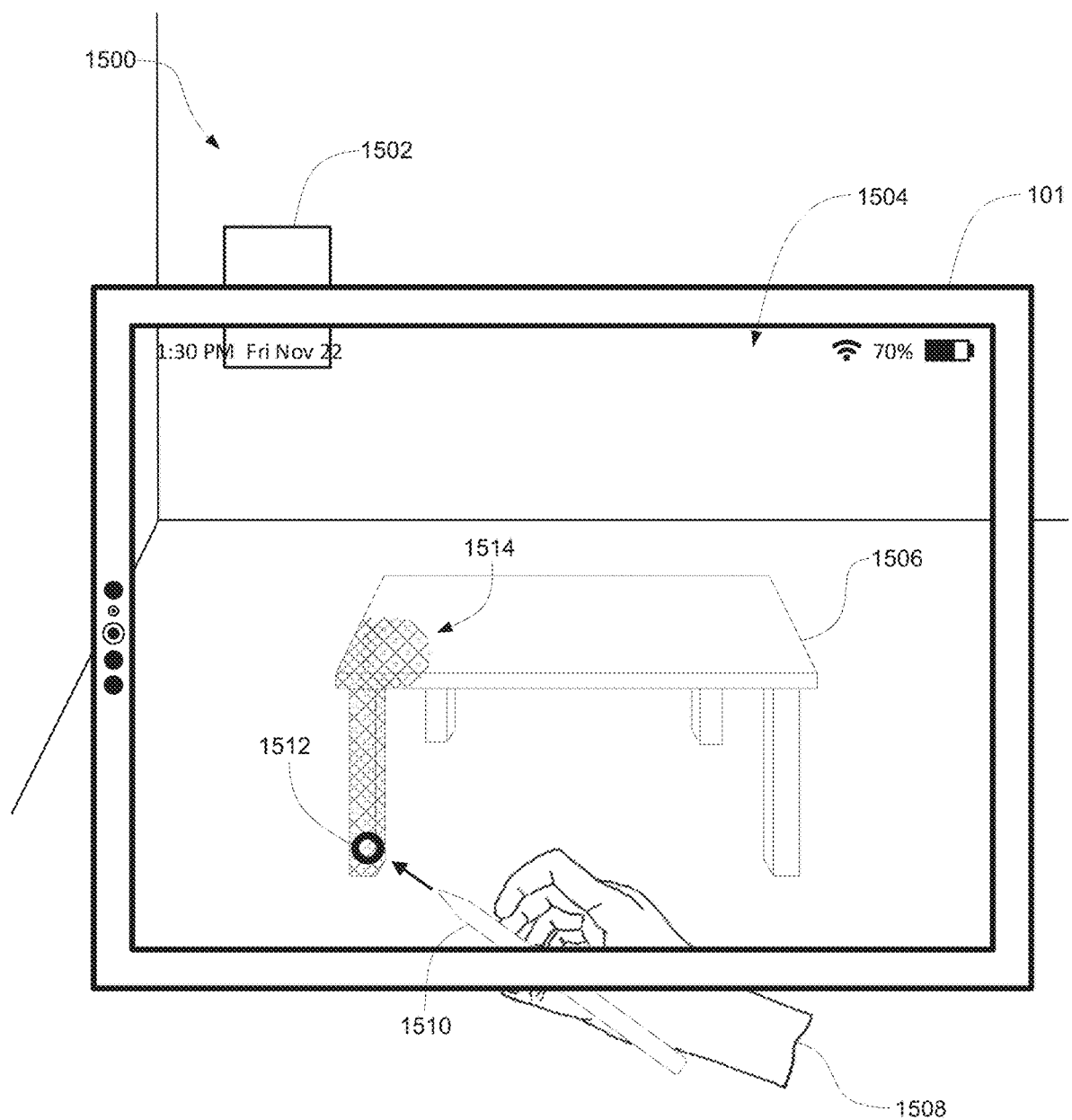
Figure 15C:
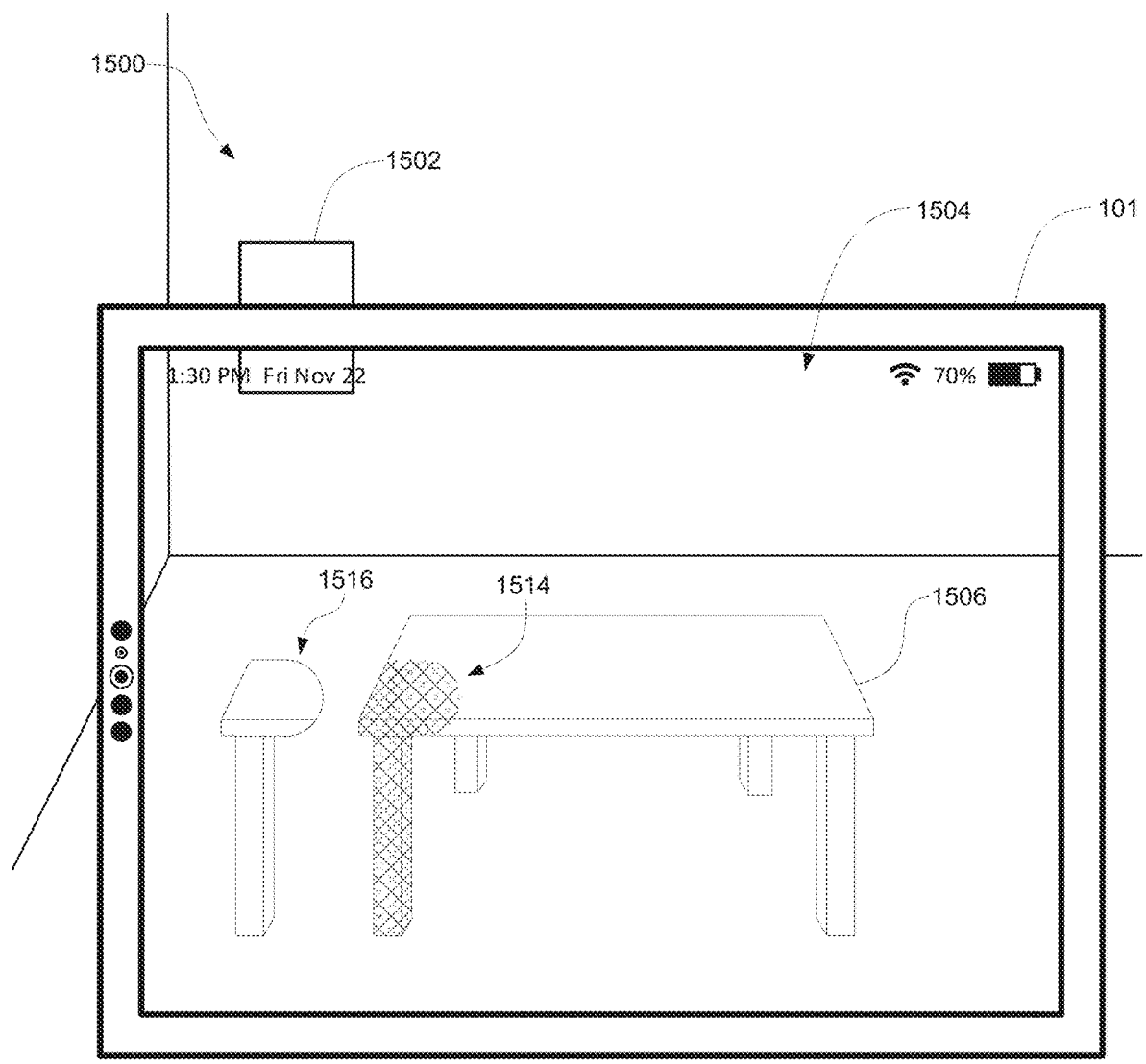

In FIG. 15C, after scanning a portion of table 1506 (e.g., indicated by scanning indicator 1514), electronic device 101 is able to generate a three-dimensional object 1516 based on the scanned portions of table 1506. In some embodiments, the generated object 1516 has a size and shape of the scanned portions of table 1506 and has colors, textures, shapes, and/or contours based on the colors, textures, shapes, and/or contours of the scanned portions of table 1506. For example, generated object 1516 includes a leg portion and a corner of the surface of the table attached to the leg portion, but does not include other portions of the surface of the table and the other legs that have not been scanned and/or marked for scanning. In some embodiments, generated object 1516 is a virtual object that the user is able to manipulate, such as to move, resize, rotate, or perform any other manipulation function, independently from table 1506, such as those described above with respect to methods 1000, 1200, and/or 1400.

In some embodiments, generated object 1516 is disassociated from table 1506 (e.g., generated from the scanned portions of table 1506) in response to receiving a user input moving generated object 1516 away from table 1506. For example, after scanning a portion of table 1506 (e.g., after the entirety of table 1506 has been scanned, after additional portions of table 1506 have not been marked for scanning after a threshold amount of time such as 5 seconds, 10 seconds, 30 seconds, etc., and/or after receiving a user input selecting a selectable option to terminate the scanning process), device 101 optionally displays a movement affordance at or near the scanned portions of table 1506. In some embodiments, the movement affordance is interactable to generate generated object 1516 by, for example, selecting and moving the movement affordance away from table 1506 (e.g., thus disassociating the scanned portions of table 1506 from table 1506).

In some embodiments, after disassociating scanning indicator 1514 from table 1506 (e.g., and generating three-dimensional object 1516), generated object 1516 is able to be re-associated with table 1506. For example, a user is able to select a selectable option or use a movement affordance displayed at or near generated object 1516 to move generated object back into table 1506 (e.g., thus reversing the steps for causing generated object 1516 to be generated) to re-associate and/or re-attach scanning indicator 1514 back into table 1506. In some embodiments, generated object 1516 snaps back into table 1506 when brought within a threshold distance from table 1506 (e.g., 1 inch, 3 inches, 6 inches, 1 foot, 3 feet, etc.) and/or within a threshold distance from the respective portions of table 1506 upon which generated object 1516 is based (e.g., within the threshold distance of the leg and/or corner of table 1506). In some embodiments, re-associating scanning indicator 1514 with table 1506 allows the user to mark additional portions of table 1506 for scanning or otherwise modify the portions of table 1506 that have been marked for scanning. In some embodiments, after re-associating scanning indicator 1514 with table 1506, manipulation operations performed on table 1506 cause the re-associated scanning indicator 1514 to also be manipulated accordingly (e.g., moving table 1506 causes scanning indicator 1514 to also move).

Figure 15D:
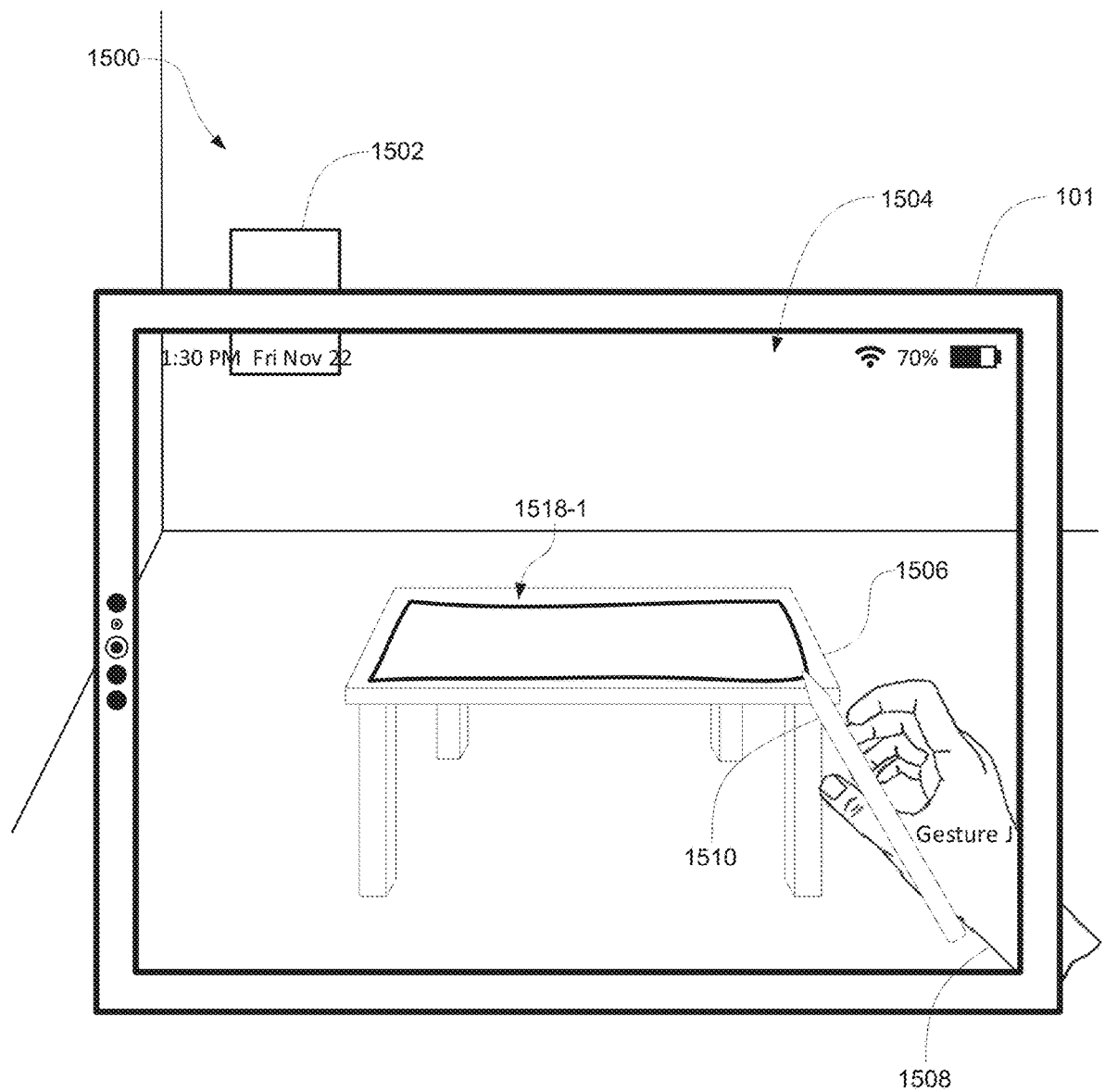
Figure 15E:
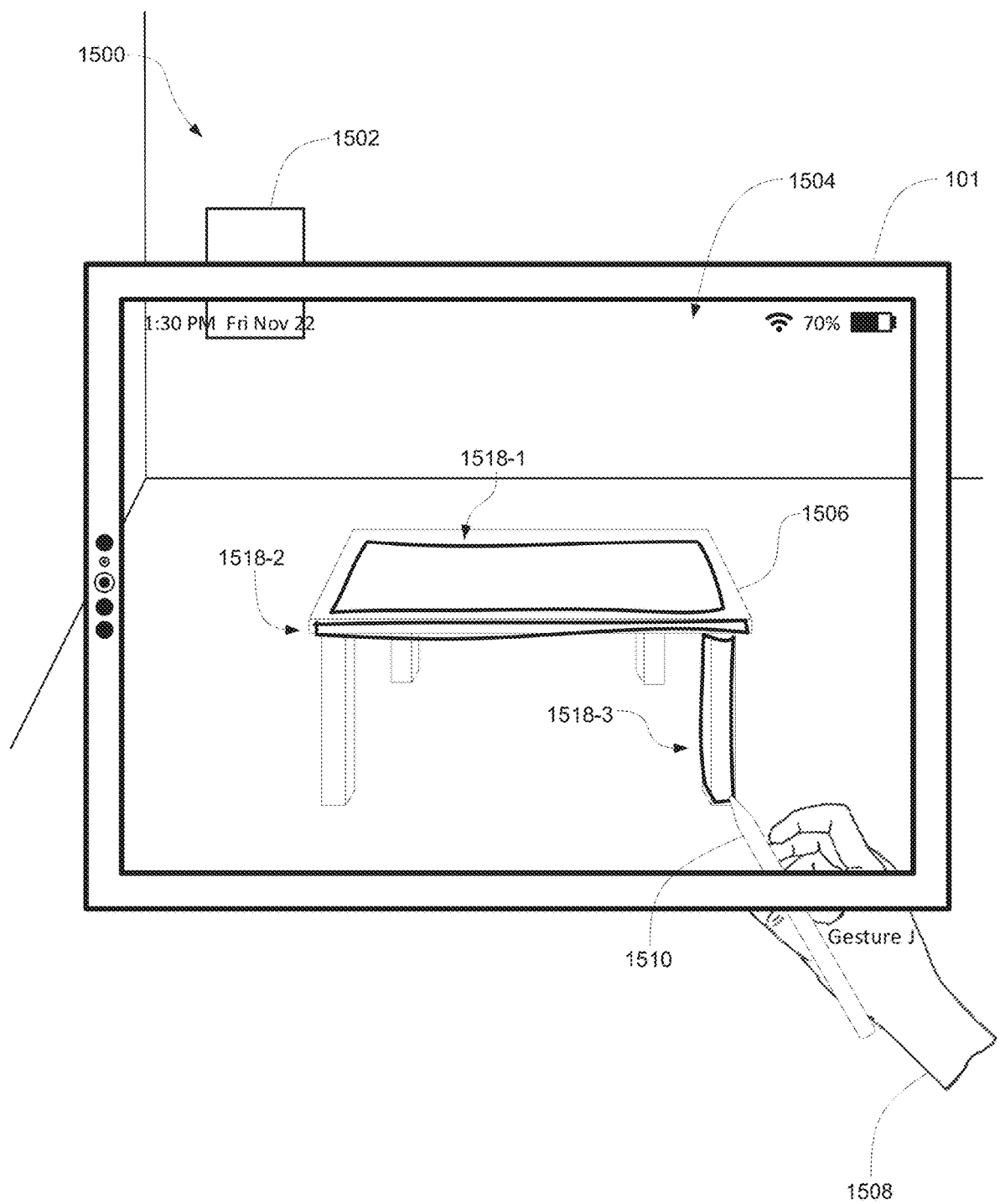
Figure 15F:
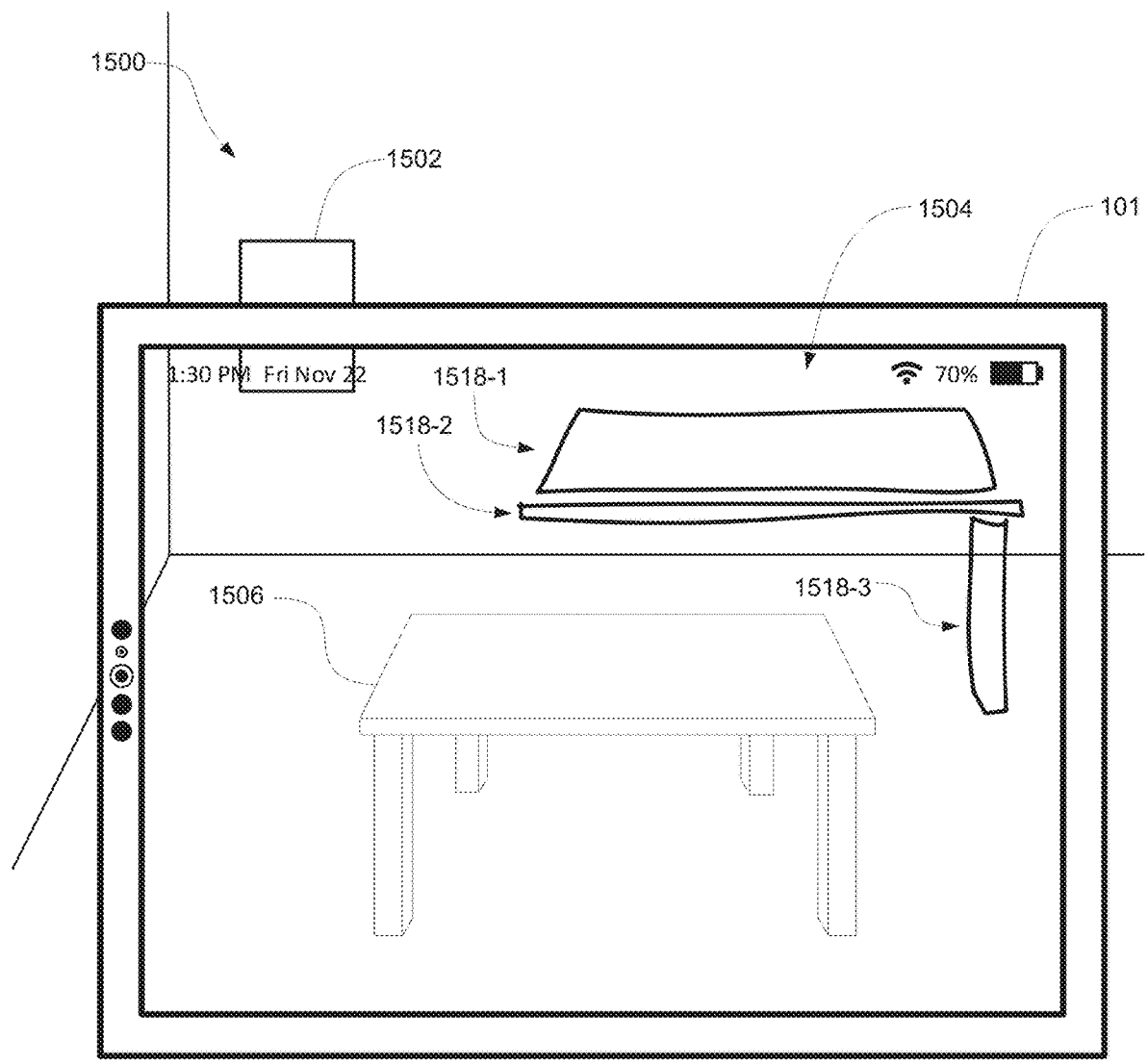
Figure 16A:
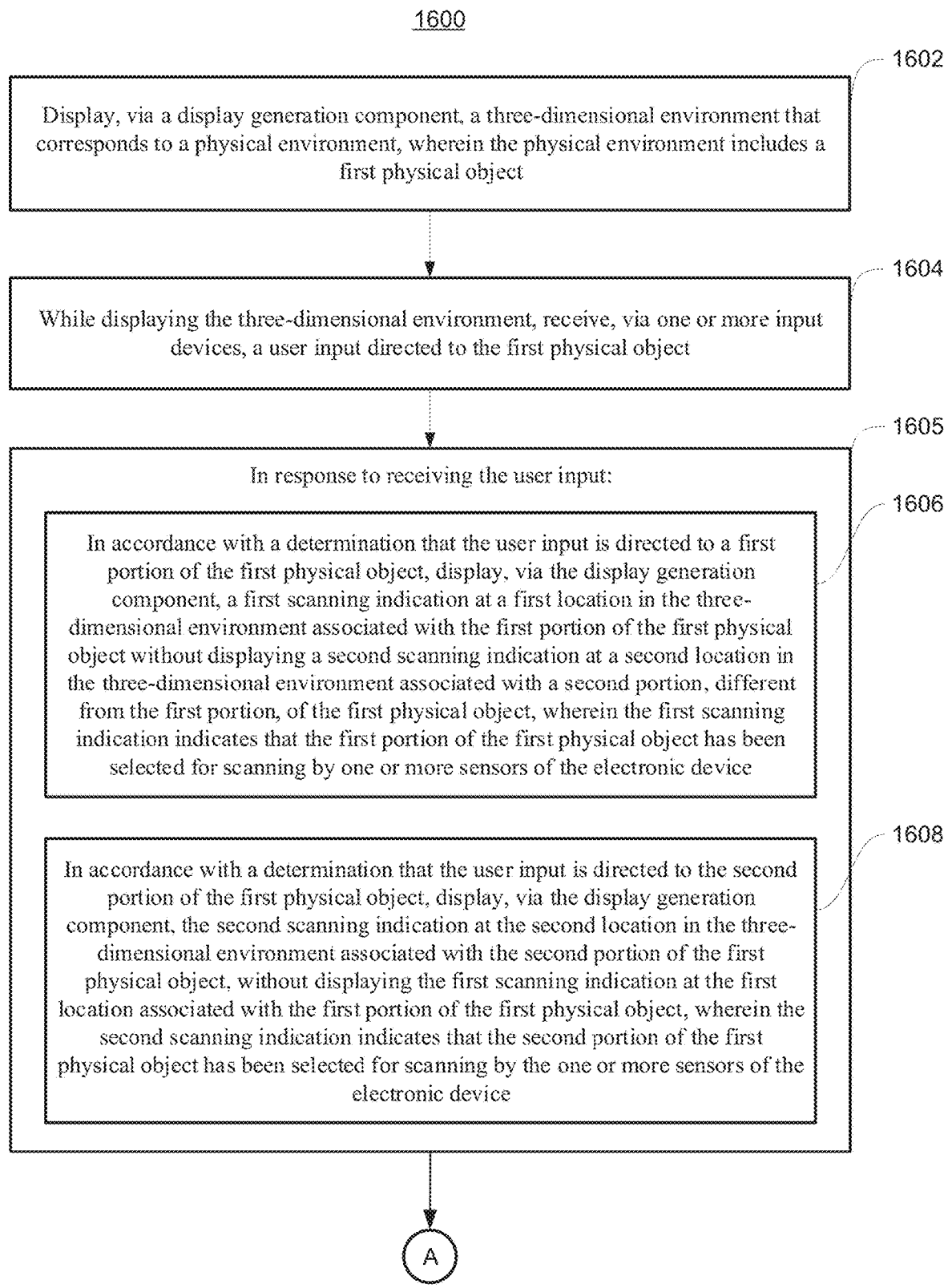
FIGS. 16A-16J is a flowchart illustrating a method of scanning a real world object in accordance with some embodiments.
Figure 16B:
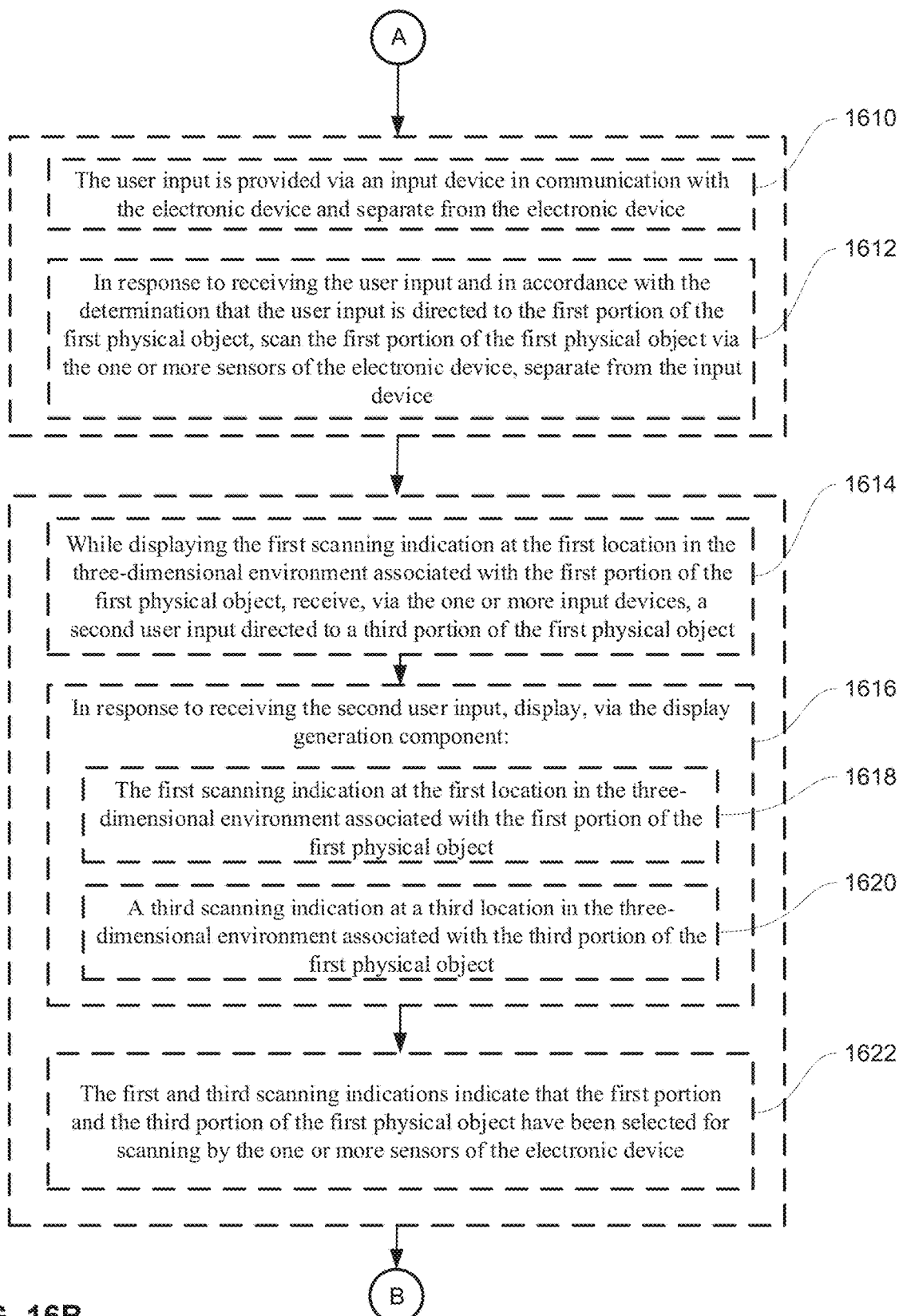
Figure 16C:
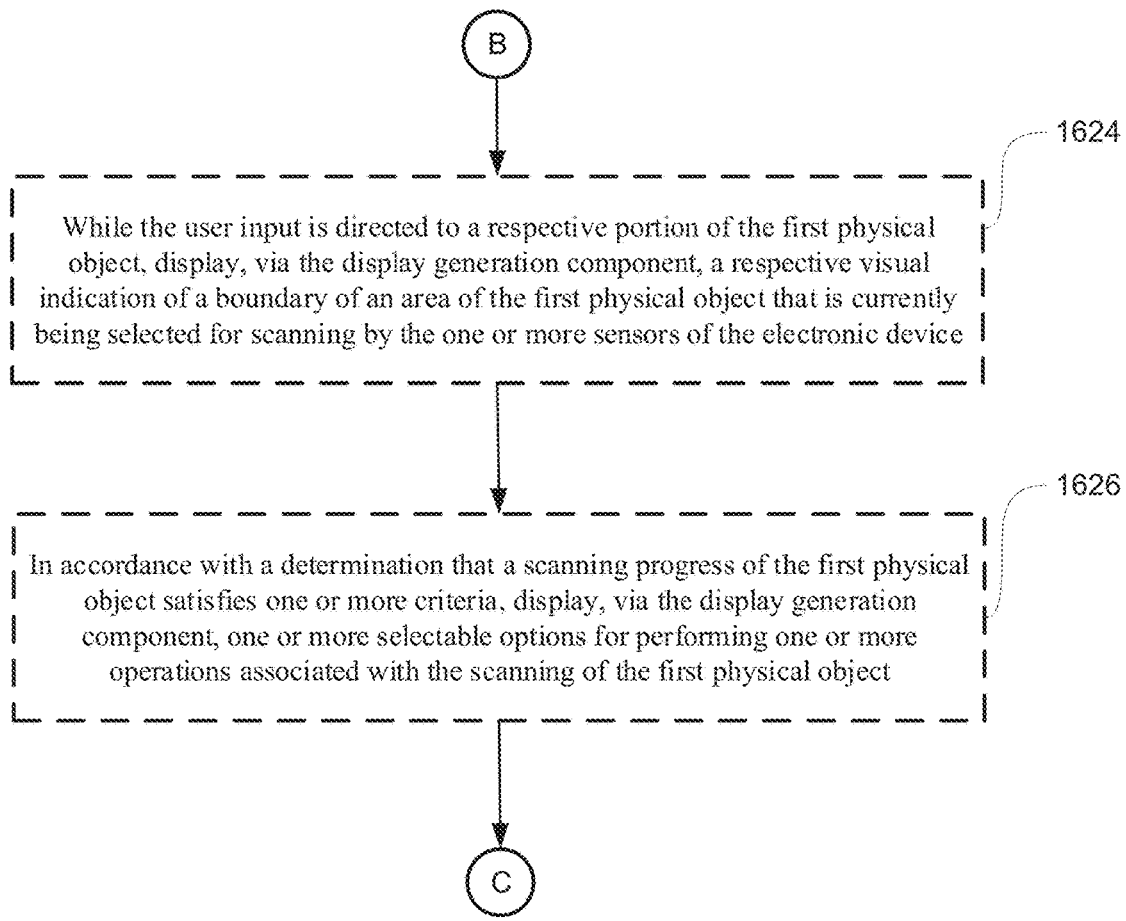
Figure 16D:
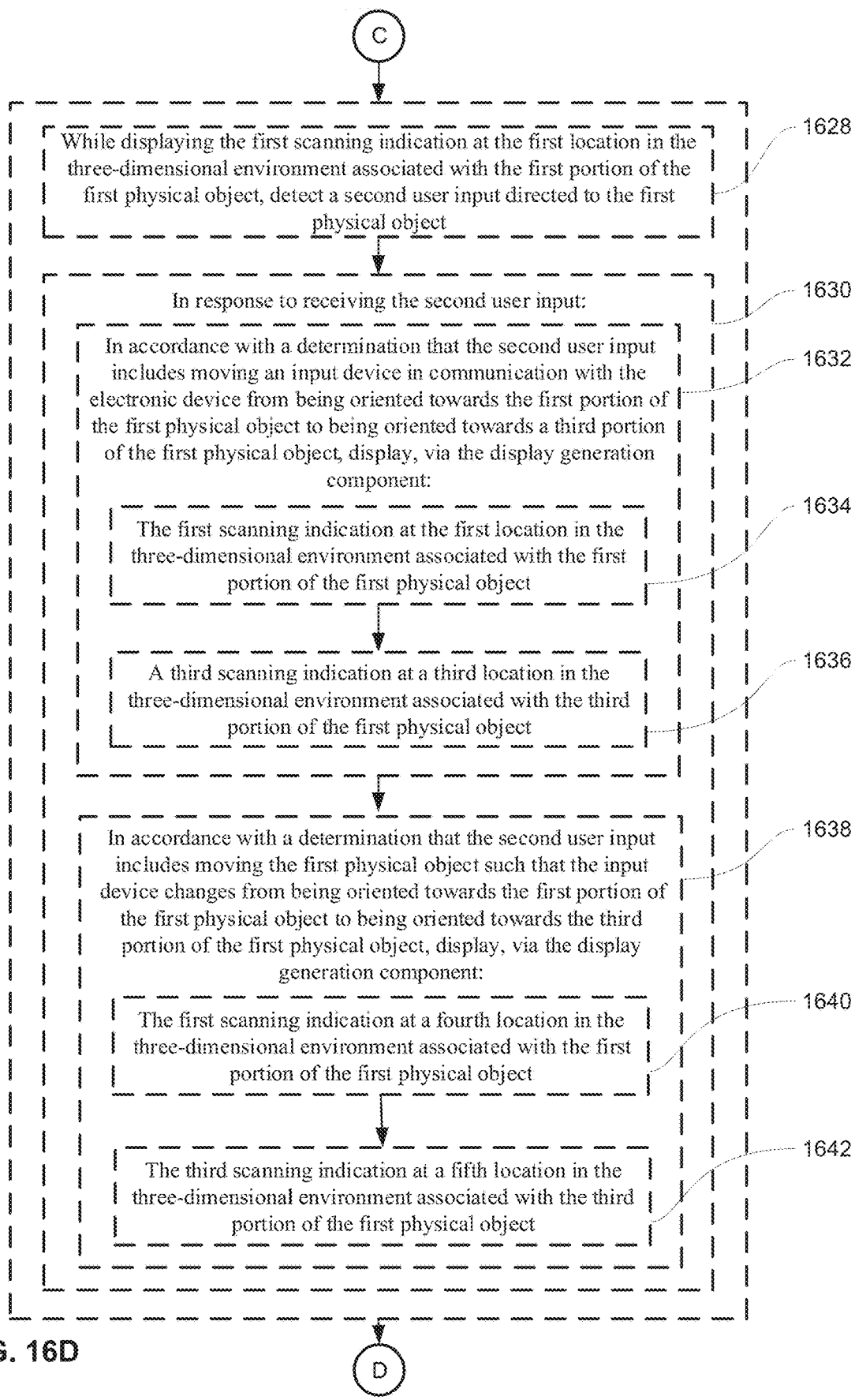
Figure 16E:
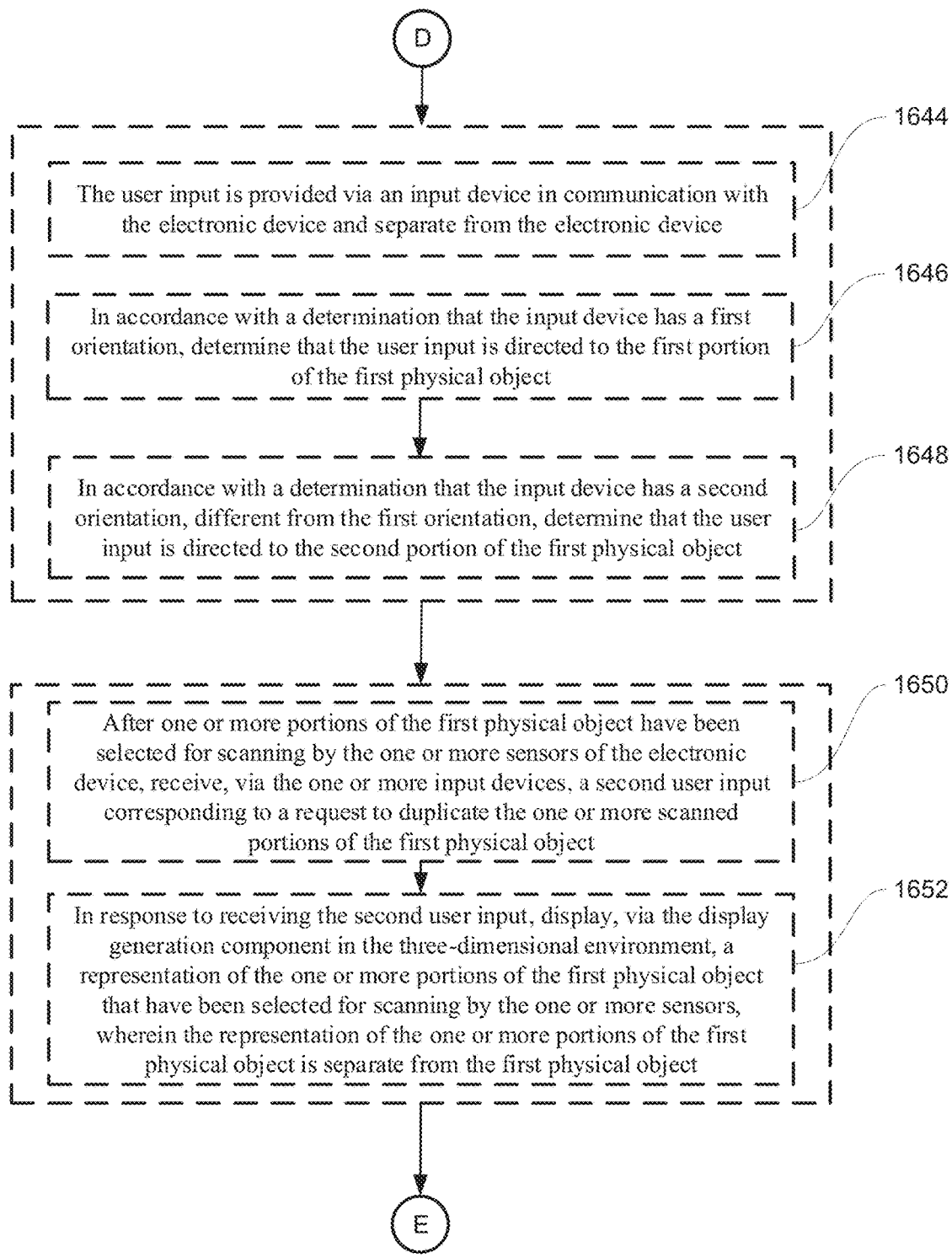
Figure 16F:
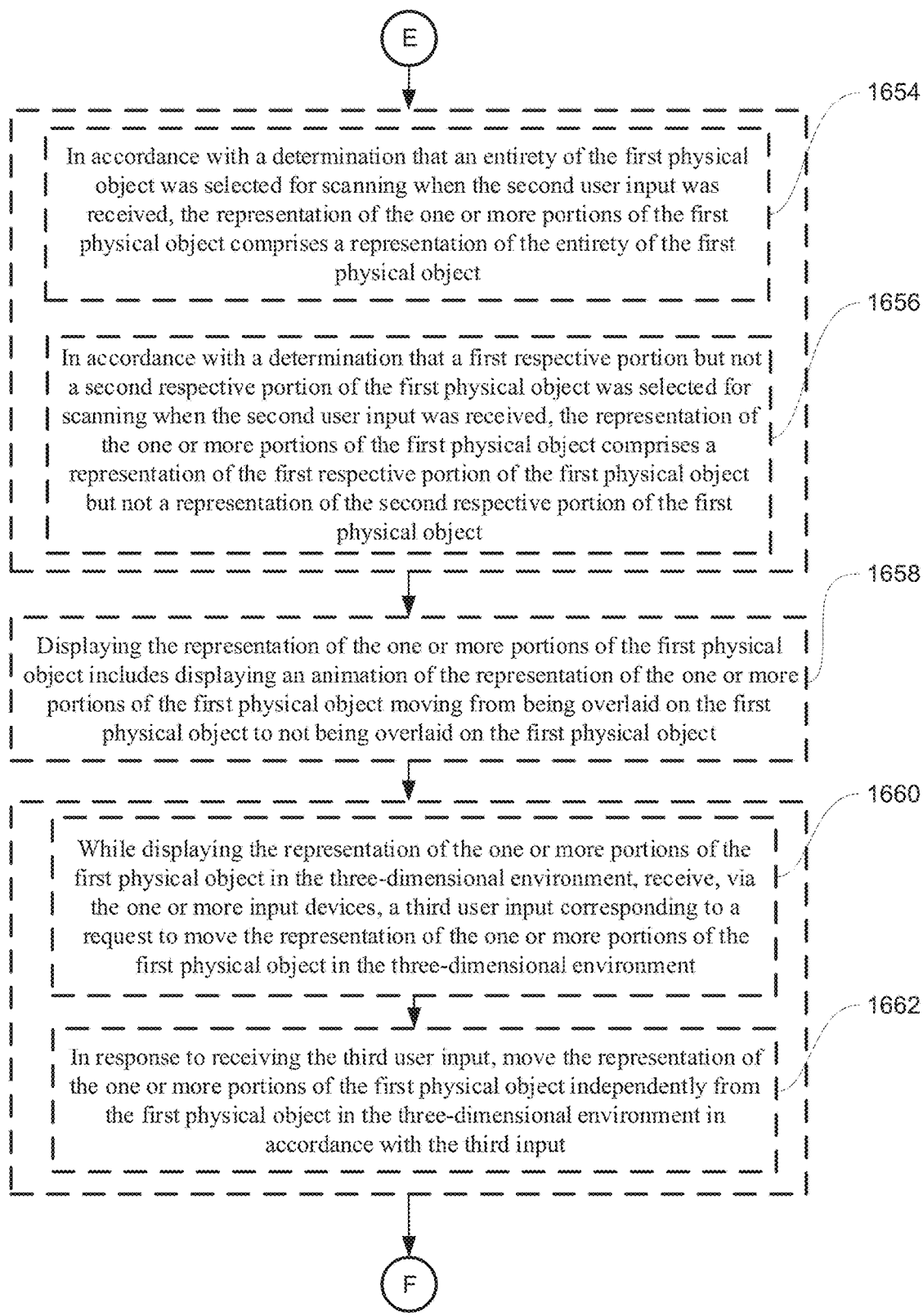
Figure 16G:
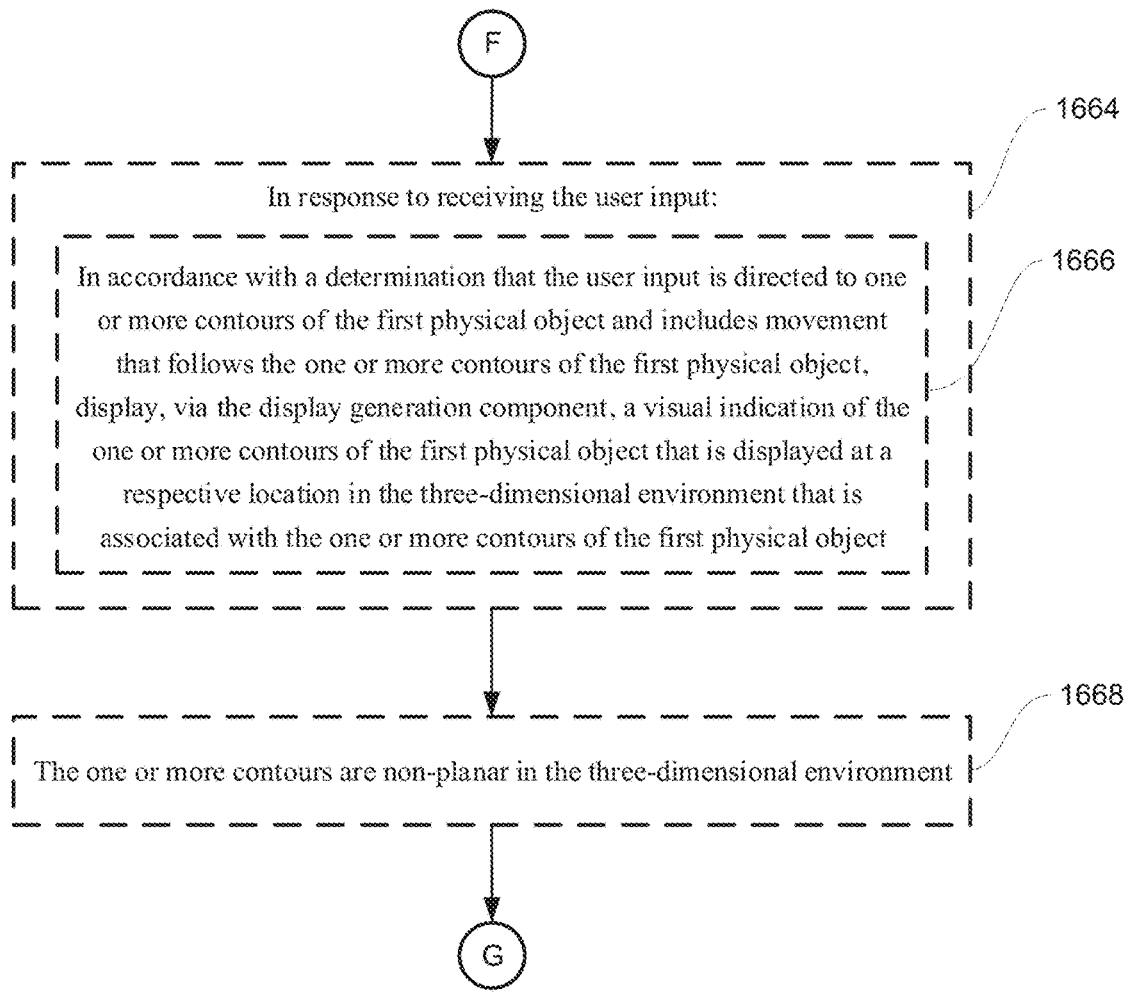
Figure 16H:
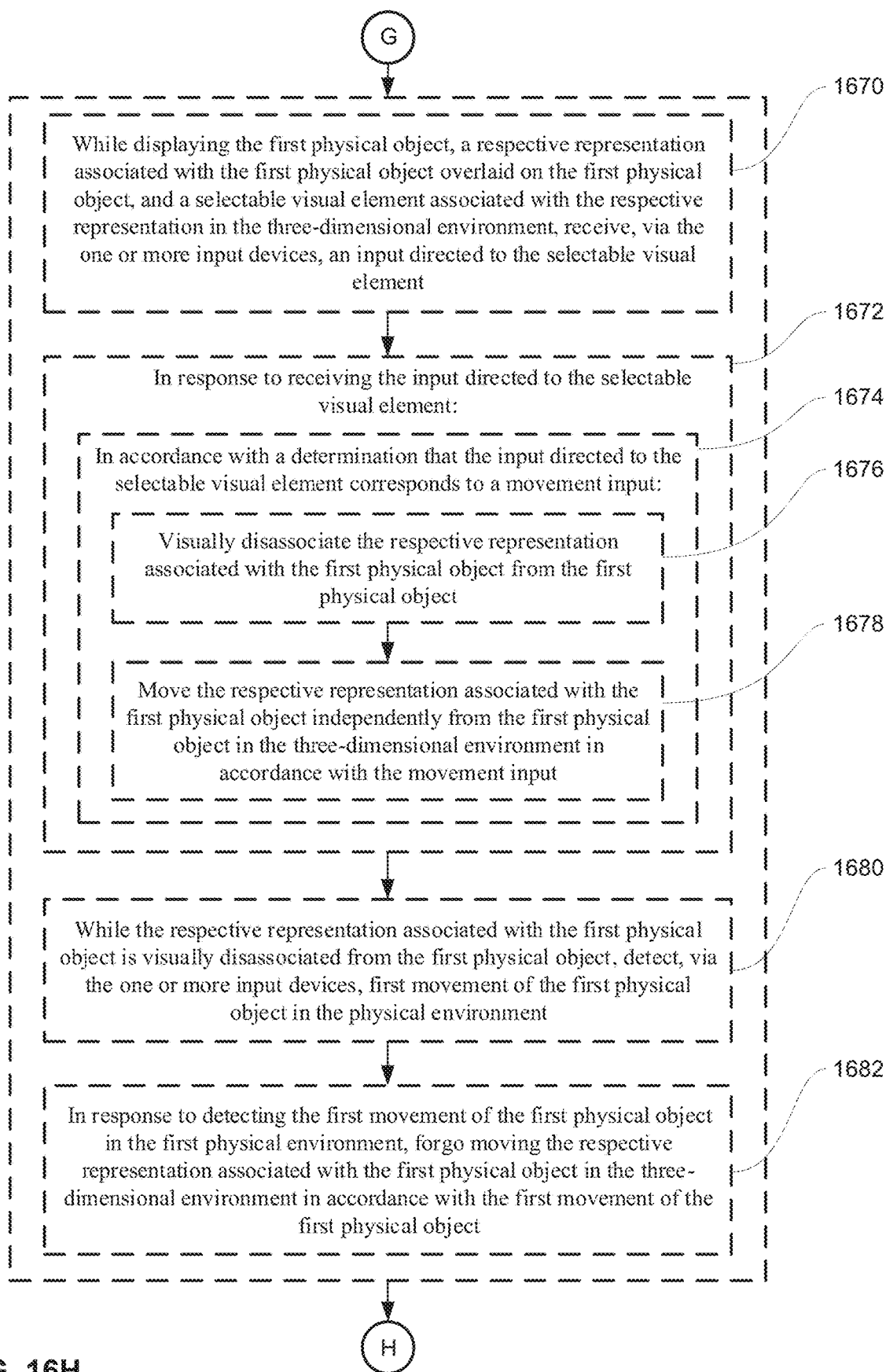
Figure 16I:
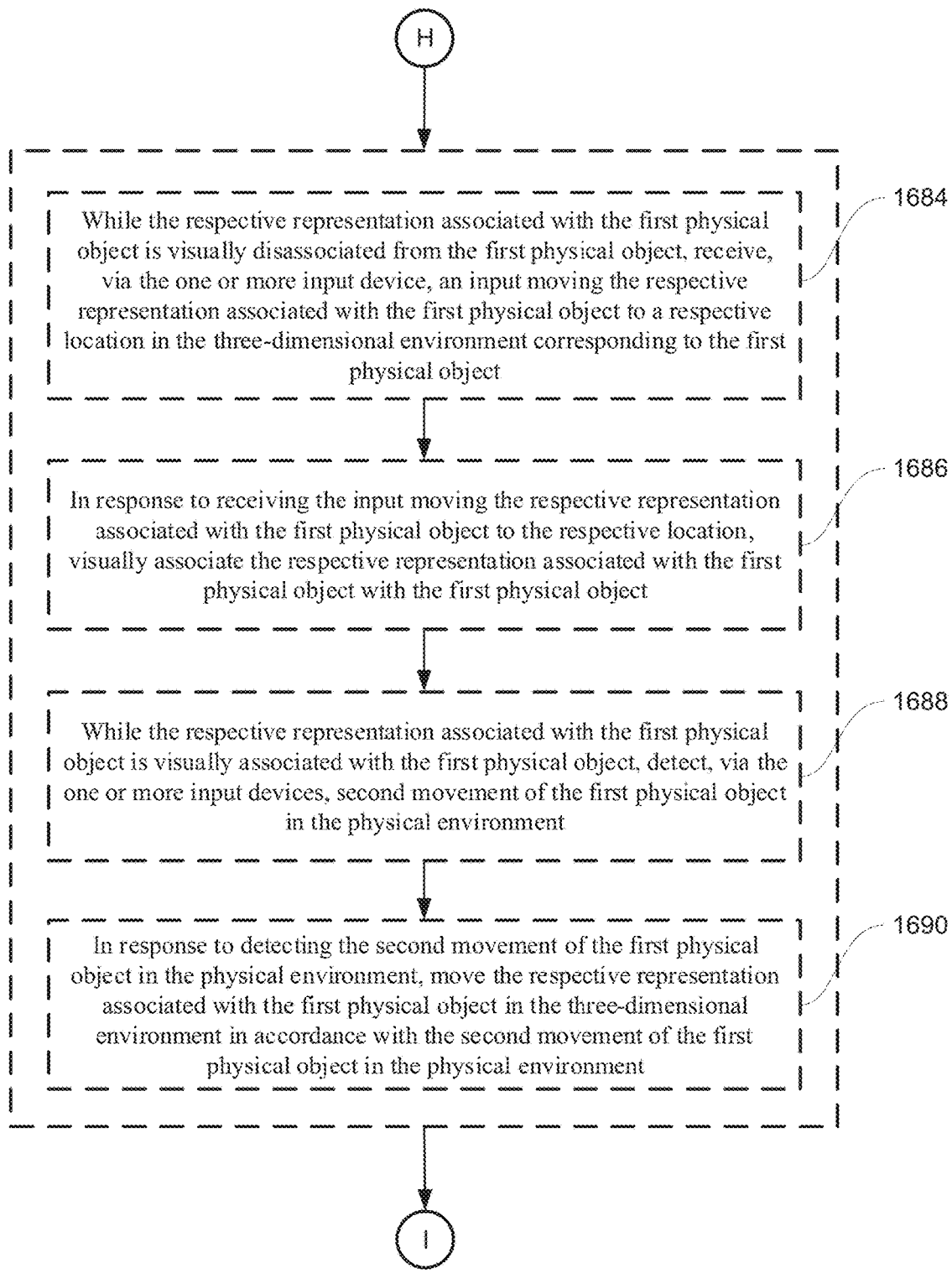
Figure 16J:
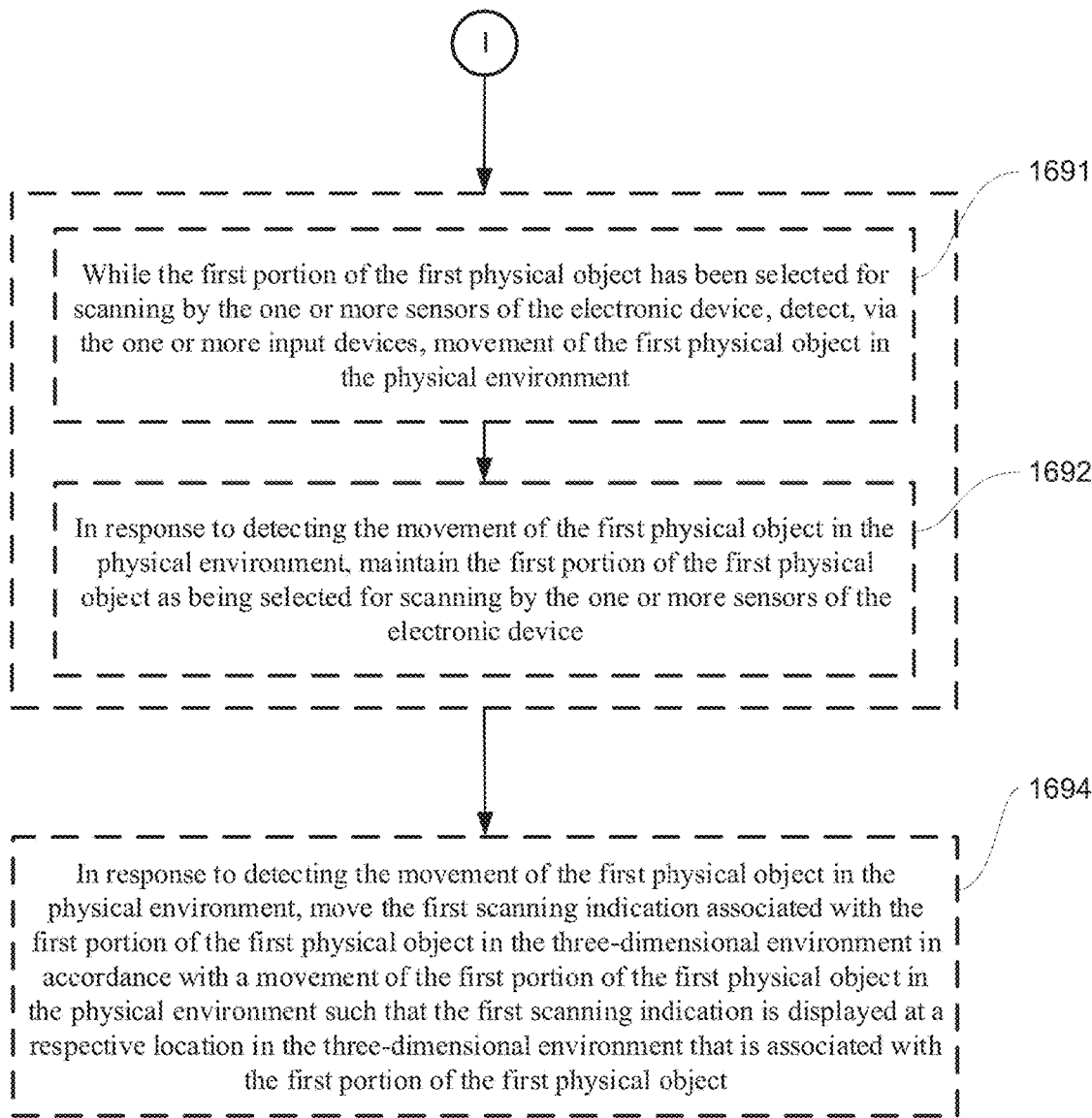

FIGS. 15D-15F illustrate a method of tracing portions of table 1506 to generate a three-dimensional object. In FIG. 15D, device 101 detects the movement of hand 1508 such that the tip of stylus 1510 traces along the edges of the top surface of table 1506 while maintaining a selection gesture (e.g., "Gesture J"). As described above, table 1506 is optionally a virtual object or optionally a representation of a real world object in real world environment 1500. In some embodiments, in response to detecting stylus 1510 tracing along the edges of the top surface of table 1506, device 101 displays tracing indicator 1518-1. In some embodiments, tracing indicator 1518-1 is a line that follows the tracing of stylus 1510 along the edges of the top surface of table 1506. In some embodiments, tracing indicator 1518-1 is displayed while stylus 1510 performs the trace gesture. For example, using stylus 1510, the user is able to "draw" tracing indicator 1518-1 along the edges of the top surface of table 1506. In some embodiments, as shown in FIG. 15D, tracing indicator 1518-1 has a shape and/or texture that is based on the movement of stylus 1510. In some embodiments, device 101 cleans up tracing indicator 1518-1 and straightens the lines. In some embodiments, device 101 aligns tracing indicator 1518-1 to the edges of table 1506. As shown in FIG. 15E, tracing indicator 1518-1 extends in the x (e.g., horizontally left and right) and z directions (e.g., away from the user and towards the user). Thus, tracing indicator 1518-1 is able to capture the size, shape, and/or orientation of the surface of table 1506 that was traced.

In FIG. 15E, device 101 detects a further movement by stylus 1510 (e.g., optionally due to a movement by hand 1508) tracing along different portions of table 1506. In some embodiments, in response to the further movement, device 101 "draws" tracing indicator 1518-2 and tracing indicator 1518-3 at the respective locations that the user performed the tracing gesture. In some embodiments, the user released the selection input after drawing tracing indicator 1518-1 and performed the selection input again to draw tracing indicator 1518-2 along the edge of the top surface of table 1506. In some embodiments, the user released the selection input and performed the selection input again to draw tracing indicator 1518-3 along the edge of the leg of table 1506. As shown in FIG. 15E, because the user released the selection input between drawing tracing indicators 1518-1, 1518-2, and 1518-3, the tracing indicators are not connected. In some embodiments, tracing indicators 1518-2 and 1518-3 have sizes and shapes based on the movement of stylus 1510. For example, tracing indicator 1518-2 follows along the edge of the top surface of table 1506 because stylus 1510 followed along the edge of the top surface of table 1506. Thus, tracing indicator 1518-2 optionally extends in the x direction (e.g., horizontally left and right along the edge of table 1506) and the y direction (e.g., up and down along the edge of table 1506). Similarly, tracing indicator 1518-3 follows along the front and left sides of the leg of table 1506. Thus, tracing indicator 1518-3 optionally extends in the x direction (e.g., horizontally left and right along the top and bottom boundaries of the leg of table 1506), they direction (e.g., vertically up and down along the right side of the leg of table 1506 and back-left side of the leg of table 1506), and in the z direction (e.g., away and towards the user along the left side of the leg of table 1506). Thus, as shown above, the tracing indicators extend in any direction and are able to follow the edges of a real world object in any of the x, y, and z directions. In some embodiments, the combination of tracing indicators (e.g., tracing indicators 1518-1, 1518-2, and 1518-3) is optionally a three-dimensional object and are optionally grouped together (e.g., are treated as parts of a singular virtual object).

In some embodiments, tracing along the edge of a real world object includes stylus 1510 touching the respective portions of the real world object that the user wishes to trace (e.g., optionally while performing a selection gesture). In some embodiments, tracing along the edge of a real world object includes stylus 1510 coming within a threshold distance from the respective portions of the real world object (e.g., within 1 inch, 3 inches, 6 inches, 1 foot, etc., optionally while performing a selection gesture). In some embodiments, tracing along the edge of a real world object includes pointing stylus 1510 towards the respective portions of the real world object (e.g., optionally while within the threshold distance). In some embodiments, because a real world object is a real physical object, the user is able to trace along the edges, boundaries, borders, and/or surface of the real world object, but not the interior of the real world object (e.g., stylus 1510 is not able to reach into the interior of the real world object). In some embodiments, as described above, the tracing indicators are "drawn" on the surfaces of the real world object at the location that stylus 1510 made contact with (or came within the threshold distance to). In some embodiments, the tracing indicators snap to the nearest edge of the real world objects (e.g., the corners of the surface of table 1506, the edges of the leg of table 1506, etc.).

In some embodiments, after tracing along the edges and/or surfaces of table 1506, a user is able to disassociate the tracing indicators from table 1506 to generate a wireframe object that is based on the shape of table 1506. For example, in FIG. 15F, a user is able to disassociate tracing indicators 1518-1 to 1518-3 from table 1506 and move tracing indicators 1518-1 to 1518-3 away from table 1506. In some embodiments, tracing indicators 1518-1 to 1518-3 are a single three-dimensional object. In some embodiments, tracing indicators 1518-1 to 1518-3 are three separate three-dimensional objects. In some embodiments, tracing indicators 1518-1 to 1518-3 maintain their three-dimensional aspect and have the same size, shape, and/or depth as their respective portions of table 1506. Thus, a user is able to generate a wireframe model of the traced portions of table 1506. In some embodiments, after disassociating tracing indicators 1518-1 to 1518-3 from table 1506, the tracing indicators are a virtual object(s) that the user is able to manipulate, such as to move, resize, rotate, or perform any other manipulation function, independently from table 1506, such as those described above with respect to methods 1000, 1200, and/or 1400. In some embodiments, the tracing indicators are able to be re-associated with table 1506 in a manner similar to reassociating scanning indicator 1514 with table 1506 described above.

FIGS. 16A-16J is a flowchart illustrating a method 1600 of scanning a real world object in accordance with some embodiments. In some embodiments, the method 1600 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1600 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1600 are, optionally, combined and/or the order of some operations is, optionally, changed.

In the method 1600, in some embodiments, an electronic device (e.g., computer system 101 in FIG. 1) in communication with a display generation component and one or more input devices (e.g., a mobile device (e.g., a tablet, a smartphone, a media player, or a wearable device), or a computer) displays (1602), via the display generation component, a three-dimensional environment that corresponds to a physical environment, wherein the physical environment includes a first physical object, such as table 1506 displayed in three-dimensional environment 1504 in FIG. 15A (e.g., presenting a computer-generated environment that includes a representation of a physical environment).

In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor and/or a motion sensor (e.g., a hand tracking sensor, a hand motion sensor), etc.

In some embodiments, the computer-generated environment is a virtual reality (VR) environment, a mixed reality (MR) environment, or an augmented reality (AR) environment that optionally includes a pass-through video of the physical environment around the electronic device. In some embodiments, the physical environment around the electronic device is captured by one or more visible light sensors (e.g., cameras) and displayed via the display generation component as a photo-realistic representation of the physical environment. In some embodiments, the physical environment around the electronic device is passively presented to the user, for example, via a transparent or translucent lens.

In some embodiments, while displaying the three-dimensional environment, the electronic device receives (1604), via the one or more input devices, a user input directed to the first physical object, such as hand 1508 performing Gesture I while directed to a portion of table 1506 in FIG. 15A (e.g., the user input is received from a pointing device such as a stylus, pointer stick, a hand of the user (e.g., a user pointing at the first physical object), etc.)

In some embodiments, a user input directed to the first physical object includes detecting that the pointing device is pointed at a portion of the first physical object. In some embodiments, a user input directed to the first physical object includes a selection input (e.g., the press of a button, a respective gesture, etc.) while the pointing device is pointed at a portion of the first physical object.

In some embodiments, in response to receiving the user input (1605), in accordance with a determination that the user input is directed to a first portion of the first physical object (e.g., the pointing device is pointed at the first portion of the first physical object), the electronic device displays (1606), via the display generation component, a first scanning indication at a first location in the three-dimensional environment associated with the first portion of the first physical object without displaying a second scanning indication at a second location in the three-dimensional environment associated with a second portion, different from the first portion, of the first physical object, wherein the first scanning indication indicates that the first portion of the first physical object has been selected for scanning by one or more sensors of the electronic device, such as scanning indicator 1514 in FIG. 15A (e.g., if the user input is directed to the first portion of the first physical object, displaying an indication that the first portion of the first physical object is being scanned, has been scanned, or will be scanned).

In some embodiments, the indication is displayed at a location in the three-dimensional environment such that the indication appears on top of and/or overlaid on the first portion of the first physical object (e.g., contours with the first portion of the first physical object). In some embodiments, the indication is displayed such that the first portion of the first physical object appears to have a different visual characteristic than other portions of the first physical object that are not displayed with the indication. In some embodiments, the scanning indication is a pattern (e.g., grid or hatching), a shading, voxels, and/or any other suitable indication. In some embodiments, the size of the first scanning indication (e.g., the area that is scanned or has been scanned) is a pre-determined size centered at the location at which the pointing device pointed (e.g., a circular area with a predetermined size). In some embodiments, the size of the first scanning indication is based on the contours and/or topology of the first physical object and/or the ability of the sensors that are performing the scanning to scan the first physical object. In some embodiments, other portions of the first physical object are not displayed with a scanning indication (e.g., portions of the first physical object outside of the first portion) in response to the user input. In some embodiments, scanning the first physical object captures the color, texture, contours, topography, etc. of the first physical object. In some embodiments, scanning the first physical object enables a partial or complete three-dimensional model of the first physical object to be constructed. In some embodiments, the scanning procedure is performed by the electronic device or another electronic device in communication with the electronic device. In some embodiments, the three-dimensional model can be used (e.g., displayed) in a computer-generated environment.

In some embodiments, in accordance with a determination that the user input is directed to the second portion of the first physical object, the electronic device displays (1608), via the display generation component, the second scanning indication at the second location in the three-dimensional environment associated with the second portion of the first physical object, without displaying the first scanning indication at the first location associated with the first portion of the first physical object, wherein the second scanning indication indicates that the second portion of the first physical object has been selected for scanning by the one or more sensors of the electronic device, such as scanning indicator 1514 in FIG. 15A (e.g., if the user input was directed to the second portion of the first physical object, displaying an indication that the second portion of the first physical object is being scanned, has been scanned, or will be scanned).

Thus, in some embodiments, the device scans portions of the first physical object that the user pointed at using the pointing device. In some embodiments, as further user inputs are received directed at different portions of the first physical object (e.g., continuous movement of the user input directed at different portions of the first physical object and/or discrete user inputs directed at different portions of the first physical object), the scanning indication is updated (e.g., expanded) to cover the different portions of the first physical object.

The above-described manner of indicating portions of a physical object that have been or will be scanned (e.g., by displaying a scanning indication at a location associated with the portion of the physical object that has been or will be scanned, controlled by user input) provides quick and efficient feedback on the progress of scanning the physical object, which simplifies the interaction between the user and the electronic device and enhances the operability of the electronic device and makes the user-device interface more efficient (e.g., without requiring the user to terminate the scanning progress to determine whether the intended portions of the object have been properly marked for scanning), which additionally reduces power usage and improves battery life of the electronic device by enabling the user to use the electronic device more quickly and efficiently, while reducing errors in usage.

In some embodiments, the user input is provided via an input device in communication with the electronic device and separate from the electronic device (1610), such as stylus 1510 held by hand 1508 in FIG. 15A (e.g., the input is received at an input device that is separate from the electronic device and communicates with the electronic device via wired or wireless communication). In some embodiments, the input device is a pointing device such as a stylus. In some embodiments, the input device is another electronic device.

In some embodiments, in response to receiving the user input and in accordance with the determination that the user input is directed to the first portion of the first physical object, the electronic device scans (1612) the first portion of the first physical object via the one or more sensors of the electronic device, separate from the input device, such as scanning the portion of table 1506 that stylus 1510 is pointed at in FIG. 15A (e.g., if the input device is directed to the first portion of the physical object, the first portion of the physical object is marked for scanning and the scanning is performed by one or more sensors of the electronic device (e.g., and not performed by the input device)).

For example, if a pointing device is pointed at the first portion of the physical object, the electronic device determines that the first portion of the physical object has been marked for scanning by the pointing device and uses a camera and/or a depth sensor that is integrated with the electronic device or in communication with the electronic device to scan the first portion of the physical object.

The above-described manner of scanning a physical object (e.g., by using a pointing device to indicate portions for scanning and performing the scanning using a device other than the pointing device) provides quick and efficient method of indicating portions of the physical object for scanning (e.g., by allowing a user to use any type of pointing device to indicate portions of the physical object for scanning, without requiring the user to use a specific pointing device with integrated scanning functionality), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while displaying the first scanning indication at the first location in the three-dimensional environment associated with the first portion of the first physical object, the electronic device receives (1614), via the one or more input devices, a second user input directed to a third portion of the first physical object, such as stylus 1510 moving to point at the leg portion of table 1506 in FIG. 15B (e.g., detecting that the pointing device has moved to pointed at the third portion of the first physical object).

In some embodiments, in response to receiving the second user input, the electronic device displays (1616), via the display generation component, the first scanning indication at the first location in the three-dimensional environment associated with the first portion of the first physical object (1618), such as scanning indication 1514 at the original portions of table 1506 in FIG. 15A (e.g., maintaining the display of the first scanning location at the first location, because that first scanning location remains selected for scanning by the one or more sensors) and a third scanning indication at a third location in the three-dimensional environment associated with the third portion of the first physical object (1620), such as scanning indication 1514 expanded to include the leg portion of table 1506 in FIG. 15B (e.g., displaying an indication that the third portion of the first physical object is being scanned, has been scanned, or will be scanned, optionally at a location in the three-dimensional environment such that the indication appears on top of and/or overlaid on the third portion of the first physical object).

In some embodiments, the first and third scanning indications indicate that the first portion and the third portion of the first physical object have been selected for scanning by the one or more sensors of the electronic device (1622), such as the corner of table 1506 and the leg of table 1506 having been selected for scanning in FIG. 15B (e.g., the scanning procedure is performed by the electronic device or another electronic device in communication with the electronic device). In some embodiments, the third portion of the first physical object is scanned in response to receiving the second user input directed to the second portion of the first physical object. In some embodiments, in response to the second user input, the third portion is marked for scanning such that the third portion of the first physical object is scanned at a future time.

The above-described manner of indicating portions of a physical object that have been or will be scanned (e.g., by updating the scanning indications to include additional portions of the physical object that have been or will be scanned) provides quick and efficient feedback on the progress of scanning different portions of the physical object, which simplifies the interaction between the user and the electronic device and enhances the operability of the electronic device and makes the user-device interface more efficient (e.g., without requiring the user to terminate the scanning progress to determine whether the intended portions of the object have been properly marked for scanning), which additionally reduces power usage and improves battery life of the electronic device by enabling the user to use the electronic device more quickly and efficiently, while reducing errors in usage.

In some embodiments, while the user input is directed to a respective portion of the first physical object, the electronic device displays (1624), via the display generation component, a respective visual indication of a boundary of an area of the first physical object that is currently being selected for scanning by the one or more sensors of the electronic device, such as reticle 1512 in FIG. 15A indicating the portion of 1506 at which stylus 1510 is pointing (e.g., display a visual element on the first physical object that corresponds to the location and/or area that the pointing device is pointing at).

For example, the visual element is a highlighting on the first physical object that indicates that the highlighted location will be or is being marked for scanning (e.g., such that a scanning indication will be displayed at the highlighted location). In some embodiments, the visual element increases or decreases in size based on the size of the area that will be scanned. In some embodiments, the visual element increases or decreases in size based on the distance of the pointing device from the respective portion of the first physical object. For example, if the pointing device is closer to the respective portion of the first physical object, the visual element is smaller and when the pointing device is farther from the respective portion, the visual element is larger, similar to the behavior of a flashlight. In some embodiments, after the respective portion of the first physical object is highlighted for a threshold amount of time (e.g., 0.3 seconds, 0.5 seconds, 1 second, 3 seconds, 5 seconds, etc.), the respective portion is marked for scanning (e.g., and a scanning indication is displayed at the respective portion).

In some embodiments, after the visual element is displayed at the portion of the physical object for a threshold amount of time (e.g., 0 seconds, 0.5 seconds, 2 seconds, 5 seconds, etc.), then the portion of the physical object is marked for scanning and a scanning indication is displayed at the first portion (optionally while maintaining display of the visual element at the first portion of the physical object).

The above-described manner of indicating portions of a physical object that will be marked for scanning (e.g., by displaying a visual indication of the portion that the pointing device is pointing at that will be marked for scanning before it is marked for scanning) provides quick and efficient feedback on the portions of the first physical object that the user is pointing at (e.g., by displaying a live indication of the area on the first physical object that the pointing device is pointing at), which simplifies the interaction between the user and the electronic device and enhances the operability of the electronic device and makes the user-device interface more efficient (e.g., without requiring the user to wait for the scan to be performed or the scanning indications to be displayed to determine the portions of the first physical object that the user has marked for scanning), which additionally reduces power usage and improves battery life of the electronic device by enabling the user to use the electronic device more quickly and efficiently, while reducing errors in usage.

In some embodiments, in accordance with a determination that a scanning progress of the first physical object satisfies one or more criteria (e.g., the entire object has been scanned, a threshold amount of the first physical object has been scanned (e.g., more than 50%, 75%, 90%, etc.), a new portion of the first physical object has not been marked for scanning for more than a threshold amount of time such as 1 second, 3 seconds, 10 seconds, 30 seconds, and/or etc.), the electronic device displays (1626), via the display generation component, one or more selectable options for performing one or more operations associated with the scanning of the first physical object, such as after scanning the portions of table 1506 indicated by scanning indicator 1514, displaying a contextual menu, similar to contextual menu 1112 in FIG. 11B, for performing operations with respect to the scanned portions of table 1506 (e.g., display options for interacting with the results of the scanned object, such as an option to create a copy of the scanned portion of the first virtual object, an option to undo the most recent action (e.g., undo the most recently scanned portion, undo all of the scanning), an option to discard the scans, etc.).

The above-described manner of displaying options for interacting with the scanned portions of the first physical object (e.g., by displaying a menu with one or more selectable options) provides quick and efficient method of performing operations on the scanned portions of the first physical object (e.g., automatically displaying the menu, without requiring the user to perform additional inputs to cause display of the menu or navigate through multiple user interfaces to perform operations on the scanned portions of the first physical object), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while displaying the first scanning indication at the first location in the three-dimensional environment associated with the first portion of the first physical object, the electronic device detects (1628) a second user input directed to the first physical object, such as the movement of stylus 1512 in FIG. 15B (e.g., detect rotation and/or movement of the object, or receiving a user input, via the one or more input devices, for scanning or selecting for scanning a portion of the first physical object).

In some embodiments, in response to receiving the second user input (1630), in accordance with a determination that the second user input includes moving an input device in communication with the electronic device from being oriented towards the first portion of the first physical object to being oriented towards a third portion of the first physical object, such as stylus 1512 pointed at the leg portion of table 1506 in FIG. 15B (e.g., if the user input includes a movement of the pointing device such that the pointing device is directed to a different portion of the first physical object), the electronic device displays (1632), via the display generation component, the first scanning indication at the first location in the three-dimensional environment associated with the first portion of the first physical object (1634) (e.g., maintaining the display of the first scanning location at the first location) and a third scanning indication at a third location in the three-dimensional environment associated with the third portion of the first physical object (1636), such as scanning indication 1514 expanded to include the leg portion of table 1506 in FIG. 15B (e.g., displaying an indication that the third portion of the first physical object is being scanned, has been scanned, or will be scanned, optionally at a location in the three-dimensional environment such that the indication appears on top of and/or overlaid on the third portion of the first physical object).

In some embodiments, in accordance with a determination that the second user input includes moving the first physical object such that the input device changes from being oriented towards the first portion of the first physical object to being oriented towards the third portion of the first physical object, such as if table 1506 were moved or rotated in FIG. 15B such that the orientation of table 1506 is different and stylus 1510 is pointed at a different location (e.g., rotating and/or moving the first physical object while maintaining the orientation of the pointing device such that the pointing device is directed to third portion of the first physical object), the electronic device displays (1638), via the display generation component, the first scanning indication at a fourth location in the three-dimensional environment associated with the first portion of the first physical object (1640) (e.g., maintaining the display of the first scanning location at the same position with respect to the first physical object) and the third scanning indication at a fifth location in the three-dimensional environment associated with the third portion of the first physical object (1642), such as scanning indication 1514 expanded to include the leg portion of table 1506 in FIG. 15B (e.g., displaying an indication that the third portion of the first physical object is being scanned, has been scanned, or will be scanned, optionally at a location in the three-dimensional environment such that the indication appears on top of and/or overlaid on the third portion of the first physical object).

For example, if the first physical object is rotated and/or moved such that the third portion of the first physical object is now at the position that the first location was at before the first physical object was rotated. Thus, in some embodiments, because the first physical object has been rotated and/or moved such that the first portion of the physical object is now at the fourth location in the three-dimensional environment, the first scanning indication also moves and/or rotates in the three-dimensional environment to the fourth location in the three-dimensional environment accordingly to maintain the same position relative to the first portion of the first physical object as before the first physical object was rotated. In some embodiments, the third location in the three-dimensional environment is at the fifth location in the three-dimensional environment. In some embodiments, the fifth location in the three-dimensional environment is the same location as the first location in the three-dimensional environment (e.g., because the pointing device is still directed at the same location in the three-dimensional environment, but the first physical object has been rotated such that the third portion is now at the location that the first portion was at).

The above-described manner of indicating new portions of a physical object that have been or will be scanned (e.g., by moving the pointing device to point at new portions of the physical object or by moving and/or rotating the physical object to position new portions of the physical object to where the pointing device is pointing) provides quick and efficient method of marking portions of the physical object for scanning (e.g., by marking portions of the physical object that the pointing device is pointing at, without regard to whether the pointing device moved locations or the physical object moved with respect to the pointing device), which simplifies the interaction between the user and the electronic device and enhances the operability of the electronic device and makes the user-device interface more efficient (e.g., by supporting multiple methods of scanning different portions of a physical object, without requiring the user to walk around the object or continually rotate the object to scan different portions), which additionally reduces power usage and improves battery life of the electronic device by enabling the user to use the electronic device more quickly and efficiently, while reducing errors in usage.

In some embodiments, the user input is provided via an input device in communication with the electronic device and separate from the electronic device (1644), such as stylus 1510 in FIG. 15A (e.g., the input is received at an input device that is separate from the electronic device and communicates with the electronic device via wired or wireless communication. In some embodiments, the input device is a pointing device such as a stylus).

In some embodiments, in accordance with a determination that the input device has a first orientation, the electronic device determines (1646) that the user input is directed to the first portion of the first physical object, such as if stylus 1510 has a particular orientation such that it is pointed at the corner of table 1506 in FIG. 15A (e.g., if the pointing device has a first orientation such that it is pointed towards (e.g., oriented towards) the first portion of the first physical object, then the device determines that the user is requesting that the first portion of the first physical object be scanned and the first scanning location is optionally displayed at the first portion of the first physical object).

In some embodiments, in accordance with a determination that the input device has a second orientation, different from the first orientation, the electronic device determines (1648) that the user input is directed to the second portion of the first physical object, such as if stylus 1510 has a particular orientation such that it is pointed at the leg of table 1506 in FIG. 15B (e.g., if the pointing device has a second orientation such that it is pointed towards (e.g., oriented towards) the second portion of the first physical object, then the device determines that the user is requesting that the second portion of the first physical object be scanned and the second scanning location is optionally displayed at the second portion of the first physical object).

The above-described manner of scanning portions of a physical object (e.g., by using the orientation of a pointing device to determine what portions of the physical object the user is pointing at for scanning) provides quick and efficient method of marking portions of the physical object for scanning (e.g., by using the orientation of the input device, without requiring the user to perform additional inputs to select particular portions of the physical object to scan), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, after one or more portions of the first physical object have been selected for scanning by the one or more sensors of the electronic device, the electronic device receives (1650), via the one or more input devices, a second user input corresponding to a request to duplicate the one or more scanned portions of the first physical object, such as in FIG. 15C (e.g., receiving a selection of a selectable option or detecting a gesture corresponding to a request to duplicate the scanned portions of the first physical object).

In some embodiments, in response to receiving the second user input, the electronic device displays (1652), via the display generation component in the three-dimensional environment, a representation of the one or more portions of the first physical object that have been selected for scanning by the one or more sensors, wherein the representation of the one or more portions of the first physical object is separate from the first physical object, such as the generation of three-dimensional object 1516 in FIG. 15C (e.g., generating a virtual object, separate from the first physical object, that is based on the scanned portions of the first physical object).

In some embodiments, the generated virtual object has a size, shape, and/or characteristics that are based on the scanned characteristics of the scanned portions of the first physical object. For example, the generated virtual object has a color, texture, and/or topography that is the same as or similar to the scanned portions of the first physical object. In some embodiments, the generated virtual object does not include portions that correspond to portions of the first physical object that were not scanned. Thus, the generated virtual object reflects the scanned portions and does not reflect the unscanned portions (if any) of the first physical object.

The above-described manner of generating a virtual object from the scanned portions of a physical object (e.g., in response to a selection of a selectable option to generate a duplicate of the scanned portions of the first physical object) provides quick and efficient method of creating a copy of the physical object (e.g., by scanning the physical object and creating a virtual object based on the scanned characteristics of the physical object), which simplifies the interaction between the user and the electronic device and enhances the operability of the electronic device and makes the user-device interface more efficient (e.g., without requiring the user to draw a virtual object from scratch), which additionally reduces power usage and improves battery life of the electronic device by enabling the user to use the electronic device more quickly and efficiently, while reducing errors in usage.

In some embodiments, in accordance with a determination that an entirety of the first physical object was selected for scanning when the second user input was received (e.g., all surfaces of the first physical object has been successfully scanned and/or selected for scanning), the representation of the one or more portions of the first physical object comprises a representation of the entirety of the first physical object (1654), such as if the entirety of table 1506 were selected for scanning in FIG. 15C when three-dimensional object 1516 was created, three-dimensional object 1516 would be a representation of the entirety of table 1506 (e.g., the virtual object generated based on the scanned portions of the first physical object is a complete representation of the entire surface of the first physical object such that the surface of the virtual object does not include gaps, holes, or missing portions).

In some embodiments, in accordance with a determination that a first respective portion but not a second respective portion of the first physical object was selected for scanning when the second user input was received, the representation of the one or more portions of the first physical object comprises a representation of the first respective portion of the first physical object but not a representation of the second respective portion of the first physical object (1656), such as three-dimensional object 1516 including the corner of table 1506 and the leg of corner of table 1506 that were selected for scanning when three-dimensional object 1516 was created in FIG. 15C (e.g., if less than all surfaces of the first physical object have been successfully scanned, then the virtual object generated based on the scanned portions of the first physical object includes the scanned portions and does not include the unscanned portions of the first physical object). In some embodiments, the portions that would otherwise correspond to the unscanned portions of the first physical object do not exist, are empty, and/or are transparent.

The above-described manner of generating a virtual object from the scanned portions of a physical object (e.g., by generating a virtual object that is a partial copy of the physical object if only a subset of the physical object is scanned or generating a full copy of the physical object if the entirety of the physical object is scanned) provides quick and efficient method of creating a copy of the physical object (e.g., by scanning the physical object and creating a virtual object based on the scanned portions of the physical object), which simplifies the interaction between the user and the electronic device and enhances the operability of the electronic device and makes the user-device interface more efficient (e.g., by providing a method of duplicating only certain portions of the physical object, without requiring the user to scan the entire object and modify the generated virtual object to remove undesired portions of the object), which additionally reduces power usage and improves battery life of the electronic device by enabling the user to use the electronic device more quickly and efficiently, while reducing errors in usage.

In some embodiments, displaying the representation of the one or more portions of the first physical object includes displaying an animation of the representation of the one or more portions of the first physical object moving from being overlaid on the first physical object to not being overlaid on the first physical object (1658), such as if an animation were displayed moving three-dimensional object 1516 out of table 1506 in FIG. 15C (e.g., in response to the request to duplicate the scanned portions of the first physical object, an animation is displayed of the virtual object being generated). In some embodiments, the animation includes an animation of the scanned portions of the first physical object (e.g., the visual indications of the scan) moving out from the first virtual object and becoming the virtual object separate from the first physical object, and at a different location in the three-dimensional environment.

The above-described manner of generating a virtual object from the scanned portions of a physical object (e.g., by displaying an animation of the virtual object moving out from the physical object) provides quick and efficient method of creating a copy of the physical object (e.g., by displaying an animation that indicates that the copy is generated from the scanned portions of the physical object), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while displaying the representation of the one or more portions of the first physical object in the three-dimensional environment, the electronic device receives (1660), via the one or more input devices, a third user input corresponding to a request to move the representation of the one or more portions of the first physical object in the three-dimensional environment, such as receiving a user input moving three-dimensional object 1516 in three-dimensional environment 1504 in FIG. 15C (e.g., a selection of a selectable option or a gesture corresponding to a request to move the first physical object). In some embodiments, the third user input includes a tap input on the pointing device while the pointing device is pointed at the virtual object followed by a change in the orientation of the pointing device to point at another location in the three-dimensional environment.

In some embodiments, in response to receiving the third user input, the electronic device moves (1662) the representation of the one or more portions of the first physical object independently from the first physical object in the three-dimensional environment in accordance with the third input, such as moving three-dimensional object 1516 without moving table 1506 in FIG. 15C (e.g., moving the virtual object in accordance with the user input without moving the first physical object upon which the virtual object is based). Thus, the virtual object is an object separate from the first physical object that is able to be manipulated separately from the first physical object. In some embodiments, the amount of movement of the virtual object is based on the distance of the virtual object to the user, such as described above with respect to method 1400.

The above-described manner of scanning a physical object (e.g., by generating a virtual object based on scanned portions of the physical object that is able to be manipulated or moved separately from the physical object) provides quick and efficient method of creating a copy of the physical object (e.g., by scanning the physical object and creating a virtual object based on the scanned characteristics of the physical object), which simplifies the interaction between the user and the electronic device and enhances the operability of the electronic device and makes the user-device interface more efficient (e.g., without requiring the user to draw or create a virtual object from scratch), which additionally reduces power usage and improves battery life of the electronic device by enabling the user to use the electronic device more quickly and efficiently, while reducing errors in usage.

In some embodiments, in response to receiving the user input (1664), in accordance with a determination that the user input is directed to one or more contours of the first physical object and includes movement that follows the one or more contours of the first physical object (e.g., the pointing device traces along the border of the first physical object), the electronic device displays (1666), via the display generation component, a visual indication of the one or more contours of the first physical object that is displayed at a respective location in the three-dimensional environment that is associated with the one or more contours of the first physical object, such as display of tracing indicator 1518-1 in FIG. 15D (e.g., displaying a visual indication of the tracing along the border of the physical object).

In some embodiments, the visual indication follows the three-dimensional boundary of the first physical object. For example, if the user input traced along an edge of the first physical object that extends in the x-y direction, then the visual indication extends in the x-y direction, and if the user input traced along an edge of the first physical object that extends in the y-z direction (e.g., the user input changes depth to follow the changing depth of the edge of the first physical object), then the visual indication extends in the y-z direction. Thus, the visual indication has three-dimensional depth and orientation information based on the user input and the topography of the first physical object.

The above-described manner of tracing a physical object (e.g., by using a pointing device to trace along the boundaries or borders of the physical object) provides quick and efficient method of creating a wireframe copy of the physical object, which simplifies the interaction between the user and the electronic device and enhances the operability of the electronic device and makes the user-device interface more efficient (e.g., without requiring the user to draw or create a wireframe model of the physical object from scratch), which additionally reduces power usage and improves battery life of the electronic device by enabling the user to use the electronic device more quickly and efficiently, while reducing errors in usage.

In some embodiments, the one or more contours are non-planar in the three-dimensional environment (1668), such as if table 1506 had non-planar surfaces and tracing indicators 1518-1, 1518-2, or 1518-3 followed along the non-planar surfaces in FIG. 15E (e.g., the tracing maintains the three-dimensional aspects of the portions being traced). For example, if the pointing device traces the first physical object along a border of the object that extends in the x, y, and/or z directions, then the tracing follows the border and also extends in the x, y, and/or z directions.

The above-described manner of generating a wireframe model of a physical object (e.g., by using a pointing device to trace along the boundaries or borders of the physical object that preserves the three-dimensional characteristics of the physical object) provides quick and efficient method of creating a wireframe copy of the physical object (e.g., without limiting the user to only two dimensions and requiring the user to perform additional inputs to post-process or otherwise modify the model to include three dimensional information), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while displaying the first physical object, a respective representation associated with the first physical object overlaid on the first physical object, and a selectable visual element associated with the respective representation in the three-dimensional environment (e.g., while displaying a representation of the first physical object (e.g., a scanning indication or a visual indication of a tracing) is displayed at or near the first physical object), the electronic device receives (167-), via the one or more input devices, an input directed to the selectable visual element, such receiving an input moving tracing indicators 1518-1, 1518-2, and 1518-3 out of table 1506 in FIG. 15F (e.g., receiving an input selecting the selectable visual element and/or moving the selectable visual element away from the first physical object).

For example, in response to a user performing a user input for marking one or more portions of the first physical object for scanning and a scanning indication is displayed at the one or more portions of the first physical object, and/or in response to a tracing input tracing at least a portion of the first physical object, a visual indication of the tracing is displayed at the portions of the first physical object that have been traced. In some embodiments, the respective representation is displayed with a selectable visual element that is selectable to move the respective representations out of the first physical object to generate a partial or complete duplicate virtual object based on the respective representation.

In some embodiments, in response to receiving the input directed to the selectable visual element (1672), in accordance with a determination that the input directed to the selectable visual element corresponds to a movement input (1674) (e.g., the user input includes a movement, optionally away from the first physical object and optionally while maintaining a selection gesture such as a pinch by the hand of the user), the electronic device visually disassociates (1676) the respective representation associated with the first physical object from the first physical object, such as disassociating tracing indicators 1518-1, 1518-2, and 1518-3 from table 1506 in FIG. 15F (e.g., moving the respective representation out of the first physical object and generating a virtual object that is separate from the first physical object based on the respective representation) and moves (1678) the respective representation associated with the first physical object independently from the first physical object in the three-dimensional environment in accordance with the movement input, such as moving tracing indicators 1518-1, 1518-2, and 1518-3 out of table 1506 in FIG. 15F (e.g., moving the virtual object away from the first physical object without moving the first physical object such that future manipulation inputs to the virtual object cause the virtual object to be manipulated without performing a corresponding manipulation to the first physical object). In some embodiments, the movement of the virtual object is based on the distance of the virtual object from the user, such as described above with respect to method 1400.

In some embodiments, while the respective representation associated with the first physical object is visually disassociated from the first physical object, the electronic device detects (1680), via the one or more input devices, first movement of the first physical object in the physical environment, such as detecting that table 1506 moved or changed orientations in FIG. 15F (e.g., detecting that the first physical object has moved in the physical environment around the electronic device such that the first physical object is in a different location in the three-dimensional environment).

In some embodiments, in response to detecting the first movement of the first physical object in the first physical environment, the electronic device forgoes (1682) moving the respective representation associated with the first physical object in the three-dimensional environment in accordance with the first movement of the first physical object, such as if tracing indicators 1518-1, 1518-2, and 1518-3 did not move in response to detecting table 1506 moving in FIG. 15F (e.g., displaying the first physical object at its updated location without moving the virtual object (e.g., the respective representation)). In some embodiments, the virtual object is maintained at the same location in the three-dimensional environment as before the movement of the first physical object was detected. In some embodiments, if the respective representation is associated with the first physical environment, then in response to detecting a movement of the first physical object, the respective representation moves with the first physical object (e.g., as if they were one unit).

The above-described manner of generating a virtual object from the scanned portions of a physical object (e.g., by displaying an affordance that is interactable to disassociate the virtual object from the physical object and move it to a location in the three-dimensional environment separate from the physical object) provides quick and efficient method of creating a copy of the physical object (e.g., without requiring the user to perform additional inputs to disassociate the virtual object and generate a virtual object model), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while the respective representation associated with the first physical object is visually disassociated from the first physical object, the electronic device receives (1684), via the one or more input device, an input moving the respective representation associated with the first physical object to a respective location in the three-dimensional environment corresponding to the first physical object, such as if scanning indicators 1518-1, 1518-2, and 1518-3 were moved back towards table 1506 in FIG. 15F (e.g., after moving the virtual object (e.g., the scanned portions of the first physical object or the tracing) away from the first physical object, moving the virtual object back to/onto/into the first physical object or within a threshold distance to the original position within the first physical object (e.g., 1 inch, 3 inches, 6 inches, 1 foot, 3 feet, etc.)). In some embodiments, the virtual object moves in response to the user input based on the distance of the first virtual object from the user, such as described above with respect to method 1400.

In some embodiments, in response to receiving the input moving the respective representation associated with the first physical object to the respective location, the electronic device visually associates (1686) the respective representation associated with the first physical object, such as if scanning indicators 1518-1, 1518-2, and 1518-3 were reassociated with table 1506, such as in FIG. 15E (e.g., re-associating the virtual object with the first physical object such that the virtual object is snapped back to its corresponding position in the first physical object).

In some embodiments, re-associating the virtual object with the first physical object causes the virtual object to be treated as if it were a part of the first physical object (e.g., as if it were never disassociated from the first physical object) such that when the first physical object moves in the physical environment, the electronic device will move the virtual object accordingly to track the movements of the first physical object.

In some embodiments, while the respective representation associated with the first physical object is visually associated with the first physical object, the electronic device detects (1688), via the one or more input devices, second movement of the first physical object in the physical environment, such as if table 1506 moved or changed orientations in FIG. 15E (e.g., detecting that the first physical object has changed position in the physical environment around the electronic device such that the first physical object is displayed at a different position in the three-dimensional environment). For example, in response to a user input to move the first physical object (e.g., as described above with respect to methods 1200 and 1400).

In some embodiments, in response to detecting the second movement of the first physical object in the physical environment, the electronic device moves (1690) the respective representation associated with the first physical object in the three-dimensional environment in accordance with the second movement of the first physical object in the physical environment, such as if scanning indicators 1518-1, 1518-2, and 1518-3 moved with the movement of table 1506 to maintain its relative position with respect to table 1506 in FIG. 15E (e.g., moving the first physical object and the virtual object in the three-dimensional environment in accordance with the change in position of the first physical object to maintain its relative position in or on the first physical object). Thus, the respective representation is re-attached to the first physical object and move together as if they were one unit.

The above-described manner of re-associating a virtual object with a physical object (e.g., by moving the virtual object and snapping it back to the physical object) provides quick and efficient method of expanding the virtual object to include previously unscanned portions of the physical object (e.g., by re-associating the virtual object with the physical object, thus allowing a user to scan new portions of the physical object that were not previously scanned and combine the newly scanned portions with the virtual object), which simplifies the interaction between the user and the electronic device and enhances the operability of the electronic device and makes the user-device interface more efficient (e.g., without requiring the user to scan portions of the physical object that were already previously scanned when initially creating the virtual object and create a new virtual object in order to include additional portions of the physical object), which additionally reduces power usage and improves battery life of the electronic device by enabling the user to use the electronic device more quickly and efficiently, while reducing errors in usage.

In some embodiments, while the first portion of the first physical object has been selected for scanning by the one or more sensors of the electronic device, the electronic device detects (1691), via the one or more input devices, movement of the first physical object in the physical environment, such as if table 1506 moved in FIG. 15B (e.g., detecting that the first physical object has moved and/or changed orientation in the physical environment). In some embodiments, in response to the first physical object moving or changing orientation, the first physical object moves or changes orientation in the three-dimensional environment accordingly.

In some embodiments, in response to detecting the movement of the first physical object in the physical environment, the electronic device maintains (1692) the first portion of the first physical object as being selected for scanning by the one or more sensors of the electronic device, such as maintaining the corner of table 1506 and leg of table 1506 as being selected for scanning in FIG. 15B (e.g., continue displaying scanning indications on the respective portions of the first physical object to indicate that the respective portions of the first physical object have been marked for scanning). In some embodiments, the scanning indications move or rotate with the first physical object. In some embodiments, moving or changing the orientation of the first physical object reveals portions of the first physical object that have not been marked for scanning and/or were not previously visible. For example, a user is able to walk around the first physical object to scan the far side of the first physical object or the user is able to pick up and rotate the first physical object to reveal the far side of the first physical object for scanning.

The above-described manner of scanning portions of a physical object (e.g., by maintaining the portions of the physical object that have been marked for scanning when physical object is moved or rotated in the physical world) provides quick and efficient method of scan different portions of the physical object (e.g., by allowing the user to rotate the object, without requiring the user to change locations to reveal previously hidden portions of the virtual object), which simplifies the interaction between the user and the electronic device and enhances the operability of the electronic device and makes the user-device interface more efficient (e.g., without requiring the user to first scan one side of the object, and then separately scan the other side of the object and post-process the results to combine the scan models), which additionally reduces power usage and improves battery life of the electronic device by enabling the user to use the electronic device more quickly and efficiently, while reducing errors in usage.

In some embodiments, in response to detecting the movement of the first physical object in the physical environment, the electronic device moves (1694) the first scanning indication associated with the first portion of the first physical object in the three-dimensional environment in accordance with a movement of the first portion of the first physical object in the physical environment such that the first scanning indication is displayed at a respective location in the three-dimensional environment that is associated with the first portion of the first physical object, such as if scanning indicator 1514 moved with the movement of table 1506 in FIG. 15B (e.g., the scanning indications displayed on the surfaces of the first physical object move or change orientations in accordance with the movement or change in orientation of the first physical object to maintain their respective positions on the first physical object).

In some embodiments, the electronic device is able to recognize the rotation and update the position and/or orientation of the scanning indications to continue indicating that their respective portions of the first physical object have been marked for scanning. For example, if the first physical object has been moved such that the first portion of the physical object is now at a respective location in the three-dimensional environment, then the scanning indication moves with the physical object to the respective location in the three-dimensional environment.

The above-described manner of indicating portions of a physical object that have been or will be scanned (e.g., by maintaining the scanning indications at their relative positions on the physical object even if the physical object is moved or rotated in the physical world) provides quick and efficient indication of the portions that have been or will be scanned (e.g., without requiring the user to separately verify whether the previously indicated portions of the device are still marked for scanning), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

FIGS. 17A-17E illustrate examples of manipulating a distant object in accordance with some embodiments.

Figure 17A:
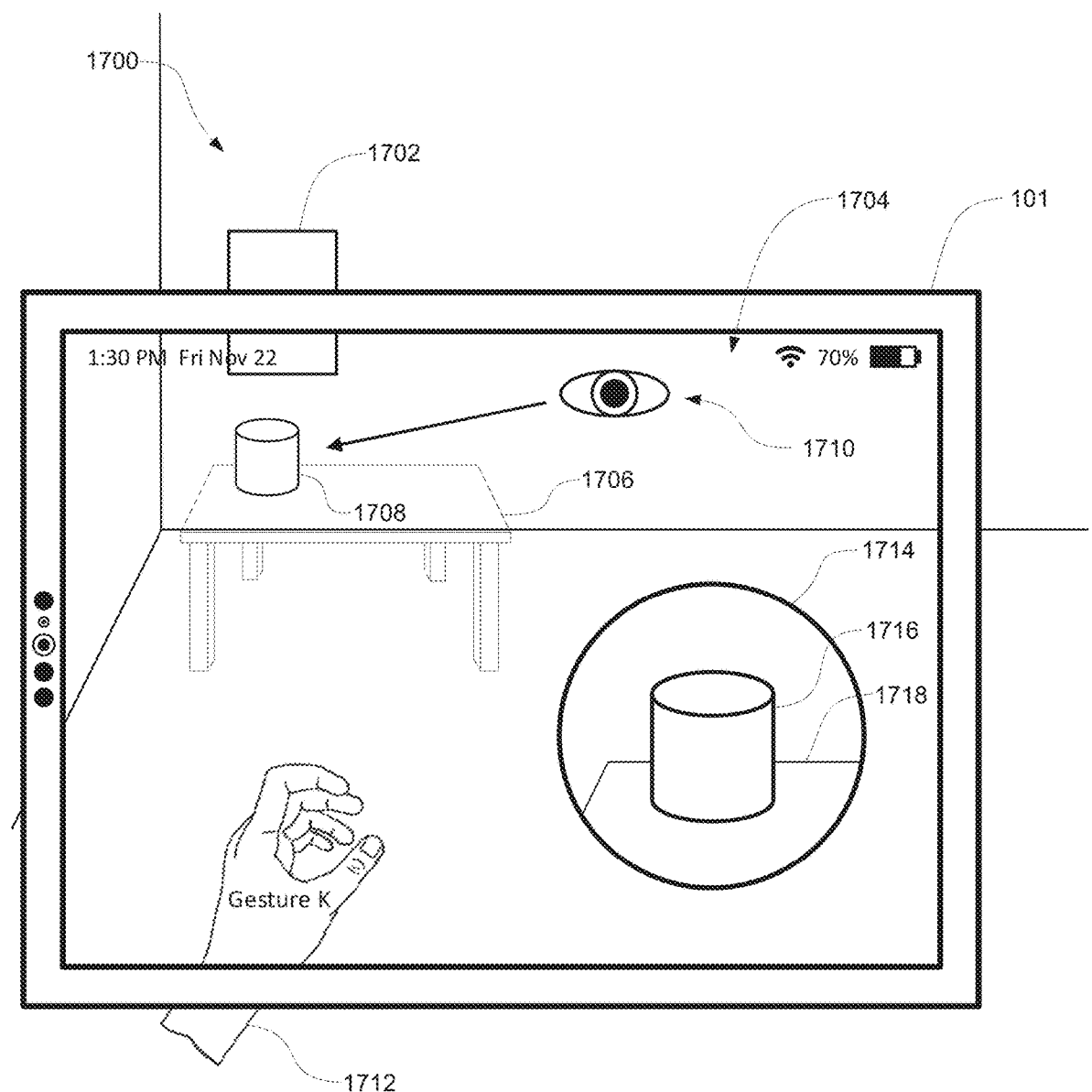
FIGS. 17A-17E illustrate examples of manipulating a distant object in accordance with some embodiments.

FIG. 17A illustrates an electronic device 101 displaying, via a display generation component (e.g., display generation component 120 of FIG. 1), a three-dimensional environment 1704 on a user interface. As described above with reference to FIGS. 1-6, the electronic device 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the electronic device 101 would be able to use to capture one or more images of a user or a part of the user while the user interacts with the electronic device 101. In some embodiments, the user interfaces shown below could also be implemented on a head-mounted display that includes a display generation component that displays the user interface to the user and sensors to detect the physical environment and/or movements of the user's hands (e.g., external sensors facing outwards from the user), and/or gaze of the user (e.g., internal sensors facing inwards towards the face of the user).

As shown in FIG. 17A, device 101 captures one or more images of the real world environment 1700 around device 101 (e.g., operating environment 100), including one or more objects in the real world environment 1700 around device 101. In some embodiments, device 101 displays representations of the real world environment 1700 in three-dimensional environment 1704. For example, three-dimensional environment 1704 includes a back corner of a room, a representation of at least a portion of picture frame 1702 on the back wall of the room, and a representation of table 1706. Similarly, in FIG. 17A, three-dimensional environment 1704 includes a representation of a hand 1712 that is a representation of a hand of the user of the device that is held in front of or behind device 101 and is captured by the one or more sensors of the device (e.g., as illustrated above in FIG. 6B).

In FIG. 17A, three-dimensional environment 1704 includes cylinder 1708 on top of representation of table 1706. As described above, table 1706 is an object in real world environment 1700 of which device 101 is able to capture an image using the one or more sensors of device 101. In some embodiments, device 101 displays a representation of table 1706 in three-dimensional environment 1704 (e.g., a photorealistic representation, a simplified representation, a cartoon, a caricature, etc.). In some embodiments, cylinder 1708 is a three-dimensional virtual object. For example, cylinder 1708 is not a physical object in real world environment 1700. Instead, cylinder 1708 is optionally an object that exists in the virtual environment of three-dimensional environment 1704. As shown in FIG. 17A, cylinder 1708 is located on the top surface of the representation of table 1706. Thus, a virtual object is optionally able to interact with representations of real world objects. In some embodiments, because cylinder 1708 is a virtual object, a user is able to manipulate cylinder 1708 (e.g., without literally manipulating objects in real world environment 1700), such as to perform rotation, movement, and/or resizing operations.

In FIG. 17A, representation of table 1706 and cylinder 1708 is at a location in three-dimensional environment 1704 that the user is unable to reach with hand 1712 without physically moving closer to table 1706 and cylinder 1708. Thus, a user is optionally unable to perform direct manipulation operations on cylinder 1708 with hand 1712, because of the inability to reach cylinder 1708 with hand 1712. Thus, the embodiments described herein, discuss methods of enabling a user to perform direct manipulation operations on a distant (e.g., faraway) object (e.g., and object that is not reachable by hand 1712 without requiring the movement of the user, such as cylinder 1708) by displaying a representation of the distant object close to the user such that the user is able to perform one or more direct manipulation operations on the representation of the distant object.

In FIG. 17A, device 101 detects hand 1712 performing a respective gesture (e.g., "Gesture K") while gaze 1710 is directed to cylinder 1708. In some embodiments, the respective gesture is a selection of a selectable option, a pinch gesture, or any other suitable gesture predetermined to correspond to a request to display a magnified view of three-dimensional environment 1704. In some embodiment, in response to detecting a respective gesture performed by hand 1712 corresponding to a request to display a magnified view of three-dimensional environment 1704, device 101 displays magnified view 1714 of a portion of three-dimensional environment 1704 that includes cylinder 1708 (e.g., the portion of three-dimensional environment 1704 that gaze 1710 was looking at when the hand 1712 performed the respective gesture), as shown in FIG. 17A. In some embodiments, magnified view 1714 displays a predetermined area around the location that gaze 1710 was looking at (e.g., 1 square feet, 3 square feet, 9 square feet, 25 square feet, etc. or any other suitable area around the location of gaze 1710 optionally based on magnification factor and/or distance from the user). For example, as shown in FIG. 17A, magnified view 1714 includes a representation of cylinder 1716 and a representation of a portion of a table 1718. In some embodiments, representation of cylinder 1716 is a magnified view of cylinder 1708 and representation of a portion of a table 1718 is a magnified view of a corner of table 1706.

In some embodiments, magnified view 1714 is an object displayed in three-dimensional environment 1704 that can be resized and/or moved as will be described below. In some embodiments, magnified view 1714 is displayed overlaid on and/or obscuring portions of three-dimensional environment 1704 (e.g., based on the size, orientation and/or placement of magnified view 1714, which are optionally changeable in response to user input as will be described below). In some embodiments, magnified view 1714 is an actual view of the respective portion of three-dimensional 1704 and not a temporary instance of a three-dimensional environment that includes a duplicate of cylinder 1708 and duplicate of table 1706. For example, the view of three-dimensional environment 1704 displayed in magnified view 1714 is optionally a view of three-dimensional environment 1704 as if the camera for the view had been placed at a location in three-dimensional environment 1704 that is closer to the respective portion of three-dimensional environment 1704 (e.g., 25% closer, 50% closer, 75% closer, 90% closer, etc.). For example, magnified view 1714 displays a view of three-dimensional environment 1704 as if a camera were placed 50% closer to cylinder 1708 (e.g., thus causing representation of cylinder 1716 to be twice the size of cylinder 1708, for a magnification factor of 2x). As discussed, in some embodiments, the objects displayed in magnified view 1714 are larger than their corresponding objects in three-dimensional environment 1704, including, for example, the line width of the borders of the objects (e.g., the line width of the borders of objects in magnified view 1714 are thicker and/or heavier than the line width of the borders of their corresponding objects in three-dimensional environment 1704).

Thus, magnified view 1714 optionally provides a view of a respective portion of three-dimensional environment 1704 as if the user had moved closer to the respective portion of three-dimensional environment 1704 (e.g., had moved to the position of the camera corresponding to magnified view 1714). In some embodiments, the perspective of magnified view 1714 is the same as the perspective of three-dimensional environment 1704 (e.g., the "camera" for magnified view 1714 is somewhere along a line from the user to the respective portion of three-dimensional environment 1704 that is displayed in magnified view 1714).

As shown in FIG. 17A, magnified view 1714 is placed at a location near the user, such that the user is able to reach out with hand 1712 and directly manipulate objects in magnified view 1714 (e.g., without having to move in three-dimensional environment 1704), even though the actual objects displayed in magnified view 1714 are far away. Thus, magnified view 1714 optionally serves as a proxy for the respective portion of three-dimensional environment 1704.

Figure 17B:
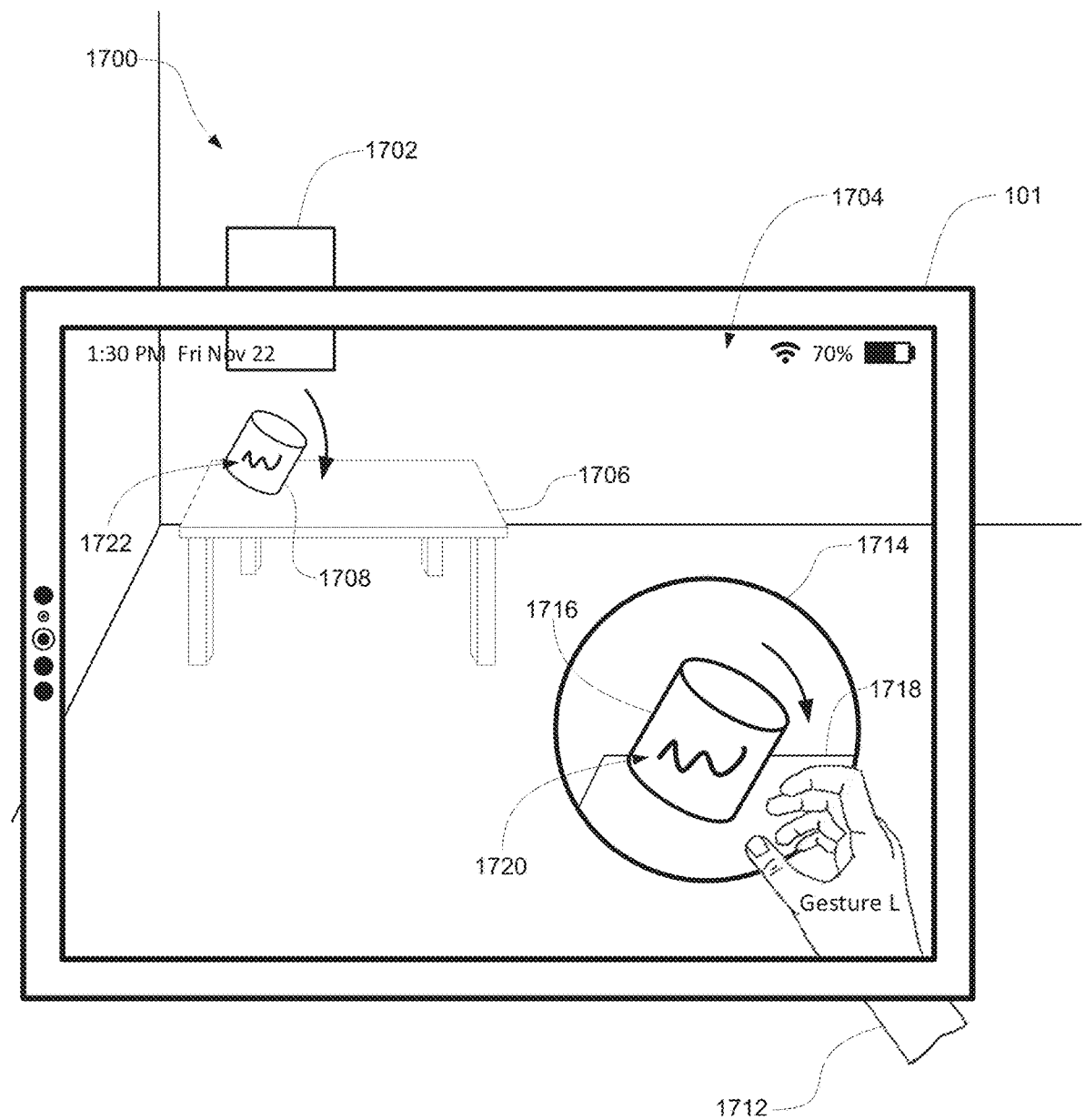

FIG. 17B illustrates a user interacting with the representation of the cylinder 1716 in magnified view 1714. As described above, a user is able to reach into magnified view 1714 and interact with objects displayed in magnified view 1714, which optionally is functionally the same as if the user were interacting directly with objects in the respective portion of three-dimensional environment 1704 that is displayed in magnified view 1714. For example, in FIG. 17B, device 101 detects hand 1712 performing one or more gestures (e.g., "Gesture L") that includes drawing content 1720 on the surface of representation 1716 and includes a rotation operation on representation 1716 (e.g., such as the drawing and/or rotation operations described with reference to method 1000). As shown in FIG. 17B, in response to the user input, content 1720 is drawn onto the surface of representation 1716 and representation 1716 is rotated in accordance with the user input. As discussed above, because magnified view 1714 is a magnified view of the actual portion of three-dimensional environment 1704 instead of a duplicate of the respective portion of three-dimensional environment 1704, performing manipulation operations on representation 1716 causes the same manipulation operations to be performed on cylinder 1708 (e.g., the original object) because interacting with representation 1716 is the same as interacting with cylinder 1708. Thus, in FIG. 17B, content 1722 is also drawn on cylinder 1708 and cylinder 1708 is also rotated in accordance with the user input. As shown, content 1722 is identical to content 1720 and the rotation of cylinder 1708 is identical to the rotation of representation 1716 because, as described above, representation 1716 is a magnified view of cylinder 1708.

In some embodiments, a user is able to move objects into and out of magnified view 1714. For example, a user is able to perform a user input and move a virtual object into magnified view 1714 and cause the object to be positioned at the respective portion of three-dimensional environment 1704 that is displayed in magnified view 1714. For example, a user is able to place an object next to representation 1716 in magnified view 1714, thus causing the object to be "transported" from its location near the user to a location in three-dimensional environment 1704 next to cylinder 1708 (e.g., on table 1706). Similarly, a user is able to move a virtual object out of magnified view 1714 to cause the virtual object to move away from its location at the respective portion of three-dimensional environment 1704 that is displayed in magnified view 1714. For example, if a user reached into magnified view 1714, selected representation 1716 and moved representation 1716 out of magnified view 1714 to a location to the left of magnified view 1714, then cylinder 1708 is optionally transported to the location to the left of magnified view 1714 (e.g., and is no longer located on table 1706). In some embodiments, an animation is displayed of cylinder 1708 moving towards hand 1712 and merging into and/or replacing representation 1716 that was being held by hand 1712. Thus, a user is optionally able to use magnified view 1714 to move objects close to the user or to a distant location.

Figure 17C:
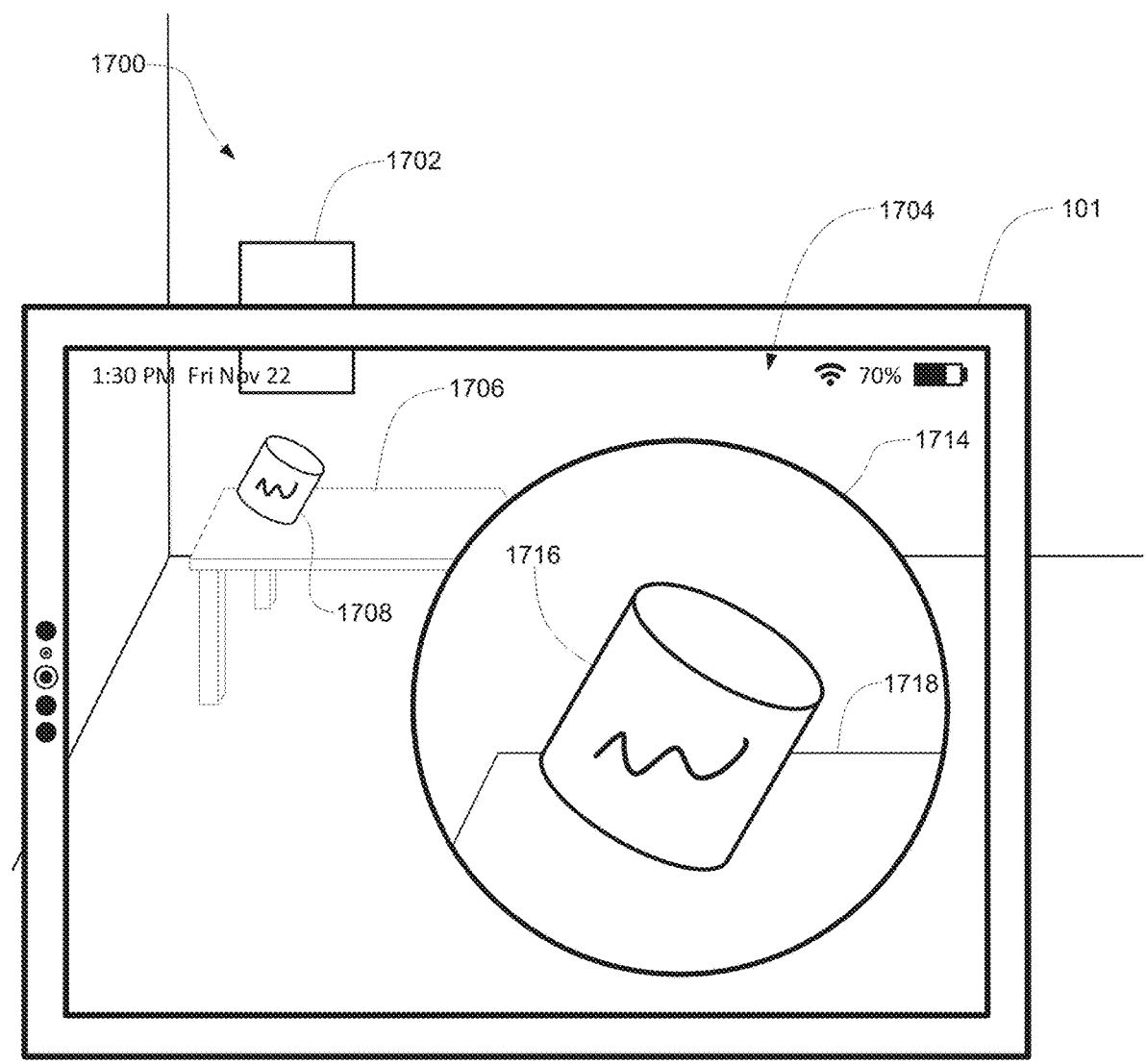

FIG. 17C illustrates an embodiment in which magnified view 1714 has been resized to a larger size (e.g., in a manner similar to described above with reference to method 1000). As shown in FIG. 17C, changing the size of magnified view 1714 does not cause magnified view 1714 to display more or less of the respective portion of three-dimensional environment 1704. Instead, changing the size of magnified view 1714 causes the objects in magnified view 1714 to change in size based on the changed size of magnified view 1714. For example, if magnified view 1714 is doubled in size, because the same amount of three-dimensional environment 1704 is displayed, the objects in magnified view 1714 double in size, thus increasing the magnification factor of magnified view 1714 by two. Similarly, if the size of magnified view 1714 is halved, then the size of objects in magnified view 1714 also are halved, thus decreasing the magnification factor of magnified view 1714 by two. Thus, in some embodiments, once created, the field of view of magnified view 1714 does not change in response to resizing of magnified view (e.g., the area/volume of three-dimensional environment 1704 shown in magnified view remains constant).

As shown in FIG. 17C, interacting with magnified view 1714 itself optionally does not cause any operations to be performed on objects in the respective portion of three-dimensional object 1704 that is displayed in magnified view 1714. Thus, magnified view 1714 can be resized and/or moved without affecting cylinder 1708 and/or table 1706. In some embodiments, moving magnified view 1714 to a different location in three-dimensional environment 1704 does not cause a change in perspective in magnified view 1714. For example, moving magnified view 1714 to the left side of the display area of the display generation component does not cause the perspective of magnified view 1714 to move leftwards. In some embodiments, the perspective remains the same because, for example, once created, the "camera" of magnified view 1714 remains in its same location along the path from the "camera" of three-dimensional environment 1704 to cylinder 1708.

Figure 17D:
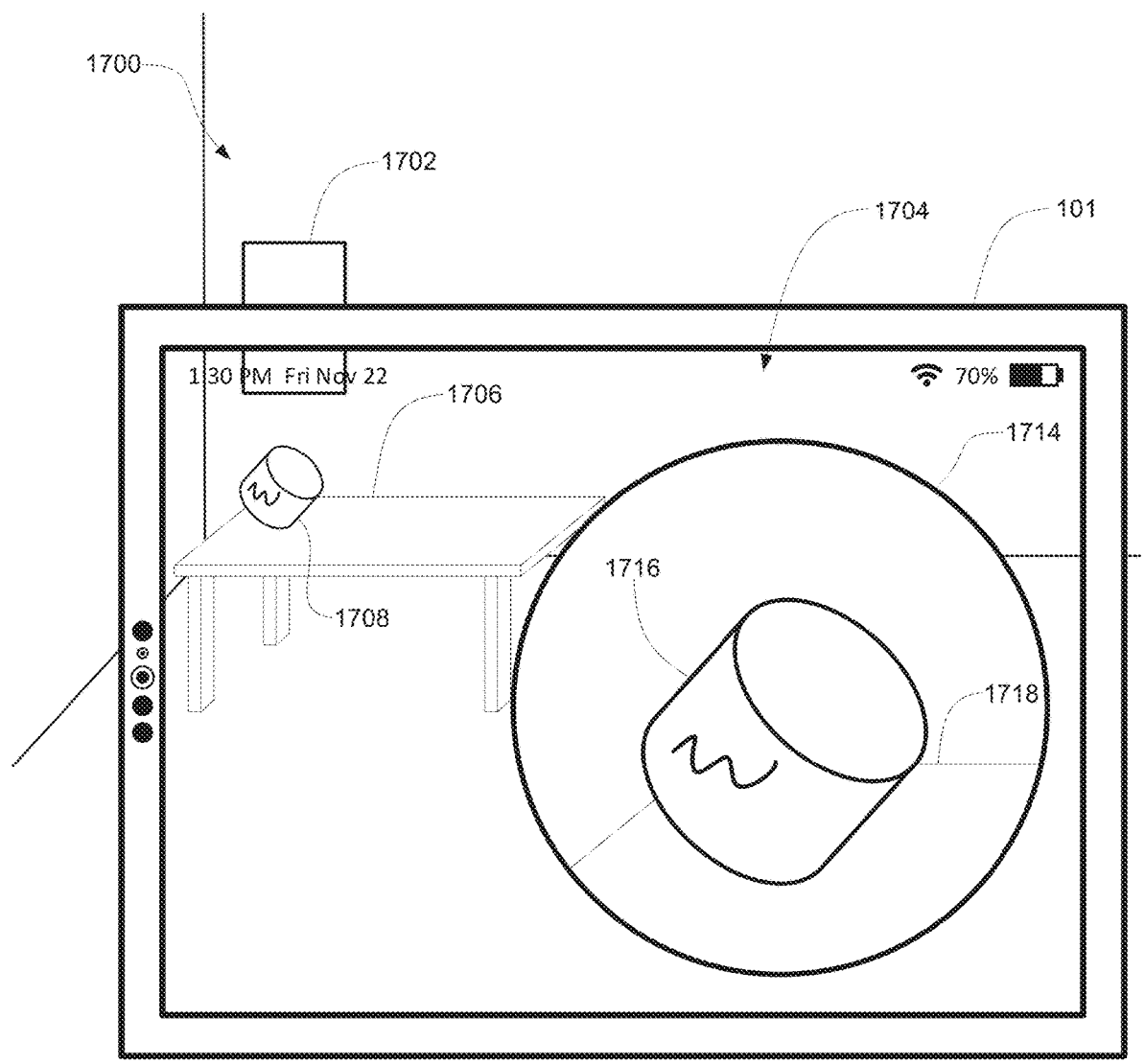

In FIG. 17D, device 101 has detected that the user has moved device 101 such that the view of real world environment 1700 has shifted to the right (e.g., such as if user 608 in FIG. 6B moved device 101 to the right). Thus, device 101 captures a view of real world environment 1700 that is to the right of the view previously captured, and as a result, displays representations of real world objects in three-dimensional environment 1704 from a different perspective than before. For example, the representation of table 1706 is rotated compared to FIG. 17C such that the right side of table 1706 is visible (e.g., whereas the right side of table 1706 was previously perpendicular to device 101 and not visible). In response to detecting that the perspective of real world environment 1700 has shifted, device 101 optionally updates the perspectives shown of virtual objects in three-dimensional environment 1704 accordingly. For example, cylinder 1708 is also rotated compared to FIG. 17C such that the view of cylinder 1708 is from a location to the right of previous, thus allowing the right side of cylinder 1708 to be more visible than before, as shown in FIG. 17D. In some embodiments, in addition to and coincident with updating the perspectives shown of virtual objects in three-dimensional environment 1704 to reflect the new perspective, magnified view 1714 is also updated such that the view of cylinder 1708 and the objects at the respective portion of three-dimensional environment 1704 (or more generally, the view of the respective portion of the three-dimensional environment shown in magnified view 1714) reflect the new perspective. In some embodiments, the "camera" position for magnified view 1714 is updated because the user/device 101 has shifted rightwards. Thus, the "camera" for magnified view 1714 is also shifted rightwards to maintain its relative position between the "camera" for three-dimensional environment 1704 and cylinder 1708 (e.g., to remain in the line of sight for cylinder 1708). Thus, the view of cylinder 1708 corresponds to the view of representation 1716 in magnified view 1714, as shown in FIG. 17D.

In some embodiments, a user is able to dismiss magnified view 1714 by performing a predefined gesture (e.g., with their hand), selecting a selectable option, or selecting an exit affordance displayed at or near magnified view 1714.

Figure 17E:
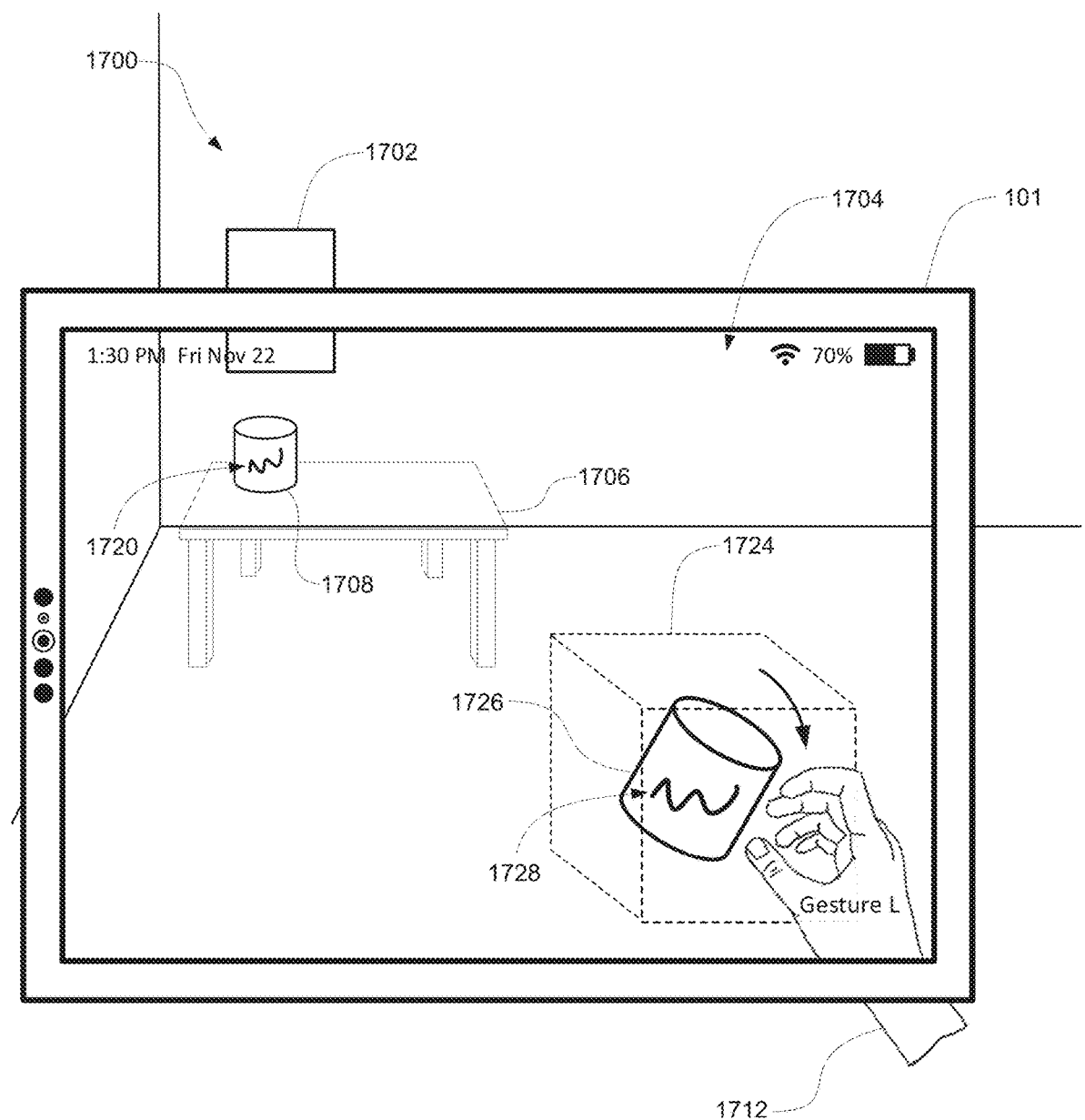
Figure 18A:
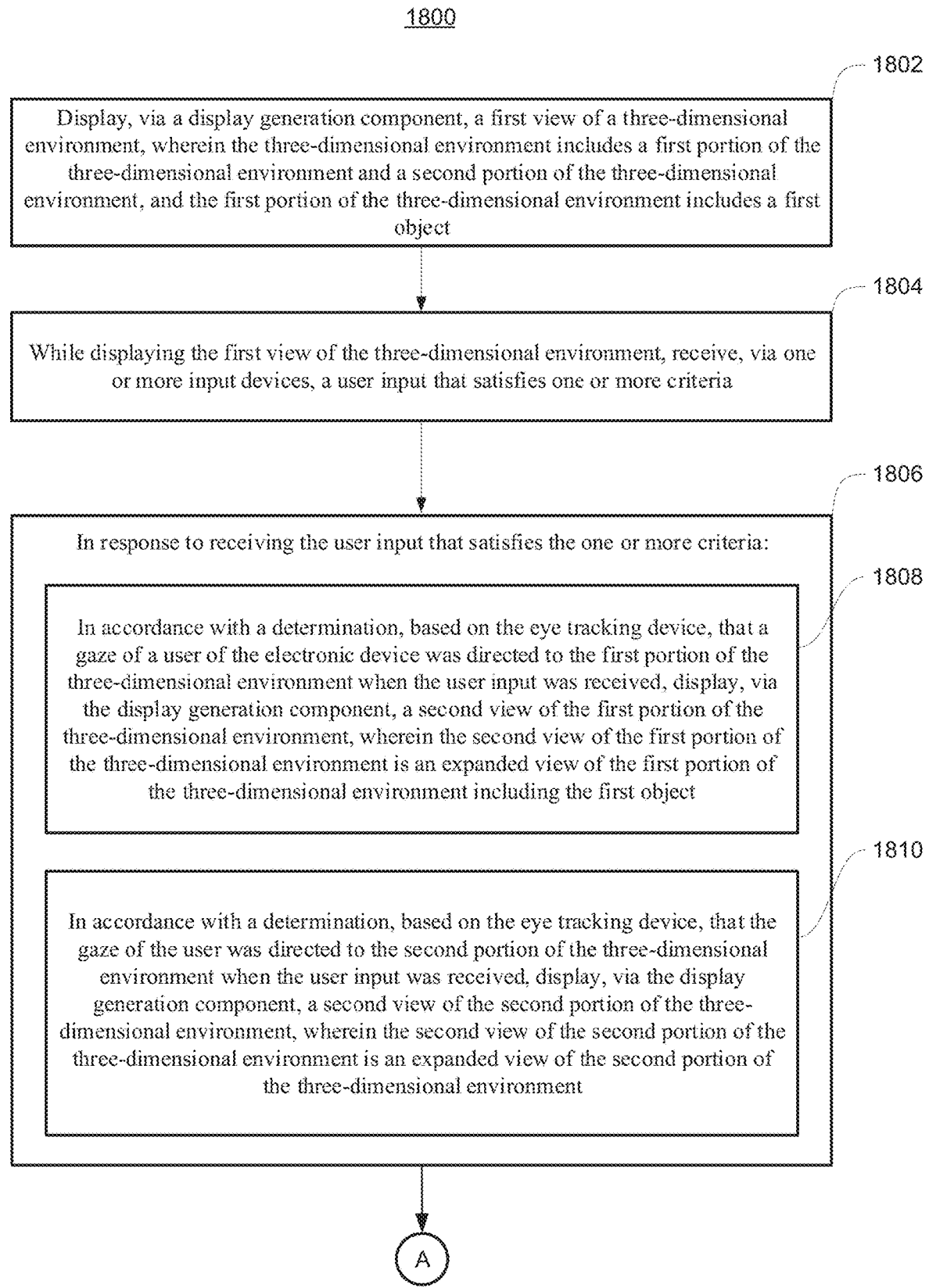
FIGS. 18A-18K is a flowchart illustrating a method of manipulating a distant object in accordance with some embodiments.
Figure 18B:
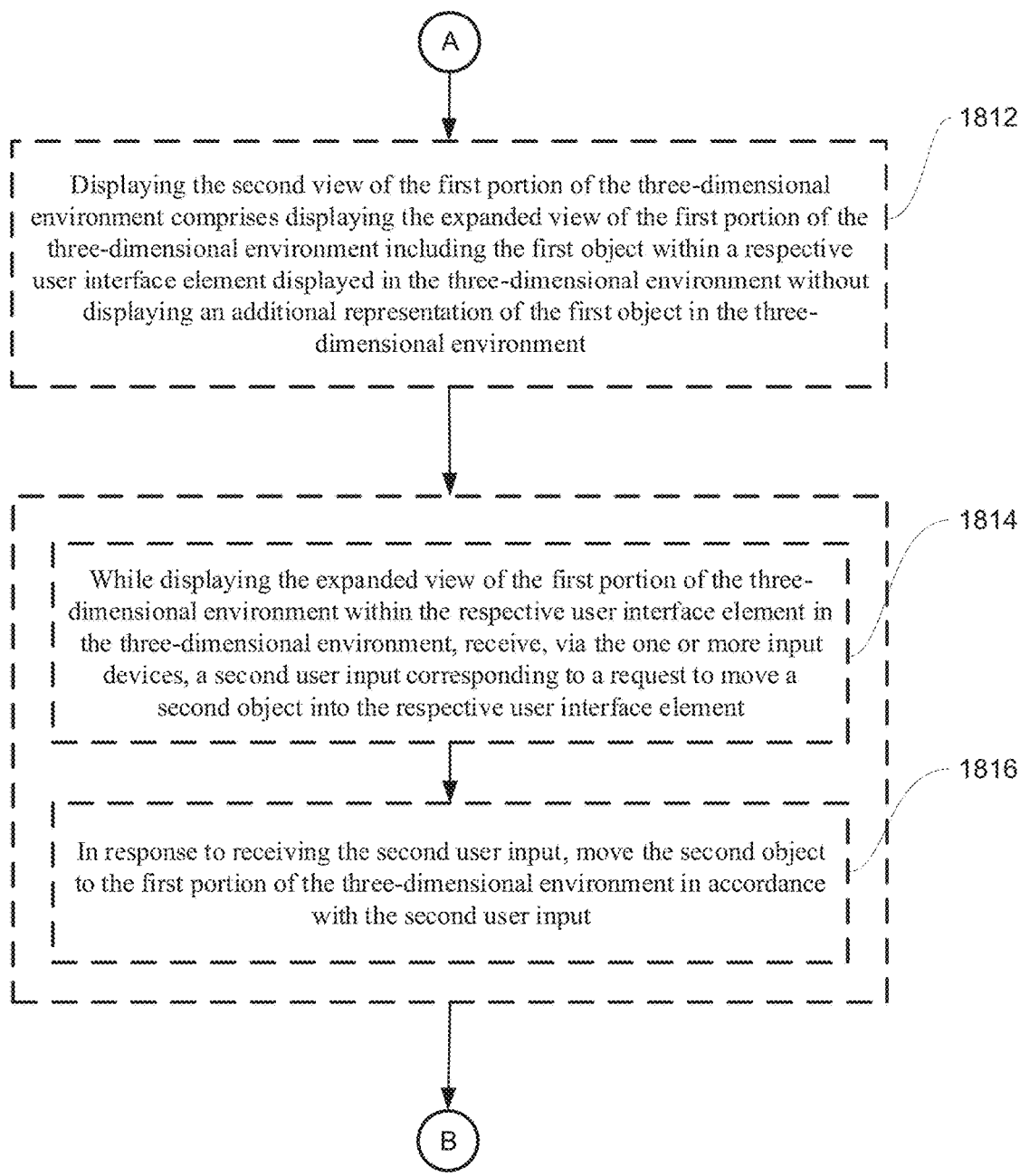
Figure 18C:
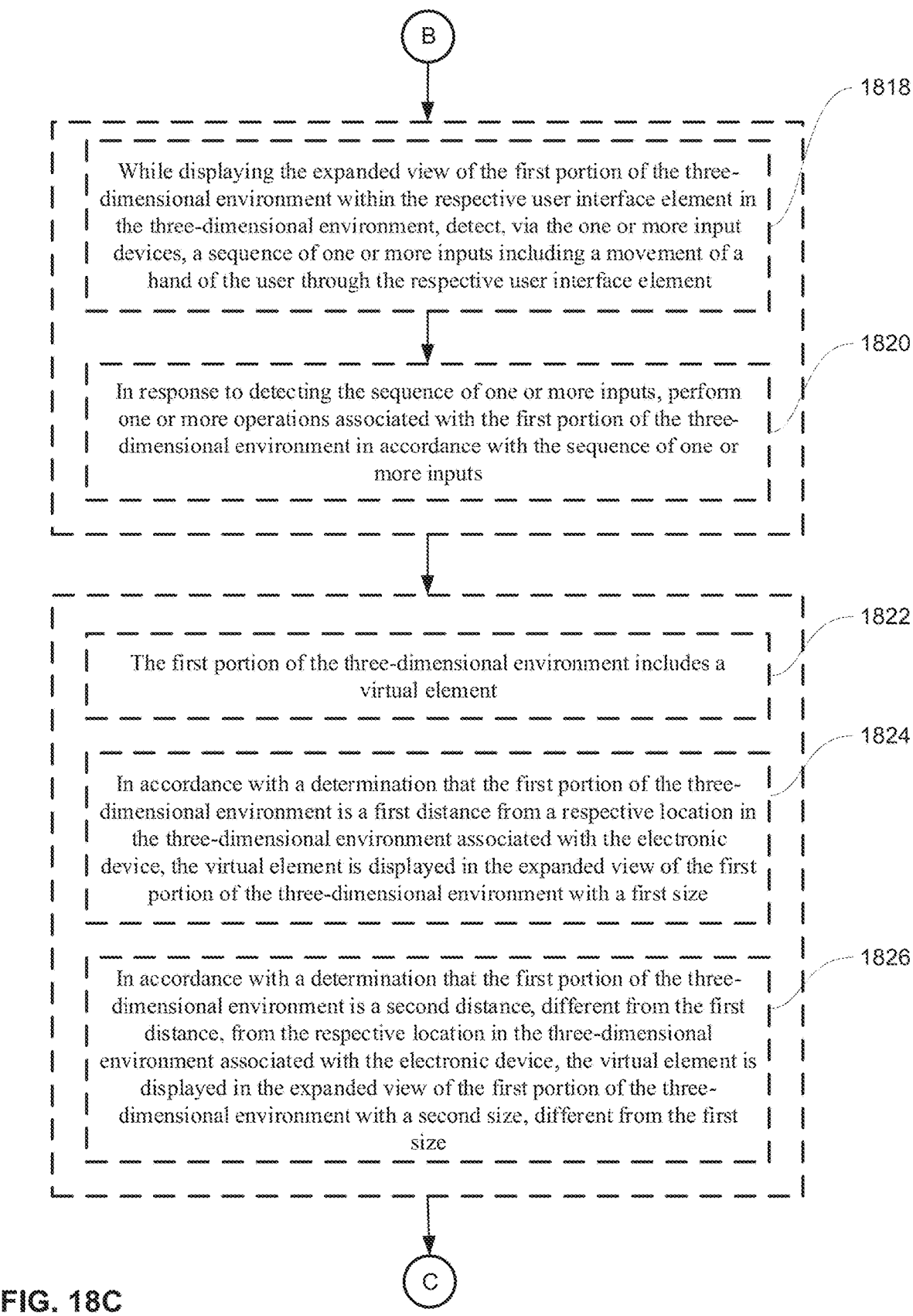
Figure 18D:
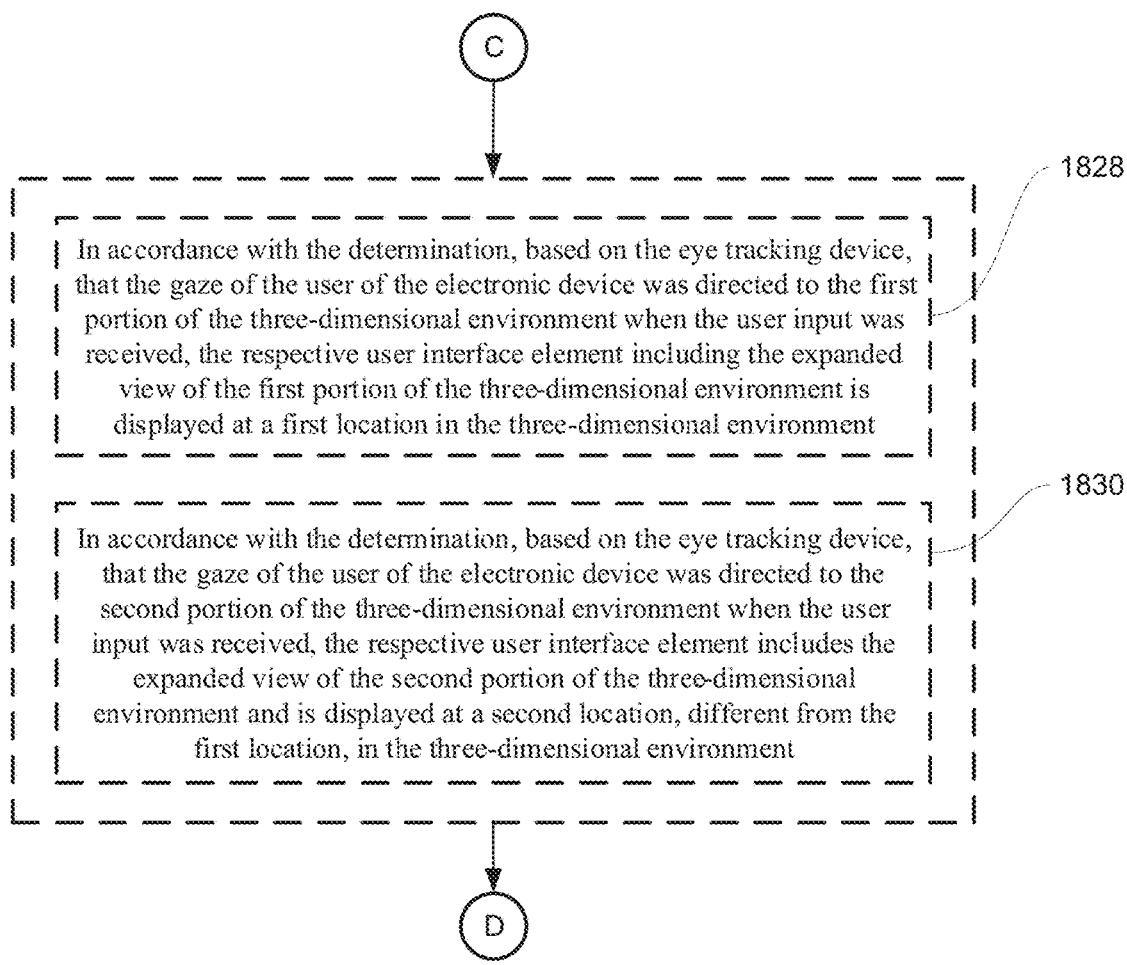
Figure 18E:
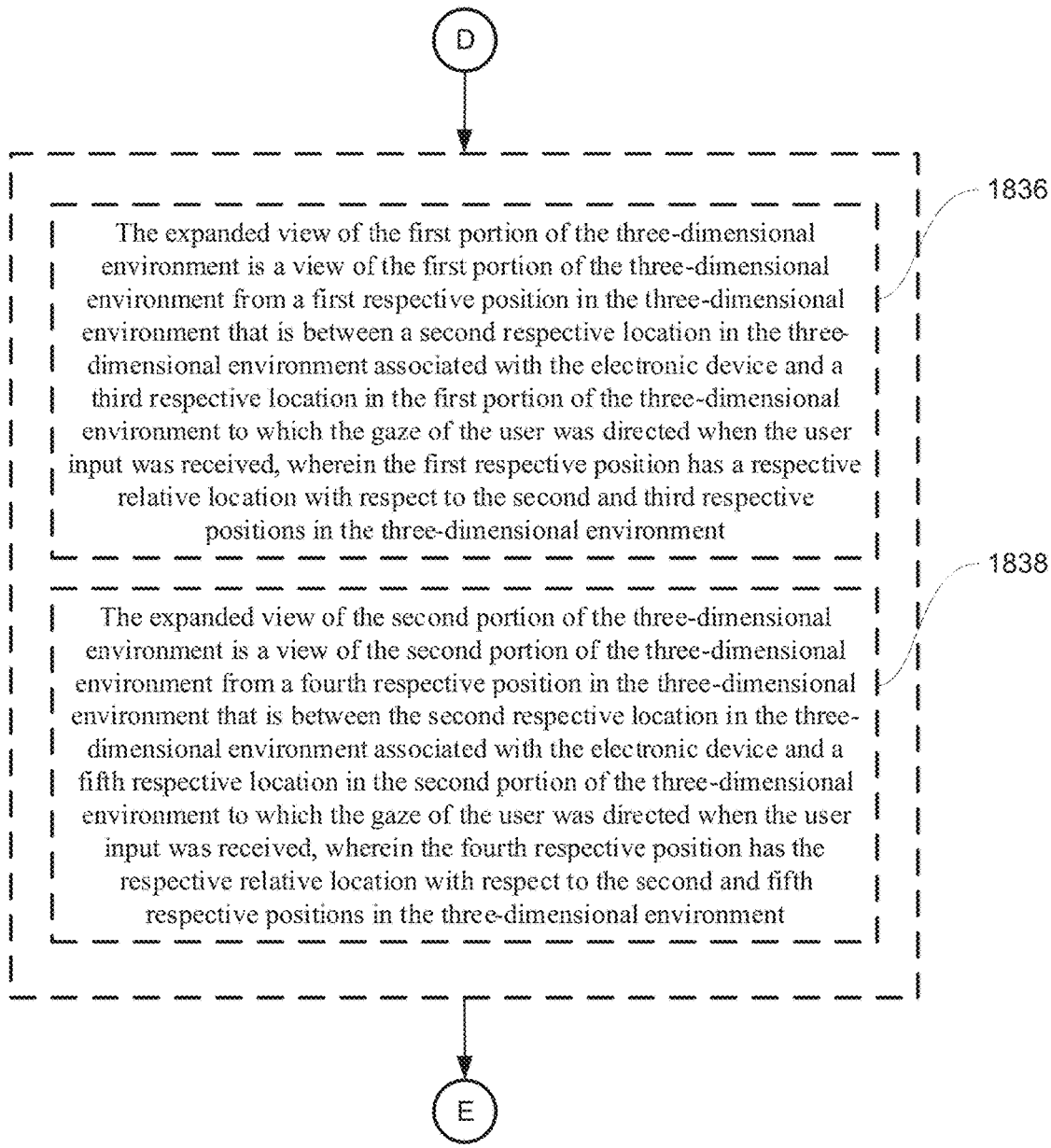
Figure 18F:
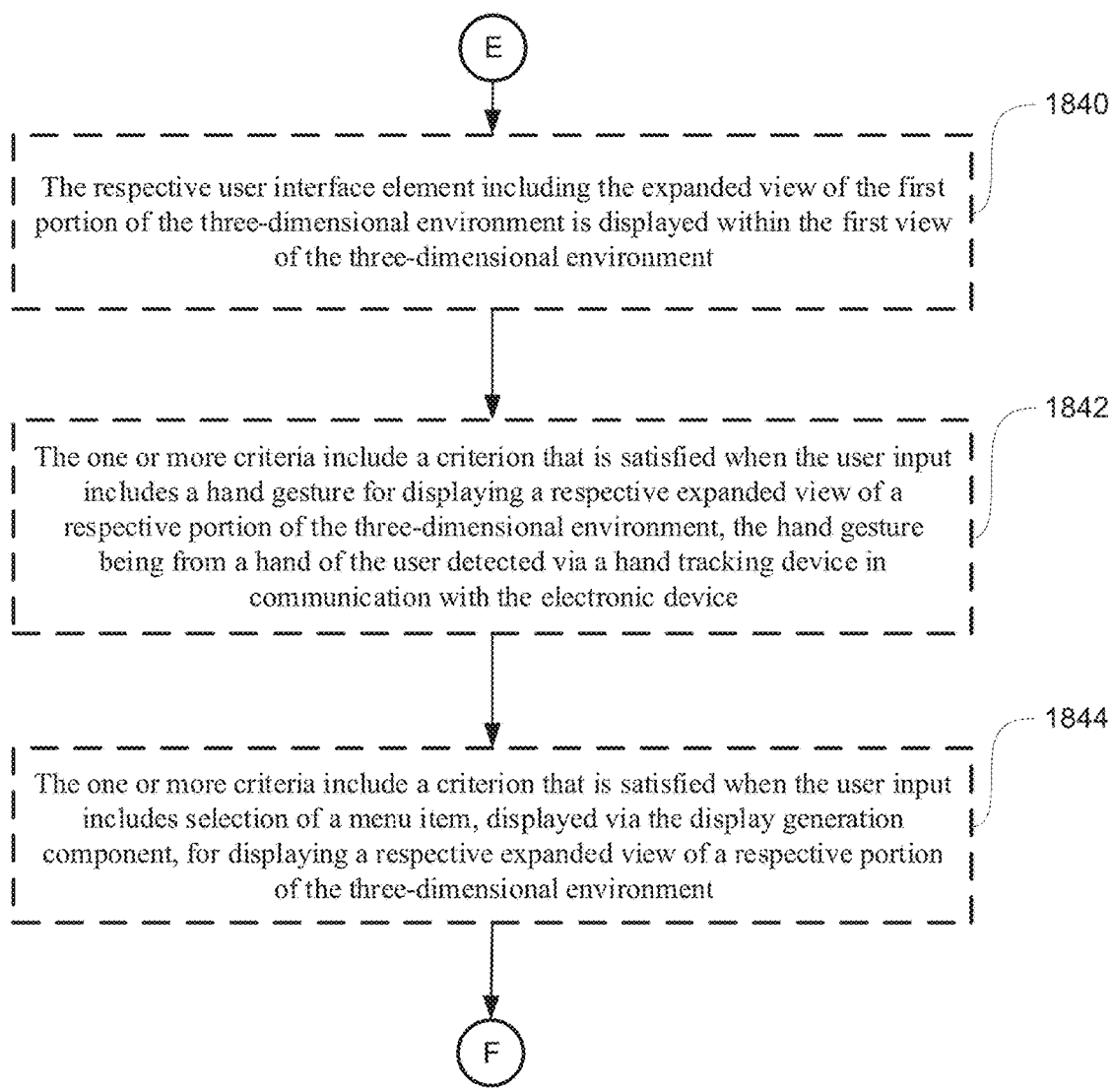
Figure 18G:
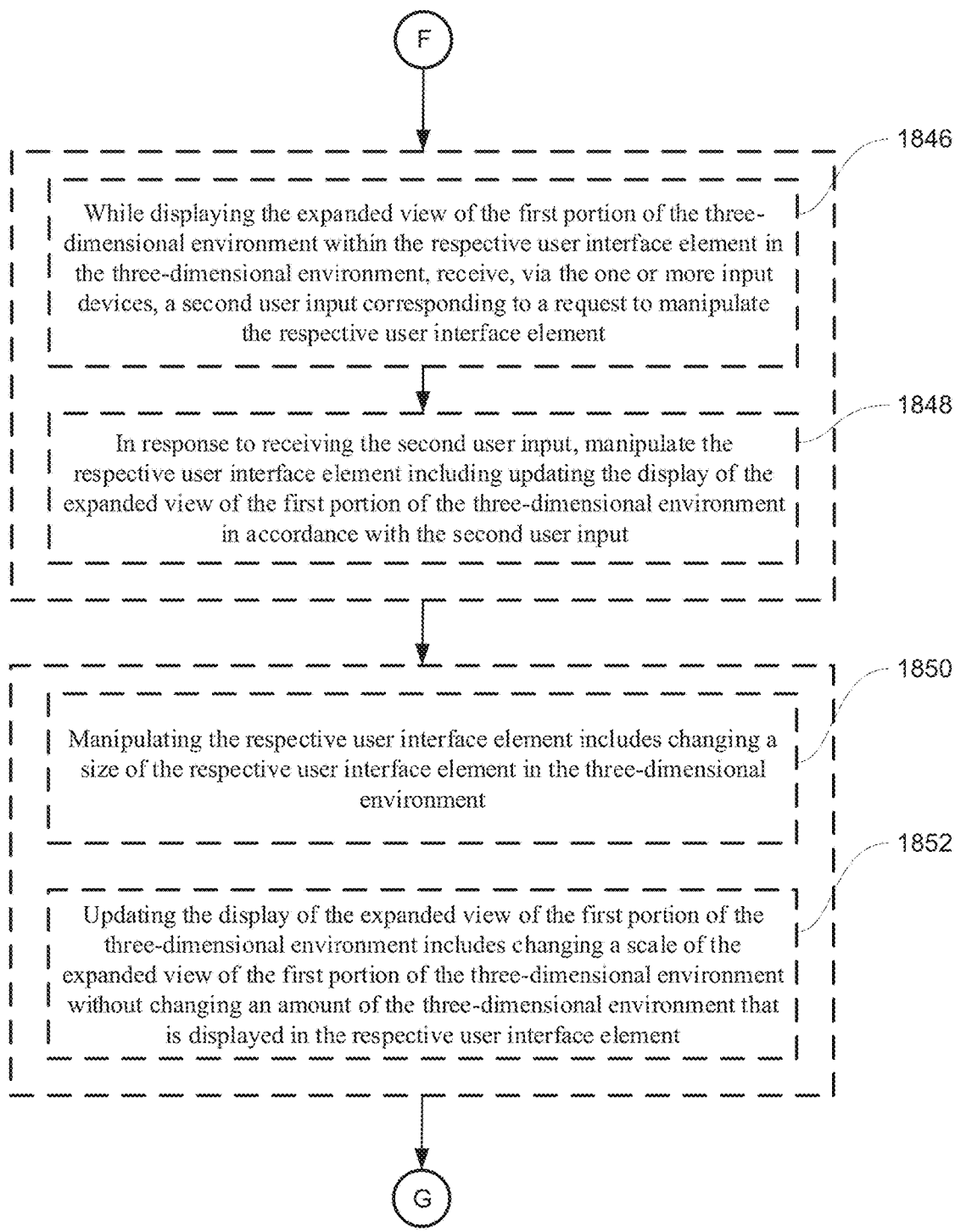
Figure 18H:
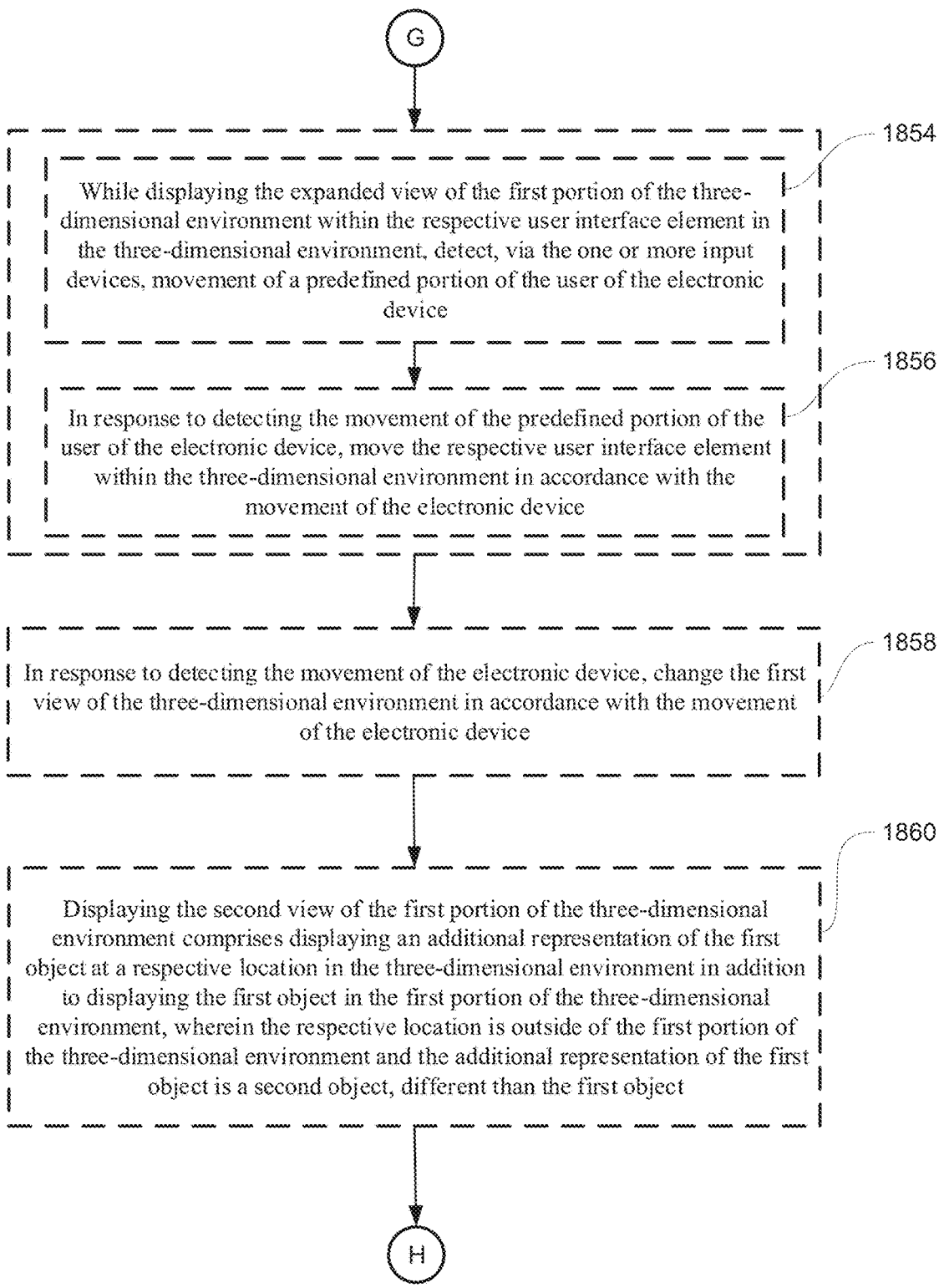
Figure 18I:
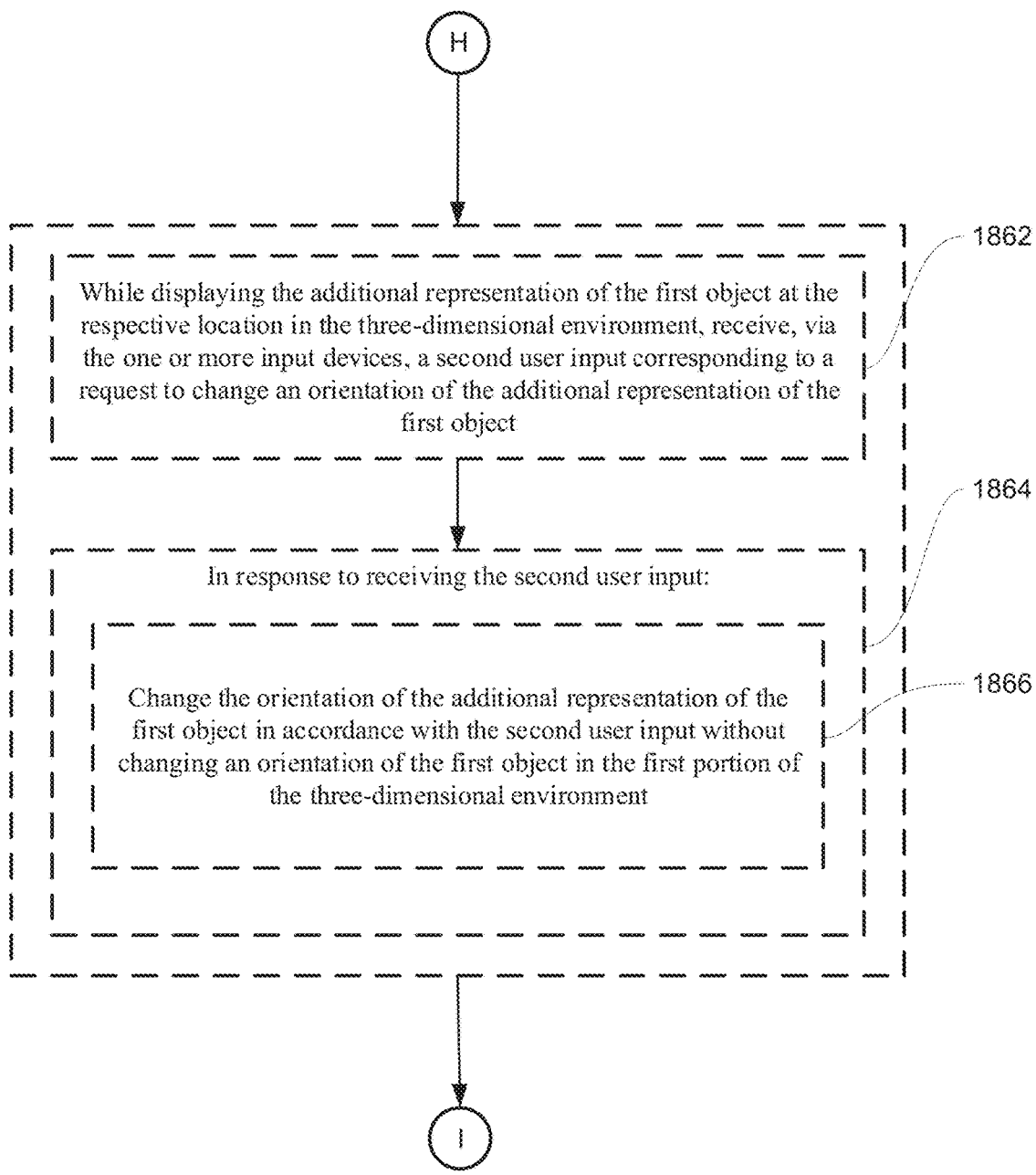
Figure 18J:
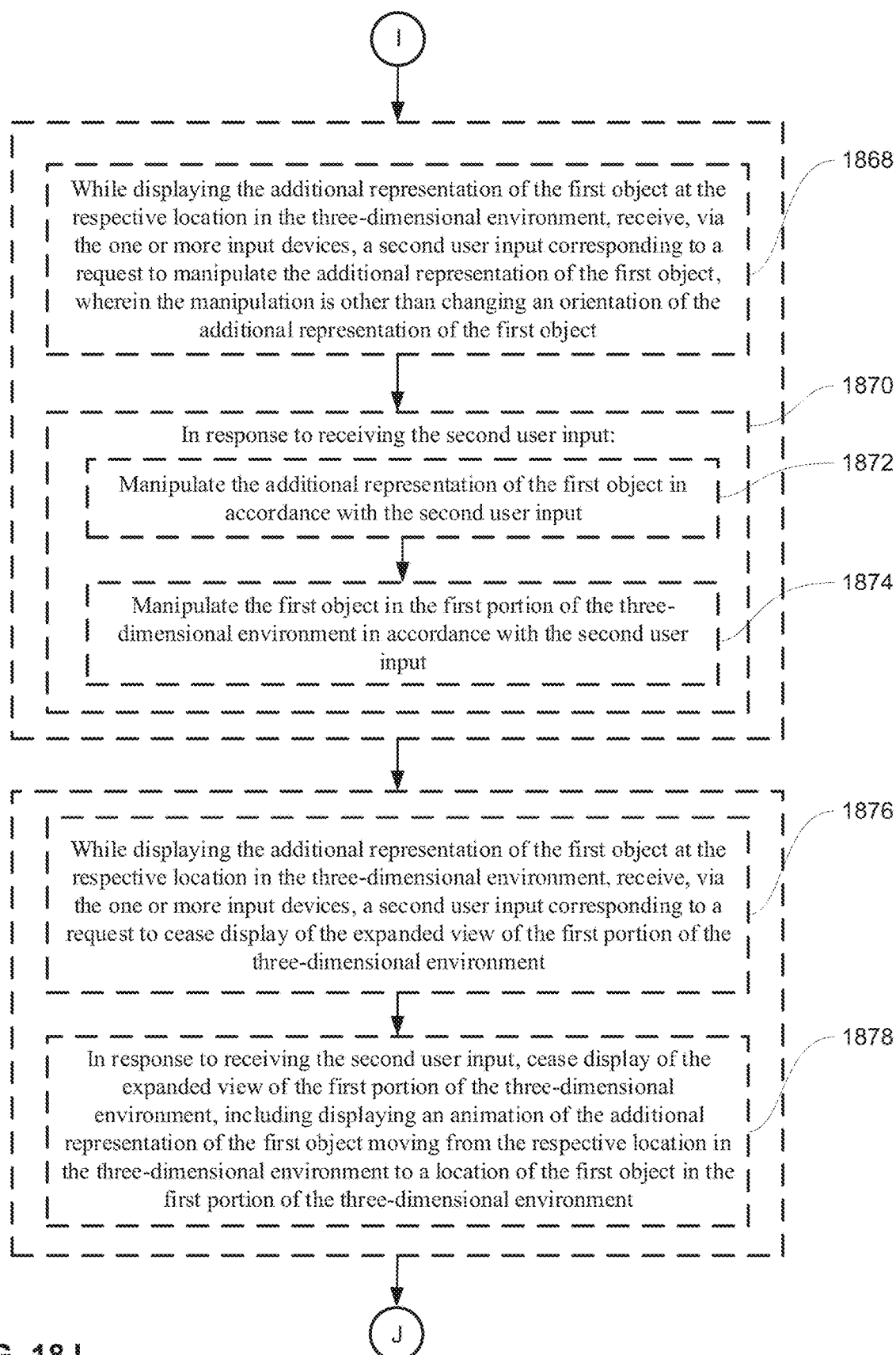
Figure 18K:
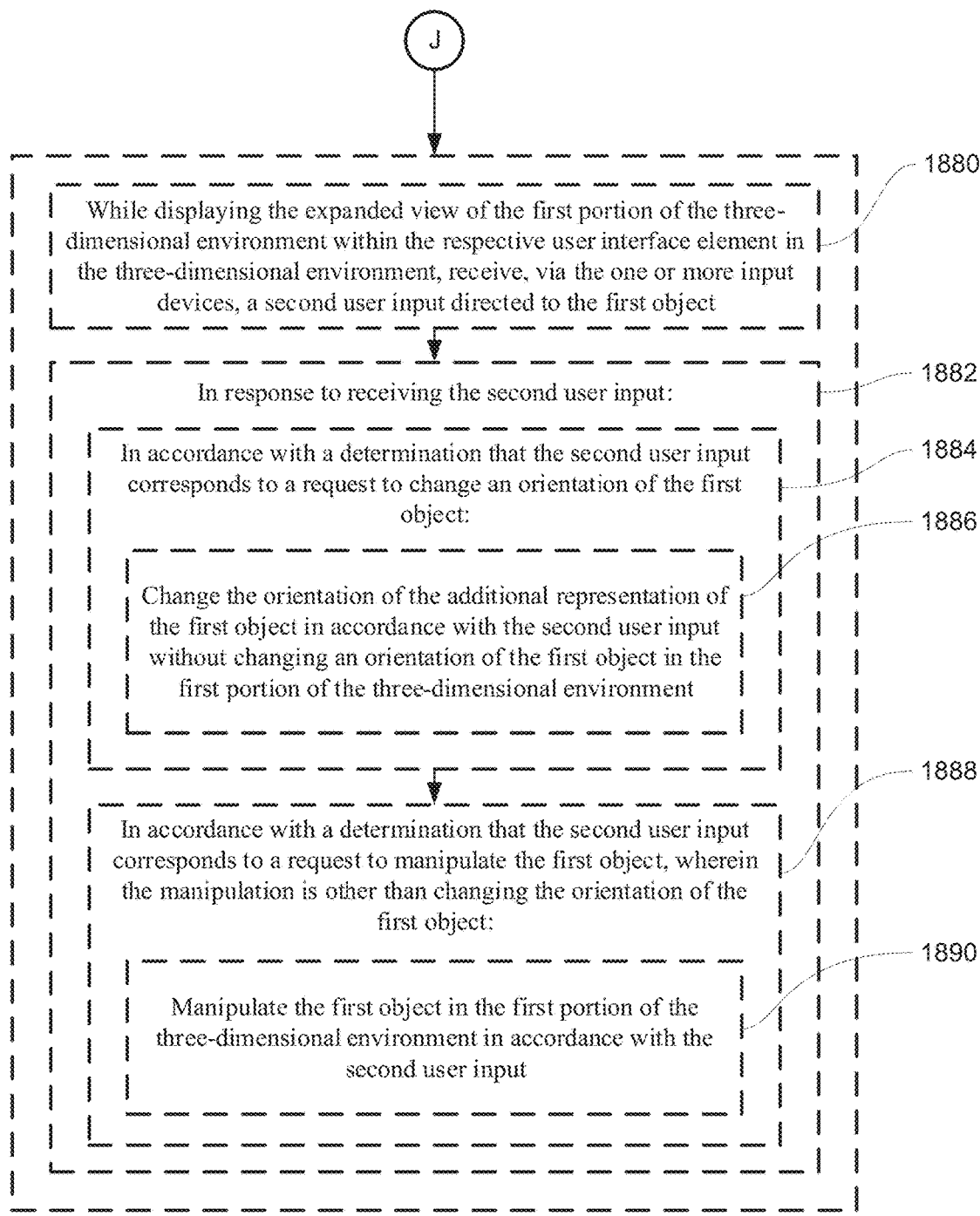

FIG. 17E illustrates another embodiment of displaying a representation of a distant object. In FIG. 17E, in response to a user selecting a selectable option or performing a predetermined gesture (e.g., with hand 1712, optionally while the gaze of the user is directed to cylinder 1608), device 101 displays a temporary instance 1724 that includes temporary representation 1726 of cylinder 1708. In some embodiments, temporary instance 1724 is not a magnified view of the respective portion of three-dimensional environment 1704, but instead, a container for a temporary duplicate of a virtual object that has been selected for manipulation. For example, representation 1726 is a temporary duplicate of cylinder 1708 that a user is able to directly manipulate to cause similar manipulations to cylinder 1708. In some embodiments, representation 1726 is a virtual object separate from cylinder 1708 that is able to be manipulated separately from cylinder 1708. By contrast, representation 1716 described above with respect to FIGS. 17A-17D is optionally not a distinct virtual object from cylinder 1708 but is instead, another view of cylinder 1708. Thus, interacting with representation 1716 is optionally the same as interacting with cylinder 1708 (and vice versa). In FIG. 17E, however, representation 1726 is a temporary duplicate object based on cylinder 1708 and interacting with representation 1726 is optionally not the same as a direct interaction with cylinder 1708, as will be described below.

As shown in FIG. 17E, temporary instance 1724 is placed at a location near the user, such that the user is able to reach out with hand 1712 and directly manipulate representation 1716 (e.g., without having to move in three-dimensional environment 1704), even though the cylinder 1708 (e.g., the virtual object upon which representation 1716 is based) is far away. Thus, representation 1716 optionally serves as a limited proxy for representation 1716, as will be described in more detail below.

In some embodiments, representation 1726 behaves differently from representation 1716 due to being a separate virtual object from cylinder 1708. In some embodiments, some (e.g., but not necessarily all) interactions with representation 1726 are transferred to cylinder 1708. For example, when device 101 performs certain operations on representation 1726 (e.g., in response to a user input to perform the respective operations), device 101 performs the same operation on cylinder 1708. For example, in FIG. 17E, device 101 detects hand 1712 performing one or more gestures (e.g., "Gesture L") that include drawing content 1728 on the surface of representation 1726 and include a rotation operation on representation 1726 (e.g., similar to the operations performed above in FIG. 17B). In some embodiments, in response to the user input, content 1728 is drawn onto the surface of representation 1726 and representation 1726 is rotated in accordance with the user input. In some embodiments, the drawing operation is performed on both representation 1726 (e.g., inserting content 1728 onto the surface of representation 1726) and cylinder 1708 (e.g., inserting content 1720 onto the surface of cylinder 1708), as shown in FIG. 17E. In some embodiments, content 1720 is identical to content 1728 and is drawn onto cylinder 1708 at the same relative location as content 1720 on representation 1726. In some embodiments, content 1720 is drawn onto the surface of cylinder 1708 concurrently with content 1728 being drawn onto the surface of representation 1726. In some embodiments, content 1720 is drawn onto the surface of cylinder 1708 after content 1728 has been drawn onto the surface of representation 1726 (e.g., one or more operations are optionally queued and transferred to representation 1726 as a set). Thus, drawing interactions on representation 1726 are optionally transferred to cylinder 1708.

In some embodiments, the rotation operation is performed on representation 1726, but not performed on cylinder 1708. For example, in FIG. 17E, cylinder 1708 is still displayed right side up (e.g., un-rotated) while representation 1726 is rotated. Thus, in some embodiments, rotation operations are not transferred from representation 1726 to cylinder 1708. In some embodiments, operations that change the perspective, view, and/or orientation of representation 1726 do not transfer to cylinder 1708. As such, a user is able to change the orientation of representation 1726 to view portions of representation 1726 that are previously hidden, without causing the change in orientation to cylinder 1708. In some embodiments, operations that substantively change the characteristics of representation 1726 (e.g., size, shape, content, color, etc.) are transferred from representation 1726 to cylinder 1708. In this way, an environment and/or object designer (e.g., a user in the three-dimensional environment) can set the desired position and orientation of objects in a three-dimensional environment and then perform edits to any portion of the objects without changing the position and/or orientation of the objects. Thus, a user is able to rotate representation 1726 and draw on portions of representation 1726 that were previously hidden and, by proxy, draw on hidden portions of cylinder 1708, even though those portions of cylinder 1708 are not currently visible to the user.

In some embodiments, a user is able to dismiss temporary instance 1724 (e.g., including temporary representation 1726) by performing a predefined gesture (e.g., with their hand), selecting a selectable option, or selecting an exit affordance displayed at or near temporary instance 1724. In some embodiments, in response to dismissing temporary instance 1724, device 101 displays an animation of temporary representation 1726 moving back towards cylinder 1708 and optionally merging into cylinder 1708.

FIGS. 18A-18K is a flowchart illustrating a method 1800 of manipulating a distant object in accordance with some embodiments. In some embodiments, the method 1800 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1800 are, optionally, combined and/or the order of some operations is, optionally, changed.

In the method 1800, in some embodiments, an electronic device (e.g., computer system 101 in FIG. 1) in communication with a display generation component, an eye tracking device, and one or more input devices (e.g., a mobile device (e.g., a tablet, a smartphone, a media player, or a wearable device), or a computer) displays (1802), via the display generation component, a first view of a three-dimensional environment (e.g., a computer-generated reality (CGR) environment such as a virtual reality (VR) environment, a mixed reality (MR) environment, or an augmented reality (AR) environment, etc.), wherein the three-dimensional environment includes a first portion of the three-dimensional environment and a second portion of the three-dimensional environment, and the first portion of the three-dimensional environment includes a first object, such as device 101 displaying a first view of three-dimensional environment 1704 in FIG. 17A (e.g., displaying a computer-generated environment that includes one or more objects in the computer-generated environment).

In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the eye tracking device is a camera and/or a motion sensor capable of determining the direction and/or location of the user's gaze. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor and/or a motion sensor (e.g., a hand tracking sensor, a hand motion sensor), etc.

In some embodiments, the computer-generated environment is an augmented reality or mixed reality environment that includes a representation of a real-world environment (optionally the environment around the device). In some embodiments, the first object is a physical object that is active displayed by the device (e.g., captured by one or more cameras of the device and displayed in the three-dimensional environment as a photo-realistic representation of the object) or passively displayed by the device (e.g., viewable by the user via a transparent or translucent display). In some embodiments, the first object is a virtual object displayed in the three-dimensional environment.

In some embodiments, while displaying the first view of the three-dimensional environment, the electronic device receives (1804), via the one or more input devices, a user input that satisfies one or more criteria, such as detecting hand 1712 performing Gesture K in FIG. 17A (e.g., a user input corresponding to a request to display an expanded view of a portion of the environment). In some embodiments, the user input is a predetermined gesture (e.g., a predetermined hand gesture detected by one or more hand tracking sensors in communication with the electronic device). In some embodiments, the user input is a selection of a selectable option (e.g., the selection of an affordance displayed in the three-dimensional environment, the actuation of a physical button, etc.).

In some embodiments, in response to receiving the user input that satisfies the one or more criteria (1806), in accordance with a determination, based on the eye tracking device, that a gaze of a user of the electronic device was directed to the first portion of the three-dimensional environment when the user input was received, the electronic device displays (1808), via the display generation component, a second view of the first portion of the three-dimensional environment, wherein the second view of the first portion of the three-dimensional environment is an expanded view of the first portion of the three-dimensional environment including the first object, such as device 101 displaying magnified view 1714 of the portion of three-dimensional environment 1704 that includes cylinder 1708 in FIG. 17A (e.g., if the user is looking at the first portion of the three-dimensional environment (e.g., determined via the eye tracking device), displaying an expanded view of the first portion of the three-dimensional environment).

In some embodiments, the expanded view is displayed at a location in the three-dimensional environment so as not to obstruct the view of the first portion to the three-dimensional environment (optionally obstructing a portion of a second portion of the three-dimensional environment). In some embodiments, the second view of the first portion of the three-dimensional environment is a zoomed in view of the first portion of the three-dimensional environment (e.g., a zoomed in view of the first portion from the same camera position as the first view, or a view from a camera position closer to the first portion of the three-dimensional environment than the camera position of the first view).

In some embodiments, in accordance with a determination, based on the eye tracking device, that the gaze of the user was directed to the second portion of the three-dimensional environment when the user input was received, the electronic device displays (1810), via the display generation component, a second view of the second portion of the three-dimensional environment, wherein the second view of the second portion of the three-dimensional environment is an expanded view of the second portion of the three-dimensional environment, such as if gaze 1710 were directed at a different portion of three-dimensional environment 1704 when the input was received in FIG. 17A (e.g., if the user is looking at a portion of the three-dimensional environment other than the first portion, then do not display an expanded view of the first portion of the three-dimensional environment).

In some embodiments, if the user is looking at a second portion of the three-dimensional environment when the user input is received, then display an expanded view of the second portion of the three-dimensional environment. In some embodiments, if the expanded view of the first portion of the environment is displayed when the user input is received for displaying an expanded view of the second portion of the environment, then the expanded view of the first portion of the environment ceases to be displayed (or optionally updated to display an expanded view of the second portion instead of the first portion). In some embodiments, multiple expanded views are displayed concurrently (e.g., in response to multiple user inputs to display expanded views of different portions of the three-dimensional environment).

The above-described manner of displaying an expanded view of a portion of an environment (e.g., displaying an expanded view of the portion of the environment that the user was looking at) provides a quick and efficient manner of displaying an enlarged and/or closer view of a respective portion of the environment, which simplifies the interaction between the user and the electronic device and enhances the operability of the electronic device and makes the user-device interface more efficient (e.g., without requiring the user to move the camera position within the three-dimensional environment to a position closer to the respective portion of the three-dimensional environment), which additionally reduces power usage and improves battery life of the electronic device by enabling the user to use the electronic device more quickly and efficiently, while reducing errors in usage.

In some embodiments, displaying the second view of the first portion of the three-dimensional environment comprises displaying the expanded view of the first portion of the three-dimensional environment including the first object within a respective user interface element displayed in the three-dimensional environment without displaying an additional representation of the first object in the three-dimensional environment (1812), such as if magnified view 1714 displayed a magnified view of the different portion of three-dimensional environment 1704 in FIG. 17A (e.g., the expanded view is displayed within a user interface element in the three-dimensional environment).

In some embodiments, the expanded view is a different view of the first portion of the three-dimensional environment and not a duplicate of objects in the first portion of the three-dimensional environment. For example, if a user manipulates or otherwise interacts with objects in the expanded view, the user is manipulating and/or interacting with the objects in the first portion of the three-dimensional environment, rather than interacting with copies of the objects (e.g., rather than interacting with distinct objects that are not the actual objects at the first portion of the three-dimensional environment).). For example, the expanded view is a "portal" into the first portion of the three-dimensional environment (e.g., a "spatial loupe"). Thus, the expanded view allows the user to view and directly interact with faraway objects as if they were close to the user (e.g., by displaying the expanded view close to the user).

The above-described manner of displaying an expanded view of a portion of an environment (e.g., displaying a different, yet expanded, view of a portion of the environment, instead of a duplicate of the respective portion of the environment) provides a quick and efficient manner of displaying an enlarged and/or closer view of a respective portion of the environment (e.g., without requiring the user to move closer to the respective portion of the environment or create duplicate copy of faraway items), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while displaying the expanded view of the first portion of the three-dimensional environment within the respective user interface element in the three-dimensional environment, the electronic device receives (1814), via the one or more input devices, a second user input corresponding to a request to move a second object into the respective user interface element, such as if hand 1712 picked up an object in three-dimensional environment 1704 and moved it into magnified view 1714 in FIG. 17A (e.g., receiving a user input that moves a virtual object from a position outside of the respective user interface element to a position inside and/or through the respective user interface element (e.g., placing an item inside the "portal")).

In some embodiments, in response to receiving the second user input, the electronic device moves (1816) the second object to the first portion of the three-dimensional environment in accordance with the second user input, such as if the object is moved to the portion of three-dimensional environment 1704 displayed in magnified view 1714 in FIG. 17A (e.g., in response to the user moving the virtual object into and/or through the respective user interface element, moving the second object to the location in the three-dimensional environment for which the respective user interface element is an expanded view).

For example, if the respective user interface element includes an expanded view of the first portion of the three-dimensional environment (e.g., is a "portal" of or into the first portion of the three-dimensional environment), then placing a virtual object into the respective user interface element causes the virtual object to be moved to the first portion of the user interface element. In some embodiments, because the second object has been moved to the first portion of the user interface element and the respective user interface element displays an expanded view of the first portion of the user interface element, in some embodiments, the display generation component includes two views of the second object (e.g., one view of the second object inside the portal and one view of the second object outside of the portal).

The above-described manner of moving virtual objects in a three-dimensional environment (e.g., by moving an item into the expanded view of the first portion of the three-dimensional environment and in response, moving the item to the first portion of the three-dimensional environment) provides a quick and efficient manner of moving virtual objects to a distant location in the three-dimensional environment (e.g., by allowing the user to move the object into the expanded view without requiring the user to directly move the object to the first portion of three-dimensional environment), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while displaying the expanded view of the first portion of the three-dimensional environment within the respective user interface element in the three-dimensional environment, the electronic device detects (1818), via the one or more input devices, a sequence of one or more inputs including a movement of a hand of the user through the respective user interface element, such as hand 1712 reaching into magnified view 1714 and interacting with objects displayed in magnified view 114 (e.g., a user is able to reach into the respective user interface element to directly interact with objects in the first portion of the three-dimensional environment).

In some embodiments, in response to detecting the sequence of one or more inputs, the electronic device performs (1820) one or more operations associated with the first portion of the three-dimensional environment in accordance with the sequence of one or more inputs, such as performing the rotation and drawing operations on cylinder 1716 in FIG. 17B (e.g., if the user input includes a manipulation input to manipulate an object in the first portion of the three-dimensional environment, then performing the manipulation operation on the object).

In some embodiments, the manipulation of the object is reflected in the expanded view of the first portion of the three-dimensional environment. In some embodiments, the manipulation operation is any of a resizing, rotation, movement, drawing, editing, modifying, etc. Thus, a user is able to interact with a faraway object via the portal. For example, if the portal is displayed 1 foot away from the user, then a user is able to reach forward by 1 foot to interact with objects that are more than 1 feet away as if they were only 1 feet away (e.g., if the portal is of a portion of the environment that is 3 feet, 5 feet, 10 feet away, etc.).

The above-described manner of interacting with objects in a three-dimensional environment (e.g., by allowing a user to directly interact with objects displayed in the expanded view of the first portion of the environment) provides a quick and efficient manner of interacting with distant objects in the three-dimensional environment (e.g., via the expanded view, without requiring the user to move closer to the first portion of the three-dimensional environment to have a closer view of the first portion of the environment when interacting with it), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the first portion of the three-dimensional environment includes a virtual element (1822), such as three-dimensional environment including cylinder 1708 in FIG. 17A (e.g., a virtual object such like a drawing, a shape, table, chair, etc.). In some embodiments, the virtual element is a virtual drawing performed, by the user, on a representation of a real object and/or on a virtual object.

In some embodiments, in accordance with a determination that the first portion of the three-dimensional environment is a first distance from a respective location in the three-dimensional environment associated with the electronic device, the virtual element is displayed in the expanded view of the first portion of the three-dimensional environment with a first size (1824), such as cylinder 1716 in magnified view 1714 having a first size in FIG. 17A (e.g., the size of the virtual element in the expanded view has a first amount of magnification as compared to the size of the virtual element in the unexpanded view).

In some embodiments, in accordance with a determination that the first portion of the three-dimensional environment is a second distance, different from the first distance, from the respective location in the three-dimensional environment associated with the electronic device, the virtual element is displayed in the expanded view of the first portion of the three-dimensional environment with a second size, different from the first size (1826), such as if cylinder 1708 were a different distance in FIG. 17A, cylinder 1716 in magnified view 1714 would be displayed with a different size (e.g., the size of the virtual element in the expanded view has a second amount of magnification such that the virtual element is a different size than if the first portion of the three-dimensional environment were a first distance from the user).

In some embodiments, the magnification factor of the expanded view depends on the distance of the first portion of the environment from the position of the user. For example, if the first portion of the environment is close to the user, then the magnification factor is small (e.g., the size of the objects in the expanded view is slightly larger than the size of the objects in the unexpanded view), but if the first portion of the environment is far from the user, then the magnification factor is large (e.g., the size of the objects in the expanded view is much larger than the size of the objects in the unexpanded view). In some embodiments, the expanded view of the first portion of the three-dimensional environment is a view of the first portion of the three-dimensional environment as if the user (e.g., the "camera") were at a position in the three-dimensional environment closer to the first portion of the three-dimensional environment. Thus, the objects in the expanded view optionally appear larger. In some embodiments, the position of the expanded view "camera" depends on how far away the first portion of the three-dimensional environment is from the user and optionally scales based on the distance. For example, the position of the expanded view "camera" is optionally 50%, 75%, or 90% closer to the first portion of the three-dimensional environment.

The above-described manner of displaying a portion of an environment (e.g., displaying an expanded view of the first portion of the environment in which the objects in the first portion of the environment are displayed with a larger size than in the regular unexpanded view of the environment) provides a quick and efficient manner of displaying an enlarged and/or closer view of a respective portion of the environment (e.g., without requiring the user to perform additional inputs to move closer to the respective portion of the environment), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, in accordance with the determination, based on the eye tracking device, that the gaze of the user of the electronic device was directed to the first portion of the three-dimensional environment when the user input was received, the respective user interface element including the expanded view of the first portion of the three-dimensional environment is displayed at a first location in the three-dimensional environment (1828), such as gaze 1710 being directed to cylinder 1708 and magnified view 1714 is displayed at a first location in FIG. 17A (e.g., determining that the user was looking at the first portion of the three-dimensional environment when the user input corresponding to the request to display the expanded view was received).

In some embodiments, because the user was looking at the first portion of the three-dimensional environment, in response to the user input, an expanded view of the first portion is displayed and the expanded view is displayed at a first location in the three-dimensional environment. In some embodiments, the "portal" is displayed at a location such that the first portion of the three-dimensional environment is not obstructed by the portal (e.g., to the left or to the right of the first portion of the three-dimensional environment). In some embodiments, the expanded view is displayed closer to the user than the first portion of the three-dimensional environment.

In some embodiments, in accordance with the determination, based on the eye tracking device, that the gaze of the user of the electronic device was directed to the second portion of the three-dimensional environment when the user input was received, the respective user interface element includes the expanded view of the second portion of the three-dimensional environment and is displayed at a second location, different from the first location, in the three-dimensional environment (1830), such as if gaze 1710 was directed to a different portion of three-dimensional environment 1704 in FIG. 17A, magnified view 1714 optionally would be displayed at a different location (e.g., determining that the user was looking at the second portion of the three-dimensional environment when the user input corresponding to the request to display the expanded view was received).

In some embodiments, because the user was looking at the second portion of the three-dimensional environment, in response to the user input, an expanded view of the second portion is displayed. Thus, the device optionally displays an expanded view of the portion of the three-dimensional environment that the user was looking at when the user input was received. In some embodiments, the expanded view is displayed at a second location in the three-dimensional environment. In some embodiments, the "portal" is displayed at a location such that the second portion of the three-dimensional environment is not obstructed by the portal (e.g., to the left or to the right of the second portion of the three-dimensional environment). In some embodiments, the expanded view is displayed closer to the user than the second portion of the three-dimensional environment.

The above-described manner of displaying an expanded view of a portion of an environment (e.g., displaying an expanded view of the portion of the environment that the user was looking at when the user input was received at a location in the environment based on the location of the first portion of the environment) provides a quick and efficient manner of displaying an enlarged and/or closer view of a respective portion of the environment (e.g., without requiring additional inputs to select the portion of the environment for which to display the expanded view and move the expanded view to a particular location in the environment), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the expanded view of the first portion of the three-dimensional environment is a view of the first portion of the three-dimensional environment from a first respective position in the three-dimensional environment that is between a second respective location in the three-dimensional environment associated with the electronic device and a third respective location in the first portion of the three-dimensional environment to which the gaze of the user was directed when the user input was received, wherein the first respective position has a respective relative location with respect to the second and third respective positions in the three-dimensional environment (1836), such as magnified view 1714 being a magnified view of the same perspective as the view of three-dimensional environment 1704 in FIG. 17A (e.g., the expanded view is a view of the first portion of the three-dimensional environment from the perspective of a viewer that is located between the actual location of the user/device and the first location).

Thus, objects in the expanded view are optionally displayed larger because the "camera" for the expanded view is at a closer location than the "camera" for the overall display of the three-dimensional environment. In some embodiments, the location of the "camera" for the expanded view is 50%, 75%, 80%, 90% closer to the first portion of the three-dimensional environment.

In some embodiments, the expanded view of the second portion of the three-dimensional environment is a view of the second portion of the three-dimensional environment from a fourth respective position in the three-dimensional environment that is between the second respective location in the three-dimensional environment associated with the electronic device and a fifth respective location in the second portion of the three-dimensional environment to which the gaze of the user was directed when the user input was received, wherein the fourth respective position has the respective relative location with respect to the second and fifth respective positions in the three-dimensional environment (1838), such as if magnified view 1714 were a view of a different portion of three-dimensional environment 1704 in FIG. 17A, then magnified view 1714 would have the same perspective as the view of three-dimensional environment 1704 (e.g., the expanded view is a view of the second portion of the three-dimensional environment from the perspective of a viewer that is located between the actual location of the user/device and the second location).

Thus, objects in the expanded view are optionally displayed larger because the "camera" for the expanded view is at a closer location than the "camera" for the overall display of the three-dimensional environment. In some embodiments, the location of the "camera" for the expanded view is 50%, 75%, 80%, 90% closer to the second portion of the three-dimensional environment.

The above-described manner of displaying an expanded view of a portion of an environment (e.g., by displaying an expanded view of the portion of the environment as if the user were looking at the portion of the environment from a location in the environment closer to the portion of the environment) provides a quick and efficient manner of displaying an enlarged and/or closer view of a respective portion of the environment (e.g., by displaying a closer view of the respective portion of the environment without requiring the user to move closer to the respective portion of the environment), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the respective user interface element including the expanded view of the first portion of the three-dimensional environment is displayed within the first view of the three-dimensional environment (1840), such as magnified view 1714 being displayed within the view of three-dimensional environment 1704 in FIG. 17A (e.g., the expanded view is displayed inside of the first view of the three-dimensional environment such that portions of the first view are still displayed/visible around the edges of the respective user interface element). In some embodiments, the expanded view is displayed overlaid on portions of the three-dimensional environment (e.g., thus obscuring portions of the three-dimensional environment).

The above-described manner of displaying an expanded view of a portion of a three-dimensional environment (e.g., by displaying the expanded view at a location within the three-dimensional environment) provides a quick and efficient manner of displaying an enlarged and/or closer view of a respective portion of the environment (e.g., by displaying both the regular view of the environment and the expanded view concurrently, without requiring the user to choose to either view the regular view or expanded view of the three-dimensional environment), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the one or more criteria include a criterion that is satisfied when the user input includes a hand gesture for displaying a respective expanded view of a respective portion of the three-dimensional environment, the hand gesture being from a hand of the user detected via a hand tracking device in communication with the electronic device (1842), such as detecting hand 1712 performing Gesture I in FIG. 17A (e.g., the user input corresponding to the request to display the expanded view includes a predetermined gesture by a hand of the user of the device).

In some embodiments, the gesture includes a selection of a selectable element or a predetermined movement or position of the hand. In some embodiments, the position and/or movement of the hand is determined via one or more hand tracking devices that are in communication with the electronic device (e.g., a visible light camera, a motion sensor, a wearable device worn on the hand, etc.).

The above-described manner of displaying an expanded view of a portion of an environment (e.g., in response to detecting a predetermined gesture by the hand of the user) provides a quick and efficient manner of displaying an enlarged and/or closer view of a respective portion of the environment (e.g., without requiring the user to perform additional user inputs to navigate through multiple user interfaces or menus to cause display of the expanded view), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the one or more criteria include a criterion that is satisfied when the user input includes selection of a menu item, displayed via the display generation component, for displaying a respective expanded view of a respective portion of the three-dimensional environment (1844), such as if hand 1712 performed a gesture selecting an option from a contextual menu in FIG. 17A (e.g., the user input corresponding to the request to display the expanded view includes a selection of a selectable option for displaying an expanded or closer view of a portion of the three-dimensional environment).

For example, a user is able to perform an input to cause a menu to be displayed (e.g., a pinch gesture while looking at the first portion of the user interface), which includes options for interacting with the three-dimensional environment, such as an option to display an enlarged/expanded view of a respective portion of the environment.

The above-described manner of displaying an expanded view of a portion of an environment (e.g., in response to detecting a selection of an option from a menu) provides a quick and efficient manner of displaying an enlarged and/or closer view of a respective portion of the environment, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while displaying the expanded view of the first portion of the three-dimensional environment within the respective user interface element in the three-dimensional environment, the electronic device receives (1846), via the one or more input devices, a second user input corresponding to a request to manipulate the respective user interface element, such as an input for resizing magnified view 1714 such as in FIG. 17C (e.g., a user input to resize, move, etc. the respective user interface element).

For example, a user is able to enlarge or shrink the "portal" or move the "portal" to another location in the three-dimensional environment such that it is not obscuring portions of the three-dimensional environment. For example, the user is able to enlarge the portal by performing a pinch gesture by two hands (optionally while looking at the portal) and moving the hands to increase the distance between the two hands. In some embodiments, a manipulation indication is displayed, such as described above with respect to method 1000.

In some embodiments, in response to receiving the second user input, the electronic device manipulates (1848) the respective user interface element including updating the display of the expanded view of the first portion of the three-dimensional environment in accordance with the second user input, such as increasing the size of magnified view 1714 and increasing the size of the objects displayed in magnified view 1714 in FIG. 17C (e.g., updating the expanded view that is displayed in the respective user interface element in accordance with the type of manipulation).

For example, if the manipulation is a resizing of the respective user interface element, then the magnification factor of the expanded view increases or decreases accordingly. In some embodiments, if the respective user interface element is enlarged, the magnification factor increases (e.g., the objects in the expanded view become larger), and if the respective user interface element is shrunk, the magnification factor decreases (e.g., the objects in the expanded view become smaller). In some embodiments, the area of the three-dimensional environment that is viewable in the expanded view does not change when the respective user interface element changes size. For example, if the respective user interface element is increased or decreased, the expanded view continues to display the same amount of the first portion of the three-dimensional environment (e.g., does not zoom in or zoom out, optionally only increasing or decreasing the size of the objects already being displayed). In some embodiments, if the manipulation input is to move the respective user interface element, the expanded view optionally does not change in size or perspective. In some embodiments, if the manipulation input is to move the respective user interface element, the expanded view shifts its perspective based on the movement of the respective user interface element. For example, if the respective user interface element is moved to the left, then the "camera" for the expanded view also moves leftwards such that the expanded view shows a view of the first portion of the three-dimensional environment from the left of where the "camera" of the expanded view was previously positioned. In some embodiments, in response to the user moving and/or resizing the portal, the objects displayed in the portal (e.g., the objects at the first portion of the three-dimensional environment) are optionally not manipulated or affected.

The above-described manner of manipulating an expanded view of a portion of a three-dimensional environment (e.g., by performing manipulation operations on the expanded view itself to move it to a different location or increase or decrease the size of the expanded view) provides a quick and efficient manner of manipulating the expanded view of the portion of the environment (e.g., by allowing the user to move or resize the expanded view, without requiring the user to perform additional inputs to dismiss the expanded view and re-display the expanded view at a different location or with a different magnification), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, manipulating the respective user interface element includes changing a size of the respective user interface element in the three-dimensional environment (1850), such as the resizing of magnified view 1714 in FIG. 17C (e.g., changing the size of the respective user interface element includes expanding or reducing the size of the "portal" while maintaining the "portal" at the same location in the three-dimensional space). In some embodiments, changing the size includes bringing the "portal" closer to or farther away from the user (e.g., such that the "portal" is displayed on the display area as larger or smaller than previously displayed).

In some embodiments, updating the display of the expanded view of the first portion of the three-dimensional environment includes changing a scale of the expanded view of the first portion of the three-dimensional environment without changing an amount of the three-dimensional environment that is displayed in the respective user interface element (1852), such as increasing the size of cylinder 1716 in FIG. 17C (e.g., changing the magnification factor of the expanded view based on the change in the size of the "portal").

In some embodiments, increasing the size of the portal increases the magnification and decreasing the size of the portal decreases the magnification such that the same amount of the first portion of the three-dimensional environment continues to be displayed in the portal. In some embodiments, moving the portal closer or farther away from the user causes the size of the portal to increase or decrease (e.g., encompass more or less of the display area, as a result of the portal moving closer or farther away). In some embodiments, moving the portal closer or farther away does not increase or decrease the amount of the first portion of the three-dimensional environment that is displayed. In some embodiments, a user is able to move the portal in a manner similar to described above with respect to method 1400.

The above-described manner of increasing or decreasing the magnification of the expanded view (e.g., in response to increasing or decreasing the size of the expanded view) provides a quick and efficient manner of further expanding the expanded view or reducing the expanded view of a respective portion of the environment (e.g., without requiring the user to perform additional inputs to move closer or farther away from the first portion of the environment to increase or decrease the expanded view of the first portion of the environment), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while displaying the expanded view of the first portion of the three-dimensional environment within the respective user interface element in the three-dimensional environment, the electronic device detects (1854), via the one or more input devices, movement of a predefined portion of the user of the electronic device (e.g., detecting, via one or more motion sensors, motion tracking sensors, etc. that the head of the user has moved (e.g., forward, backward, leftward, or rightward)).

In some embodiments, in response to detecting the movement of the predefined portion of the user of the electronic device, the electronic device moves (1856) the respective user interface element within the three-dimensional environment in accordance with the movement of the electronic device, such as moving the head of the user causing the movement of magnified view 1714 in FIG. 17A (e.g., moving the position of the respective user interface element in the three-dimensional environment in accordance with the movement of the head of the user).

For example, if the head of the user moves leftwards, the respective user interface element moves leftwards in the three-dimensional environment, and if the head of the user moves rightwards, the respective user interface element moves rightwards in the three-dimensional environment. In some embodiments, the "camera" of the portal is along the path from the user's head (e.g., the path along which the user's eyes see) to the first portion of the three-dimensional environment. Thus, if the user moves his or her head, path from the user's head to the first portion of the three-dimensional environment shifts (e.g., leftwards or rightwards based on the movement of the user's head), and the "camera" of the portal also shifts in accordance with the shift in the path, and therefore changing the perspective of the portal in the same way as the change in the perspective of the three-dimensional environment due to the movement of the user's head.

The above-described manner of moving the expanded view of a portion of an environment (e.g., in response to detecting the movement of the head of the user) provides a quick and efficient manner of moving the expanded view in the three-dimensional environment (e.g., without requiring the user to perform additional user inputs or select options on a menu to move the expanded view to a different location in the three-dimensional environment), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, in response to detecting the movement of the electronic device, the electronic device changes (1858) the first view of the three-dimensional environment in accordance with the movement of the electronic device, such as moving the head of the user causing the perspective of magnified view 1714 in FIG. 17D (e.g., when the head of the user moves, changing the perspective of the view of the three-dimensional environment as well as the perspective of the expanded view of a respective portion of the three-dimensional environment).

For example, if the head of the user moves leftwards, then the perspective of the view of the three-dimensional environment (e.g., the view of the three-dimensional environment outside of/surrounding the "portal") moves leftwards such that the three-dimensional environment is displayed from a position to the left of the previous position (e.g., as if the user is now looking at the environment from the left). In some embodiments, the perspective of the expanded view also shifts similarly. For example, if the head of the user moves leftwards, then the perspective of the view of the expanded view of a portion of the three-dimensional environment (e.g., the view shown in the "portal") moves leftwards such that the respective portion of the three-dimensional environment is displayed from a position to the left of the previous position (e.g., as if the user is now looking at the respective portion from the left). In some embodiments, changing the view includes displaying a parallax effect (e.g., objects closer to the user move more than objects farther away from the user).

The above-described manner of updating the perspective of the view of an environment (e.g., in response to detecting the movement of the head of the user) provides a quick and efficient manner of matching changing the perspective view of the environment (e.g., by automatically updating the perspective of the three-dimensional environment based on the change in the position of the camera, without requiring the user to perform additional user inputs to change the perspective view of the three-dimensional environment), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, displaying the second view of the first portion of the three-dimensional environment comprises displaying an additional representation of the first object at a respective location in the three-dimensional environment in addition to displaying the first object in the first portion of the three-dimensional environment, wherein the respective location is outside of the first portion of the three-dimensional environment and the additional representation of the first object is a second object, different than the first object (1860), such as temporary representation 1726 in FIG. 17E (e.g., displaying the second view of the first portion of the three-dimensional environment includes generating one or more temporary objects that are duplicates of one or more objects at the first portion of the three-dimensional environment).

In some embodiments, the temporary objects are displayed at a location different from the location of the objects upon which the temporary objects are based. For example, a temporary object (e.g., a second object, different from the first object) is placed at a location closer to the user such that the user is able to directly manipulate the temporary object (e.g., without having to change locations in the three-dimensional environment to be closer to the original object). In some embodiments, the temporary object and the original object are linked such that certain modifications to the temporary object are transferred to the original object.

The above-described manner of manipulating a faraway object (e.g., by displaying a temporary copy of the faraway object at a location closer to the user that the user is able to manipulate) provides a quick and efficient manner of editing a faraway object (e.g., without requiring the user to perform additional user inputs to move closer to the faraway object), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while displaying the additional representation of the first object at the respective location in the three-dimensional environment, the electronic device receives (1862), via the one or more input devices, a second user input corresponding to a request to change an orientation of the additional representation of the first object, such as the rotation of temporary representation 1726 in FIG. 17E (e.g., a rotational input to rotate the temporary object, such as those described above with respect to method 1000).

In some embodiments, in response to receiving the second user input (1864), the electronic device changes (1866) the orientation of the additional representation of the first object in accordance with the second user input without changing an orientation of the first object in the first portion of the three-dimensional environment, such as the rotation of temporary representation 1726 but not rotating cylinder 1708 in FIG. 17E (e.g., in response to the input, rotating the temporary object without rotating the original object upon which the temporary object is based). Thus, inputs that cause a change in viewing perspective of the temporary object do not cause a similar change in viewing perspective of the original object upon which the temporary object is based. For example, rotations of the temporary object and/or movements of the temporary object do not cause the original object to rotate or move.

The above-described manner of manipulating a faraway object (e.g., by rotating the temporary copy of the faraway object, but not causing the faraway object itself to rotate) provides a quick and efficient manner of editing a faraway object (e.g., by allowing the user to perform modifications to different sides of the faraway object without requiring the user to change the orientation of the faraway object itself), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while displaying the additional representation of the first object at the respective location in the three-dimensional environment, the electronic device receives (1868), via the one or more input devices, a second user input corresponding to a request to manipulate the additional representation of the first object, wherein the manipulation is other than changing an orientation of the additional representation of the first object, such as drawing on temporary representation 1726 in FIG. 17E (e.g., an input that modifies the object itself rather than the orientation or position of the object). For example, drawing on the object, changing the shape of the object, etc.

In some embodiments, in response to receiving the second user input (1870), the electronic device manipulates (1872) the additional representation of the first object in accordance with the second user input (e.g., performing the requested manipulation operation on the temporary object) and manipulates (1874) the first object in the first portion of the three-dimensional environment in accordance with the second user input, such as drawing on cylinder 1708 in FIG. 17E (e.g., performing the same requested manipulation operation on the original object upon which the temporary object is based).

In some embodiments, the manipulation is performed concurrently with the manipulation of the temporary object (e.g., manipulations are immediately transferred to the original object). In some embodiments, the manipulation of the original object is performed after a threshold amount of time has elapsed since the manipulation operation is performed on the temporary object (e.g., 0.5 seconds, 1 second, 3 seconds, 5 seconds, etc.). In some embodiments, the manipulation of the original object is performed after detecting a pause or termination in the second user input (e.g., after 0.5 seconds, 1 second, 3 seconds, 5 seconds, etc.). Thus, in some embodiments, certain manipulation operations are transferred to the original object while other manipulation operations are not transferred to the original object. For example, if the input is a request to perform a rotational or movement manipulation, the manipulation is performed on the temporary object, but not transferred to the original object, but if the input is a request to perform a manipulation other than a rotational or movement manipulation (e.g., a manipulation that changes the appearance or characteristic of the object itself, rather than the view of the object), the manipulation is performed on both the temporary object and the original object. Thus, a user is optionally able to perform manipulations on portions of the original object that are not visible (e.g., the far side), without requiring the user to rotate the original object in the three-dimensional environment. For example, during an environment creation situation, a user may place an object in a desired location in a desired orientation and may, at a future time, desire to modify the object without changing the location or orientation of the object. In such a situation, the user is optionally able to generate a temporary copy of the object and rotate the temporary object to perform modifications to different sides of the original object without causing the original object to change location or orientation (e.g., and without requiring the user to move to different sides of the object). In some embodiments, in response to the second user input, if the second user input is a request to change an orientation of the object, the orientation of the temporary object changes without changing the orientation of the original object, but if the second user input is a request to manipulate the temporary object other than a change in orientation, then the manipulation is performed on the temporary object and the original object.

The above-described manner of manipulating a faraway object (e.g., by manipulating both the temporary copy of the faraway object and the original faraway object) provides a quick and efficient manner of editing a faraway object (e.g., by allowing the user to perform modifications to the faraway object without requiring the user to move closer to the faraway object to directly edit the faraway object), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while displaying the additional representation of the first object at the respective location in the three-dimensional environment, the electronic device receives (1876), via the one or more input devices, a second user input corresponding to a request to cease display of the expanded view of the first portion of the three-dimensional environment, such as a user input causing magnified view 1714 in FIG. 17A to be dismissed (e.g., receiving a user input to dismiss the temporary copy of the object). In some embodiments, the user input is a selection of a displayed selectable option or the detection of a predetermined gesture by a hand of the user. In some embodiments, the temporary copy of the object is dismissed if a manipulation input to the temporary copy of the object is not received for a threshold amount of time (e.g., 1 second, 3 seconds, 5 seconds, 10 seconds, 30 seconds, etc.).

In some embodiments, in response to receiving the second user input, the electronic device ceases (1878) display of the expanded view of the first portion of the three-dimensional environment, including displaying an animation of the additional representation of the first object moving from the respective location in the three-dimensional environment to a location of the first object in the first portion of the three-dimensional environment, such as displaying an animation of cylinder 1716 merging into cylinder 1708 in FIG. 17A (e.g., dismissing the temporary copy of the object and displaying an animation of the temporary copy of the object moving to the location of the original object).

In some embodiments, the animation includes the temporary copy of the object absorbing into and/or dissolving into the original object. In some embodiments, when the temporary copy of the object is dismissed, the manipulations to the temporary copy of the object are transferred to the original object (e.g., non-rotational manipulations are queued and transferred when the temporary copy is dismissed, optionally instead of transferring the manipulations to the original object when the manipulations are received).

The above-described manner of dismissing the temporary copy of a faraway object (e.g., by displaying an animation of the temporary copy reincorporating with the original faraway object) provides a quick and efficient manner of editing a faraway object (e.g., by displaying a visual indication that the temporary object is based on the faraway object and that modifications to the temporary object have been or will be transferred to the original faraway object), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while displaying the expanded view of the first portion of the three-dimensional environment within the respective user interface element in the three-dimensional environment, the electronic device receives (1880), via the one or more input devices, a second user input directed to the first object, such as an input directed to cylinder 1716 in FIG. 17B (e.g., an input that modifies the first object via the portal, including drawing on the object, changing the shape, rotating, resizing, etc.). For example, the user input interacts with the first object that is displayed in the portal (e.g., as opposed to directly interacting with the first object in the first view of the environment).

In some embodiments, in response to receiving the second user input (1882), in accordance with a determination that the second user input corresponds to a request to change an orientation of the first object (1884), such as the rotation of cylinder 1716 in FIG. 17B (e.g., a rotational input to rotate the temporary object, such as those described above with respect to method 1000), the electronic device changes (1886) the orientation of the additional representation of the first object in accordance with the second user input without changing an orientation of the first object in the first portion of the three-dimensional environment, such as the rotation of cylinder 1708 in FIG. 17B (e.g., in response to the input, rotating the first object that is displayed in the portal as well as the first object that is not displayed in the portal (e.g., the "regular" view of the first object)).

In some embodiments, rotations to the "portal" view of the first object and the "regular" view of the first object are performed concurrently. Thus, inputs that cause a change in viewing orientation of the first object cause a similar change in orientation of the original view of the first object.

In some embodiments, in accordance with a determination that the second user input corresponds to a request to manipulate the first object, wherein the manipulation is other than changing the orientation of the first object (1888) (e.g., an input that modifies the object itself rather than the orientation or position of the object, such as drawing on the object, changing the shape of the object, etc.), the electronic device manipulates (1890) the first object in the first portion of the three-dimensional environment in accordance with the second user input, such as drawing content 1720 on cylinder 1716 causing drawing content 1722 on cylinder 1708 in FIG. 17B (e.g., performing the requested manipulation operation on the first object).

In some embodiments, manipulations to the "portal" view of the first object and the "regular" view of the first object are performed concurrently. Thus, in some embodiments, manipulation operations are performed on both the "portal" view of the first object and the "regular" view of the first object (e.g., because manipulating the portal view of the object is treated by the device as being analogous to the user directly manipulating the first object). In some embodiments, both rotational and movement manipulations are transferred to the "regular" view of the first object (e.g., as opposed to the additional representation of the first object described above in which rotational and movement manipulations are not transferred to the original object).

The above-described manner of manipulating a faraway object (e.g., by manipulating the faraway object that is displayed in the expanded view, which causes the same manipulation to the faraway object) provides a quick and efficient manner of editing a faraway object (e.g., by automatically transferring manipulations to the faraway object, without requiring the user to move closer to the faraway object to directly edit the faraway object), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, aspects/operations of methods 800, 1000, 1200, 1400, 1600, and 1800 may be interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
   at an electronic device in communication with a display generation component and one or more input devices:
   displaying, via the display generation component, a three-dimensional environment including a first object at a first location, wherein a second location in the three-dimensional environment, different from the first location, corresponds to a location of a predefined portion of a user of the electronic device in a physical environment;
   while displaying the three-dimensional environment including the first object at the first location, receiving, via the one or more input devices, a user input including a movement of the predefined portion of the user that has a first magnitude; and
   in response to receiving the user input:
   in accordance with a determination that the first object is a first distance from the second location, moving the first object in the three-dimensional environment from the first location by a first amount in accordance with the first magnitude of the user input; and
   in accordance with a determination that the first object is a second distance from the second location, different from the first distance, moving the first object in the three-dimensional environment from the first location by a second amount, different from the first amount, in accordance with the first magnitude of the user input; and
   while receiving the user input, displaying a visual indication at a third location of a snap point for the first object that has an appearance that is based on a size and shape of a portion of the first object that will make contact with the third location if the first object is snapped to the third location.

2. The method of claim 1, wherein:
   the movement of the predefined portion of the user has a first direction,
   moving the first object in the three-dimensional environment is in a respective direction based on the first direction.

3. The method of claim 1, wherein the first distance and the second distance are greater than a threshold distance from the second location, the method further comprising:
   in response to receiving the user input:
   in accordance with a determination that the first object is less than the threshold distance from the second location, moving the first object in the three-dimensional environment from the first location by the first magnitude.

4. The method of claim 1, wherein:
   the movement of the predefined portion of the user includes a first portion of the movement that has a respective magnitude and a second portion of the movement that has the respective magnitude, and
   moving the first object in the three-dimensional environment from the first location includes:
   changing a distance of the first object from the second location,
   moving the first object by a first respective amount in accordance with the first portion of the movement of the predefined portion of the user, and
   moving the first object by a second respective amount, different from the first respective amount, in accordance with the second portion of the movement of the predefined portion of the user.

5. The method of claim 1, wherein the user input includes a pinch gesture performed by the predefined portion of the user, followed by the movement of the predefined portion of the user.

6. The method of claim 1, wherein receiving the user input includes detecting, via an eye tracking device, that a gaze of the user of the electronic device is directed to the first object.

7. The method of claim 1, wherein the three-dimensional environment includes a respective predefined location on a respective surface, and moving the first object in the three-dimensional environment includes:
   in accordance with a determination that a current location of the first object in the three-dimensional environment is within a threshold distance of the respective predefined location of the respective surface in the three-dimensional environment, snapping the first object to the respective predefined location in the three-dimensional environment.

8. The method of claim 7, further comprising:
   in accordance with the determination that the current location of the first object in the three-dimensional environment is within the threshold distance of the respective predefined location in the three-dimensional environment, displaying, via the display generation component, a visual indication of the respective predefined location in the three-dimensional environment.

9. The method of claim 8, wherein a size of the visual indication of the respective predefined location is based on a size of the first object.

10. The method of claim 8, wherein a shape of the visual indication of the respective predefined location is based on a shape of the first object, and indicates an area of the three-dimensional environment that will be occupied by a portion of the first object when the first object is placed at the respective predefined location in the three-dimensional environment.

11. The method of claim 10, further comprising:
    concurrently displaying, via the display generation component, a shadow corresponding to the first object in the three-dimensional environment and the visual indication of the respective predefined location, wherein the shadow is different from the visual indication of the respective predefined location.

12. The method of claim 8, wherein the respective predefined location is located on a surface of a respective object in the three-dimensional environment, and displaying the visual indication of the respective predefined location includes visually emphasizing the surface of the respective object.

13. The method of claim 8, further comprising:
    while the current location of the first object in the three-dimensional environment is within the threshold distance of the respective predefined location in the three-dimensional environment and while displaying the visual indication of the respective predefined location in the three-dimensional environment, detecting movement of the first object to a distance further away than the threshold distance from the respective predefined location in the three-dimensional environment; and in response to detecting the movement of the first object to the distance further away than the threshold distance from the respective predefined location in the three-dimensional environment, ceasing display of the visual indication of the respective predefined location.

14. The method of claim 8, further comprising:
while the current location of the first object in the three-dimensional environment is within the threshold distance of the respective predefined location in the three-dimensional environment and while displaying the visual indication of the respective predefined location in the three-dimensional environment, detecting manipulation of the first object; and
in response to detecting the manipulation of the first object, updating display of the visual indication of the respective predefined location to reflect the manipulation of the first object.

15. The method of claim 7, further comprising:
while moving the first object in the three-dimensional environment:
in accordance with the determination that the current location of the first object in the three-dimensional environment is within the threshold distance of the respective predefined location in the three-dimensional environment, generating, via the electronic device, a respective tactile output.

16. The method of claim 7, wherein:
in accordance with a determination that the respective predefined location in the three-dimensional environment corresponds to a first type of surface in the three-dimensional environment, the threshold distance is a first threshold distance, and
in accordance with a determination that the respective predefined location in the three-dimensional environment corresponds to a second type of surface, different from the first type of surface, in the three-dimensional environment, the threshold distance is a second threshold distance, different from the first threshold distance.

17. The method of claim 1, wherein the user input includes a selection input followed by a pause input for longer than a time threshold, followed by the movement of the predefined portion of the user.

18. The method of claim 1, wherein the first magnitude of the movement of the predefined portion of the user is greater than a magnitude threshold, the method further comprising:
in response to receiving the user input:
in accordance with a determination that the first magnitude of the movement of the predefined portion of the user is less than the magnitude threshold, maintaining the first object at the first location in the three-dimensional environment.

19. The method of claim 1, wherein while receiving the user input:
in accordance with a determination that the first object is within a first threshold distance of a first snap point and within a second threshold distance of a second snap point, displaying, in the three-dimensional environment, a first visual indication of the first snap point and a second visual indication of the second snap point; and
in accordance with a determination that the first object is within the first threshold distance of the first snap point and not within the second threshold distance of the second snap point, displaying the first visual indication of the first snap point without displaying the second visual indication of the second snap point.

20. An electronic device, comprising:
one or more processors;
memory; and
one or more programs, wherein the one or more programs are stored in the memory and configured to be executed by the one or more processors, the one or more programs including instructions for:
displaying, via a display generation component, a three-dimensional environment including a first object at a first location, wherein a second location in the three-dimensional environment, different from the first location, corresponds to a location of a predefined portion of a user of the electronic device in a physical environment;
while displaying the three-dimensional environment including the first object at the first location, receiving, via one or more input devices, a user input including a movement of the predefined portion of the user that has a first magnitude; and
in response to receiving the user input:
in accordance with a determination that the first object is a first distance from the second location, moving the first object in the three-dimensional environment from the first location by a first amount in accordance with the first magnitude of the user input; and
in accordance with a determination that the first object is a second distance from the second location, different from the first distance, moving the first object in the three-dimensional environment from the first location by a second amount, different from the first amount, in accordance with the first magnitude of the user input; and
while receiving the user input, displaying a visual indication at a third location of a snap point for the first object that has an appearance that is based on a size and shape of a portion of the first object that will make contact with the third location if the first object is snapped to the third location.

21. The electronic device of claim 20, wherein:
the movement of the predefined portion of the user has a first direction,
moving the first object in the three-dimensional environment is in a respective direction based on the first direction.

22. The electronic device of claim 20, wherein the first distance and the second distance are greater than a threshold distance from the second location, the one or more programs further include instructions for:
in response to receiving the user input:
in accordance with a determination that the first object is less than the threshold distance from the second location, moving the first object in the three-dimensional environment from the first location by the first magnitude.

23. The electronic device of claim 20, wherein:
the movement of the predefined portion of the user includes a first portion of the movement that has a respective magnitude and a second portion of the movement that has the respective magnitude, and
moving the first object in the three-dimensional environment from the first location includes:
changing a distance of the first object from the second location,
moving the first object by a first respective amount in accordance with the first portion of the movement of the predefined portion of the user, and
moving the first object by a second respective amount, different from the first respective amount, in accordance with the second portion of the movement of the predefined portion of the user.

24. The electronic device of claim 20, wherein the user input includes a pinch gesture performed by the predefined portion of the user, followed by the movement of the predefined portion of the user.

25. The electronic device of claim 20, wherein receiving the user input includes detecting, via an eye tracking device, that a gaze of the user of the electronic device is directed to the first object.

26. The electronic device of claim 20, wherein the three-dimensional environment includes a respective predefined location on a respective surface, and moving the first object in the three-dimensional environment includes:
   in accordance with a determination that a current location of the first object in the three-dimensional environment is within a threshold distance of the respective predefined location of the respective surface in the three-dimensional environment, snapping the first object to the respective predefined location in the three-dimensional environment.

27. The electronic device of claim 26, wherein the one or more programs further include instructions for:
   in accordance with the determination that the current location of the first object in the three-dimensional environment is within the threshold distance of the respective predefined location in the three-dimensional environment, displaying, via the display generation component, a visual indication of the respective predefined location in the three-dimensional environment.

28. The electronic device of claim 27, wherein a size of the visual indication of the respective predefined location is based on a size of the first object.

29. The electronic device of claim 27, wherein a shape of the visual indication of the respective predefined location is based on a shape of the first object, and indicates an area of the three-dimensional environment that will be occupied by a portion of the first object when the first object is placed at the respective predefined location in the three-dimensional environment.

30. The electronic device of claim 29, wherein the one or more programs further include instructions for:
   concurrently displaying, via the display generation component, a shadow corresponding to the first object in the three-dimensional environment and the visual indication of the respective predefined location, wherein the shadow is different from the visual indication of the respective predefined location.

31. The electronic device of claim 27, wherein the respective predefined location is located on a surface of a respective object in the three-dimensional environment, and displaying the visual indication of the respective predefined location includes visually emphasizing the surface of the respective object.

32. The electronic device of claim 27, wherein the one or more programs further include instructions for:
   while the current location of the first object in the three-dimensional environment is within the threshold distance of the respective predefined location in the three-dimensional environment and while displaying the visual indication of the respective predefined location in the three-dimensional environment, detecting movement of the first object to a distance further away than the threshold distance from the respective predefined location in the three-dimensional environment; and
   in response to detecting the movement of the first object to the distance further away than the threshold distance from the respective predefined location in the three-dimensional environment, ceasing display of the visual indication of the respective predefined location.

33. The electronic device of claim 27, wherein the one or more programs further include instructions for:
   while the current location of the first object in the three-dimensional environment is within the threshold distance of the respective predefined location in the three-dimensional environment and while displaying the visual indication of the respective predefined location in the three-dimensional environment, detecting manipulation of the first object; and
   in response to detecting the manipulation of the first object, updating display of the visual indication of the respective predefined location to reflect the manipulation of the first object.

34. The electronic device of claim 26, wherein the one or more programs further include instructions for:
   while moving the first object in the three-dimensional environment:
   in accordance with the determination that the current location of the first object in the three-dimensional environment is within the threshold distance of the respective predefined location in the three-dimensional environment, generating, via the electronic device, a respective tactile output.

35. The electronic device of claim 26, wherein:
   in accordance with a determination that the respective predefined location in the three-dimensional environment corresponds to a first type of surface in the three-dimensional environment, the threshold distance is a first threshold distance, and
   in accordance with a determination that the respective predefined location in the three-dimensional environment corresponds to a second type of surface, different from the first type of surface, in the three-dimensional environment, the threshold distance is a second threshold distance, different from the first threshold distance.

36. The electronic device of claim 20, wherein the user input includes a selection input followed by a pause input for longer than a time threshold, followed by the movement of the predefined portion of the user.

37. The electronic device of claim 20, wherein the first magnitude of the movement of the predefined portion of the user is greater than a magnitude threshold, the one or more programs further include instructions for:
   in response to receiving the user input:
   in accordance with a determination that the first magnitude of the movement of the predefined portion of the user is less than the magnitude threshold, maintaining the first object at the first location in the three-dimensional environment.

38. The electronic device of claim 20, wherein while receiving the user input:
   in accordance with a determination that the first object is within a first threshold distance of a first snap point and within a second threshold distance of a second snap point, displaying, in the three-dimensional environment, a first visual indication of the first snap point and a second visual indication of the second snap point; and
   in accordance with a determination that the first object is within the first threshold distance of the first snap point and not within the second threshold distance of the second snap point, displaying the first visual indication of the first snap point without displaying the second visual indication of the second snap point.

39. A non-transitory computer readable storage medium storing one or more programs, the one or more programs comprising instructions, which when executed by one or more processors of an electronic device, cause the electronic device to perform a method comprising:
  displaying, via a display generation component, a three-dimensional environment including a first object at a first location, wherein a second location in the three-dimensional environment, different from the first location, corresponds to a location of a predefined portion of a user of the electronic device in a physical environment;
  while displaying the three-dimensional environment including the first object at the first location, receiving, via one or more input devices, a user input including a movement of the predefined portion of the user that has a first magnitude; and
  in response to receiving the user input:
    in accordance with a determination that the first object is a first distance from the second location, moving the first object in the three-dimensional environment from the first location by a first amount in accordance with the first magnitude of the user input; and
    in accordance with a determination that the first object is a second distance from the second location, different from the first distance, moving the first object in the three-dimensional environment from the first location by a second amount, different from the first amount, in accordance with the first magnitude of the user input; and
  while receiving the user input, displaying a visual indication at a third location of a snap point for the first object that has an appearance that is based on a size and shape of a portion of the first object that will make contact with the third location if the first object is snapped to the third location.

40. The non-transitory computer readable storage medium of claim 39, wherein:
  the movement of the predefined portion of the user has a first direction,
  moving the first object in the three-dimensional environment is in a respective direction based on the first direction.

41. The non-transitory computer readable storage medium of claim 39, wherein the first distance and the second distance are greater than a threshold distance from the second location, the method further comprising:
  in response to receiving the user input:
    in accordance with a determination that the first object is less than the threshold distance from the second location, moving the first object in the three-dimensional environment from the first location by the first magnitude.

42. The non-transitory computer readable storage medium of claim 39, wherein:
  the movement of the predefined portion of the user includes a first portion of the movement that has a respective magnitude and a second portion of the movement that has the respective magnitude, and
  moving the first object in the three-dimensional environment from the first location includes:
    changing a distance of the first object from the second location,
    moving the first object by a first respective amount in accordance with the first portion of the movement of the predefined portion of the user, and
    moving the first object by a second respective amount, different from the first respective amount, in accordance with the second portion of the movement of the predefined portion of the user.

43. The non-transitory computer readable storage medium of claim 39, wherein the user input includes a pinch gesture performed by the predefined portion of the user, followed by the movement of the predefined portion of the user.

44. The non-transitory computer readable storage medium of claim 39, wherein receiving the user input includes detecting, via an eye tracking device, that a gaze of the user of the electronic device is directed to the first object.

45. The non-transitory computer readable storage medium of claim 39, wherein the three-dimensional environment includes a respective predefined location on a respective surface, and moving the first object in the three-dimensional environment includes:
  in accordance with a determination that a current location of the first object in the three-dimensional environment is within a threshold distance of the respective predefined location of the respective surface in the three-dimensional environment, snapping the first object to the respective predefined location in the three-dimensional environment.

46. The non-transitory computer readable storage medium of claim 45, wherein the method further comprising:
  in accordance with the determination that the current location of the first object in the three-dimensional environment is within the threshold distance of the respective predefined location in the three-dimensional environment, displaying, via the display generation component, a visual indication of the respective predefined location in the three-dimensional environment.

47. The non-transitory computer readable storage medium of claim 46, wherein a size of the visual indication of the respective predefined location is based on a size of the first object.

48. The non-transitory computer readable storage medium of claim 46, wherein a shape of the visual indication of the respective predefined location is based on a shape of the first object, and indicates an area of the three-dimensional environment that will be occupied by a portion of the first object when the first object is placed at the respective predefined location in the three-dimensional environment.

49. The non-transitory computer readable storage medium of claim 48, wherein the method further comprising:
  concurrently displaying, via the display generation component, a shadow corresponding to the first object in the three-dimensional environment and the visual indication of the respective predefined location, wherein the shadow is different from the visual indication of the respective predefined location.

50. The non-transitory computer readable storage medium of claim 46, wherein the respective predefined location is located on a surface of a respective object in the three-dimensional environment, and displaying the visual indication of the respective predefined location includes visually emphasizing the surface of the respective object.

51. The non-transitory computer readable storage medium of claim 46, wherein the method further comprising:
  while the current location of the first object in the three-dimensional environment is within the threshold distance of the respective predefined location in the three-dimensional environment and while displaying the visual indication of the respective predefined location in the three-dimensional environment, detecting movement of the first object to a distance further away than the threshold distance from the respective predefined location in the three-dimensional environment; and in response to detecting the movement of the first object to the distance further away than the threshold distance from the respective predefined location in the three-dimensional environment, ceasing display of the visual indication of the respective predefined location.

52. The non-transitory computer readable storage medium of claim 46 wherein the method further comprising:

while the current location of the first object in the three-dimensional environment is within the threshold distance of the respective predefined location in the three-dimensional environment and while displaying the visual indication of the respective predefined location in the three-dimensional environment, detecting manipulation of the first object; and in response to detecting the manipulation of the first object, updating display of the visual indication of the respective predefined location to reflect the manipulation of the first object.

53. The non-transitory computer readable storage medium of claim 45, wherein the method further comprising:

while moving the first object in the three-dimensional environment:

in accordance with the determination that the current location of the first object in the three-dimensional environment is within the threshold distance of the respective predefined location in the three-dimensional environment, generating, via the electronic device, a respective tactile output.

54. The non-transitory computer readable storage medium of claim 45, wherein:

in accordance with a determination that the respective predefined location in the three-dimensional environment corresponds to a first type of surface in the three-dimensional environment, the threshold distance is a first threshold distance, and in accordance with a determination that the respective predefined location in the three-dimensional environment corresponds to a second type of surface, different from the first type of surface, in the three-dimensional environment, the threshold distance is a second threshold distance, different from the first threshold distance.

55. The non-transitory computer readable storage medium of claim 39, wherein the user input includes a selection input followed by a pause input for longer than a time threshold, followed by the movement of the predefined portion of the user.

56. The non-transitory computer readable storage medium of claim 39, wherein the first magnitude of the movement of the predefined portion of the user is greater than a magnitude threshold, the method further comprising:

in response to receiving the user input:

in accordance with a determination that the first magnitude of the movement of the predefined portion of the user is less than the magnitude threshold, maintaining the first object at the first location in the three-dimensional environment.

57. The non-transitory computer readable storage medium of claim 39, wherein while receiving the user input:

in accordance with a determination that the first object is within a first threshold distance of a first snap point and within a second threshold distance of a second snap point, displaying, in the three-dimensional environment, a first visual indication of the first snap point and a second visual indication of the second snap point; and in accordance with a determination that the first object is within the first threshold distance of the first snap point and not within the second threshold distance of the second snap point, displaying the first visual indication of the first snap point without displaying the second visual indication of the second snap point.

\* \* \* \* \*